Oct. 9, 1962 J. M. CUNNINGHAM ET AL 3,057,422
TOLL HIGHWAY RECORDER SYSTEM
Filed July 14, 1954 61 Sheets-Sheet 1

INVENTORS
JAMES M. CUNNINGHAM
PAUL M. KOVACH
BY
J. Tanain Jr.
ATTORNEY

Oct. 9, 1962   J. M. CUNNINGHAM ET AL   3,057,422
TOLL HIGHWAY RECORDER SYSTEM
Filed July 14, 1954   61 Sheets-Sheet 2

Oct. 9, 1962　　　J. M. CUNNINGHAM ET AL　　　3,057,422
TOLL HIGHWAY RECORDER SYSTEM
Filed July 14, 1954　　　　　　　　　　　　　　　61 Sheets-Sheet 3

| TO STATION NUMBER | 5 | 10 | 12 | 28 | 31 | 32 | 35 | 40 | 42 | 44 | 47 | 50 | | CLASSIFICATION | ENTRANCE BINGHAMTON STATION NO. 30 |
|---|---|---|---|---|---|---|---|---|---|---|---|---|---|---|---|
| | 10.20 | | | | | 0.95 | | | | | | 10.30 | 9 | | |
| | 9.00 | | | | | 0.85 | | | | | | 9.10 | 8 | | |
| | 8.15 | | | | | 0.75 | | | | | | 8.05 | 7 | | |
| | 7.00 | | | | | 0.65 | | | | | | 7.10 | 6 | | |
| | 6.05 | | | | | 0.55 | | | | | | 6.00 | 5 | | |
| | 5.00 | | | | | 0.45 | | | | | | 4.95 | 4 | | |
| | 3.95 | | | | | 0.35 | | | | | | 3.30 | 3 | | |
| | 2.85 | | | | | 0.25 | | | | | | 2.25 | 2 | | |
| | 2.00 | | | | | 0.15 | | | | | | 1.80 | 1 | | |
| TO STATION NUMBER | 5 | 10 | 12 | 28 | 31 | 32 | 35 | 40 | 42 | 44 | 47 | 50 | | | |

Oct. 9, 1962 J. M. CUNNINGHAM ET AL 3,057,422
TOLL HIGHWAY RECORDER SYSTEM
Filed July 14, 1954 61 Sheets-Sheet 4
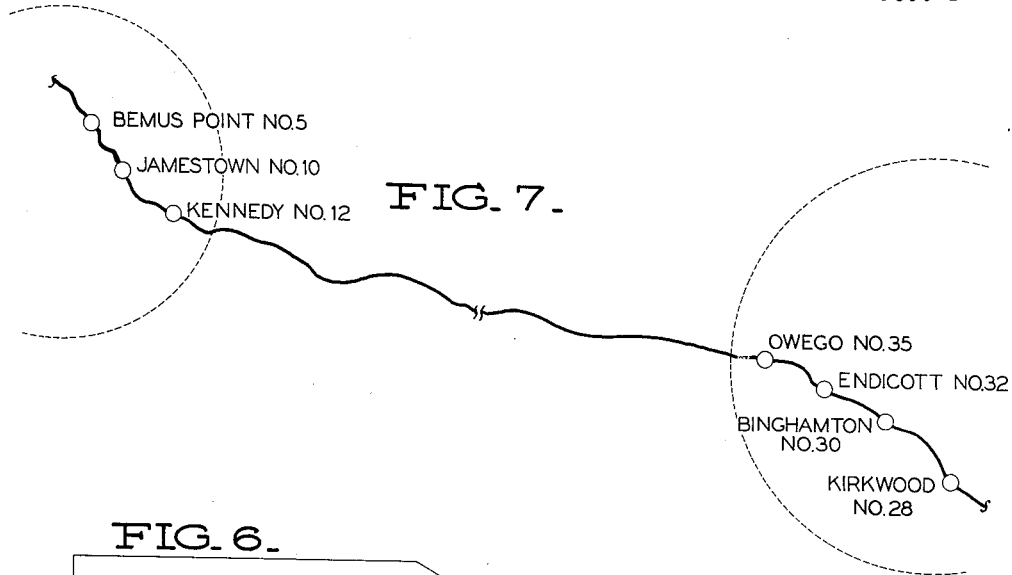
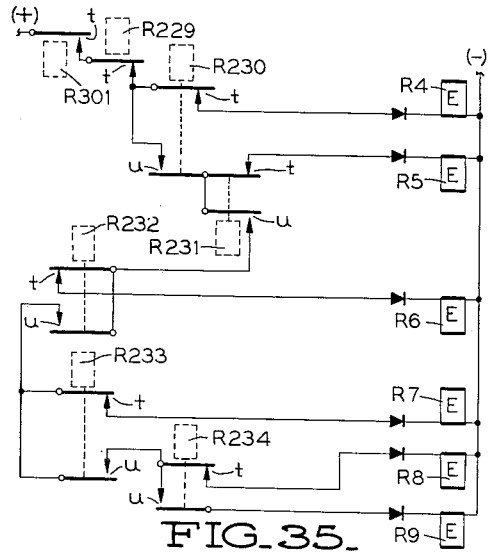
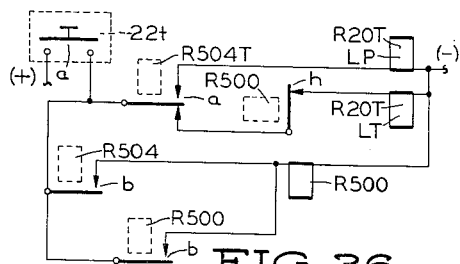

Oct. 9, 1962         J. M. CUNNINGHAM ET AL         3,057,422
                    TOLL HIGHWAY RECORDER SYSTEM
Filed July 14, 1954                              61 Sheets-Sheet 5

Oct. 9, 1962 J. M. CUNNINGHAM ET AL 3,057,422
TOLL HIGHWAY RECORDER SYSTEM
Filed July 14, 1954 61 Sheets-Sheet 8

Oct. 9, 1962 J. M. CUNNINGHAM ET AL 3,057,422
TOLL HIGHWAY RECORDER SYSTEM
Filed July 14, 1954 61 Sheets-Sheet 9

Oct. 9, 1962    J. M. CUNNINGHAM ET AL    3,057,422
TOLL HIGHWAY RECORDER SYSTEM
Filed July 14, 1954    61 Sheets-Sheet 10
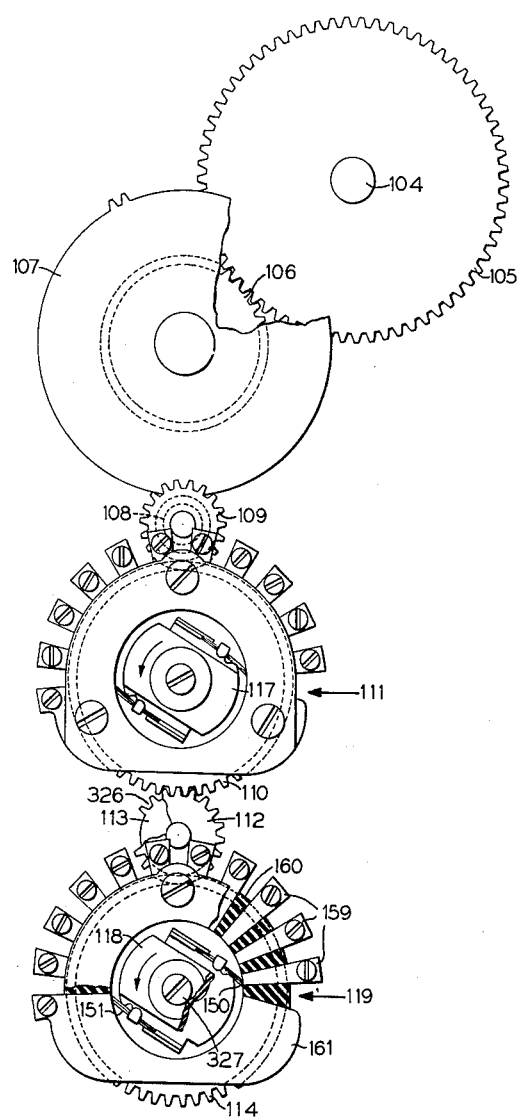
FIG_13_
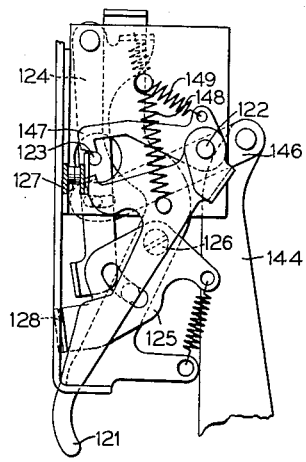
FIG_14_
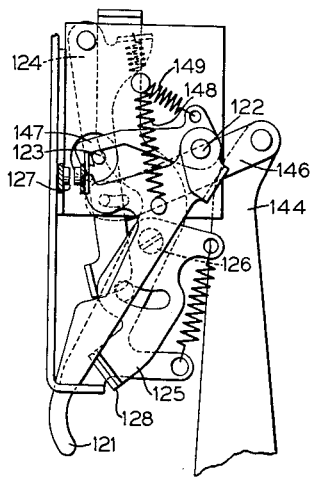
FIG_15_

Oct. 9, 1962
J. M. CUNNINGHAM ET AL
3,057,422
TOLL HIGHWAY RECORDER SYSTEM
Filed July 14, 1954
61 Sheets-Sheet 11
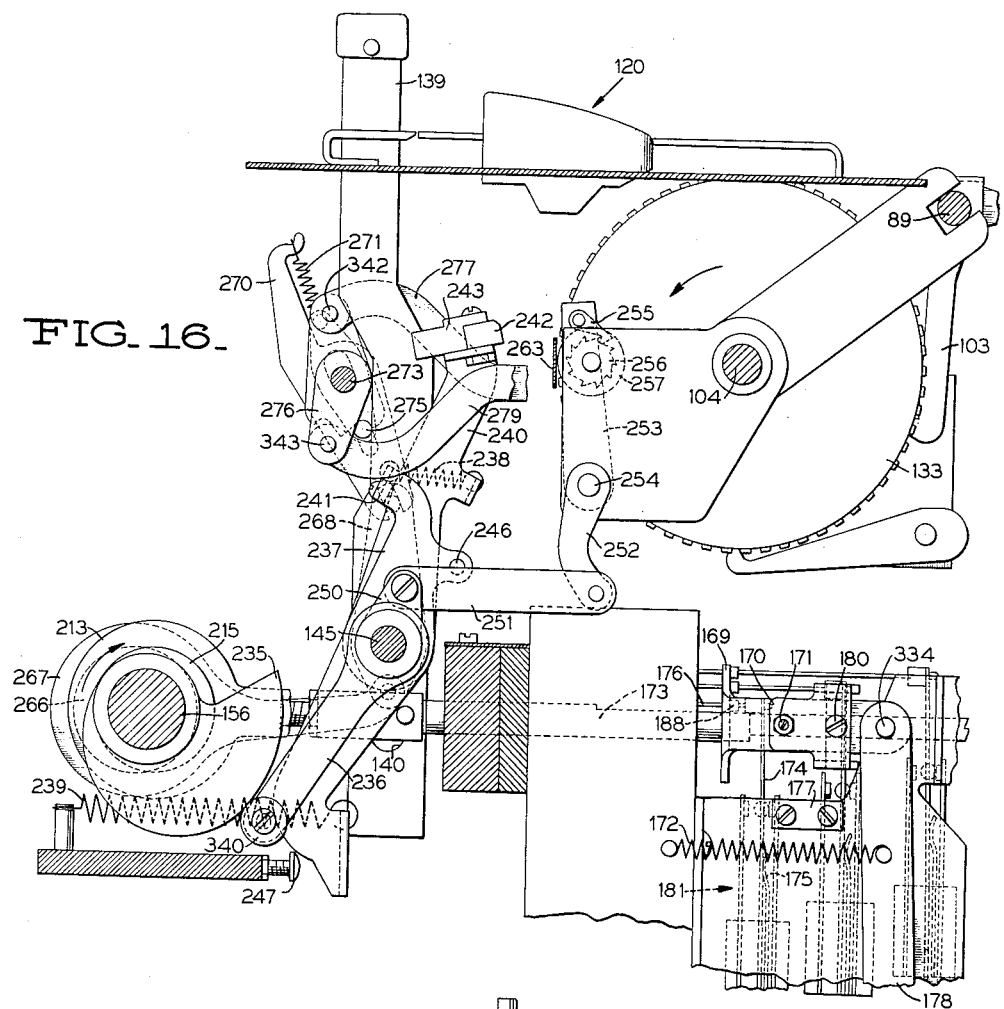
FIG_16_
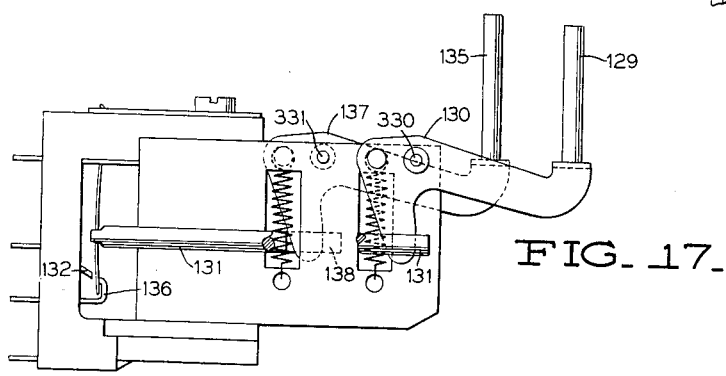
FIG_17_

Oct. 9, 1962   J. M. CUNNINGHAM ET AL   3,057,422
TOLL HIGHWAY RECORDER SYSTEM
Filed July 14, 1954   61 Sheets-Sheet 13

Oct. 9, 1962  J. M. CUNNINGHAM ET AL  3,057,422
TOLL HIGHWAY RECORDER SYSTEM
Filed July 14, 1954  61 Sheets-Sheet 15
FIG_23_
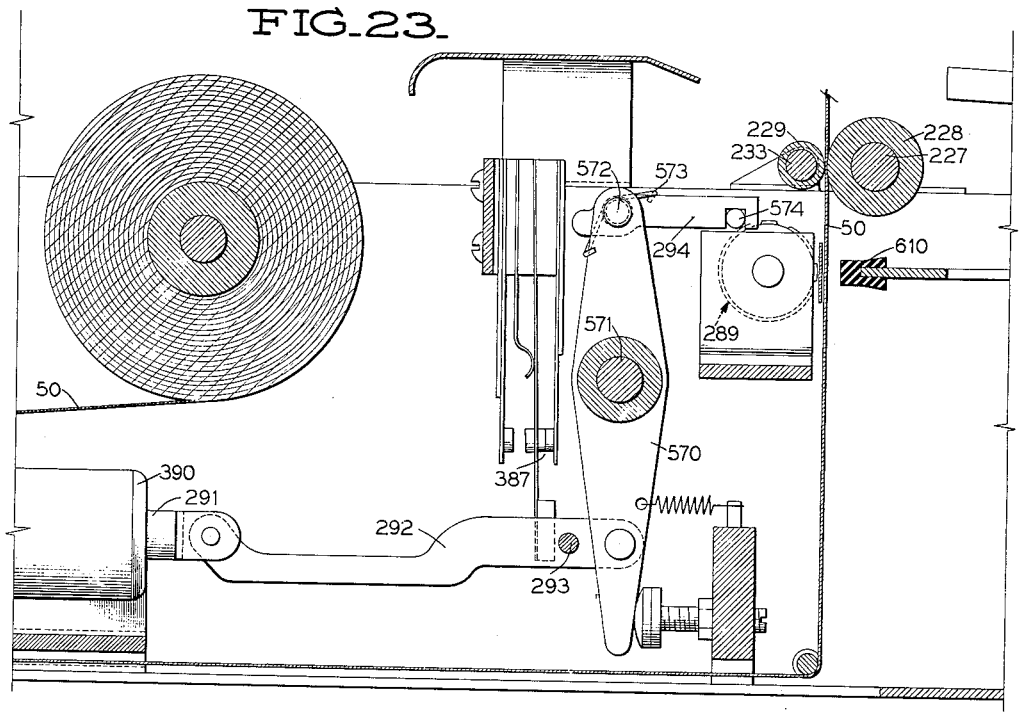
FIG_24_
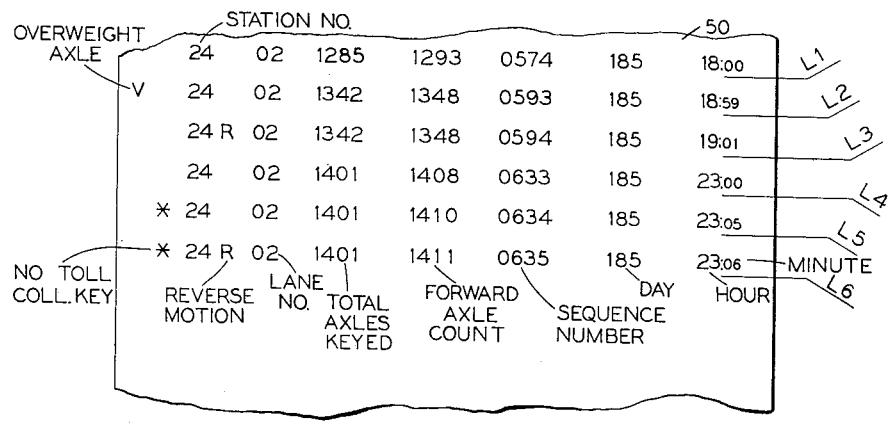

Oct. 9, 1962  J. M. CUNNINGHAM ET AL  3,057,422
TOLL HIGHWAY RECORDER SYSTEM
Filed July 14, 1954  61 Sheets-Sheet 16
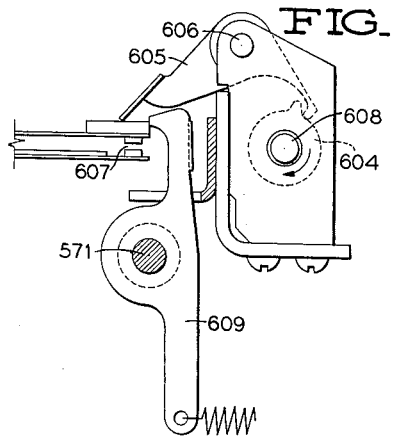
FIG. 25.
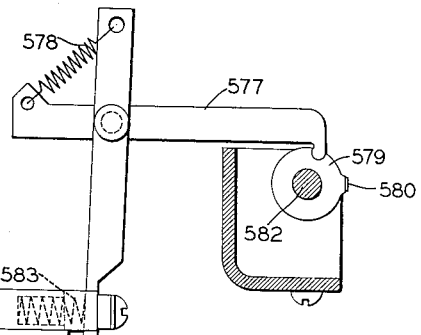
FIG. 26.
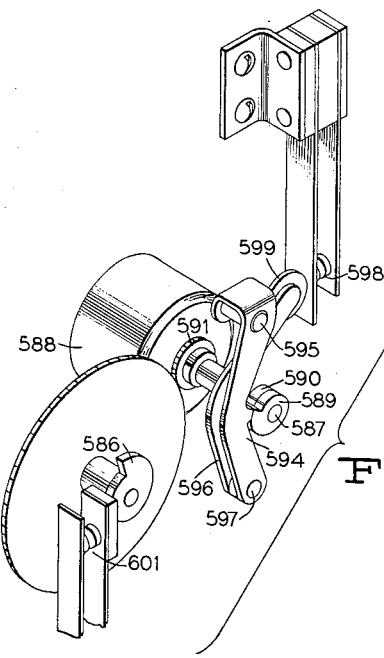
FIG. 28.
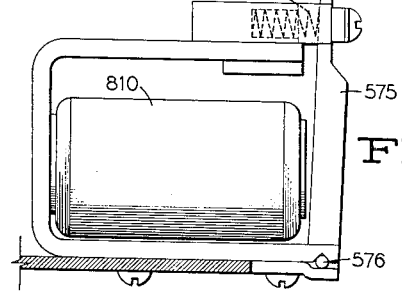
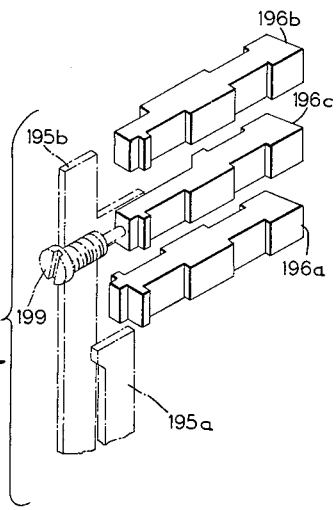
FIG. 27.

Oct. 9, 1962

J. M. CUNNINGHAM ET AL 3,057,422

TOLL HIGHWAY RECORDER SYSTEM

Filed July 14, 1954

ENTRANCE STATION TOLL RECORDER

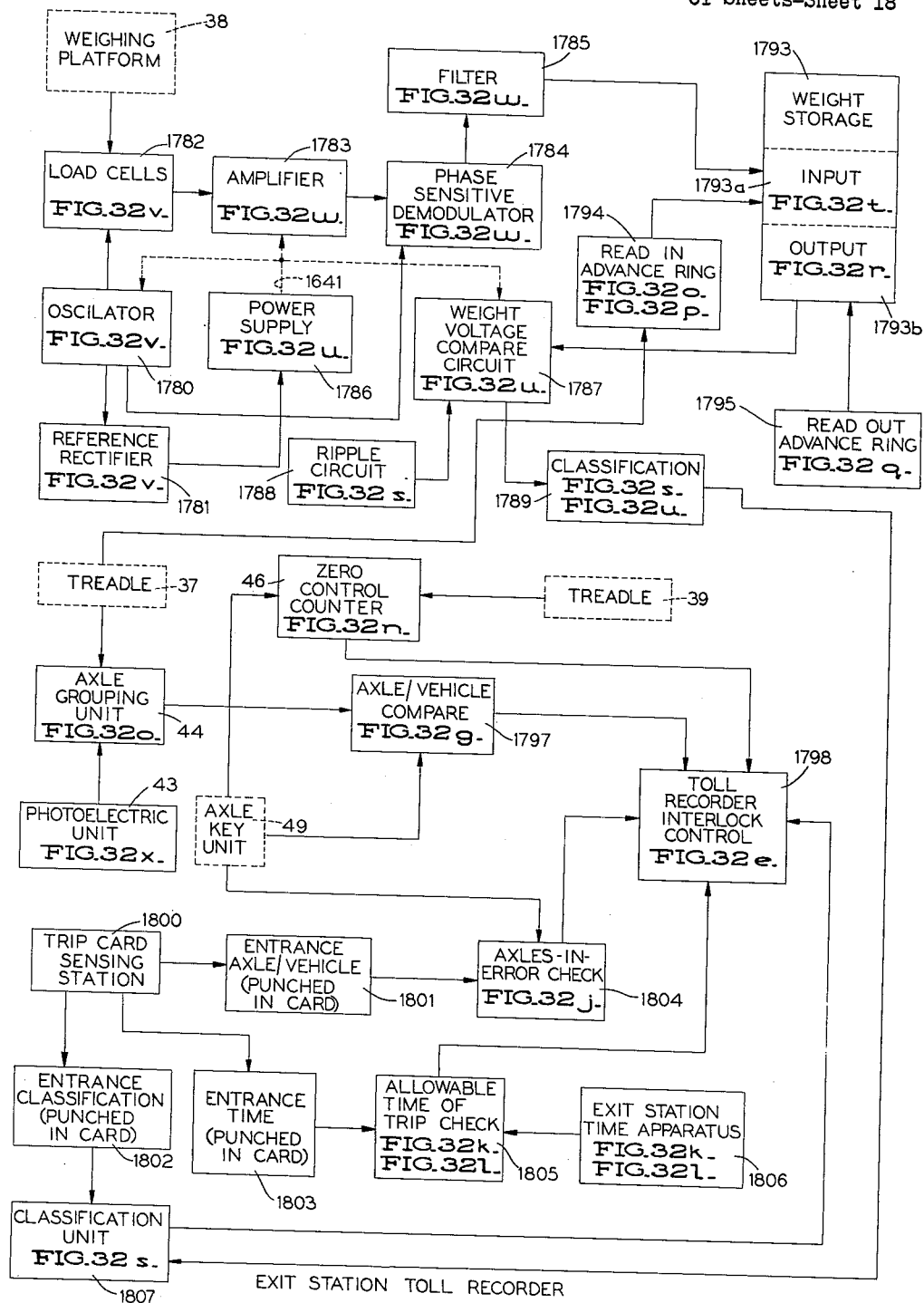
FIG_30_

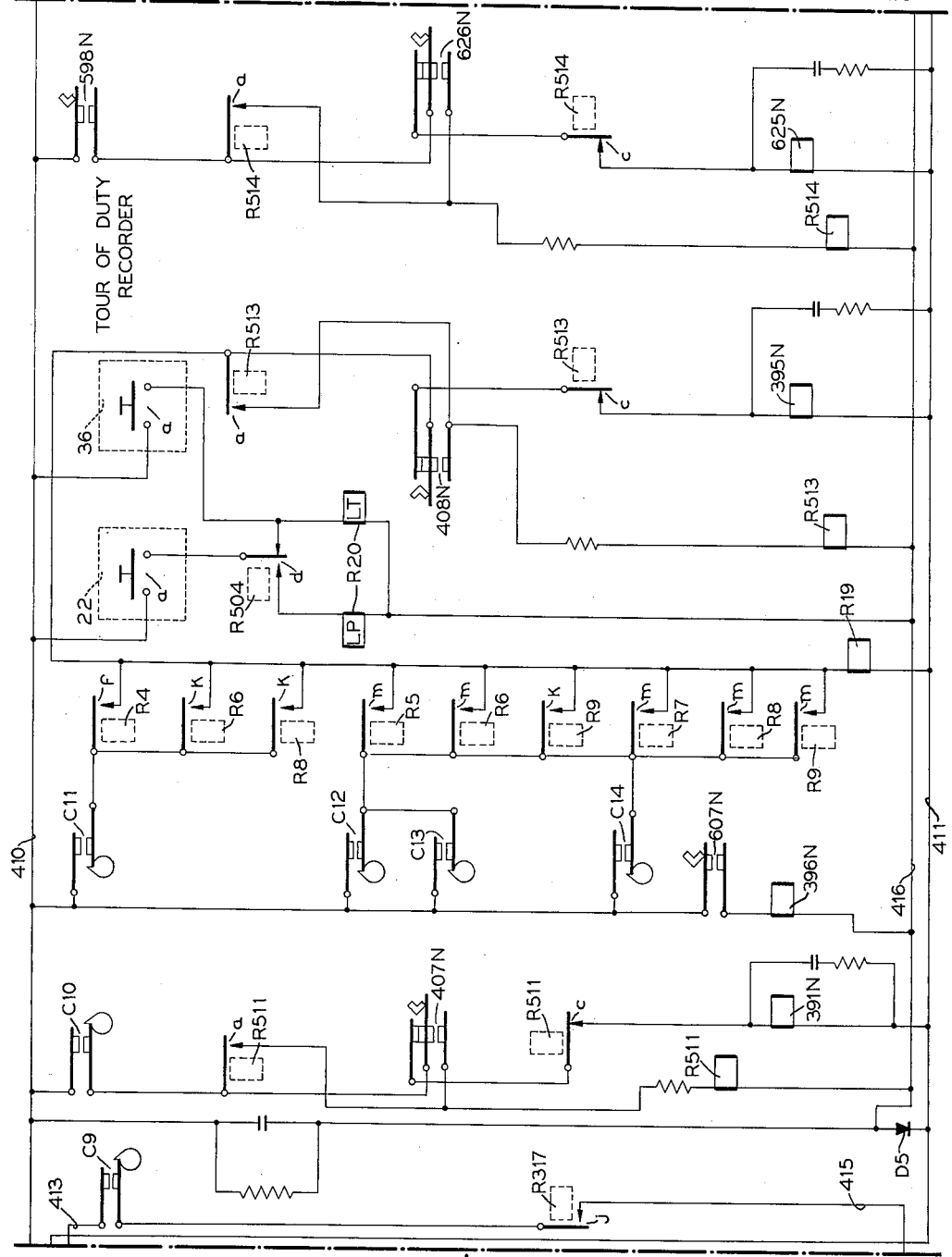

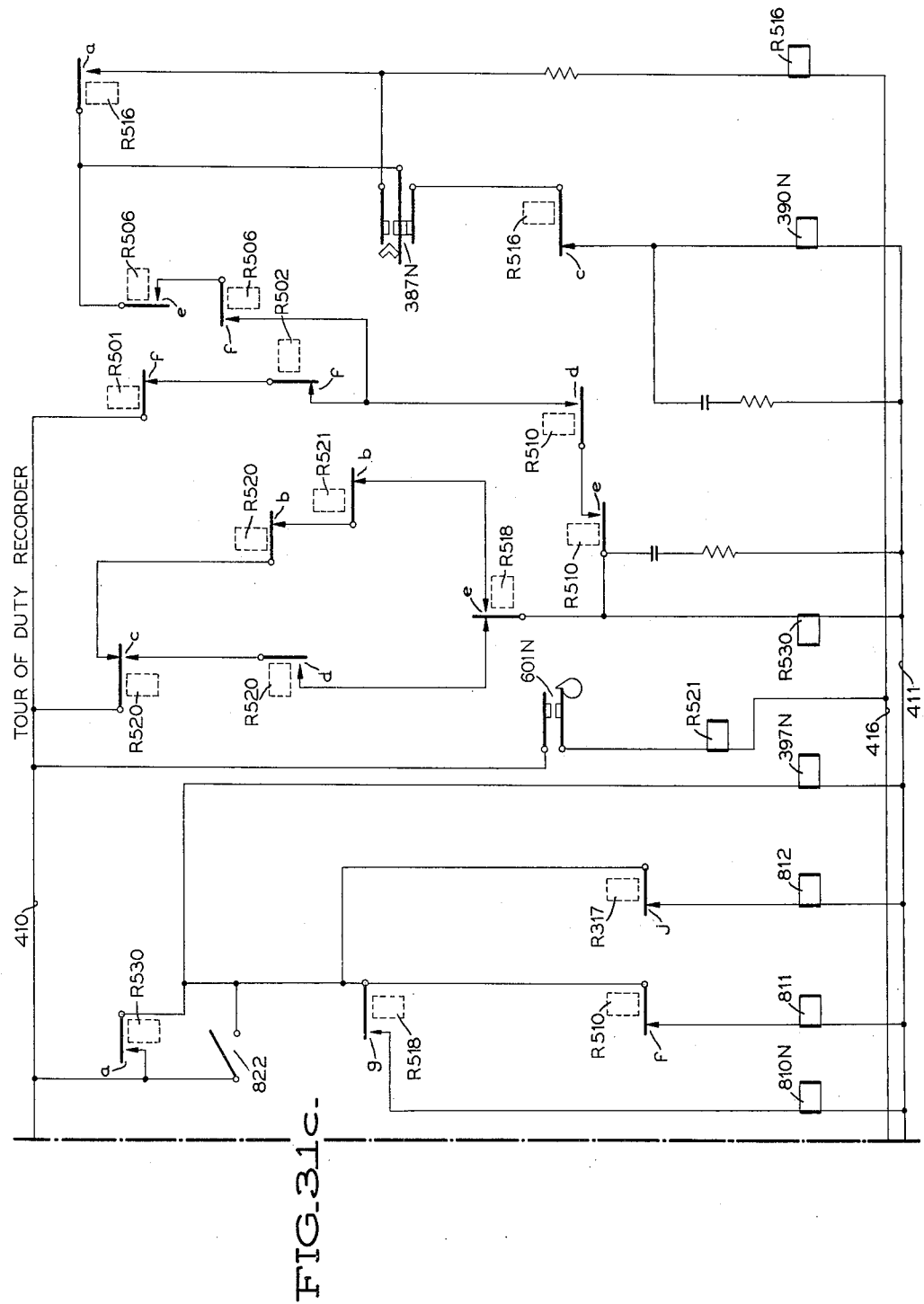

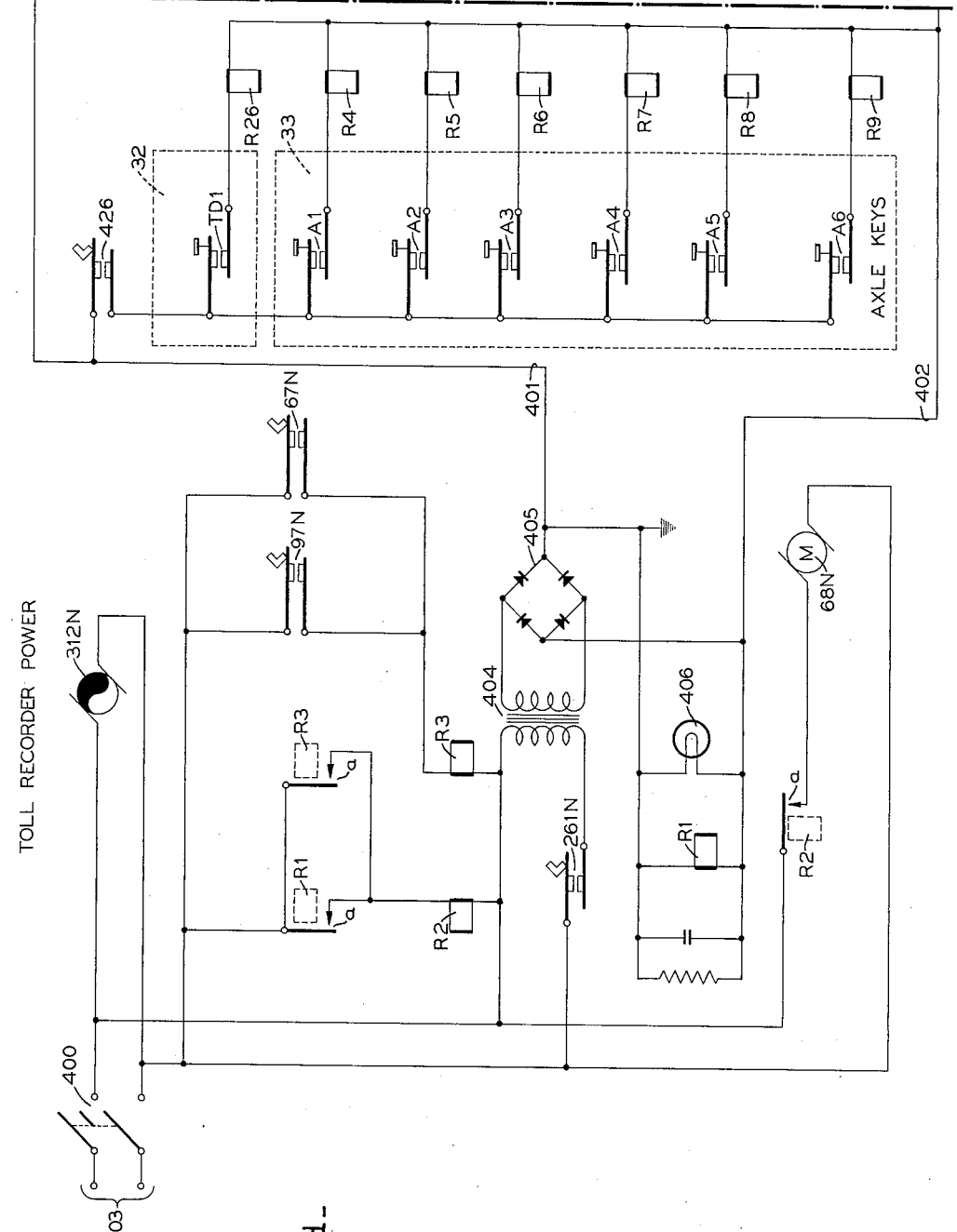

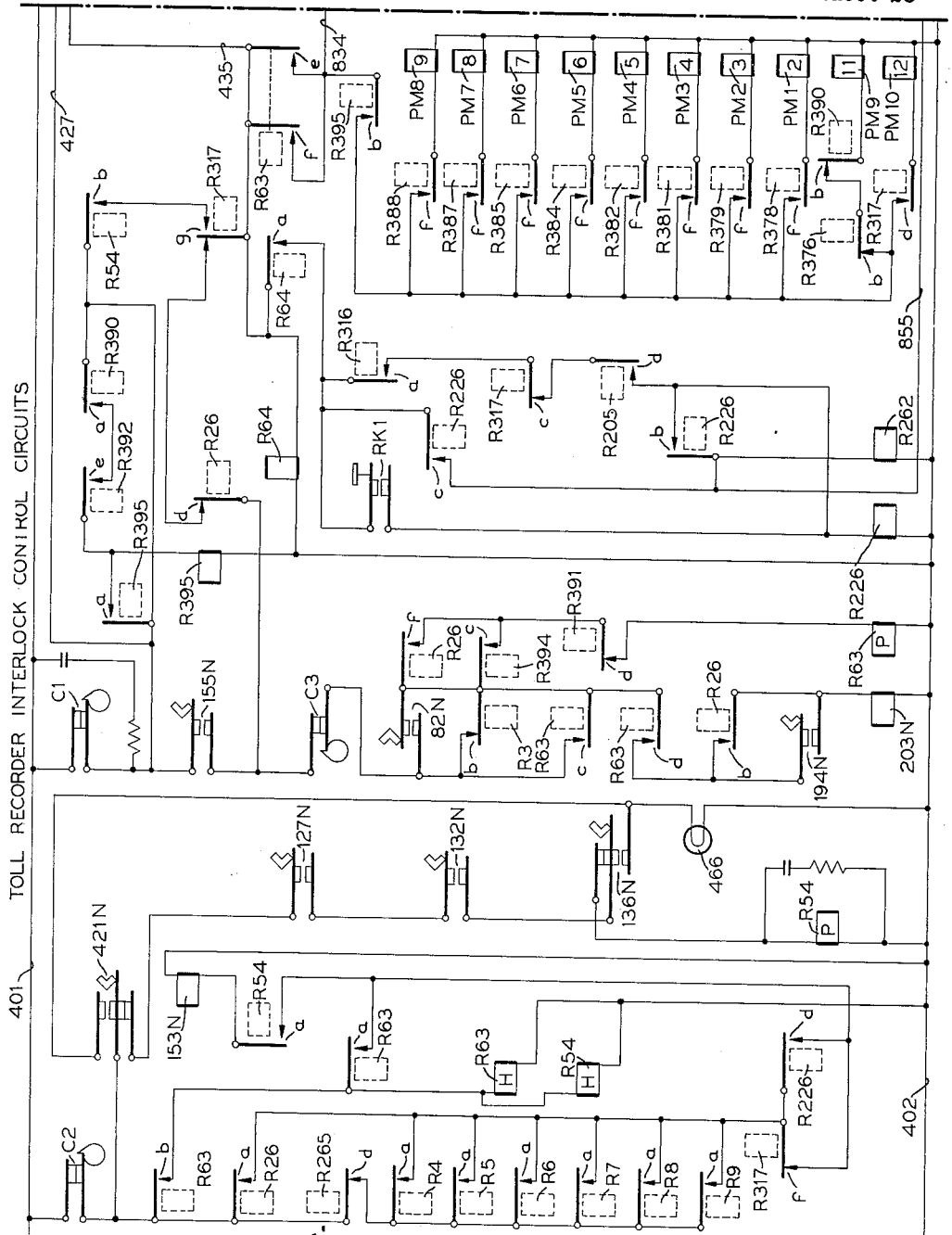

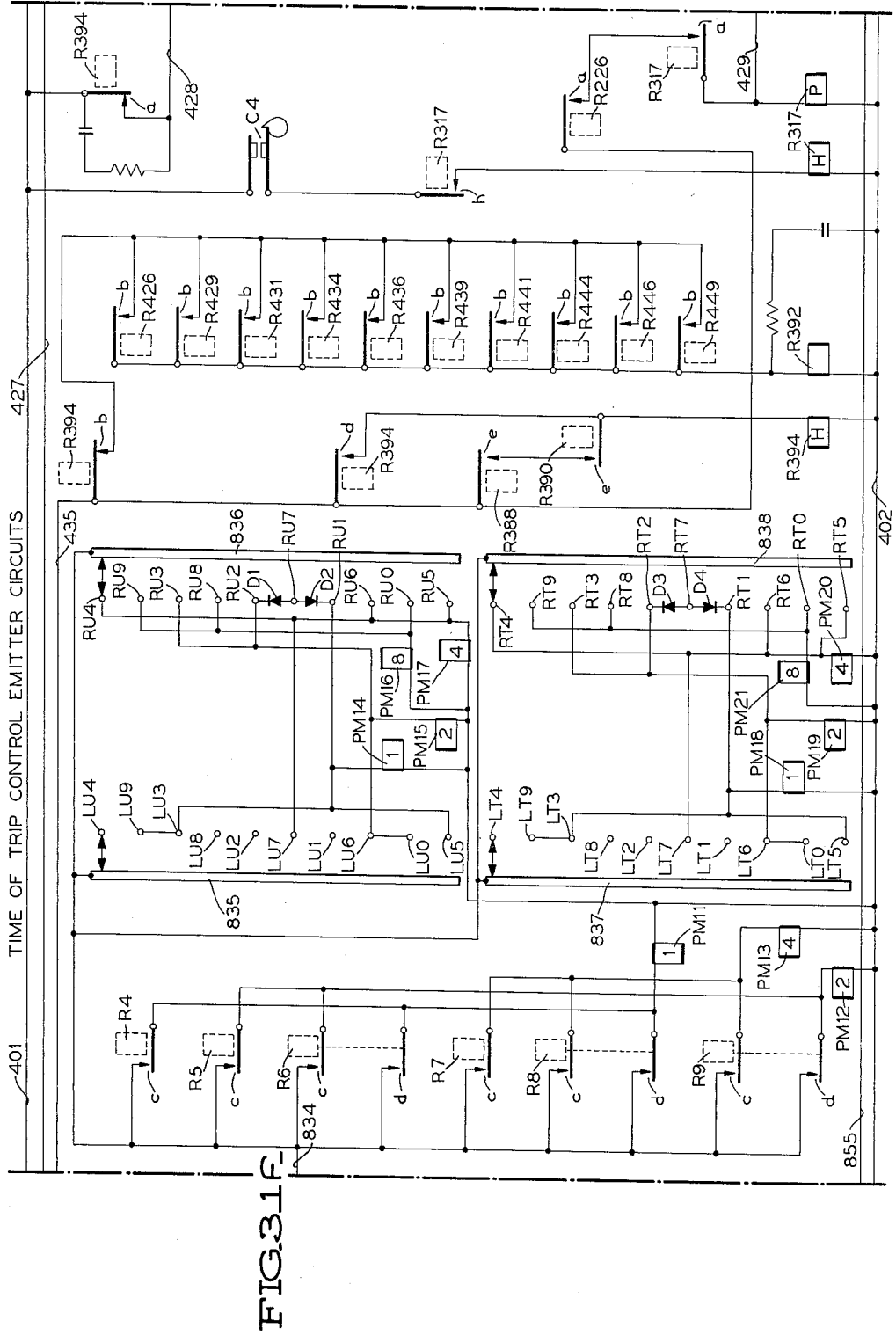

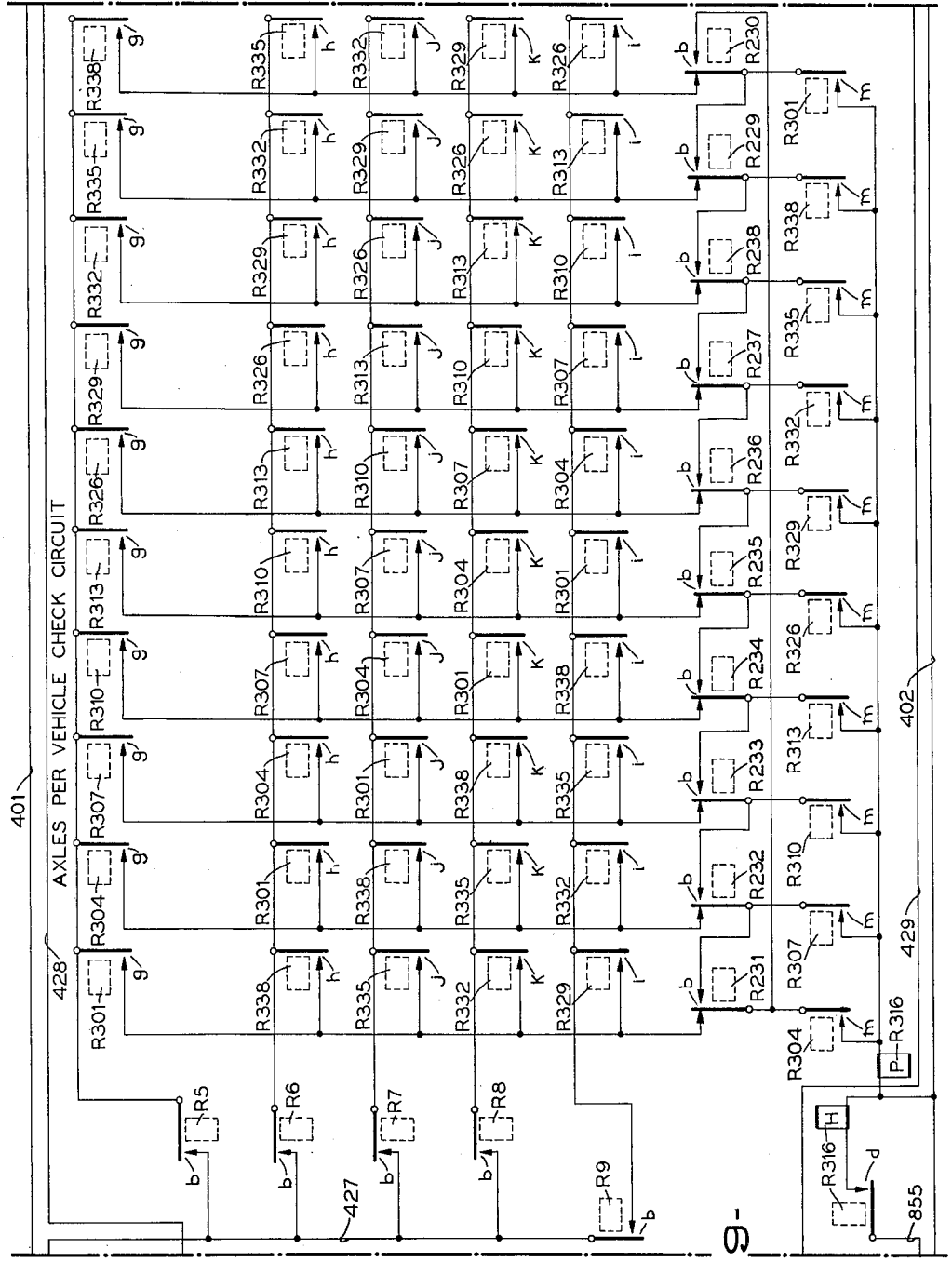

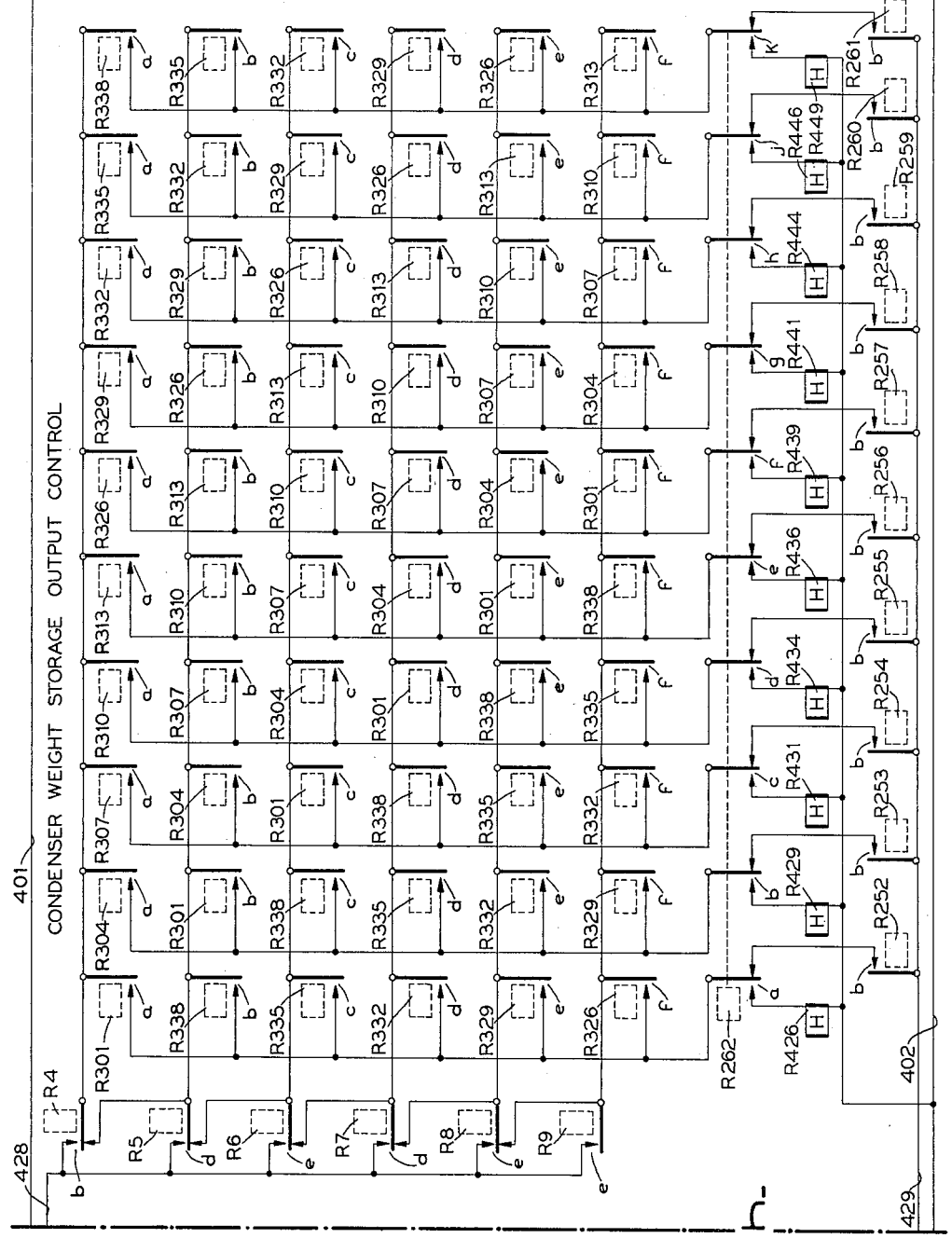

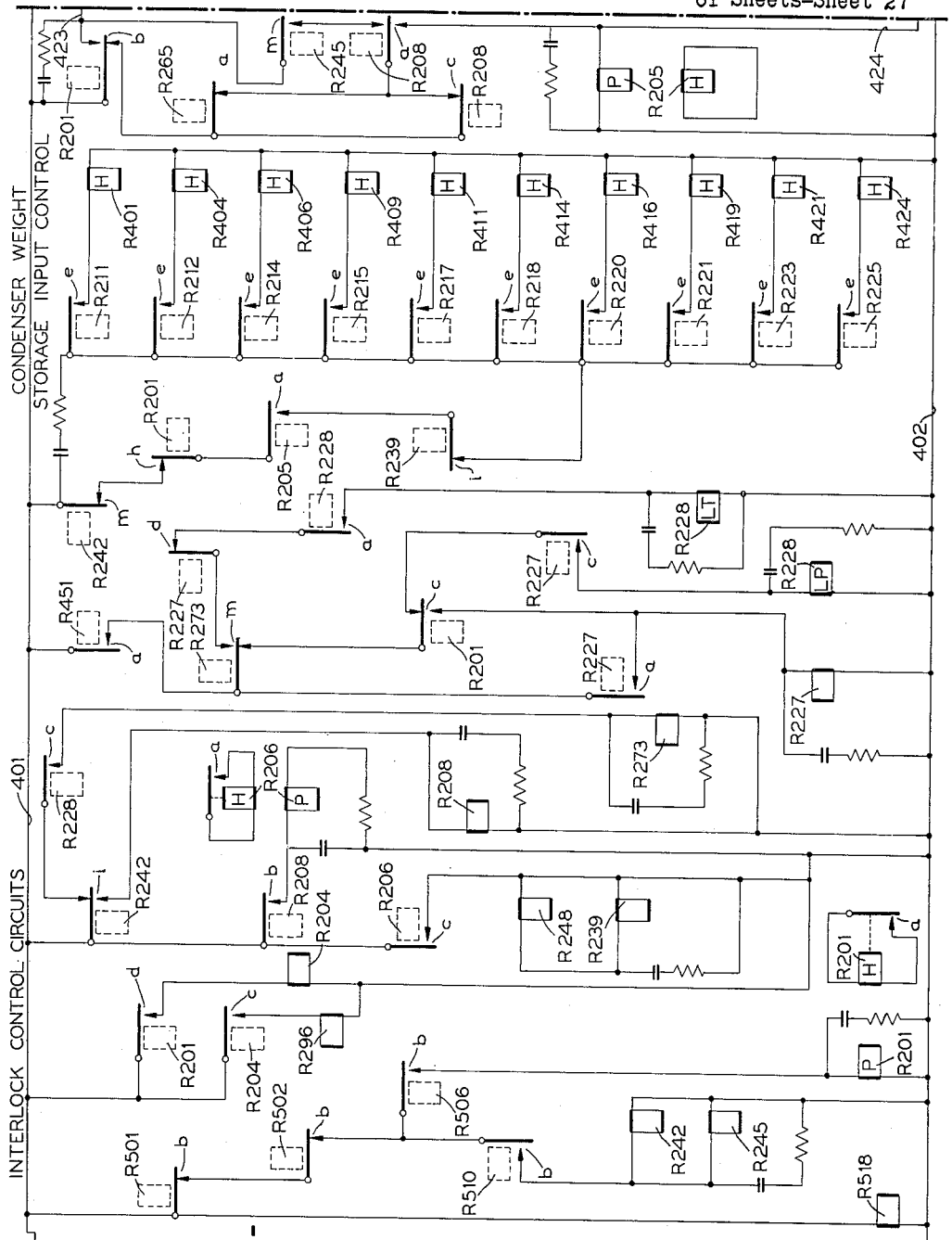

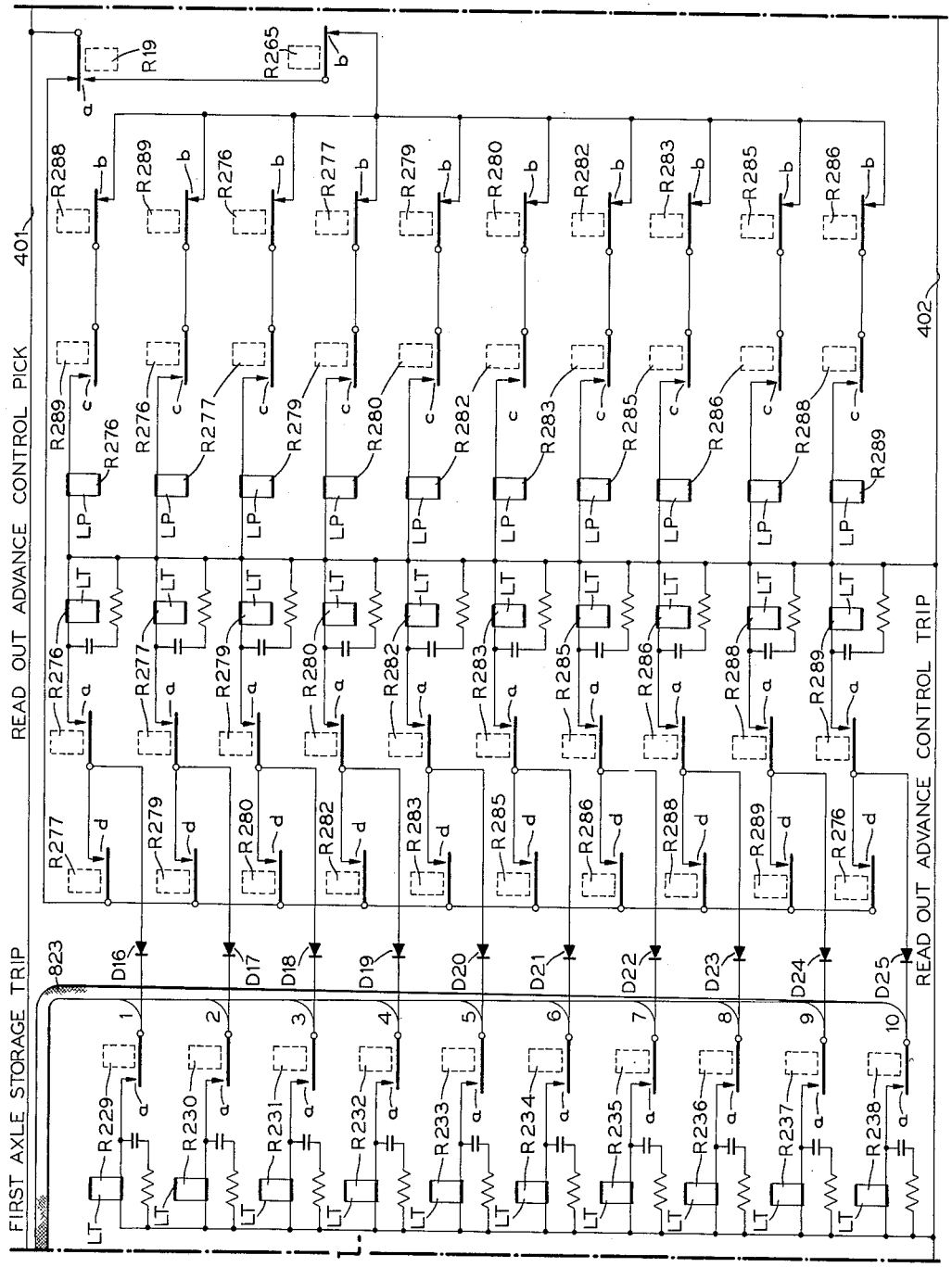
FIG.3.1.

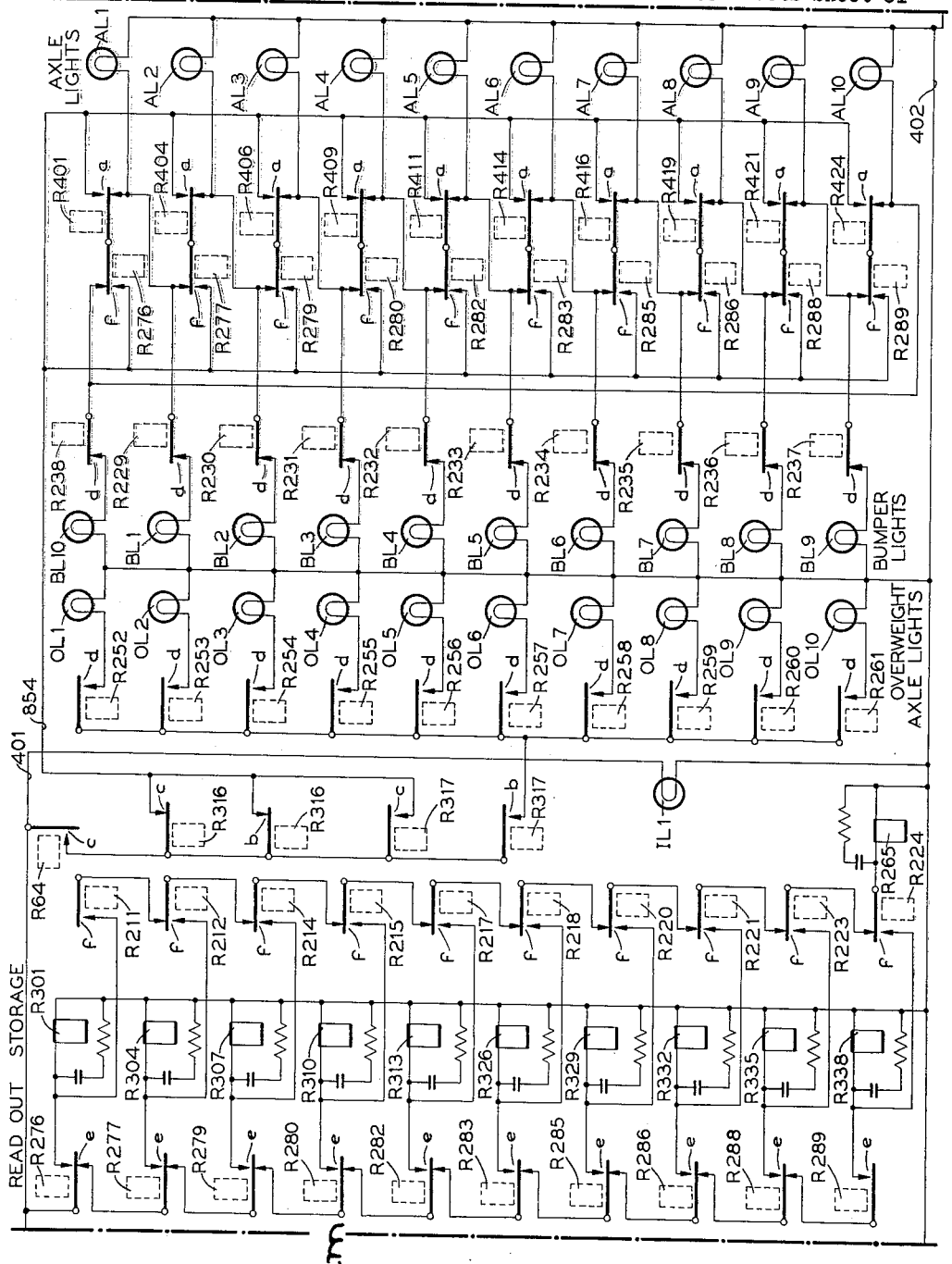

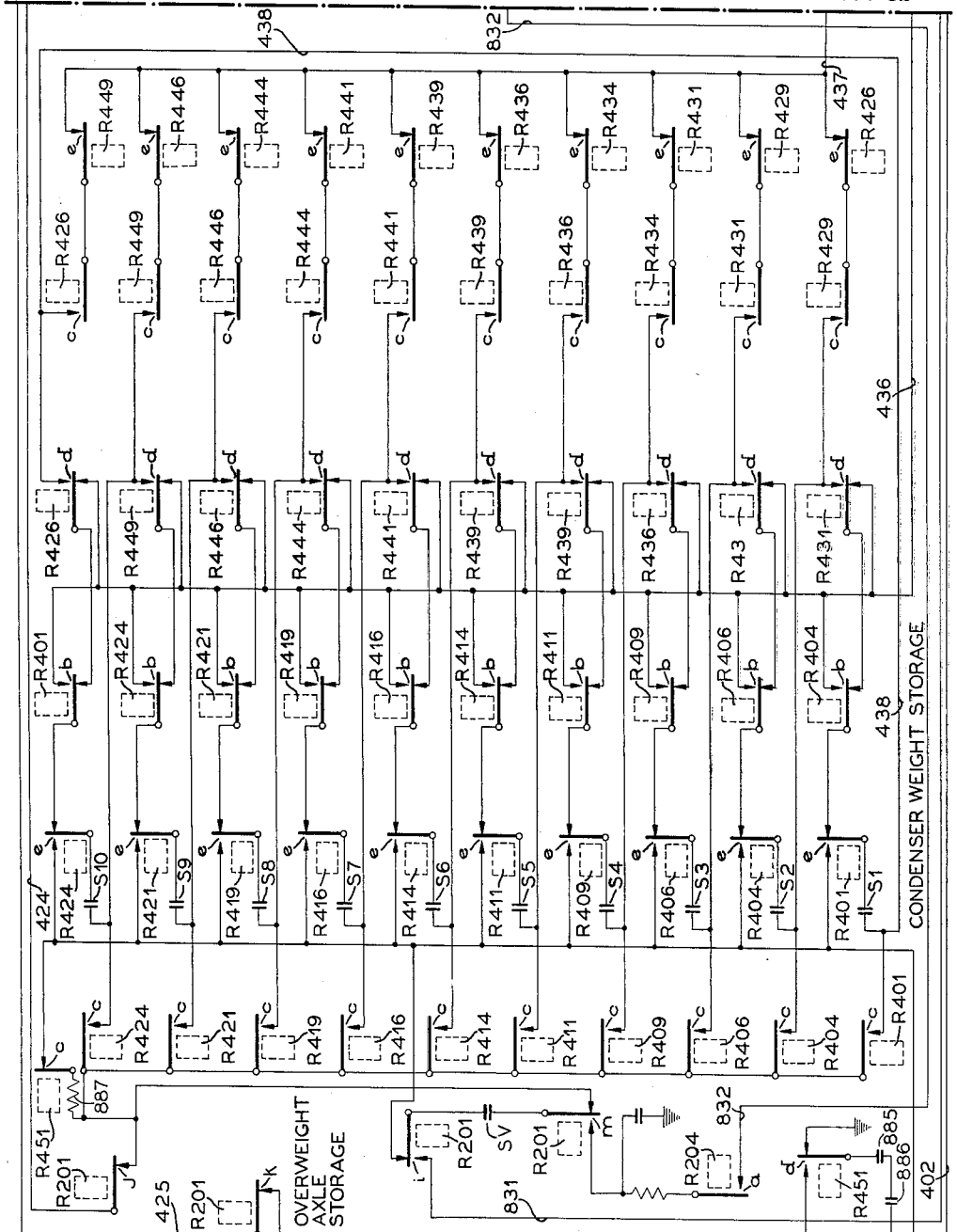

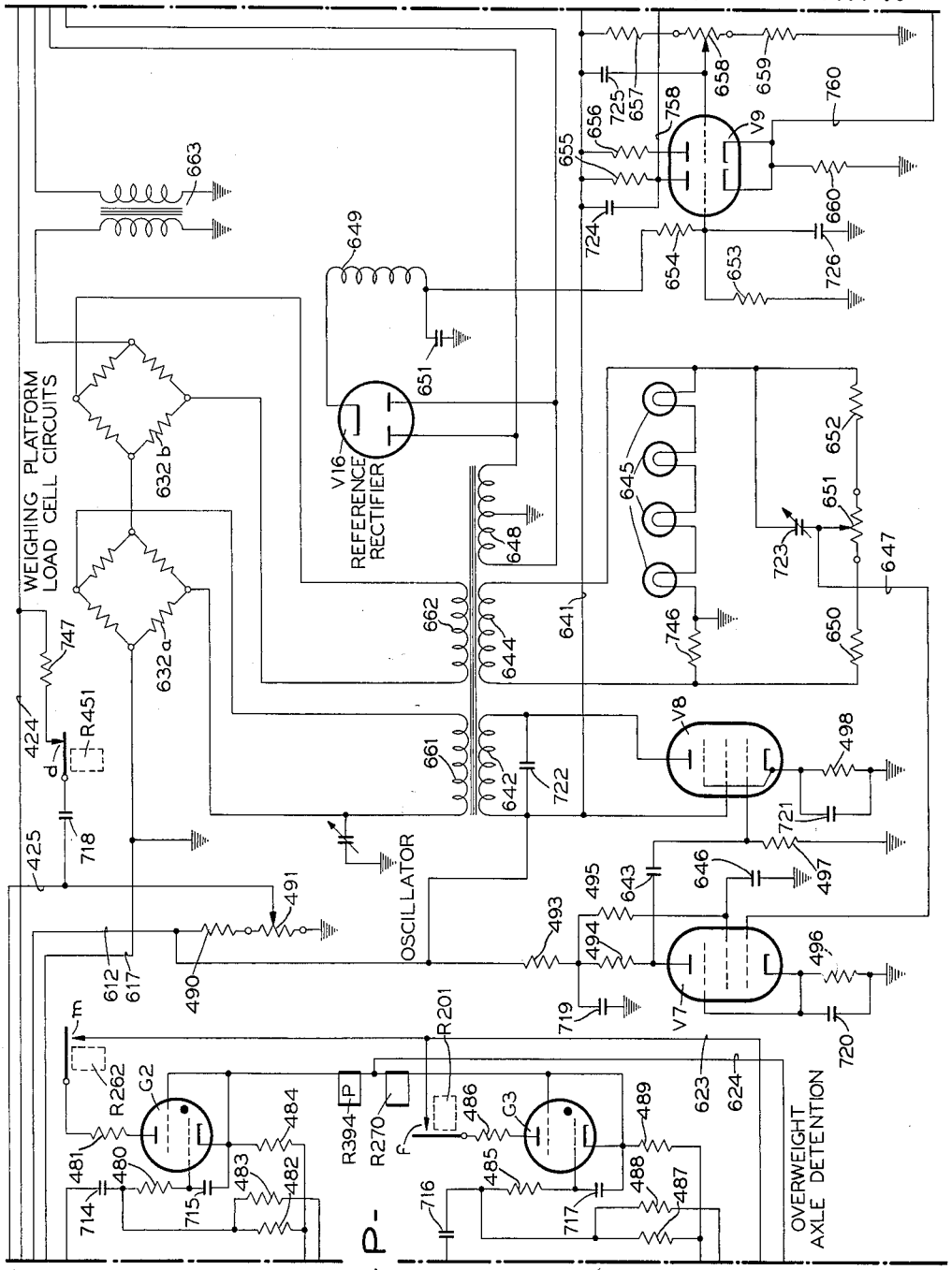

Oct. 9, 1962    J. M. CUNNINGHAM ET AL    3,057,422
TOLL HIGHWAY RECORDER SYSTEM
Filed July 14, 1954    61 Sheets-Sheet 35

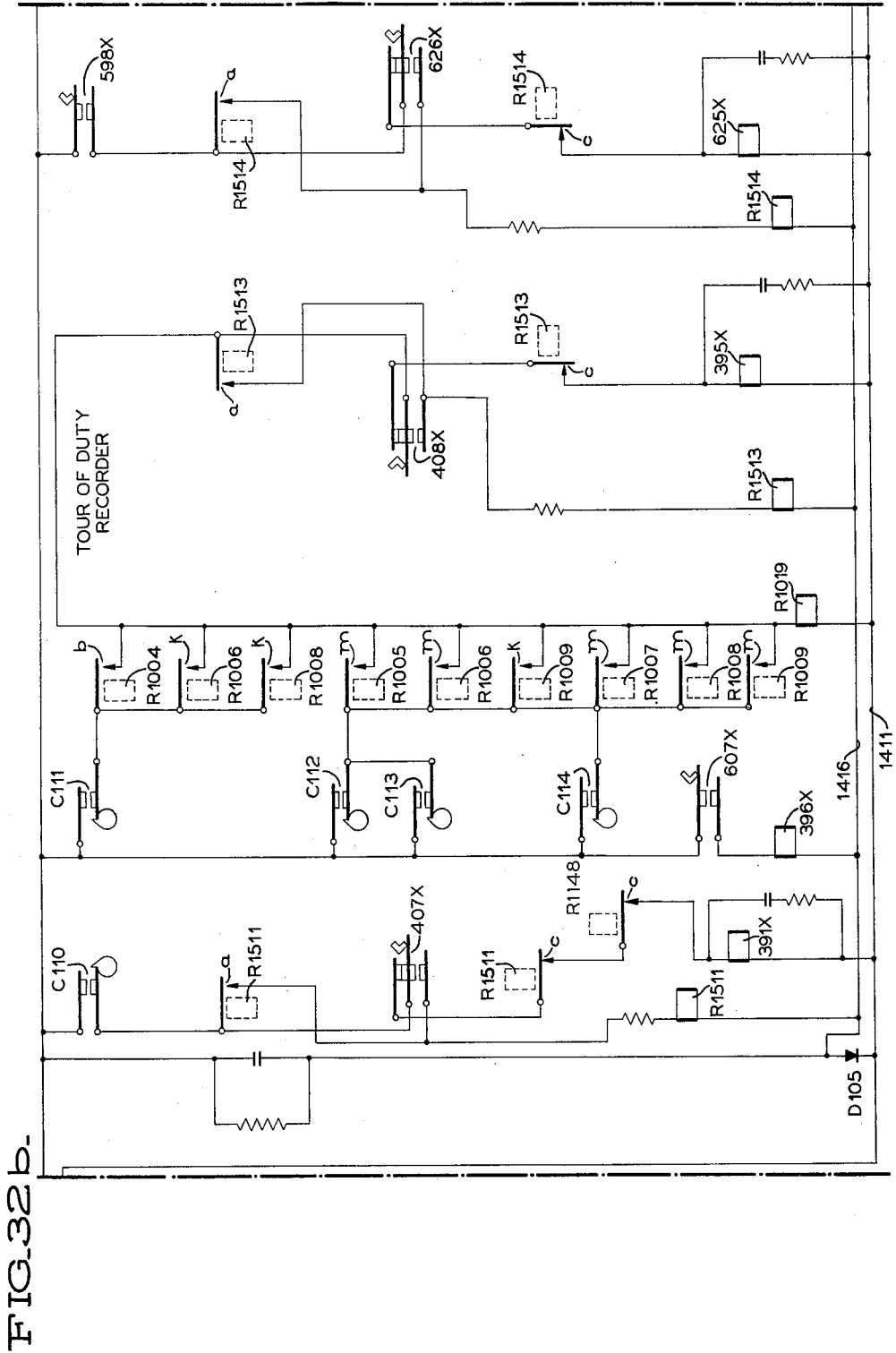

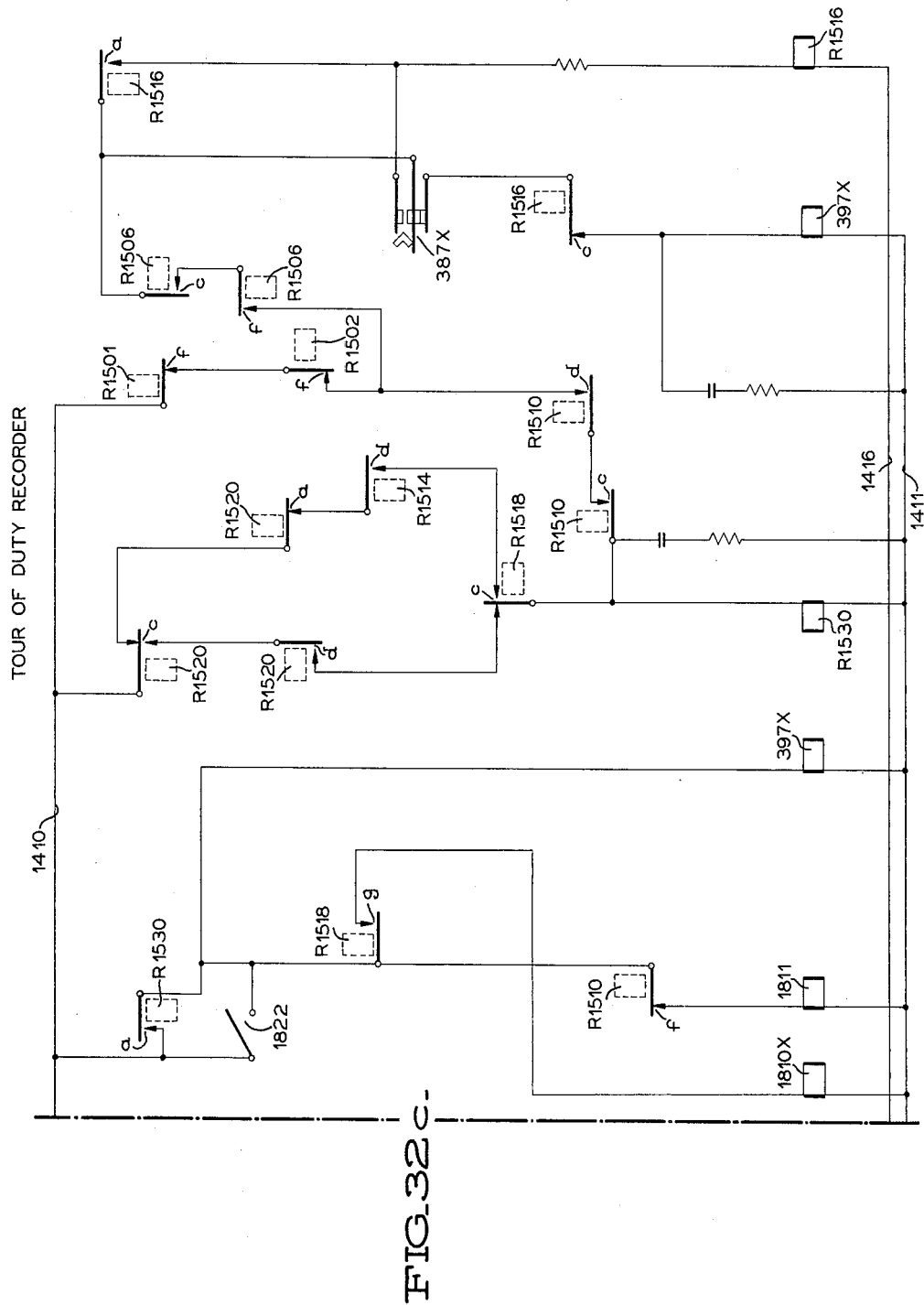

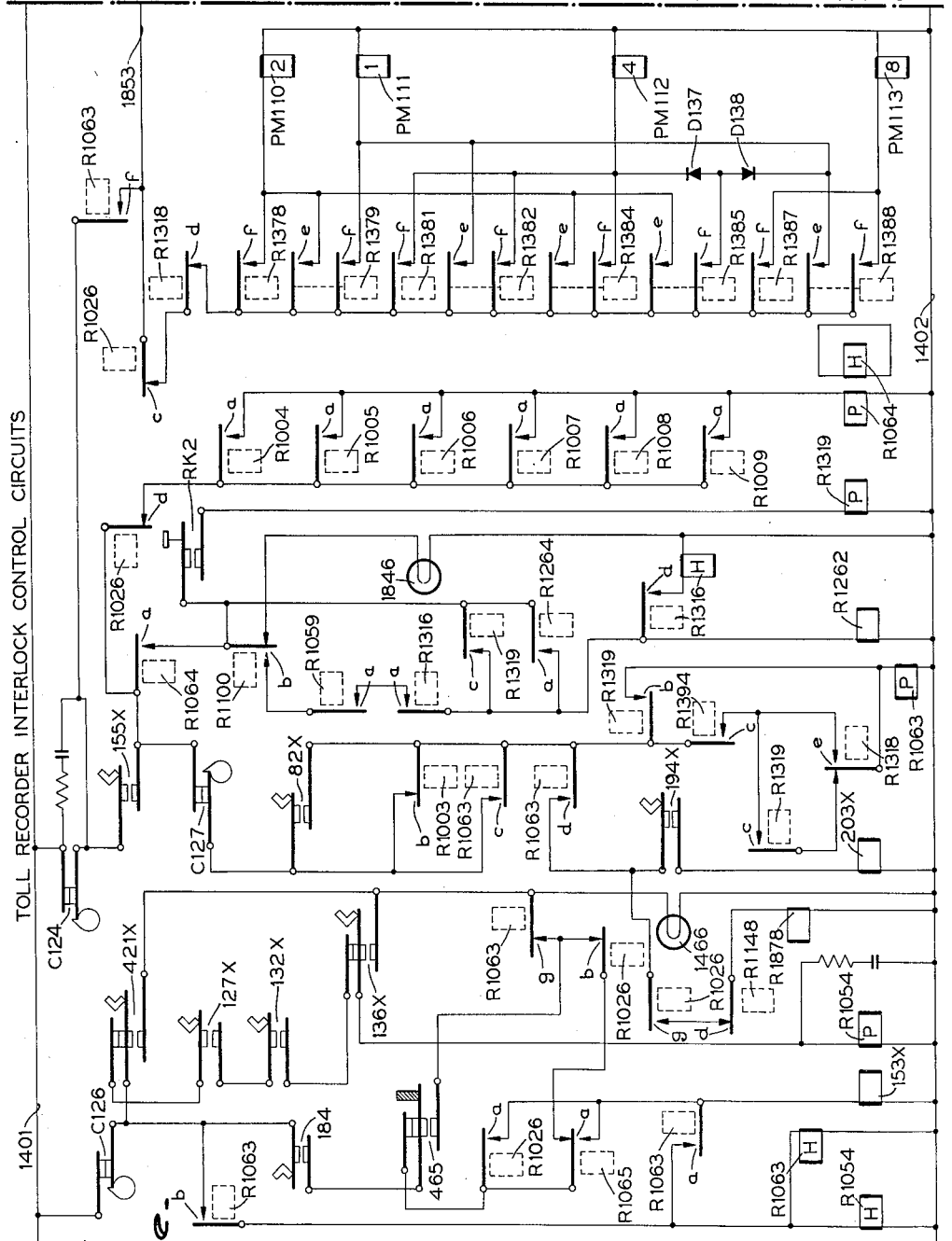

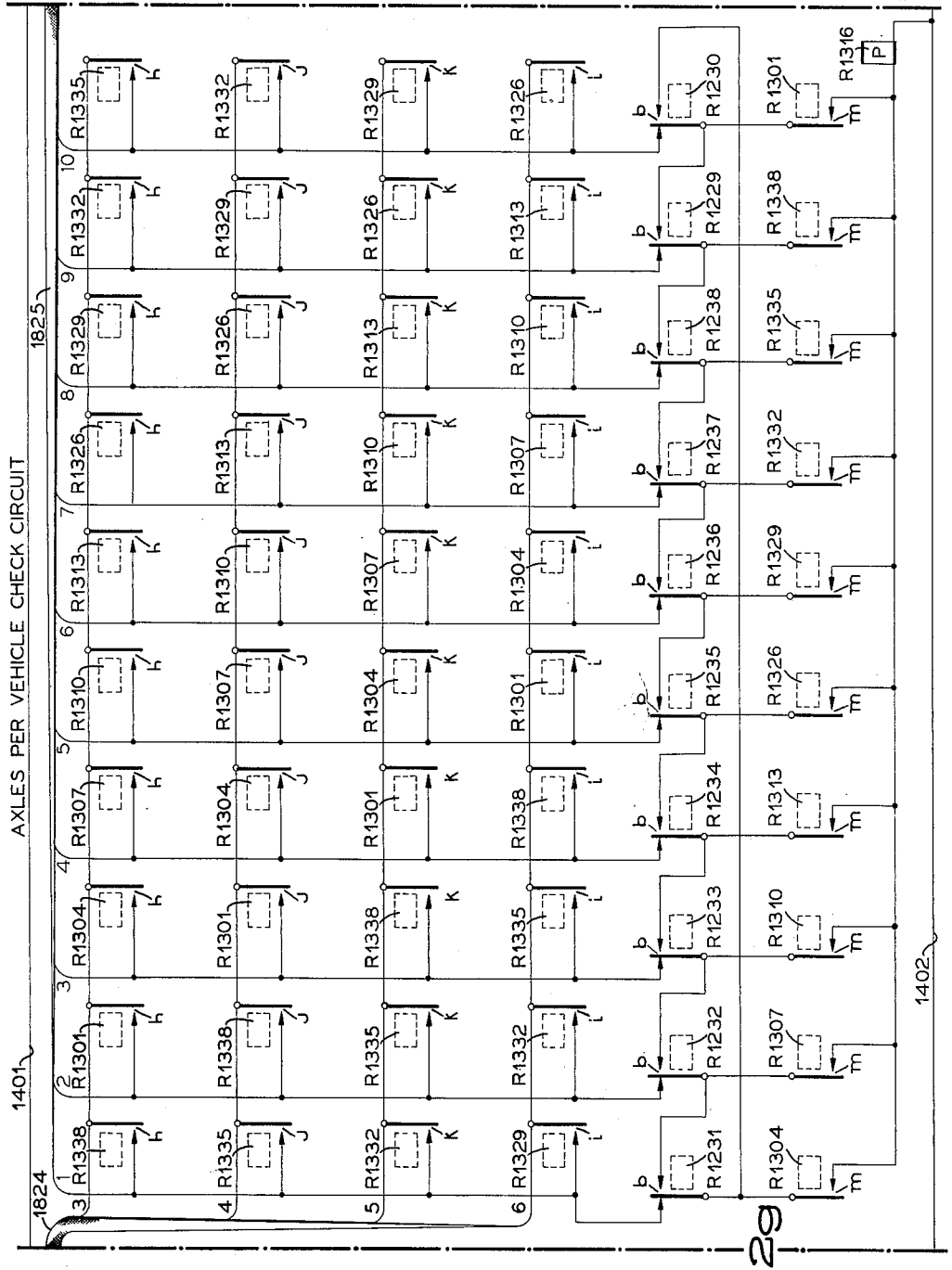

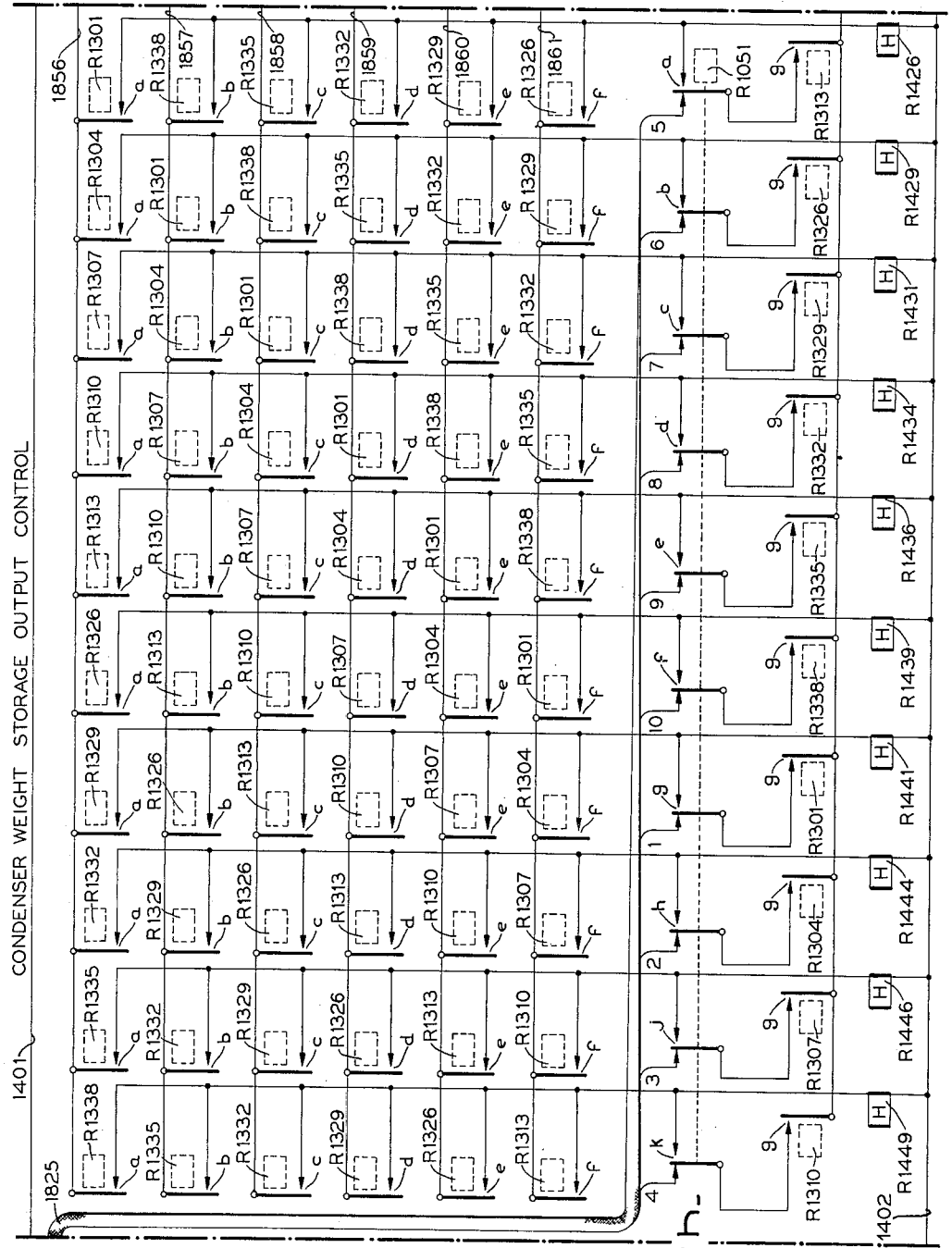

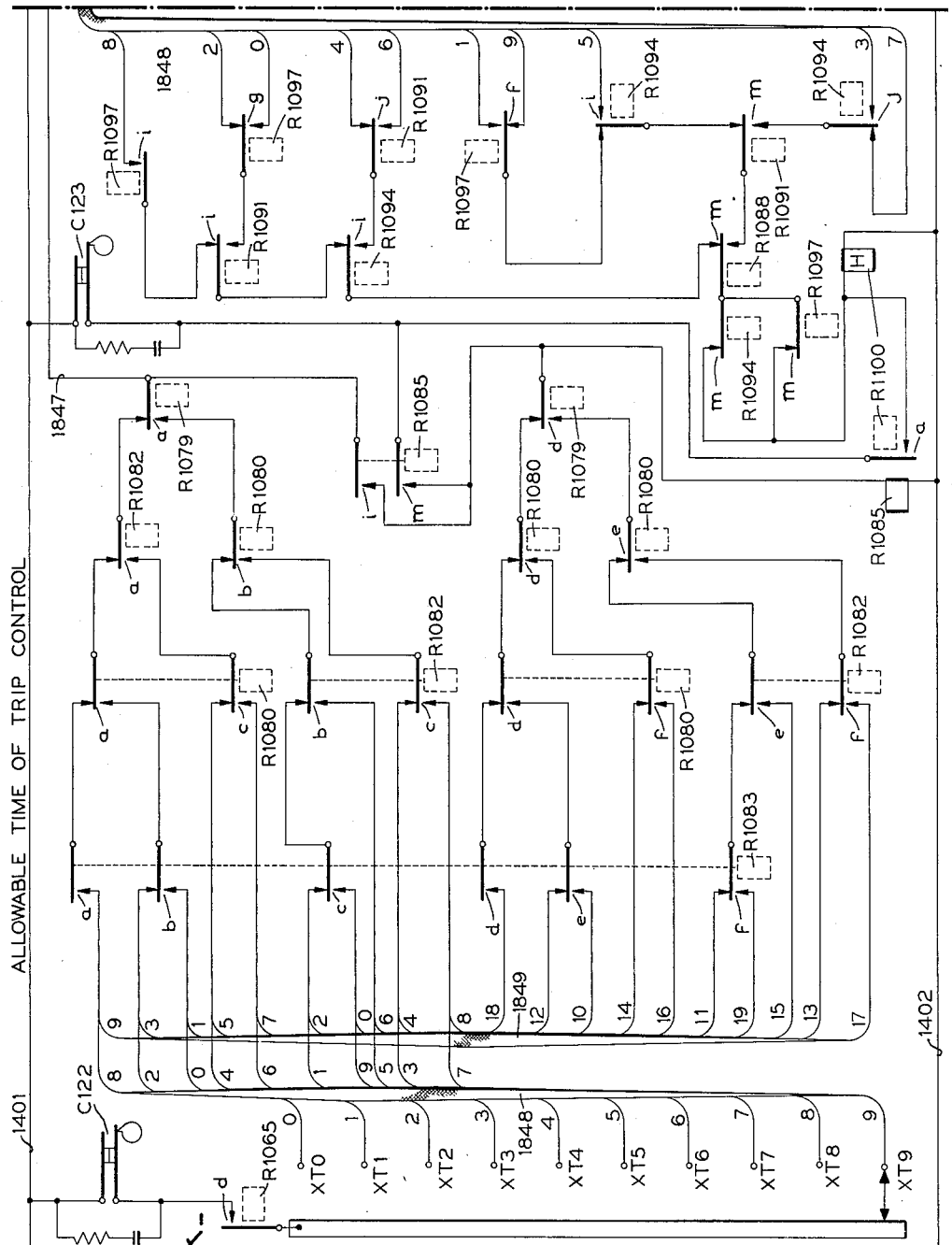

Oct. 9, 1962  J. M. CUNNINGHAM ET AL  3,057,422
TOLL HIGHWAY RECORDER SYSTEM
Filed July 14, 1954  61 Sheets-Sheet 48

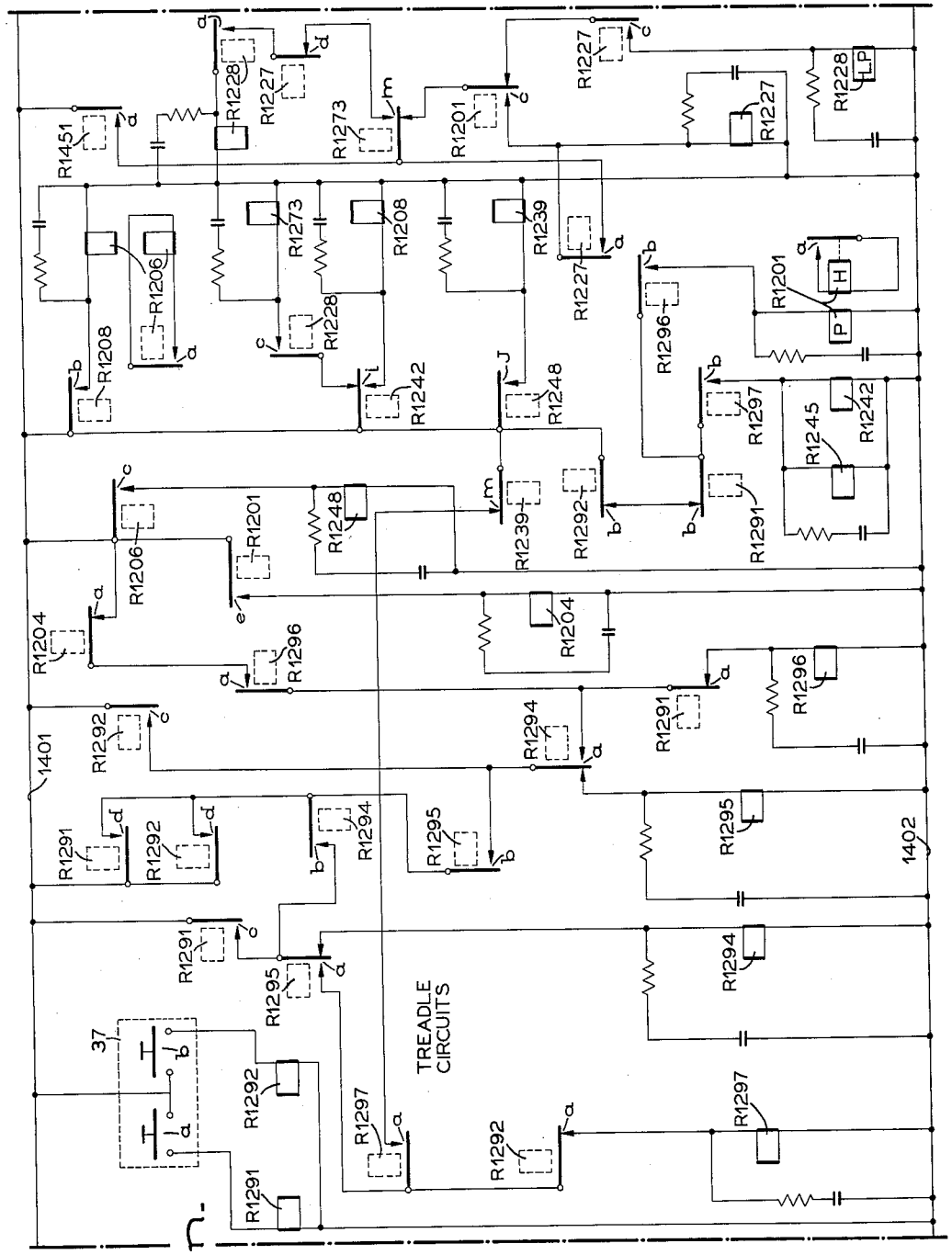

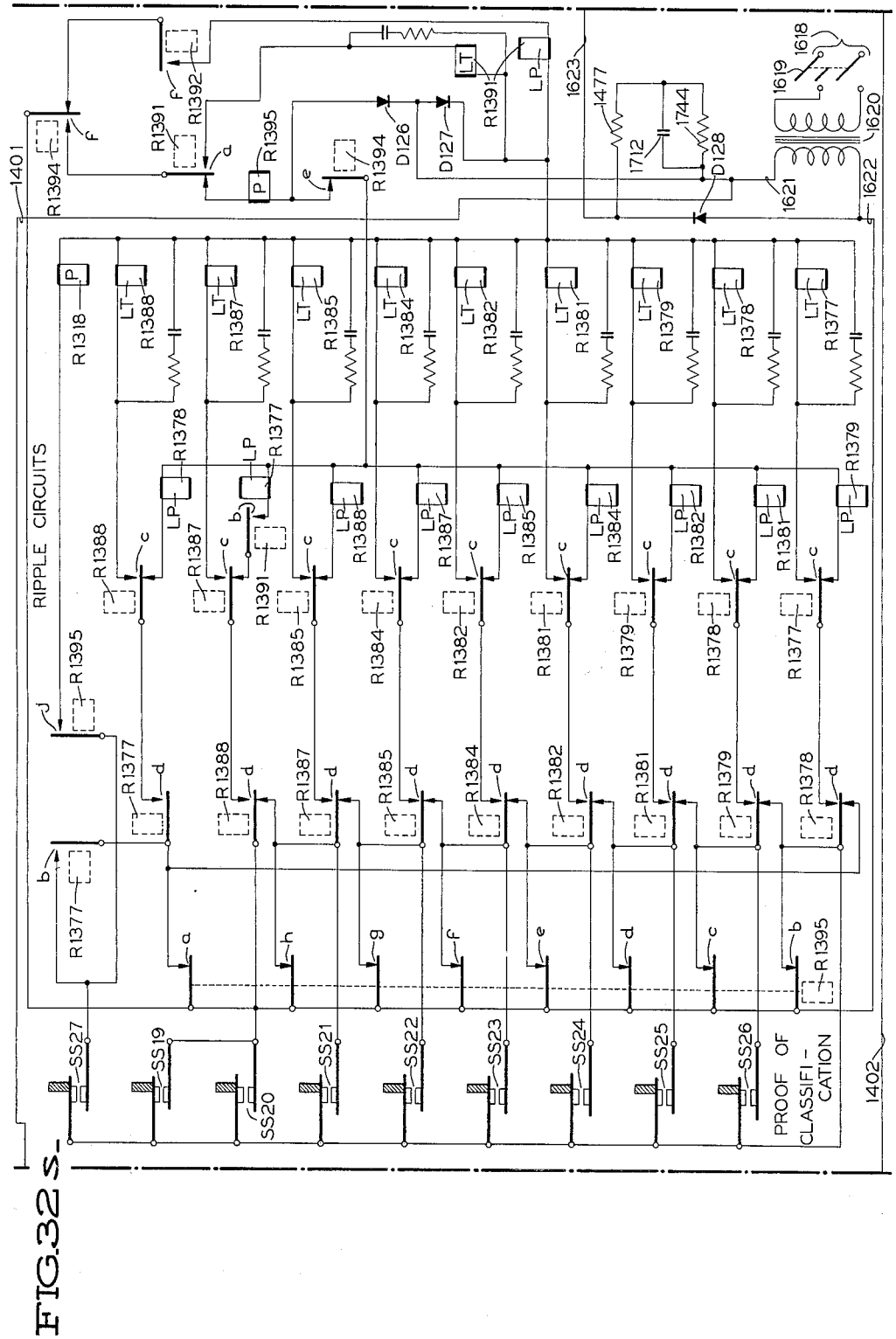

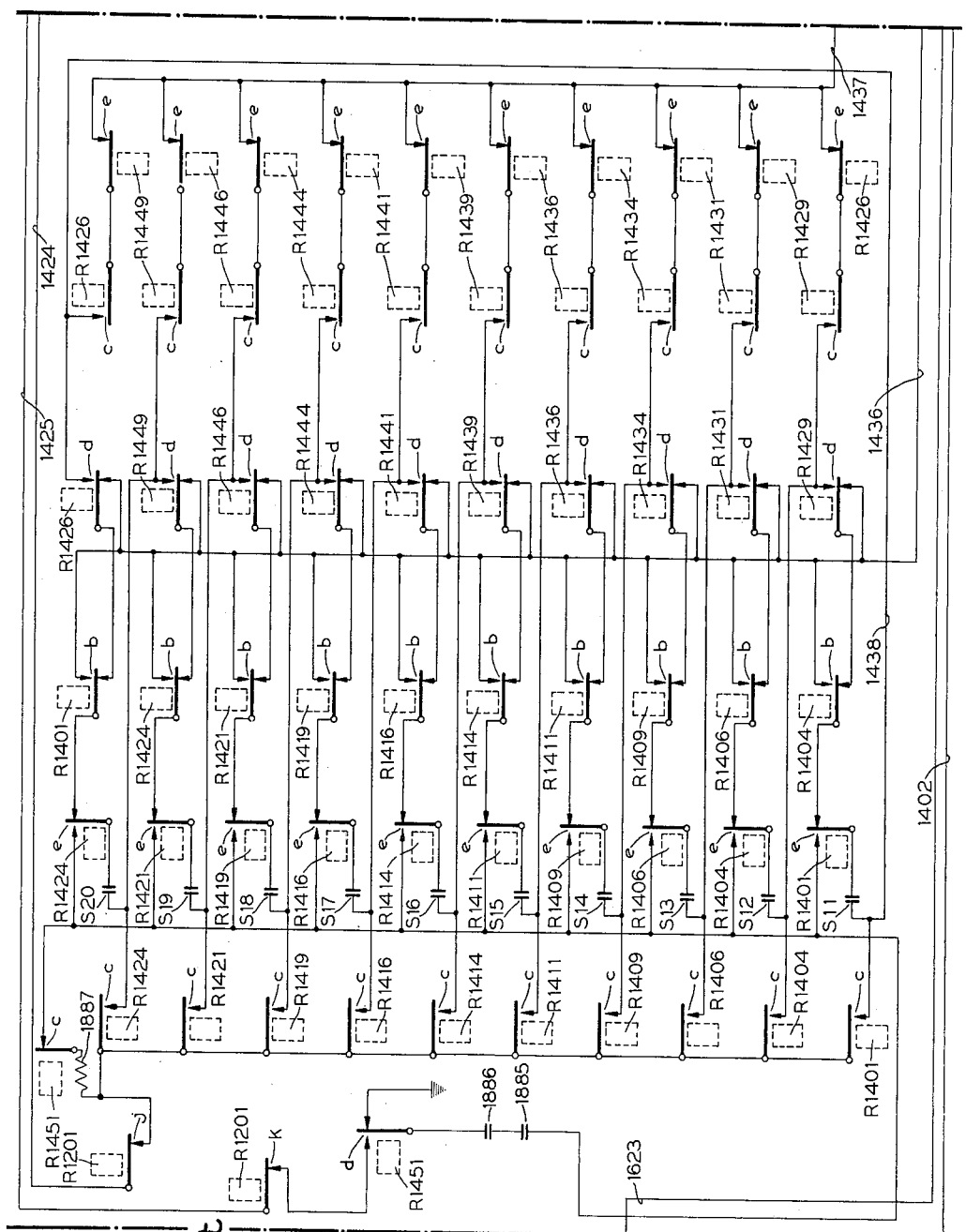

Oct. 9, 1962 J. M. CUNNINGHAM ET AL 3,057,422
TOLL HIGHWAY RECORDER SYSTEM
Filed July 14, 1954 61 Sheets-Sheet 56

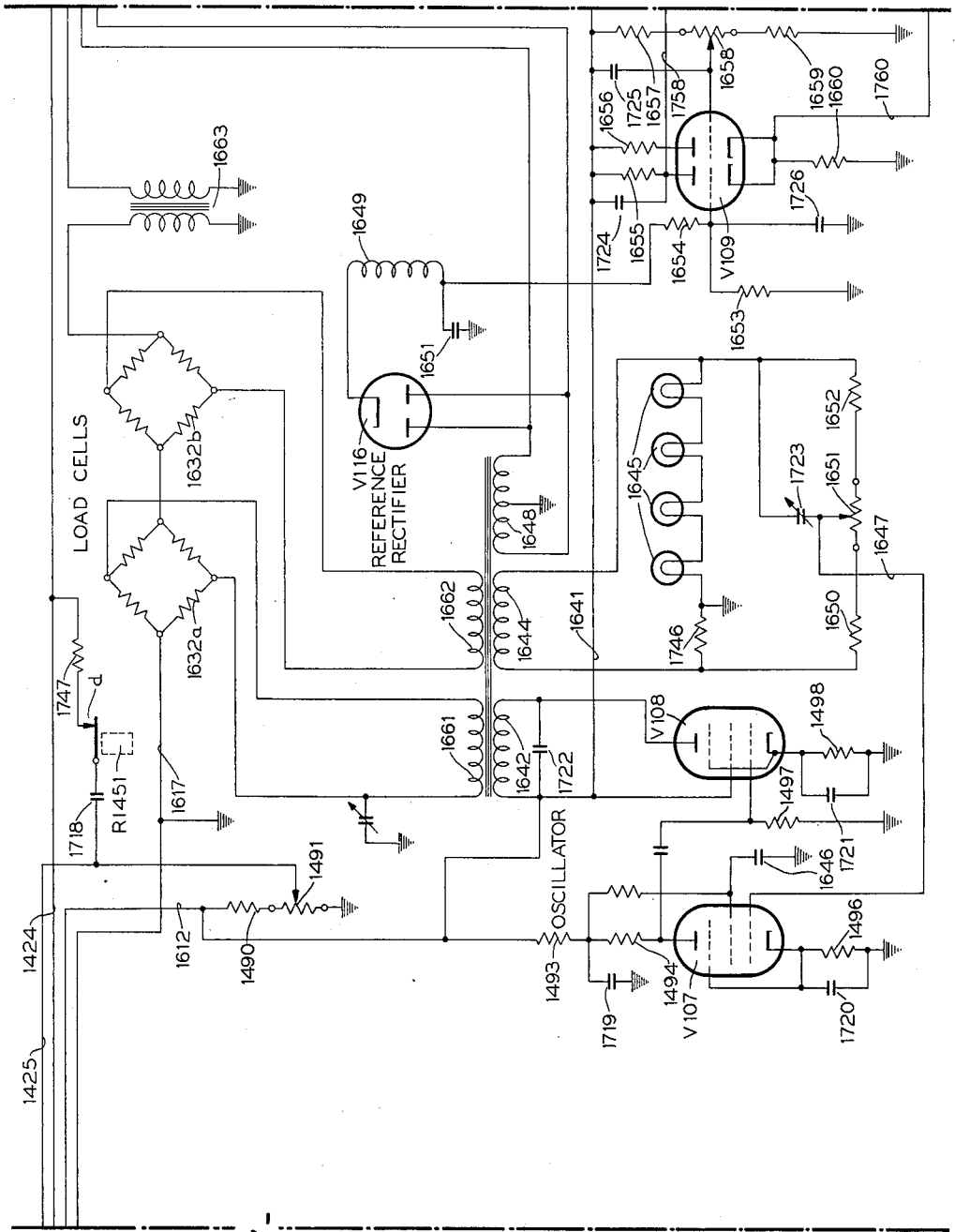

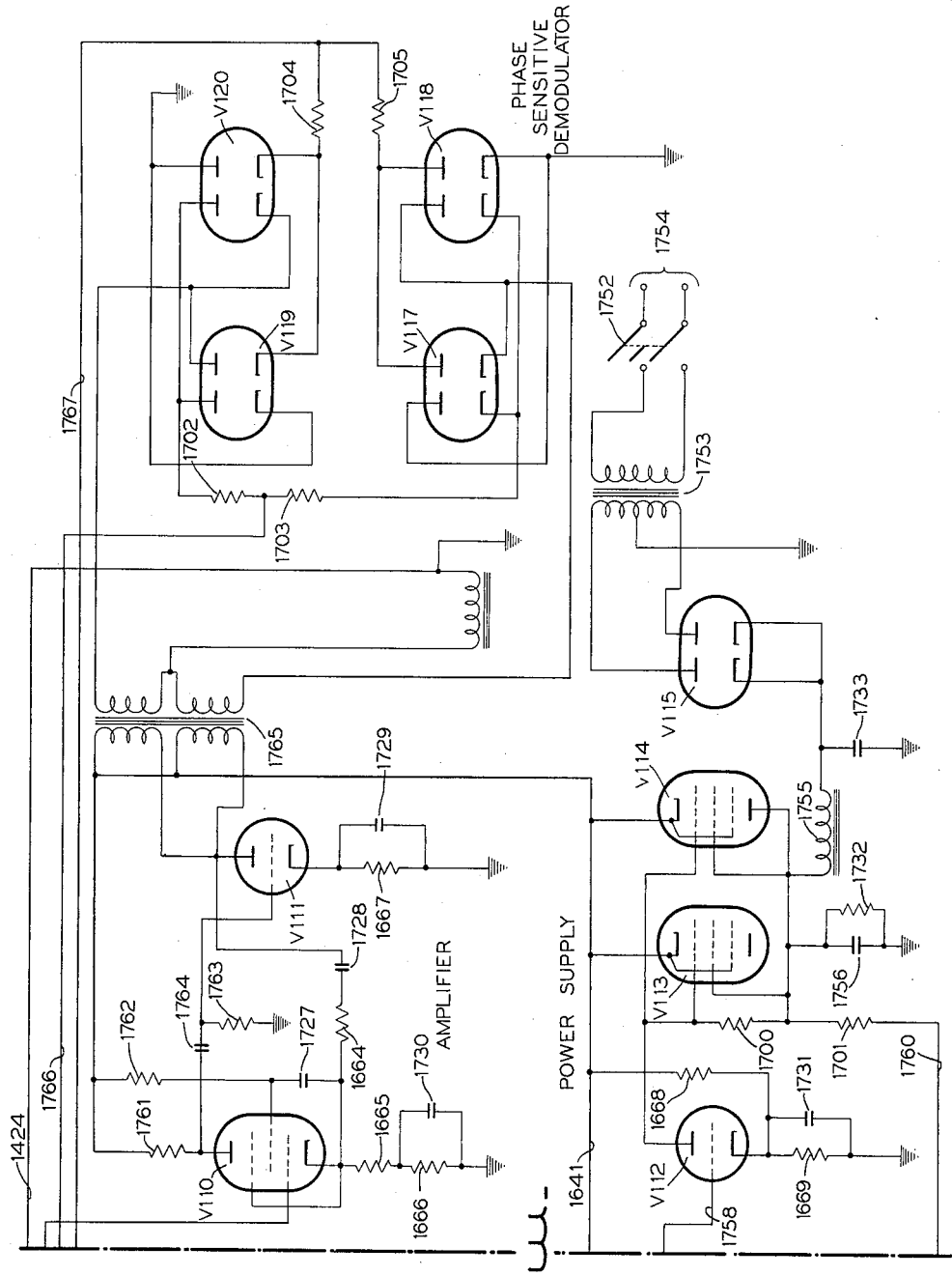

United States Patent Office 3,057,422
Patented Oct. 9, 1962

3,057,422
TOLL HIGHWAY RECORDER SYSTEM
James M. Cunningham, Endicott, and Paul M. Kovach, Vestal, N.Y., assignors to International Business Machines Corporation, New York, N.Y., a corporation of New York
Filed July 14, 1954, Ser. No. 443,264
2 Claims. (Cl. 177—210)

This invention relates in general to apparatus and systems there of for toll highway operations, and in particular to apparatus systems for processing and recording information pertaining to toll collecting.

Success of the Pennsylvania Turnpike, first of the modern "pay-by-the-mile" toll highways, since its inception in the year 1940, has proved the feasibility of such highways. This fact coupled with the apparent inability of regular public highway improvement programs to keep up with ever-increasing traffic demands with the funds available, is generally believed to be the reason for a toll highway movement presently under way, whereby the number of toll road miles is expected to be increased more than thirteen fold in the very near future.

The financial success of a toll highway program is dependent upon the manner in which records relating to toll collecting are kept. In line with the foregoing, the apparatus by which information pertaining to toll collecting is recorded, is of the utmost importance. Hence, it should be apparent that the over-all success of any toll highway program will depend particularly upon the accuracy with which records relating to such items as daily revenue audit, for example, are made.

Accordingly, a broad object of this invention is to provide an improved system of apparatus for processing and recording information pertinent to toll highway operations.

Still another broad object of this invention is to provide a toll highway system of apparatus which is extremely reliable, efficient and simple to operate so as to provide maximum protection against loss of revenue.

There are two categories of toll roads; namely, limited-access roads and barrier roads. Limited-access roads provide uninterrupted traffic flow unhampered by any toll booths built across the roads. Entrance to and exit from such roads are possible only through toll plazas called "interchanges" built on the access roads adjacent the toll highway and accessible generally by right turn cloverleaf construction. Tolls are based not only on vehicle type but also on the distance traveled. Barrier roads are so called because of their construction, with toll booths and traffic lanes extending across the width of the road. Tolls are generally based on types of vehicles without regard to the distance traveled. These roads are sometimes called "open" toll roads since, in most cases, local traffic is permitted to enter and leave sections of the road between barriers without charge.

The present invention may be adapted for use in either category of roads. The preferred embodiment of this invention, however, is shown and described herein for use in a limited-access type road. Information pertaining to toll highway operation is processed and recorded first at a vehicle entrance station and then at a vehicle exit station, and a card whereon such information is recorded is carried by the vehicle operator from the entrance station to the exit station whereat the card is caused to be completely processed.

In order to avoid any uncertainty as to what is meant by certain words and terms to be used hereinafter, a definition of these is provided as follows:

A station is intended to include a toll plaza, terminal, interchange, and the like, and, particularly, denotes a place of ingress to or egress from the toll highway.

A lane is one avenue of ingress to and/or egress from the toll highway and accordingly, a station may include one or more lanes.

A vehicle axle includes the wheel or wheels supported thereon, and the vehicular weight supported thereby.

A trip card is in essence a ticket whereon information relating to the trip and the fare due for the privilege of passing over the toll highway, is recorded.

A trip card may be described as having been completely processed only after having been validated at both the entrance and the exit stations. In the preferred embodiment of this invention, a trip card is validated at either station by printing and punching specific data thereon.

In keeping with the foregoing, it should be apparent that a trip card is partially processed at the entrance station prior to being completely processed at the exit station. Furthermore, as will become clear as the description advances, the operation of the exit station system of apparatus is controlled by a manifestation of partial processing which is recorded on the trip card at the entrance station.

Accordingly, another main object of this invention is to provide a system of toll highway apparatus for completing the processing of a record in response to the detection thereon of a manifestation of partial processing.

Another object of this invention is to provide a toll highway recorder system having an exit station whereat a trip record may be completely processed consequent upon the detection at the exit station of a manifestation of partial processing which was entered upon the record at an entrance station.

The toll highway recorder apparatus at each of the stations in the preferred embodiment of this invention includes an axle detecting treadle and an axle weighing platform, whereby the number of axles and the weight of each axle, may be determined dynamically as vehicles in motion approach a station toll booth. A photoelectric gating apparatus is also utilized in the preferred embodiment of this invention to signify the presence of a vehicle at a station so as to afford, among other things, a means for automatically grouping the axles carried by a vehicle. Furthermore, inasmuch as the weight of each vehicle axle may be determined by the axle weighing platform, and since the axles per vehicle may be grouped, the weight of each vehicle may be determined by a combination thereof.

Another object of this invention is to provide apparatus for grouping axles per vehicle automatically.

Another object of this invention is to provide apparatus for detecting the first axle of a vehicle.

According to the present invention, apparatus is provided whereby the weight of each axle may be compared with an axle weight standard, and the weight of each vehicle may be compared with a vehicle weight standard, to thereby afford apparatus to detect an overweight axle and/or an overweight vehicle. Accordingly, other objects of this invention are to provide toll highway apparatus for detecting overweight axles and/or overweight vehicles.

Inasmuch as the vehicles on the toll highway associated with this invention are in motion while passing over an axle counting treadle and a weighing platform, more specific objects of this invention are to provide dynamic operating apparatus for detecting overweight axles and/or overweight vehicles.

A still another object of this invention is to provide an automatic tare weight compensating apparatus which is effective between successive axles.

Due to the fact that information relating to axles carried by a plurality of vehicles may be stored at one time in the preferred embodiment of the present invention, an indicator panel which will show the axle pattern according to a vehicle basis, is provided as a visual aid to the toll collector. In more particular terms, this panel will provide a showing of all of the axles stored in a toll recorder on a per vehicle basis for all of the vehicles at a toll system station, and a showing of all overweight axles. Accordingly, another object of this invention is to provide an indicator panel for showing all of the axles stored in a toll recorder on a per vehicle basis for all of the vehicles at a toll system station.

Another object of this invention is to provide an indicator panel for indicating which axles of all of the axles stored in a toll recorder, are overweight.

It is most common to classify vehicles according to the total weight thereof because classification by weight generally is accepted as the most equitable basis for charging tolls. For example, vehicles under 8,000 pounds may be placed into class 1, whereas vehicles having a weight between 8,000 and 11,00 pounds may fall within class 2, etc. It must be explained here that the vehicle classification limits are generally and preferably determined by the governmental authority which controls the operation of the toll highway and, of course, the toll highway recorder system.

In keeping with the foregoing, another object of this invention is to provide a toll highway apparatus for automatically classifying vehicles.

Another object of this invention is to provide apparatus for automatically classifying vehicles in accordance with the weight thereof.

A still another object of this invention is to provide apparatus for dynamic weight vehicle classifying.

It may be pointed out here that the invention shown and described in copending U.S. patent application Serial No. 399,229, filed on December 21, 1953, now Patent No. 2,907,521 includes a manually controlled vehicle classifying system, whereas the present invention includes as is stated hereinabove, an automatically controlled dynamic weight classifying system.

It has been indicated previously that a number of axles associated with more than one vehicle, may be stored at one time in a toll recorder. As will be described in detail hereinafter, the various axle weights are stored in a weight storage unit in the form of weight representing voltages. When a trip card associated with a single vehicle is being processed, only the axle weights for the axles per single vehicle will be recognized in order to obtain the true vehicular weight. Thus, another object of this invention is to provide apparatus for selecting from a weight storage unit having a total weight value stored therein corresponding to the weight of a plurality of vehicles, only the weight value of the vehicle being classified.

In the preferred embodiment of this invention, the weight storage unit mentioned hereinabove includes a plurality of condensers, one for each axle passing over a treadle and a weighing platform, wherein a dynamic weight axle voltage may be stored. The operation of these condensers is controlled by a condenser storage read-in ring circuit which always stays in step with the movement of axles over the treadle and a condenser storage readout ring circuit which always stays in step with an axles per vehicle grouping of the condensers whereby the vehicular weight is obtained. During the dynamic weight classifying operation, the weight representing voltage of the axles per vehicle grouped condensers is compared in a step-by-step manner with a series of voltage standards, one of which will cause the step-by-step comparison operation to stop consequent upon a predetermined relationship between the vehicle weight representing voltage and the voltage standard.

In the preferred embodiment of this invention, the afore-mentioned step-by-step comparison is governed by a so-called ripple circuit timing ring which is caused to advance in response to the variations in polarity of an alternating current wave, for example a sine wave. Accordingly, another object of this invention is to provide an improved timing ring which is advanced in response to the polarity variation of an A.C. wave.

As has been indicated previously, above and beyond affording data records relative to the vehicular traffic over a toll highway, the present invention includes apparatus to detect accidental errors and/or fraudulent acts. In addition, the present invention includes apparatus to clearly indicate to the toll collector at the time an error and/or fraudulent act is detected, the nature of the error and the act. One such irregularity, for example, which may be either accidental or fraudulent concerns the number of axles per vehicle. This information is caused to be recorded on a trip card at the entrance station under the manual control of a toll collector, and subsequently caused to be sensed at the exit station. The same kind of information is caused to be set up manually and automatically (by photoelectric axles per vehicle grouping, for example) at the exit station. Should any of the three separate axles per vehicle values differ, an exit station apparatus is provided to detect and to indicate this difference.

Another broad object of this invention is to provide a toll highway recorder system having means for detecting accidental errors and/or fraudulent acts.

In line with the foregoing, another object of this invention is to provide a toll highway recorder system having apparatus for recording specific information which relates to the variety and the scope to any one of a plurality of different accidental errors and/or fraudulent acts.

Still another obpect of this invention is to provide a toll highway recorder system having an entrance station apparatus and an exit station apparatus, wherein each apparatus includes means for detecting and recording accidental errors and/or fraudulent acts committed at the other station.

Another object of this invention is to provide a toll highway recorder system having an entrance station apparatus and an exit station apparatus, wherein the exit station apparatus includes means for detecting and recording information relating to an irregular act committed at either toll highway station.

A more specific object of this invention is to provide apparatus for designating whether the axles per vehicle determination by a toll collector is less than or greater than the actual number of axles per vehicle.

A somewhat common fraudulent act which is extremely difficult to detect is termed "kiting." In general terms, this is a practice where a vehicle operator traveling a distance on a toll highway, three hundred miles for example, from station A to station D, and passing on his way stations B and C, each of which may be only ten miles away from its respective station A and D, withholds from the toll collector at station D the trip card issued to him at station A, and thereafter, during a return trip, makes use of the withheld trip card at station B. Ordinarily, this would appear to the toll collector at station B as an ordinary procedure in which the vehicle had been moved only ten miles because it appeared to enter the toll highway at station A. The fact of the matter would be, however, that the vehicle had actually been moved from station A to station D to station B. It may be seen, too, that one withheld trip card would pave the way to a succession of fraudulent acts by kiting.

Kiting is detected in the present invention by providing a time limit within which a vehicle must be moved from an entrance station in a given zone area to any one of a plurality of designated exit stations in the same zone area. This time limit is recorded on the trip card at the entrance station for comparison with the actual time at which the trip card for the vehicle at the exit station is processed, in order to determine the amount of time of travel to the exit station. All vehicles requiring a greater travel time than that provided for by the time limit, will be detected. The type of disciplinary action, if any, taken thereafter may be determined by the governmental authority operating the toll highway.

Accordingly, another object of this invention is to provide means to detect and to indicate the act of kiting.

Another object of this invention is to provide a toll recorder apparatus for detecting a vehicle whose toll highway traveling time exceeds a predetermined allowable time of travel.

In line with the foregoing, another object of this invention is to provide a toll highway recorder system for indicating upon a record associated with a vehicle that the time of vehicle highway travel is in excess of a predetermined time limit.

Still another object is to provide a toll highway recorder system having a highway entrance apparatus to record a future time, and a highway exit apparatus to detect a period of highway travel of a duration such that the time at which a vehicle leaves the toll highway is later than the previously recorded future time.

A still another object of this invention is to provide a toll highway recorder system having an apparatus associated with each exit station to detect vehicles entering the toll highway at any one of selected entrance stations in the same zone area as the exit station.

Each vehicle passing over the toll highway is identified by a trip card which is validated or partially processed first at the exit station. The exit station apparatus will detect and prevent the reuse of a completely processed trip card. Similarly, this apparatus will detect and prevent the use of a trip card which has not been partially processed at a highway entrance station.

Accordingly, another object of this invention resides in the provision of means to prevent the reuse of a completely processed trip card.

A more specific object of this invention is to provide a toll recorder apparatus to detect a completely processed trip card, for controlling the operation of the toll recorder.

In line with the foregoing, a more specific object of this invention is to provide a record sensing apparatus for controlling the operation of a recording apparatus so that cancelation data is recorded by the latter apparatus only if the sensing apparatus detects the absence of said data on a record.

Another object of this invention is to provide a toll highway recorder system having an exit station apparatus for detecting a trip card which has not been partially processed at an entrance station.

In the preferred embodiment of this invention, a zero control counter is used at the exit station to determine a number of axles in error as is indicated by a difference count between the actual number of vehicle axles having passed over an axle treadle and the number of axles per vehicle manually set up on a keyboard and caused to be recorded on a trip card by a toll collector. In addition to accumulating a count of the number of axles in error, to thereby afford an indication of the actual number of axles as determined by the axle treadle, this counter may also designate the kind of error. That is, the zero control counter may designate whether the number of axles caused to be recorded on the trip card due to a manual setup by the toll collector is less than, equal to, or greater than, the actual number of vehicle axles passing through the station.

Accordingly, another object of this invention is to provide an improved apparatus for detecting a difference count between the number of vehicle axles manually set up by a toll collector and the actual number of axles per vehicle.

Another object of this invention is to provide an apparatus for determining and recording a number of axles in error due to an improper axles per vehicle determination by a toll collector.

It may be pointed out at this time that the invention shown and described in copending U.S. patent application Serial No. 398,358, filed on February 22, 1954, now Patent 2,947,591 includes an apparatus for verifying a vehicle axle count.

It has been mentioned previously that the present invention includes an overweight axle detecting apparatus. It must be pointed out at this time that some toll highway governing agencies stipulate one weight limit, for example 22,400 pounds, for so-called single axles, and another weight limit, for example 18,600 pounds, for each one of so-called tandem axles.

Accordingly, another object of this invention is to provide apparatus to effect an overweight axle check for different types of axles having different weight limits.

A still another object of this invention is to provide a treadle apparatus for distinguishing single axles and tandem axles.

Provision is made in the preferred embodiment of this invention whereby a receipt card may be issued to the vehicle operator at the exit station only after an associated trip card has been processed. That is, a receipt card toll recorder operation may not be effected immediately following either a tour-of-duty card operation or a charge card operation. Inasmuch as a receipt card may be considered to be a part of the transaction involving the preceding trip card, there are provided means whereby the counter for printing the transaction number of the toll recorder operation and the counter for accumulating the sequence number count in the tour-of-duty recorder, are not advanced during a receipt card operation.

Accordingly, another object of this invention is to provide a receipt card apparatus which is rendered operative only after a toll recorder operation for a trip card.

In keeping with the foregoing, another object of this invention is to provide a receipt card apparatus which may be operated for only one operation following a toll recorder cycle for a trip card.

A more specific object of this invention is to provide apparatus whereby a toll recorder transaction number counter is disabled during a receipt card operation.

Other objects of the invention will be pointed out in the following description and claims and illustrated in the accompanying drawings, which disclose, by way of example, the principle of the invention and the best mode, which has been contemplated, of applying that principle.

In the drawings:

FIG. 4 shows the reverse side of a trip card.

FIG. 5 shows the front side of a completely processed trip card.

FIG. 6 shows one side of a tour-of-duty card.

FIG. 7 is a somewhat diagrammatic representation of a toll highway between separate zone checking areas.

FIG. 13 is an elevation, with parts in section, of toll recorder time of trip control emitters.

FIG. 14 is an elevation of the card receiver braking mechanism in an operated position.

FIG. 15 is an elevation of the card receiver braking mechanism in a disabled position.

FIG. 16 is an elevation, with parts in section, taken along sectional lines 16—16 of FIG. 18.

FIG. 17 is a view of the card operated contacts taken along sectional lines 17—17 of FIG. 12.

FIG. 23 is a view taken along sectional lines 23—23 in FIG. 22.

FIG. 24 shows a portion of a printed tour-of-duty recorder report sheet.

FIG. 25 is an elevation, somewhat diagrammatic in character, of the tour-of-duty recorder "day" operating mechanism.

FIG. 26 is an elevation, somewhat diagrammatic in character, of a tour-of-duty recorder type wheel operating mechanism.

FIG. 27 is a perspective view, somewhat diagrammatic in character, of card punches and interposers.

FIG. 28 is a perspective view, somewhat diagrammatic in character, of a master pulse timer for a tour-of-duty recorder.

FIG. 30 is a block diagram of an exit station toll recorder.

Figure 31A:
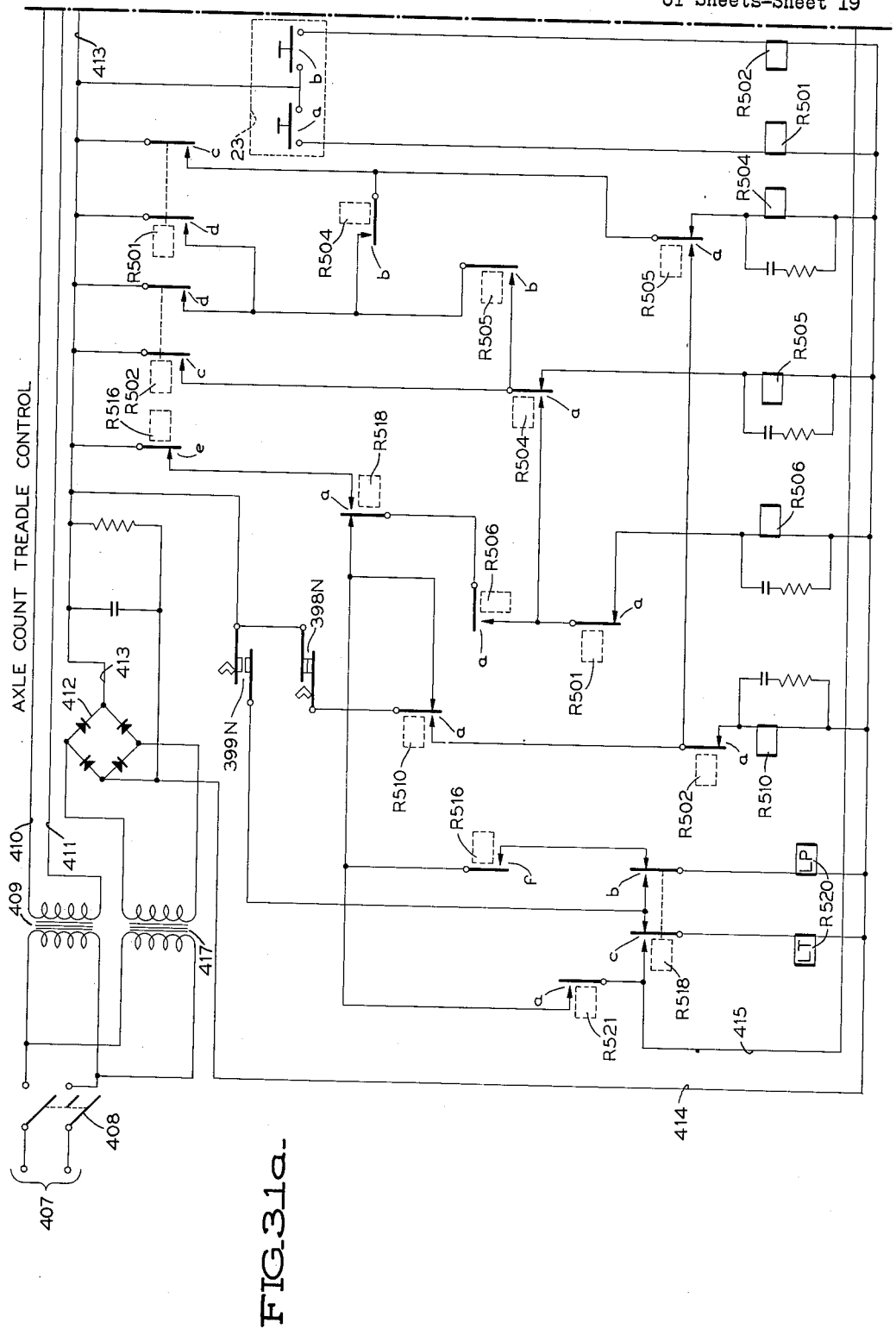
Figure 31J:
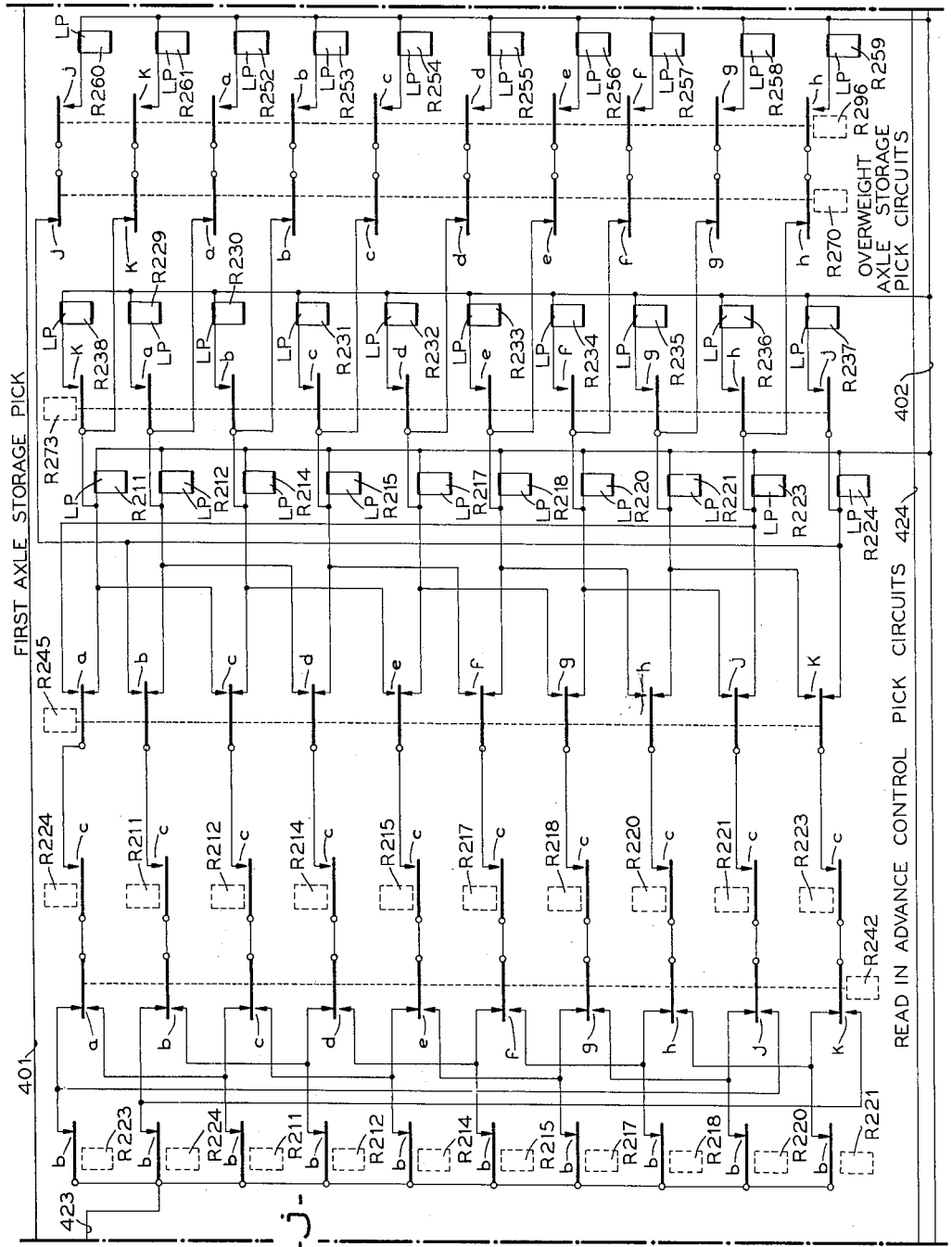
Figure 31K:
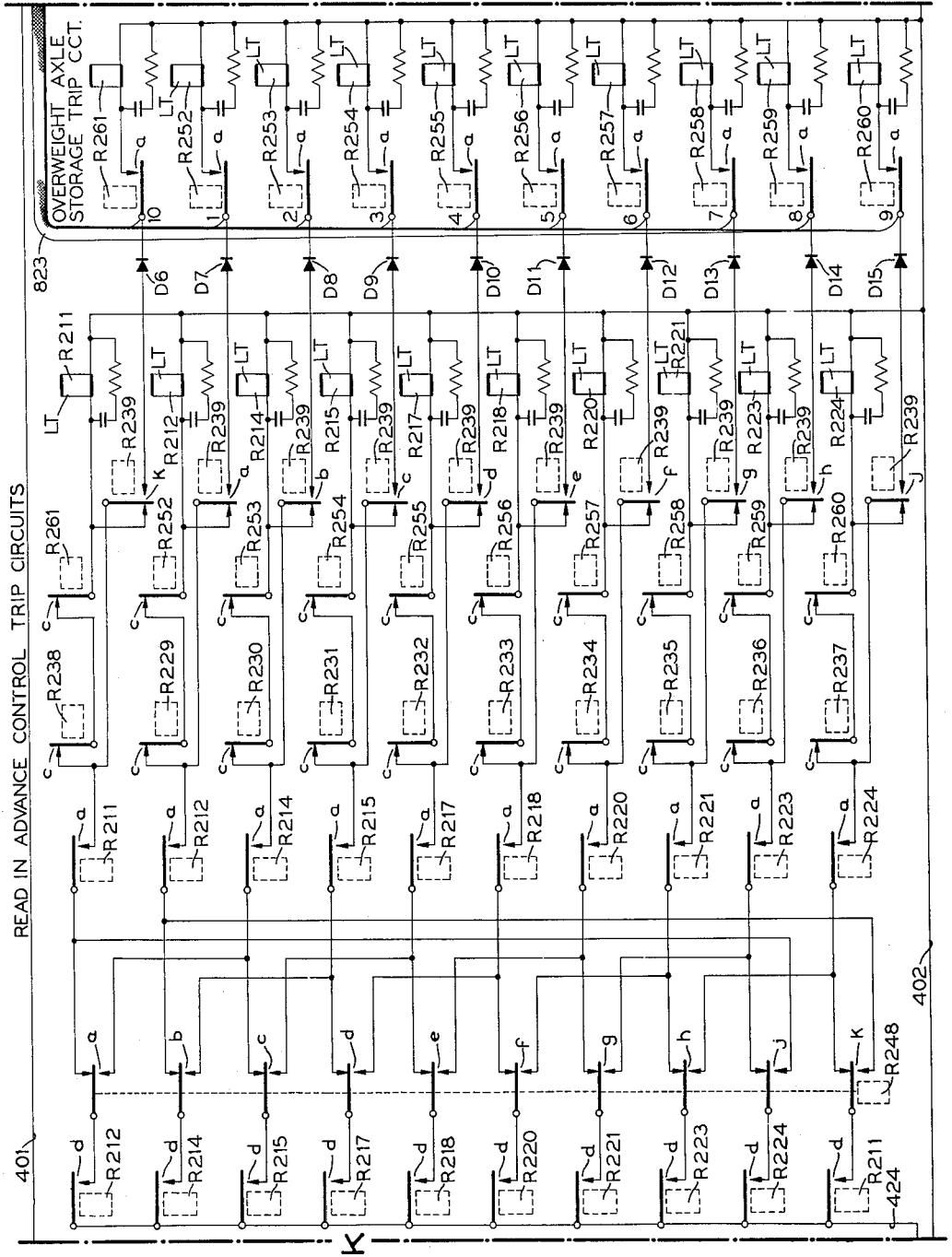
Figure 319:
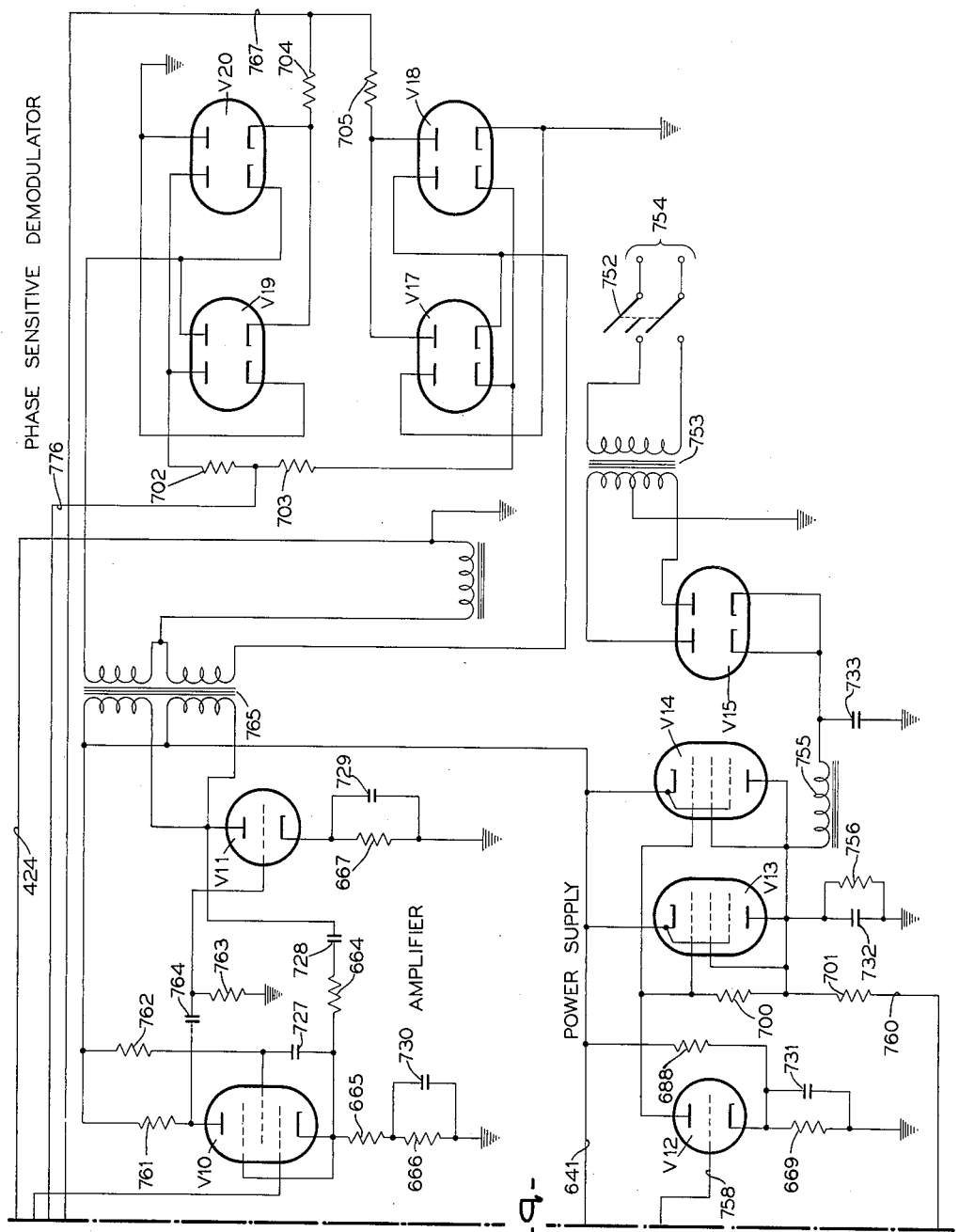
Figure 31R:
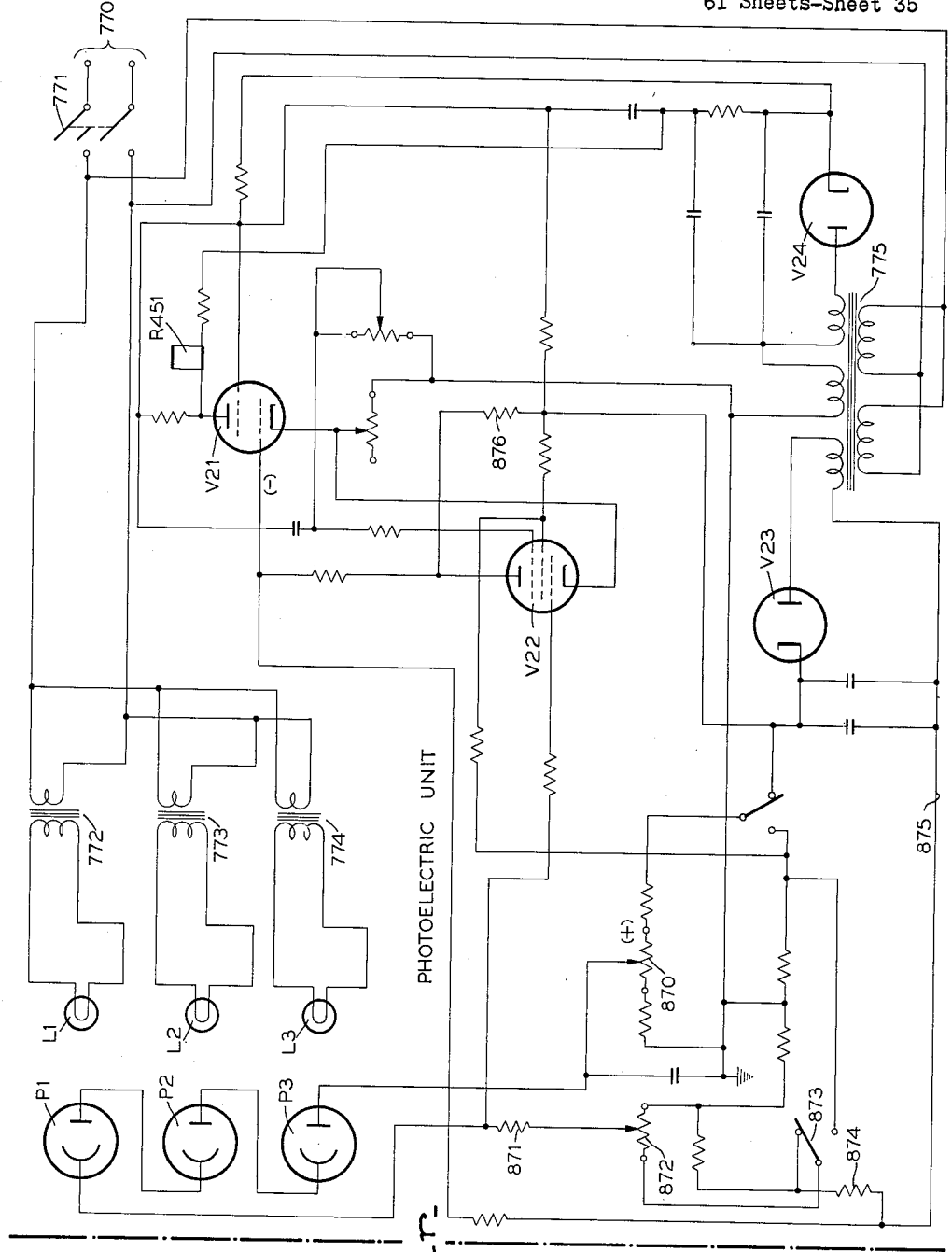

FIGS. 31a to 31r, inclusive, taken together, constitute a wiring diagram of a toll highway entrance station recorder system.

Figure 32A:
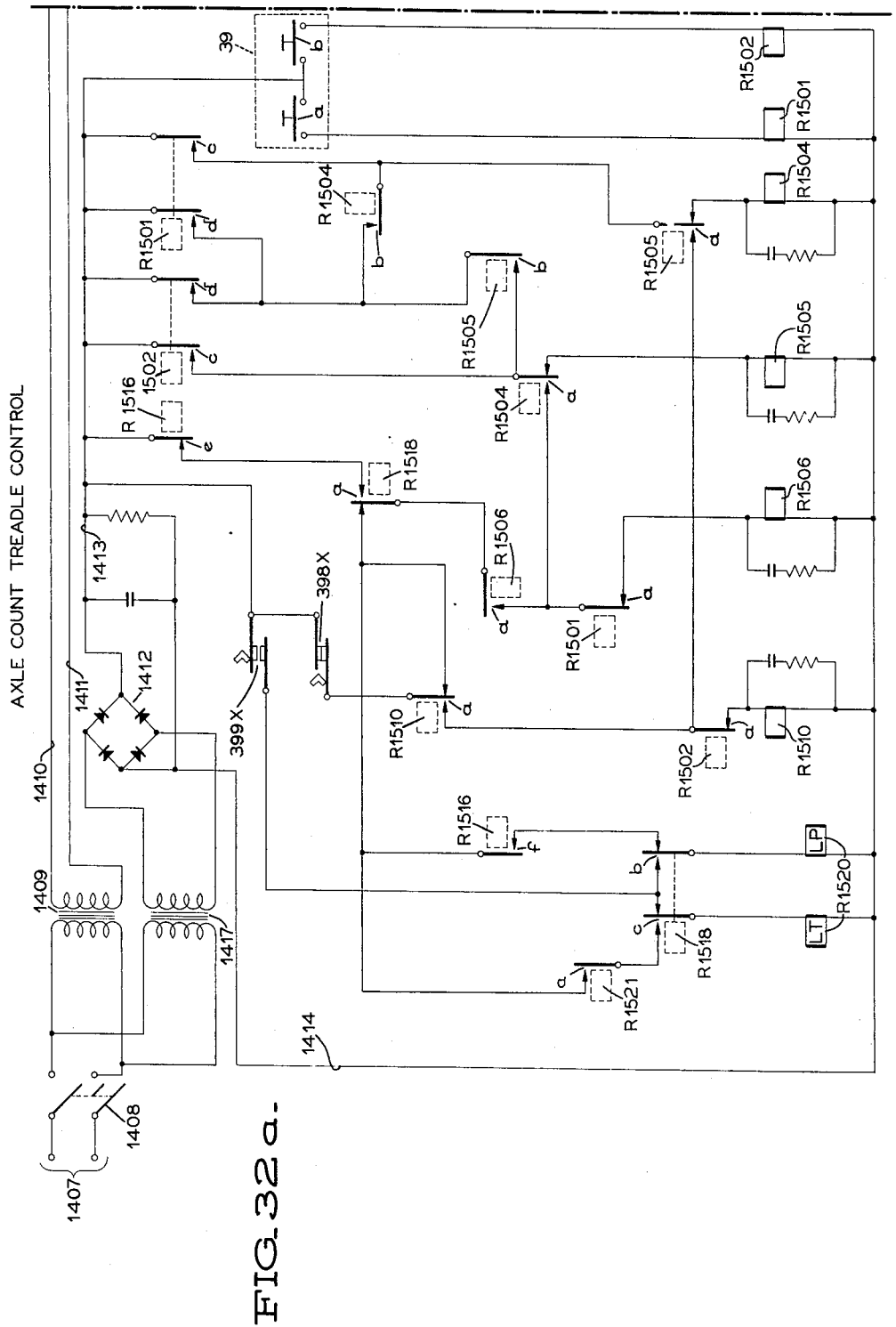

FIGS. 32a to 32x, inclusive, taken together, constitute a wiring diagram of a toll highway exit station recorder system.

Figure 33:
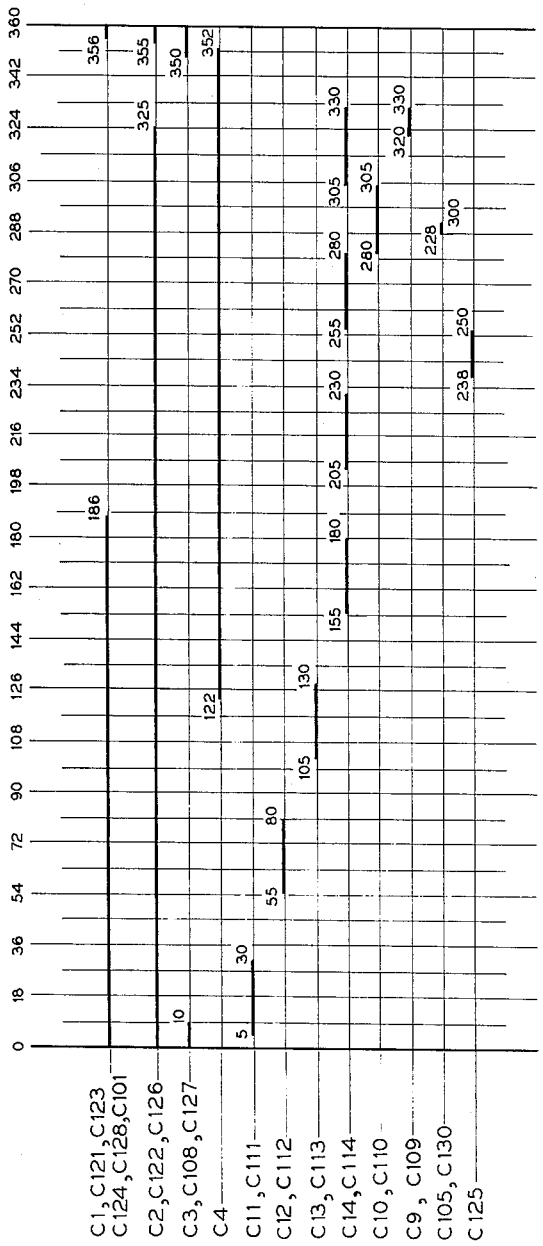
Figure 310:
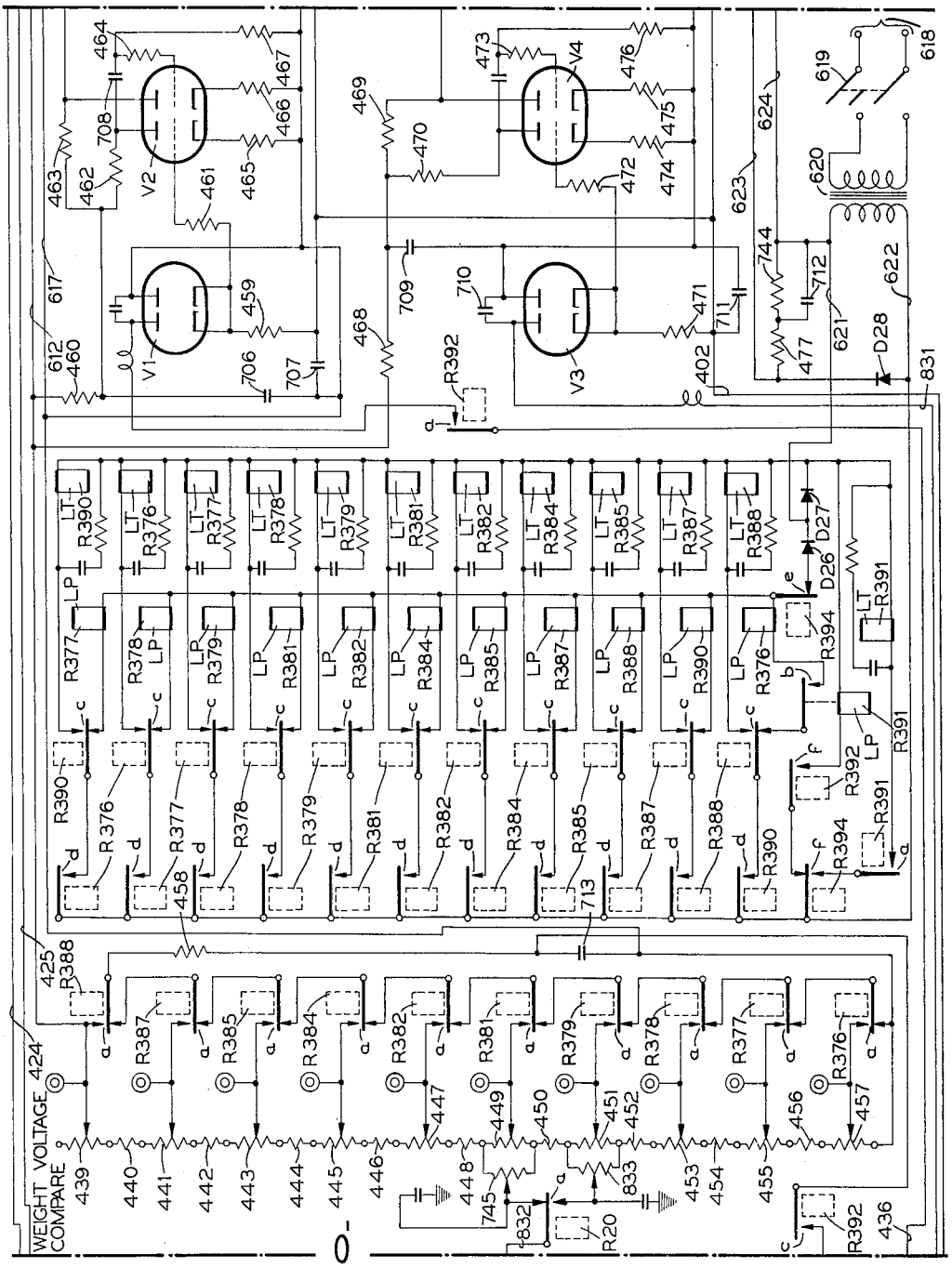

FIG. 33 is a timing chart.

Figure 34:
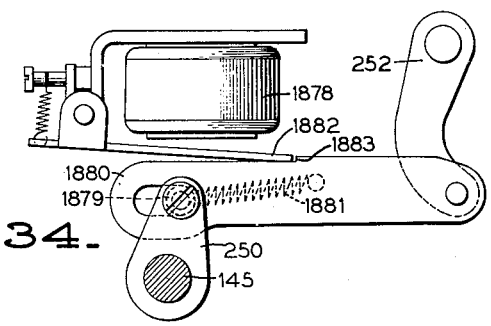

FIG. 34 is an elevation, with certain parts omitted, of a toll recorder transaction counter operating mechanism.

FIG. 35 is a partial circuit diagram for operating an axles per vehicle manifesting apparatus.

FIG. 36 is a partial circuit diagram of a tandem axle treadle control apparatus.

The following outline of the main description headings is provided in order to aid the reader of this specification:

(A) Toll Highway Recorder System General Description
(B) Mechanism Description
   1. Time Control Mechanism
   2. Card Receiver Mechanism
   3. Card Sensing Mechanism
   4. Card Punching Mechanism
   5. Card Printing Mechanism
   6. Ribbon Drive Mechanism
   7. Tour-of-Duty Recorder Mechanism
   8. Keying Mechanism
(C) Circuit Description
   1. Entrance Toll Recorder—General
   2. Exit Toll Recorder—General
   3. Similar Entrance and Exit Station Apparatus Circuits
     (a) Toll and Tour-of-Duty Recorders Power Supply
     (b) Forward Vehicle Motion Over Axle Count Treadle
     (c) Reverse Vehicle Motion Over Axle Count Treadle
     (d) Forward Movement Complete Relay R201
     (e) Reverse Movement Relays R242 and R245
     (f) First Axle Storage Control-Relay R273
     (g) Read-In Advance Control Pick Relays
     (h) First Axle Storage Pick Relays
     (i) Weight Storage Condenser Input Control
     (j) Axle Key Unit
     (k) Readout Advance Control Relays
     (l) First Axle Storage Trip Relays
     (m) Readout Storage Relays
     (n) Axles Per Vehicle Check Relay R316
     (o) Weight Storage Condenser Output Control Relays
     (p) Weight Storage Condenser Readout-Total Vehicle Weight
     (q) Vehicle Classifying
        Weight voltage compare circuit
        Ripple circuit
        End classify relay R394
        Ripple circuit reset
     (r) Carrier Oscillator
     (s) Reference Rectifier
     (t) Power Supply
     (u) Load Cells
     (v) Carrier Amplifier
     (w) Phase Sensitive Demodulator
     (x) Tare Correction Apparatus
     (y) Photoelectric Unit
     (z) Tour-of-Duty Card Circuit Operation
   4. Other Entrance Station Apparatus Circuits
     (a) Overnight Axle Check
     (b) Tandem Axle Overweight Axle Check
     (c) Overweight Axle Interlock Relay
     (d) Interlock Control Circuits
     (e) Punch Interposer Magnets
   5. Other Exit Station Apparatus Circuits
     (a) Card Indicia Sensing Station
     (b) Kiting
        Zone check circuit
        Allowable time of trip checking circuit
     (c) Axles in Error Check
     (d) Dynamic Weight Vehicle Classification Check
     (e) Zero Control Circuits
     (f) Interlock Control Circuits
     (g) Punch Interposer Magnets
     (h) Receipt Card Operation
(D) Indicator Panel and Circuits
(E) Tour-of-Duty Recorder Circuits
   1. Tour-of-Duty Recorder Operation
     (a) Insertion or Removal of Collector's Identification Key
     (b) Resumption of Power After Toll Recorder Power Failure
     (c) Reverse Vehicle Motion When Toll Collector's Key Is in Toll Recorder
     (d) Reverse Vehicle Motion When Toll Collector's Key Is Out of Toll Recorder
     (e) Forward Vehicle Motion When Collector's Key Is Out of Toll Recorder
     (f) Processing Trip Card for Vehicle Having at Least One Overweight Axle
     (g) Hourly Print Operation
     (h) Manual Operation
(F) Operation and Summary Prior to describing those various mechanical and electrical components of the present invention which cooperate to provide an effective and practicable toll highway recorder system, the system will first be explained briefly and in a general way so as to afford a picture of the overall operation thereof.

(A) A TOLL HIGHWAY RECORDER SYSTEM GENERAL DESCRIPTION

Figure 1:
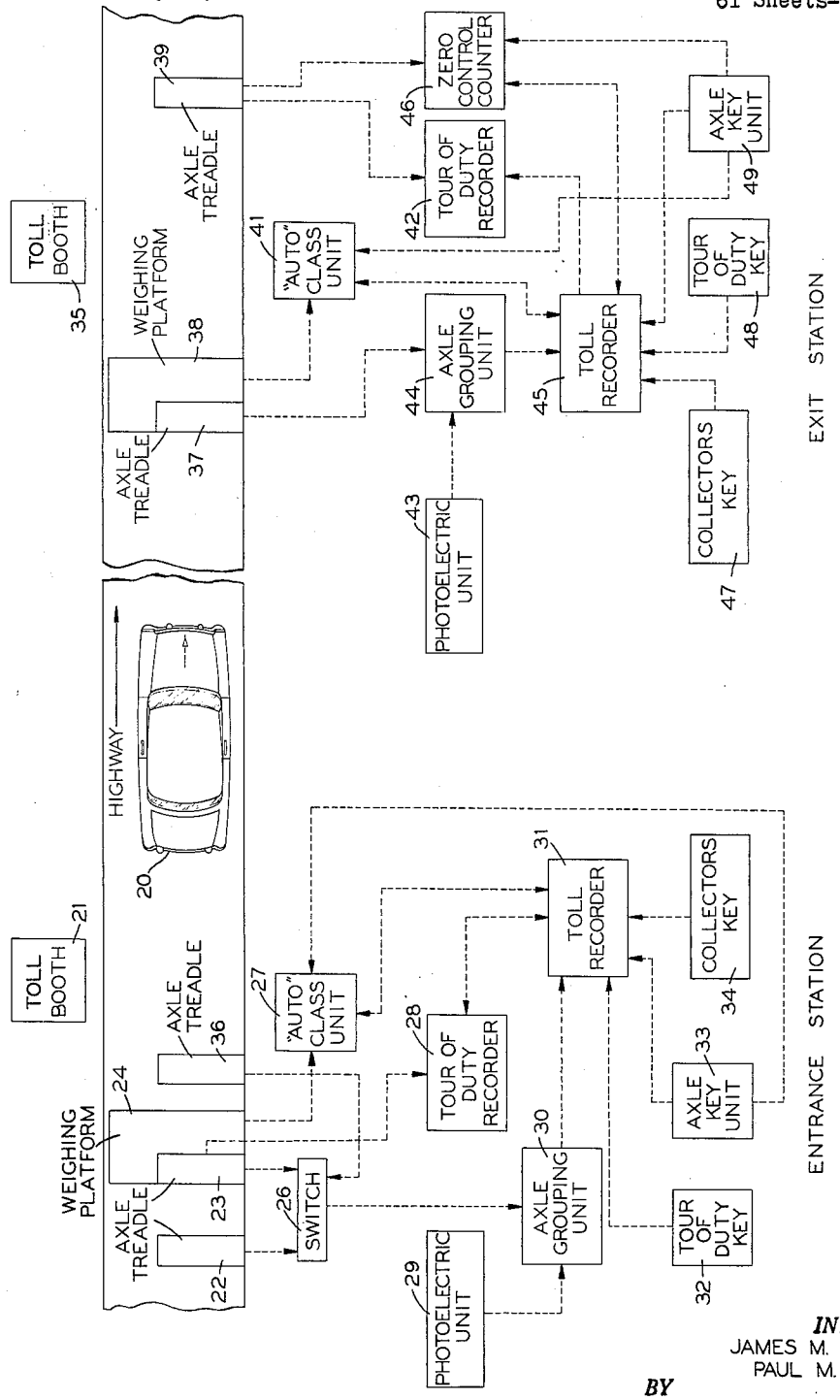
FIG. 1 is a diagrammatic representation of a dynamic weight classification toll highway recorder system having entrance and exit station apparatus.

A diagrammatic representation of a preferred embodiment of a toll highway recorder system for a toll highway having a vehicle entrance station and a vehicle exit station, is shown in block diagram form in FIG. 1. The two stations are separated by the number of highway miles between the locations of the entrance and exit stations, this distance being a partial factor for determining the toll to be paid by a vehicle operator for the privilege of passing over the highway.

A vehicle 20 which is about to pass over the highway, is first stopped at the entrance station so that information relative to toll highway operations may be entered upon a trip card in the toll recorder 31 and upon a record sheet in the tour-of-duty recorder 28. This vehicle is stopped opposite a toll booth 21 after having passed over successively arranged axle treadles 22 and 23, and weighing platform 24. The number of vehicle axles passing over the axle counting treadle 23 in a forward direction, i.e., in a direction towards the highway, are registered as forward axles. In the event that the vehicle is moved over treadle 23 in a reverse direction, i.e., away from the highway, after having passed completely over the treadle in a forward direction, those axles are registered as reverse axles.

The weighing platform 24 is a suitable distance ahead of stop booth 21, such as fifty feet for example, so that all of the axles of a conventional vehicle are certain to be weighed in advance of the vehicle being stopped opposite toll booth 21. This is necessary inasmuch as in the preferred embodiment of this invention the weight of a vehicle is determined by adding the weights of the vehicle axles. The weighing platform to be described in detail later, is supported by two load cells which cause voltages corresponding to the weights of the axles crossing the platform to be directed to an axle weight storage apparatus located in the toll recorder. An overweight axle check circuit 791 (see also FIG. 29) is also provided in entrance toll recorder 31 in order to check each axle passing over weighing platform 24 for an overweight condition. In the event that the weight of any axle is over a predetermined amount, for example over 22,400 pounds, this condition will be stored until the trip card associated with the vehicle is to be processed in the toll recorder, at which time a select overweight axle indicator light, e.g., light OL$b$ (FIG. 8), corresponding to the overweight axle, will be lit on a toll recorder associated indicator panel 352 to thereby apprise the toll collector of the overweight axle condition.

A photoelectric gating system (see also FIG. 3) is used to detect the presence of a vehicle passing through a lane of the entrance station, for example. This system which includes photoelectric unit 29 (FIG. 1), is effective in combination with the circuits of axle treadle 23, to govern an axle grouping unit 30, whereby the axles per vehicle of each vehicle passing over treadle 23 are grouped together. It may be pointed out at this time that inasmuch as the axles of each vehicle are grouped on an axle per vehicle basis, and since the axles of each vehicle are weighed separately while passing over weighing platform 24, a circuit is provided in toll recorder 31 to compare the total weight of the vehicle which is acquired by adding the weight of each of the axles per vehicle, with a predetermined weight limit, for example 80,000 pounds. As a result, any single vehicle whose total axles weight is greater than the 80,000 pounds limit may be determined as an overweight vehicle and, in accordance with the preferred embodiment of this invention, will be classified as class 9 (see also FIG. 5).

A dynamic weighing classification circuit network is also provided so as to afford an automatic vehicle classification of the vehicle which is based on the weight of the vehicle. This is represented in FIG. 1 by automatic class unit 27.

Upon being stopped opposite toll booth 21, vehicle 20 is examined for the number of axles it carries by the toll collector thereat, whereupon the toll collector will operate an axle count key in unit 33, which corresponds to the number of vehicle axles determined to be carried by the vehicle. In addition, the operated key must also correspond to the number of axles automatically grouped by unit 30, inasmuch as an axles per vehicle compare circuit provides a check of the axles per vehicle manually grouped with those automatically grouped.

The toll collector may then procure a trip card 51 (see also FIG. 5) from a convenient card rack, for insertion into the card receiver of the entrance toll recorder 31. As is shown in FIG. 5, trip card 51 has a corner cut 52 and, in general, the appearance of the well-known IBM tabulating card. Complete insertion of the trip card into the card receiver of the toll recorder with proper regard to the position of corner cut, will condition for operation electrical circuits which will cause the following information relating to toll highway operation to be entered upon the trip card:

(1) The identification number of the entrance station toll collector, e.g., H/3 (FIG. 5). It must be pointed out here that the toll collector's identification key 34 (FIG. 1) must be inserted in the entrance toll recorder 31 for the latter to be operative.

(2) The identification symbol of the entrance station lane through which the vehicle passes to enter the highway, e.g., 1/8 (FIG. 5).

(3) The time and the day at which the trip card has the information entered thereupon at the entrance station, e.g., 18:26 and 265, respectively.

(4) The recorder transaction number associated with the vehicle entering the highway, e.g., 1593.

(5) The classification of the vehicle (row 1, columns C through K), e.g., class 3.

(6) A proof of classification recording (row 1, column B).

(7) The entrance station identification symbol (row 2, columns F through L), e.g., station No. 28.

(8) The number of axles per vehicle (row 3, columns B through D), e.g., two axles.

(9) The time of trip control value within which the vehicle should pass over a designated portion of the toll highway (row 3, columns E through L), e.g., a value of 55.

(10) An overweight axle marking (row 1, column A).

As is shown in FIG. 5, the preceding items of information identified by numbers 1 through 4 are printed on the upper line of the face of trip card 51, whereas the last six items of information are recorded on the trip card in the form of perforated data in rows 1 to 3, inclusive.

After the trip card has been validated at the entrance station so as to contain the information described hereinabove, i.e., after a toll recorder cycle has been completed, the card is removed from the toll recorder card receiver and placed into the custody of the vehicle operator. The operator is then permitted to leave the entrance station and to pass over the highway towards his destination at which an exit station toll recorder system is located.

Upon entering the exit station, the vehicle 20 is stopped opposite toll booth 35 after having completely passed over axle treadle 37 and weighing platform 38, but prior to passing over axle treadle 39. The number of vehicle axles passing over treadle 37 in a forward direction, i.e., in a direction away from the highway, are registered as forward axles, whereas the number of vehicle axles passing over the treadle in a reverse direction are registered as reverse axles. Vehicle 20 is once again examined for the number of axles it carries by a toll collector, this time an exit station toll collector, whereby the number of axles per vehicle is determined for a second time. In keeping with this determination, a corresponding axle count key in axle key unit 49 is depressed. The trip card 51 (see also FIG. 5) which was previously placed in the custody of the vehicle operator at the entrance station, is taken by the exit station toll collector for insertion into the card receiver of toll recorder 45. Complete insertion of the trip card with proper regard to the position of corner cut will cause a punched hole sensing mechanism incorporated in the exit station apparatus, to operate so as to analyze perforated data in the trip card. As a result of this analysis, exit station toll recorder electric circuits may be conditioned for operation in order to complete the processing of the trip card only if the afore-mentioned sensing mechanism detects the following trip card information (refer to FIG. 5):

(1) An entrance station number in row 2, columns E through L of trip card 51.

(2) That the perforated number of axles per vehicle entered upon the trip card at the entrance station in row 3, columns B through D, corresponds with the number of axles represented by the axle count key operated in exit station axle unit 49.

(3) The absence of a cancelation perforation which is punched in a trip card in row 3, column A, only at an exit station; this check prevents the reuse of a trip card after it has once been validated at an exit station.

(4) An allowable time of trip control value in row 3, columns E through L, which indicates that excess time was not required for vehicle 20 to move from an entrance station to an exit station which is located within the same zone checking area as is the entrance station.

(5) A proof of classification hole in row 1, column A to indicate that the dynamic weight classifying circuits operated properly at the entrance station.

In order to place the exit station toll recorder in a condition for operation so as to complete the processing of the trip card, the following conditions must be met in addition to the sensing mechanism detecting the foregoing information:

(1) The toll collector's identification key 47 (FIG. 1) must be inserted into the exit station toll recorder 45.

(2) The number of axles represented by the key operated in unit 49 must correspond to the number of axles grouped by axle grouping unit 44. As will be described in detail hereinafter, the photoelectric gating system for the exit station includes photoelectric unit 43, and electrical apparatus associated with axle treadle 37 in combination with unit 43, controls axle grouping unit 44 so that the axles of each vehicle passing over treadle 37 are grouped together on a per vehicle basis.

(3) The dynamic weight vehicle classification determined automatically at the exit station by "auto" class unit 41 does not exceed the dynamic weight vehicle classification determined at the entrance station by a class value greater than one.

The afore-mentioned electric circuits which are caused to operate only if the sensing mechanism detects the hereinbefore listed information, and only if the preceding conditions are met, will effect an exit station toll recorder cycle which will cause the following information to be entered upon the trip card at the exit station:

(1) The identification number of the exit station toll collector as represented by his key, e.g., M/4 (FIG. 5).

(2) The identification symbol of the exit lane through which vehicle 20 passes to leave the highway, e.g., 1/0.

(3) The time and the day at which the trip card has the information entered thereupon at the exit station, e.g., 20:30 and 265, respectively.

(4) The recorder operation transaction number associated with the vehicle leaving the highway, e.g., 5678.

(5) The exit station number (row 4, columns F through L), e.g., station No. 5.

(6) The number of vehicle axles keyed in unit 49 (row 5, columns B through D), e.g., two axles.

(7) That excess time was not required for vehicle 20 to pass over the toll highway (row 5, column F).

(8) The dynamic weight classification of the vehicle (row 4, columns A through D) in binary notation, e.g., three (only under certain conditions to be brought out as the description advances).

(9) A cancelation marking (row 3, column A).

As is shown in FIG. 5, the first four preceding items of information are printed on the second or lower line of trip card 51, whereas the last five items of information are entered thereon as perforated data.

In addition to the foregoing information, an axles-in-error indication may be entered upon the trip card in row 5, columns I though L, as well as a kind of axles-in-error indication, i.e., whether the axles-in-error is a positive or negative value, which may be entered upon the trip card at row 5, column G. It is necessary that it be brought out at this time that the axles-in-error information recorded on the trip card for vehicle 20 pertains to the vehicle which immediately preceded vehicle 20 through the exit station. In order to explain this point briefly at this time, the setup of this information is as follows:

The operation of an axle count key in exit station axle unit 49 (FIG. 1) causes a corresponding vehicle axle count value to be added in a zero control counter 46 (FIG. 1). The subsequent passage of the vehicle for which the axle count key was operated, over axle treadle 39 causes a count of the vehicle axles carried by the said vehicle to be subtracted in counter 46. Of course, if the axle count value entered in counter 46 as a positive value is the exact tens complement of the axle count value subtracted, counter 46 will have a zero balance total after the vehicle has passed completely over treadle 39. If, however, the axle count entered as a plus value in counter 46 is more or less than the axle count subtracted therefrom, counter 46 will have a plus or minus total, respectively, therein. It should be apparent that since a trip card associated with a vehicle, vehicle 20 for example, is processed before the vehicle passes over treadle 39, the axles-in-error indication, i.e., the axle count difference represented as a total in zero control counter 46, for example vehicle 20, cannot be entered upon the trip card associated with the said vehicle for which this difference occurs, but must be entered upon a trip card processed subsequently thereto. As mentioned previously this axles-in-error information which will hereinafter be referred to as a zero control counter balance, is recorded upon the trip card associated with the next following vehicle.

After the trip card for a vehicle has been completely processed at the exit station, the toll collector will determine the toll to be paid by the vehicle operator. This determination is made by referring to a toll chart imprinted upon the back of the trip card 51 (see FIG. 4). The amount of the toll to be paid for the privilege of passing over the highway is selected from this chart which takes into account the distance traveled over the highway, and the classification of the vehicle. Referring to FIG. 4, the toll collector will select the exit station through which the vehicle is passing, Endicott station No. 32 for example, as the ordinate, and the classification perforation, class 3 for example, as the abscissa. The point at which the ordinate and abscissa intersect defines the toll to be paid, which in this example is $0.35. It should be clear that each entrance station has assigned thereto a particular group of trip cards, each trip card having a toll chart imprinted on the back thereof which includes all of the exit station locations that can be reached from the given entrance station.

As has been stated previously, an overweight axle comparing circuit is provided at the entrance station so as to check each axle passing over the weighing platform for an overweight axle condition. In the event that the weight of any axle is over a predetermined amount, for example 22,400 pounds, a particular overweight axle indicator light on a toll recorder indicator panel 352 (FIG. 8) corresponding to the overweight axle, will be lit to thereby apprise the toll collector of the overweight axle condition. As a general rule, however, tandem axles which are carried by a vehicle, i.e., axles spaced approximately four feet apart, are not permitted to carry as great a load as are so-called single axles. For example, each tandem axle may be limited to a maximum load of only 18,600 pounds. For this reason, the afore-mentioned axle weight comparing circuit must be altered when each one of the tandem axles is caused to move over a weighing platform, platform 24 for example, so that the weight of the tandem axle may be compared against an 18,600 pound limit instead of a 22,400 pound limit. Referring particularly to the entrance station system apparatus in FIG. 1, axle treadles 22 and 23 are spaced apart an amount, for example four feet, so that tandem axles will pass thereover simultaneously. In so doing, switch 26 will be operated to thereby alter the axle weight comparing circuit in toll recorder 31, and will be disabled after the first one of the tandem axles passes over treadle 36.

The tour-of-duty recorders 28 and 42 are similar in construction, function and purpose, and are employed to provide a summary check report of the operations at a station lane. A tour-of-duty recorder operation (refer to FIG. 24) will occur to cause lines of information to be printed in response to any one of the following conditions:

(1) The insertion or removal of the toll collector's identification key (lines L1 and L4, for example).

(2) The resumption of power immediately after a power failure (line L1, for example).

(3) A reverse movement across an axle counting treadle such as treadle 23 (line L3, for example).

(4) A reverse movement across an axle counting treadle with the identification key in the toll recorder (line L6, for example).

(5) A forward movement across a treadle such as treadle 23, when the toll collector's key is out of the toll recorder (line L5 for example).

(6) The processing of a trip card for a vehicle having an overweight axle thereon (line L2, for example).

(7) Every hour on the hour (line L1, for example).

(8) Operation of a manually controlled switch associated with the tour-of-duty recorder (line L1, for example).

The information designated above as that which is printed on the summary check sheet 50 includes the following items:

(1) A "V" sign, such as in line L2, to indicate an overweight axle.

(2) An "R" sign, such as in line L3, to indicate a reverse motion across the treadle while the toll collector's key is in the toll recorder.

(3) An "R" sign and an "*" (asterisk), such as in line L6, to indicate a reverse movement across the treadle while the toll collector's key is out of the toll recorder.

(4) An "*", such as in line L5, to indicate a forward movement across the treadle.

(5) The Total Axles keyed which is a representation of an accumulation of the axle count corresponding to the axle count keys operated by the toll collector.

(6) A Forward Axle Count to indicate the number of vehicle axles passing over an axle treadle in a forward direction.

(7) Sequence Number to indicate the number of toll recorder operations.

(8) The Station and Lane Numbers.

(9) The Day and the Time of the day that a tour-of-duty recorder operation is effected.

Generally the tour-of-duty recorder, recorder 28 for example, is in a locked cabinet which may be remotely positioned from its associated toll recorder. This is for the reason that only an inspector, or toll collector supervisor, is expected to examine the summary sheet.

In addition to inserting a toll collector's key into a station toll recorder at the start of a tour of duty, the toll collector is required to insert a tour-of-duty record card 53 (FIG. 6) into the card receiver of the toll recorder at the start of a tour of duty. Complete insertion of the tour-of-duty card with proper regard to the position of corner cut, and depression of a tour-of-duty key, such as that indicated by block 32 in FIG. 1, associated with the station toll recorder, will render electric circuits operated which cause the following information to be recorded upon tour-of-duty card 53 (FIG. 6):

(1) The identification number of the station toll collector, e.g., H/3.

(2) The number of the station lane at which the collector is directed to spend his tour of duty, e.g., 1/8.

(3) The time and day at which the tour-of-duty card is processed, e.g., 18:00 and 265, respectively.

(4) The transaction number of the toll recorder cycle of operation, e.g., 1592.

(5) The station number at which the toll collector is directed to spend his tour of duty (row 2, columns F through L).

As is shown in FIG. 6, the first four preceding items of information are printed upon the face of card 53, and the last item is recorded as punched data.

The tour-of-duty card is expected to be processed at the start of a tour of duty so that the afore-mentioned information may be recorded at one end of the card, and at the completion of a tour of duty so that similar information may be recorded at the other end of the card. As a result, the tour-of-duty card is in effect a daily work record, or a job time card, for a toll collector's daily work period.

At the end of a tour of duty, each toll collector is responsible for the delivery of all processed tour-of-duty cards and trip cards in his possession to an immediate supervisor who sees to it that all of the cards in his custody are forwarded to a centrally located punched card accounting bureau. These cards are subsequently processed through accounting machines, such as the well-known IBM punched card machines for example, so as to complete desired accounting reports which are accurate and may be obtained speedily. These reports may be checked against the summary sheet 50 (FIG. 24) prepared in the tour-of-duty recorder in order to determine whether the trip card data corresponds with the summary sheet data.

Prevalidated trip cards may be employed during periods of heavy traffic to pass vehicles onto the highway more rapidly. The trip cards are prevalidated by the toll collector at the entrance station in the same manner as trip cards are normally validated or processed. As a rule, trip cards are prevalidated for only two axle, class one vehicles. Thus, if a vehicle carries more than two axles or belongs in a class other than class 1, a trip card will have to be processed therefor in the normal manner. With a group of cards prevalidated, the toll collector may use the prevalidated trip cards without taking time for operating the toll recorder for each vehicle when traffic is heavy. However, since excess travel time is determined from an allowable time of trip control value punched in the trip card at the time the card is validated at the entrance station, the trip card should be prevalidated a minimum period in advance of the time of issuance.

With the present toll highway recorder system, it is possible to accommodate vehicle operators having charge cards. These cards will be received initially by the vehicle operator in book form from the authority operating the toll highway. For each use of the toll highway, a charge card will be presented to the entrance station toll collector who will see to it that the card is validated in the same manner as a trip card prior to returning the card to the vehicle operator. The operator will retain custody of the card during his time of travel over the highway to the exit station, and at the exit station, the charge card will be presented to the toll collector who will also validate the card in the normal manner. However, instead of paying his toll in cash, the vehicle operator having a charge card will simply leave his card and make no payment to the exit station toll collector.

As will be described in detail hereinafter in connection with the circuit diagram, a receipt key may be provided at every exit station toll recorder in order that a receipt card may be prepared for a vehicle operator requesting the same. It will be recalled that the exit station toll collector will keep the completely processed card, and normally, there is nothing available to give to the vehicle operator to show that he has traveled over the toll highway. It is for this reason that the receipt card feature is provided. The receipt card will have thereon all of the printed information carried by a tour-of-duty card. In addition, the exit station identification number and the cancelation hole are caused to be punched in the receipt card. As the description advances, it will become clear that a receipt card operation cannot be effected after a tour-of duty card cycle or a charge card cycle.

The procedure followed in case of a lost card is one wherein the vehicle operator will be required to pay as his fare, the toll for a trip from the most distant entrance station to the particular exit station at which he is leaving the toll highway. Every exit station toll collector will have in his custody prepunched lost fare cards having punched thereon the entrance station number of the most distant station. Such a prepunched lost fare card will be processed by the exit station toll collector in the same manner as for any trip card. However, inasmuch as this prepunched card will have no number of axles per vehicle data punched therein, the exit station toll recorder will always lock up for a lost fare card, and a visual signal will appear. It will then be necessary for the toll collector to depress a release key so as to permit the processing of this lost fare card.

(B) MECHANISM DESCRIPTION

Inasmuch as a substantial portion of entrance station mechanism is similar to exit station mechanism, only the entrance station mechanism will be described herein wherever possible in order to avoid undue prolixity and unnecessary complexity. Special mention will be made when mechanism which is located in only the entrance station or exit station systems, is described.

(B1) *Time Control Mechanism*

It will be apparent to those persons familiar with the recorder art that the present time control mechanism is basically the same as that mechanism which is described in U.S. Patent No. 2,281,998 granted to F. Q. Rast. This patent may be referred to for a more detailed description of the time control mechanism than will be given hereinafter, the description being kept brief in order to avoid undue complexity as has already been stated hereinbefore.

Figure 9:
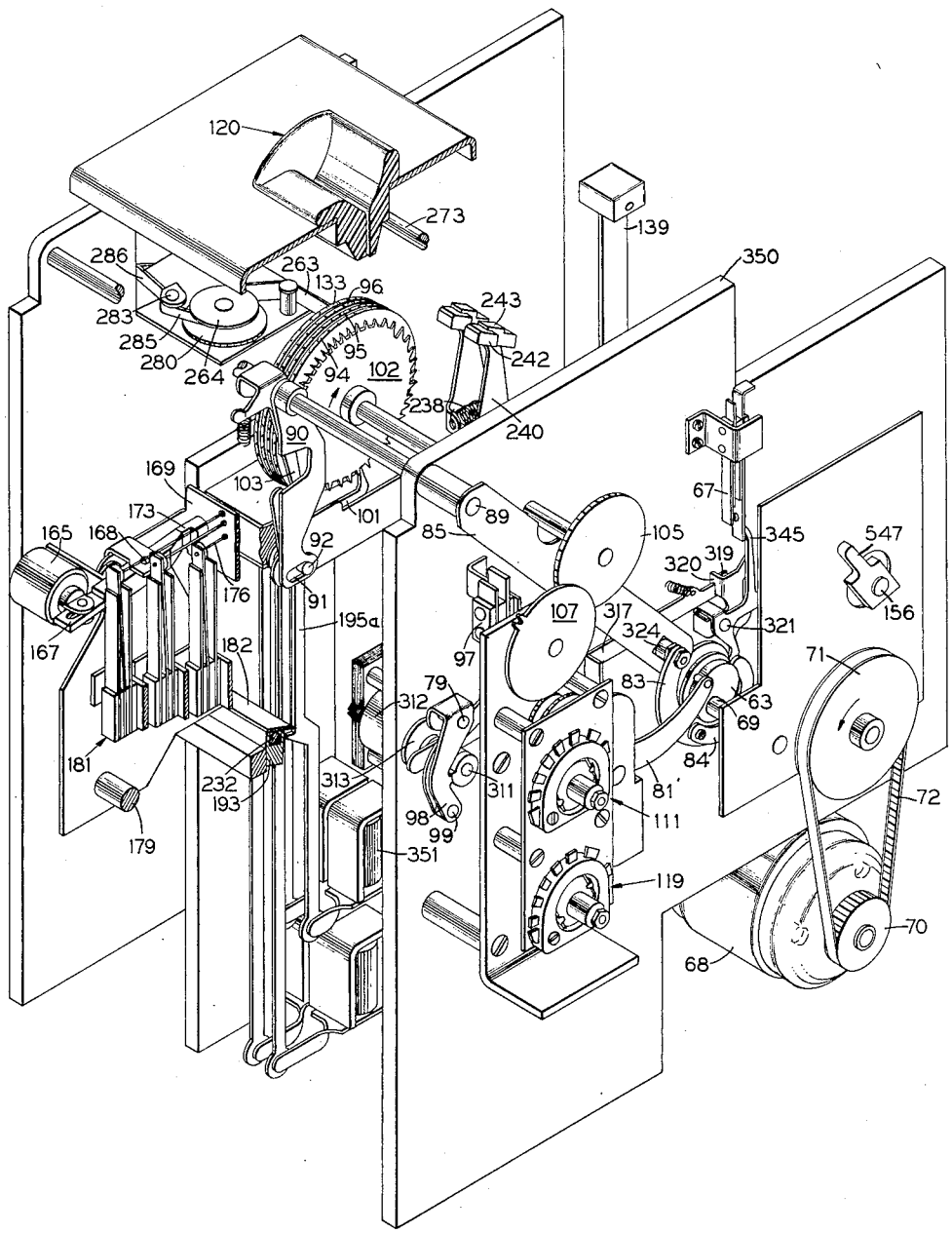
FIG. 9 is a perspective view, with some parts cut away, of a toll recorder.

The relationship of the time control mechanism with respect to the structure of the toll recorder as a whole is shown in FIG. 9. Referring to FIG. 9 in general and FIG. 10 in particular, shaft 311 of continuously operating synchronous motor 312 completes one revolution each minute. It may be seen that motor 312 is mounted on a recorder subframe 350. A synchronous motor is customarily used in locations where it is desirable to operate the recorder as an independent unit. The time control mechanism may be operated by a solenoid (not shown) which is energized by minute impulses from a master clock or other suitable timing device. However, the time control mechanism operated is the same in either case and will now be described.

Cams 313, 314 and 315 are attached to shaft 311, and also complete one revolution each minute. Hence, cam follower projection 316 will drop off the high dwell of cam 313 once each minute, whereupon latch arm 317 will be moved to the left under action of a latch arm spring 318. As the latch arm is moved to the left, a latch point 319 on arm 317 is caused to engage a latch member 320. This engagement of parts pivots spring-biased member 320 about stud shaft 321 in a counterclockwise direction. Consequently, the lower portion 322 of latch member 320 will be moved to the right to as to permit drive clutch pawl 59 to drop into engagement with a drive clutch ratchet 60 under the urging of a pawl spring 323. The pawl 59 is pivotally mounted upon the face of a cam 61 (see also FIG. 11) by stud shaft 64 so that the afore-mentioned clutch engagement, i.e., the engaging of the pawl with the ratchet, has the effect of connecting the cam with the ratchet. It may be mentioned here that cams 62 and 63 are fixed by conventional means to cam 61 for rotation therewith.

Figure 11:
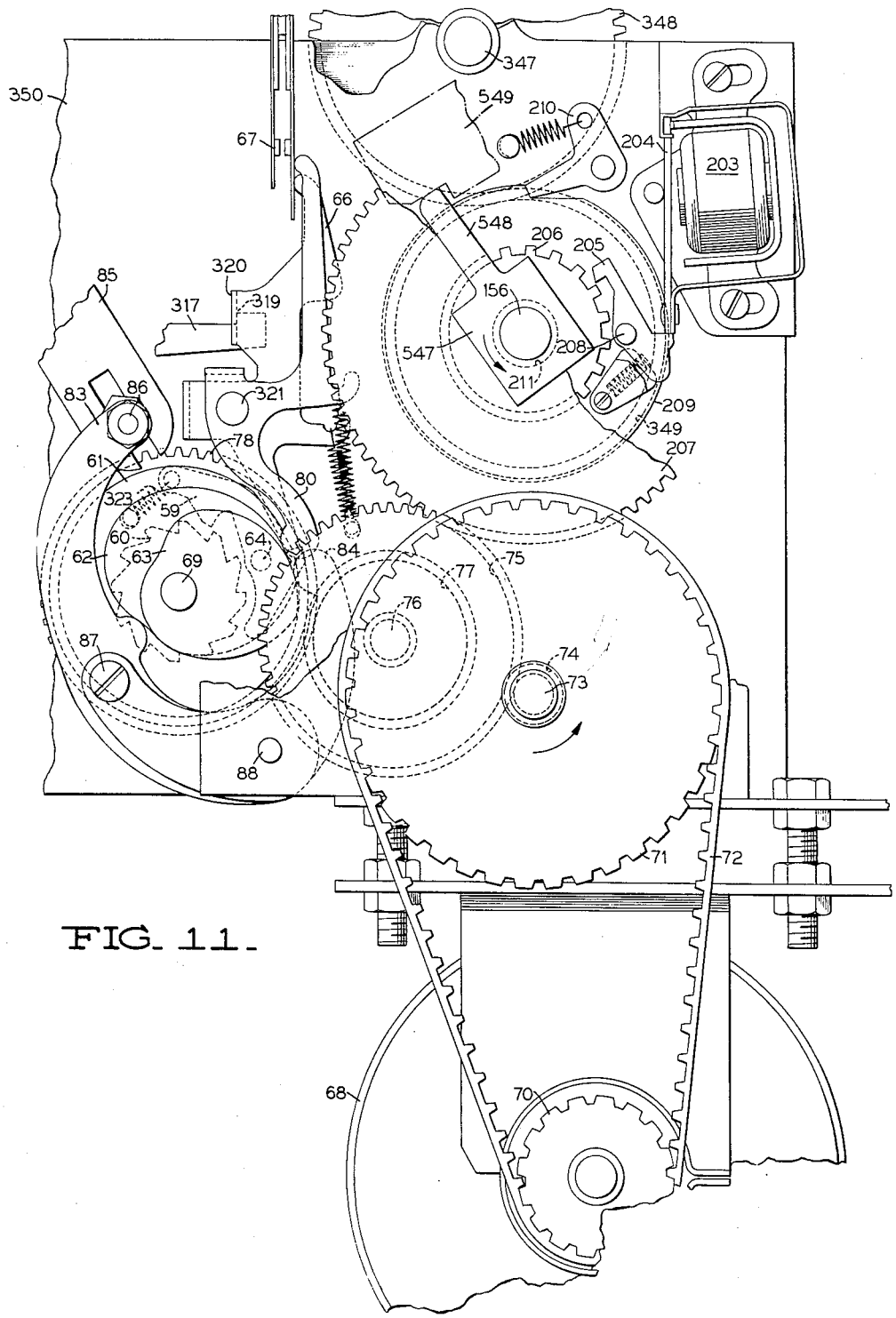
FIG. 11 is an elevation of the toll recorder main drive mechanism.

The upper end 66 of latch member 320 operates a pair of minute advance motor contacts 67 which complete a circuit when closed, to a drive motor 68 (see also FIG. 11). This circuit will be described hereinafter in detail in connection with the circuit diagram, it being sufficient for the present to say that upon the closing of contacts 67, motor 68 will be operated to turn a shaft 69 in a counterclockwise direction. As is shown in FIG. 11, drive pulley 70 is connected to driven pulley 71 via belt 72 so as to revolve shaft 73 and a gear 74 attached thereto whenever motor 68 operates. Gear 74 is in mesh with gear 75 which, in turn, is attached to shaft 76 whereon gear 77 is also attached. Gear 77, in turn, is in mesh with gear 78 which is fixed to shaft 69, as is also drive clutch ratchet 60 attached to shaft 69. Cams 61, 62 and 63 are loosely mounted on shaft 69, but since pawl 59 is now engaged with ratchet 60, these cams will be carried with the ratchet through stud shaft 64 as the latter is moved by the motor 68.

A cam follower 80 (see also FIG. 10), shaped like a bell crank, rides on the periphery of cam 61, said cam follower being pivotally mounted on stud shaft 321 and having a contact operating extension 345 which is moved to the left to close minute advance motor contacts 67 as the lower extremity of this cam follower rides up out of the recess in the periphery of cam 61 in which the cam follower is normally positioned. This has the effect of maintaining the motor contacts 67 closed during the course of movement of cam 61. As mentioned previously, fixed to the outer face of cam 61 are complementary cams 62 and 63. The cam follower end of bell crank 81 rides upon the periphery of cam 62 in order to operate minute interlock contacts 82 (FIG. 10), the use of which will be described hereinafter in connection with the circuit diagram.

Continued rotation of synchronous motor cam 313 will cause latch arm 317 to be moved to the right. As to be described hereinafter, arm 85 is caused to rock about shaft 89 during the time that the pawl 59 is engaged with ratchet 60. During the clockwise rocking movement thereof, a pin (not shown) on arm 85 moves lever 317 downwardly at its right end so as to disengage the latch point 319 from member 320. This permits latch member 320 to return to its normal position. Hence, the lower portion 322 will be moved into the path of drive clutch pawl 59 so as to disengage pawl 59 from ratchet 60 after a single revolution of the clutch and associated mechanism. During disengagement, spring-urged cam follower 80 will move into the recess in the periphery of cam 61, whereby the motor contacts 67 will separate to open the circuit to the motor 68 (FIG. 11).

As will be described hereinafter in connection with the circuit diagram, minute advance warning contacts 97 (FIG. 10) are closed approximately 0.4 second before latch arm projection 316 drops off the high dwell of cam 313 in order to afford a signal to indicate that a minute type wheel advance is going to occur. Contacts 97 are then opened approximately 0.3 second after the minute type wheel advance does occur. Since any of the type wheels 94, 95, 96 and 133 may be moved during such a minute advance period, it is undesirable to have a toll recorder printing cycle occur within this period inasmuch as the printing stroke may occur precisely at the time that a type wheel is being moved. The signal resulting from the closing of contacts 97 disables those circuits which cause a toll recorder cycle during which a printing stroke is effected, until after the minute advance is completed, after which the aforesaid circuits are automatically rendered operative by the closing of contacts 97.

Figure 10:
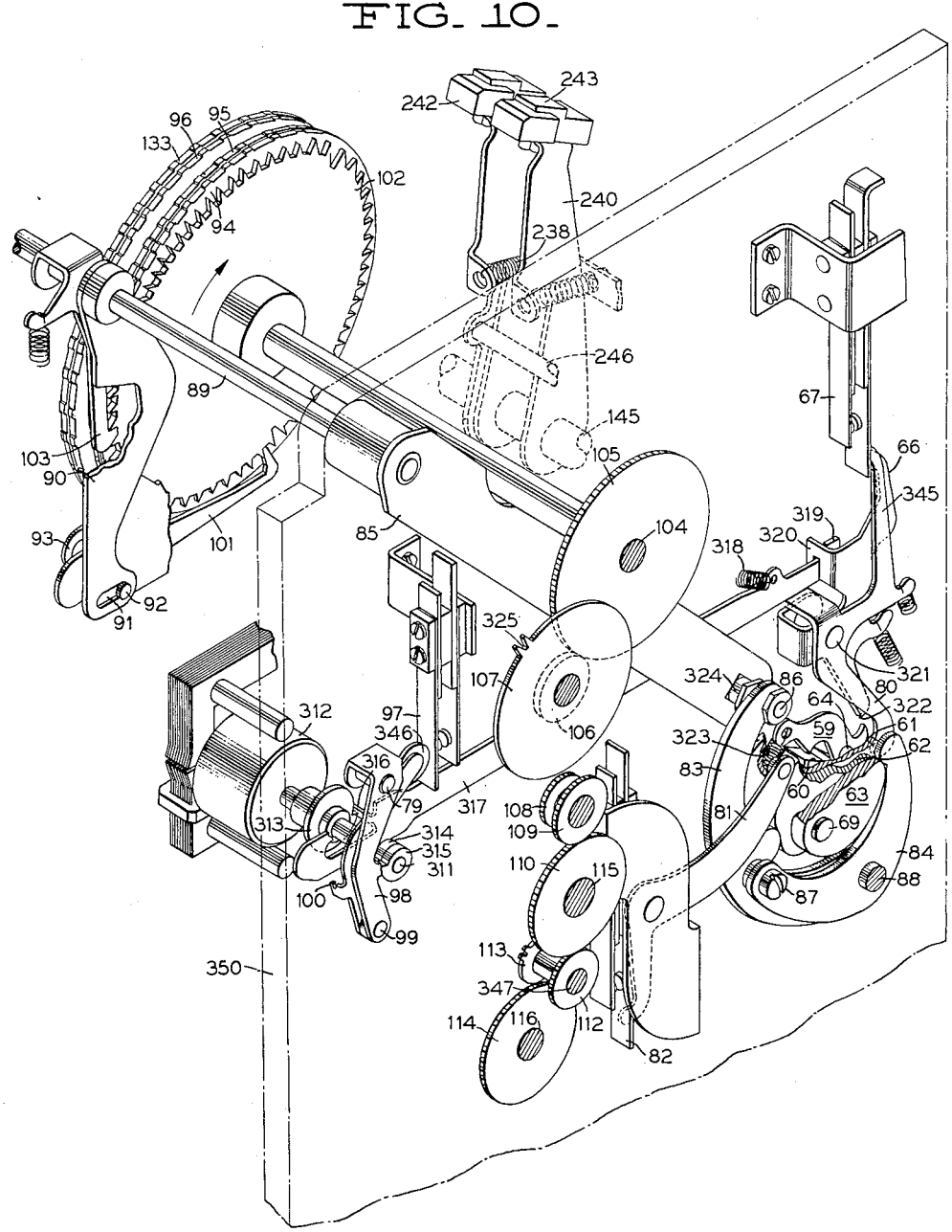
FIG. 10 is a perspective view, somewhat diagrammatic in character, of a toll recorder time control mechanism.

As is shown in FIG. 10, cam follower 98 is pivotally connected to stud shaft 79 and to cam follower 100 by connecting stud 99. As mentioned previously, just prior to the time that projection 316 drops off the high dwell of cam 313, cam follower 100 will drop off the high dwell of cam 314 to thereby close minute advance warning contacts 97 as cam follower 100 pivots in a clockwise direction about connecting stud 99. Shortly thereafter, cam follower 98 will drop off the high dwell of cam 315, carrying with it stud 99 as cam follower 98 moves in a counterclockwise direction about pivot stud 79. During the period of this latter movement, the contact operating end 346 of cam follower 100 is caused to move away from the contacts 97 inasmuch as the cam follower 100 is now pivoting in a counterclockwise direction about the point of contact between cam follower 100 and cam 314, to thereby cause contacts 97 to open. Thereafter, cam follower 98 will be moved in a clockwise direction about stud 79; the operating end 346 will not, however, be moved sufficiently to close contacts 97.

Up to this point it has been shown how the movement of latch arm 317 causes the clutch including pawl 59 and ratchet 60, to engage and the motor 68 to operate in order to drive the clutch. Mechanism operated from, or driven by, this clutch so as to operate a minute advance type wheel unit will now be described. As cams 62 and 63 (FIG. 10) rotate with the cam 61 connected to the ratchet 59 by pin 64 (see also FIG. 11), their respective cam followers 83 and 84 cause arm 85 to rock, or oscillate, about shaft 89, first in a clockwise direction and then in a counterclockwise direction. The lower forked end of arm 85 straddles cam 324 which is attached to eccentric stud 86 fixed to cam follower 83, whereas cam follower 84 is connected to cam follower 83 by a conventional locking screw 87. In addition thereto, each of the aforesaid cam followers 83 and 84 is caused to rock about a stud shaft 88 common to the said cam followers. Thus, a similar rocking, or oscillating, motion is imparted to shaft 89, thereby causing an arm 90 which is attached to shaft 89 to be moved clockwise first, and then counterclockwise. This arm is provided with an elongated hole 91 through which a stud 92 protrudes, said stud 92 forming a part of a pawl carrying member 93 which is moved forward (i.e., to the left) with the arm 90 as the right or rear end of slot 91 engages stud 92. The forward movement of the pawl carrying member 93 provides the feed stroke for advancing the minute type wheel 94 one position in a clockwise direction. Also, when there is an hour and day change the pawl carrying member advances an hour type wheel 95 and one or both day type wheels 96 and 133 one position in a manner which will now be described.

The pawl carrying member 93 is provided with a number of type unit feed pawls only one of which, namely pawl 101, is shown in FIG. 10. These feed pawls co-operate with the type wheel ratchets of the minute, hour and day type wheels. Only ratchet 102 for the minute type wheel is shown. Hence, when pawl carrying member 93 is moved forward; i.e., to the left, by arm 90, spring-biased feed pawl 101 will advance minute type wheel 94 one position. Spring-biased detent arm 103 is loosely positioned on shaft 89, and is employed to position the minute type wheel accurately for printing after the latter wheel has been advanced by the feed pawl 101. Only the detent ratchet for the minute type wheel is shown, it being understood that suitable detents are provided for all of the other type wheel mechanisms. As is described in the afore-mentioned Rast patent, the hour type wheel feed pawl has a projection attached thereto which bears against the underside of the minute pawl 101, whereas the day type wheel feed pawl has a projection attached thereto which bears against the underside of the hour type wheel pawl. By this construction, the hour and day pawls are maintained just out of engagement with their respective type wheel ratchets as long as the minute pawl 101 is seated in a normal depth tooth of its ratchet 102. However, type wheel ratchet 102 is provided with a deep tooth so that when the minute type 101 moves into this tooth, the hour pawl (not shown) is permitted to engage its ratchet (not shown) so as to advance the latter ratchet one tooth on the forward stroke of the pawl carrying member 93. This will be recognized by persons skilled in the art as a "deep-tooth" transfer operation. The hour wheel ratchet is provided with one deep tooth so that at the end of one revolution of the hour wheel, when the hour feed pawl moves into this tooth, the day feed pawl is permitted to engage its ratchet so as to advance the latter ratchet and wheel 96 one tooth on the forward stroke of the member 93. As is shown and described in the afore-mentioned Rast patent, the hour type wheel characters appear doubly, one following the other, and therefore it is necessary to advance the hour wheel twice to effect a difference in reading of one hour. The first advancement of the hour type wheel will occur as the minute type wheel is advanced on the sixtieth minute. The minute wheel is numbered from 00 to 59, whereas the hour wheel is numbered half way around from 1 to 12 and for the other half from 13 to 24, double numbering being employed as described hereinabove. Thus, a total of 48 type characters are provided on the hour wheel as compared with 60 type characters on the minute wheel. The day wheel 96 is provided with forty type characters, 0–9 four times around, whereas wheel 133 is provided with a 0–36 tens of days type characters. The second advancement of the hour type wheel 95 may occur at any predetermined point in the revolution of the minute wheel depending upon the location of the second deep tooth in the minute type wheel ratchet 102. This advancement of the hour wheel, however, has no effect in changing the reading of the hour wheel but simply moves this wheel so that the first of a pair of similar type characters is moved out of a registering position and the second character of the pair advances to supplant the first. This feature is employed in order to limit the wear of hour type characters.

Minute type wheel 94 is attached to shaft 104 which, in turn, is connected to gear 105. Gear 105 (see also FIG. 13) is in engagement with a driven gear 106 which is attached to a transfer gear 107 for rotation therewith. The ratio between gears 105 and 106 is such that the transfer gear 107 completes one revolution each half hour. Hence, since the single set of notches 325 on transfer gear 107 engage gear 108, the gear train including gears 109, 110 and 112 is advanced one increment each half hour. A second transfer gear 113 is connected to a shaft 347 common to gear 112. The design ratio of the gears mentioned above is such that transfer gear 113 completes one revolution every five hours, and gear 114 which engages the single set of notches 326 on transfer gear 113, is advanced one increment every five hours. Gears 110 and 114 are attached to shafts 115 and 116, respectively, as are time emitter rotors 117 and 118. Since time emitters 111 and 119 are of similar construction, only emitter 119 will be described herein.

A pair of electrically connected brushes 150 and 151 are insulated from, and attached to, rotor 118 for movement therewith. Rotor 118 is frictionally held to shaft 116 by a clamping screw 327. Ten conducting segments 159 are equidistantly spaced and radially arranged in an insulator member 160. A common conducting segment 161 is arranged so that either brush 150 or 151 is in contact with this segment at any particular time. When gear 114 is moved one increment as aforedescribed, rotor 118 is rotated an amount sufficient to move a brush, brush 150 for example, from one conducting segment 159 to the next. Hence, as will be described in detail hereinafter in connection with the circuit diagram, a circuit at any time will be completed from a segment 159, through the brush 150 or 151 in contact therewith, the other brush on rotor 118, to segment 161 in contact with the latter brush. A similar type of circuit will be completed by emitter 111. The incremental movement of rotors 117 and 118 is such that a brush on rotor 118 passes from one conducting segment 159 to the next every fifth hour, whereas a brush on rotor 117 moves from one conducting segment to the next every one-half hour.

(B2) *Card Receiver Mechanism*

Figure 12:
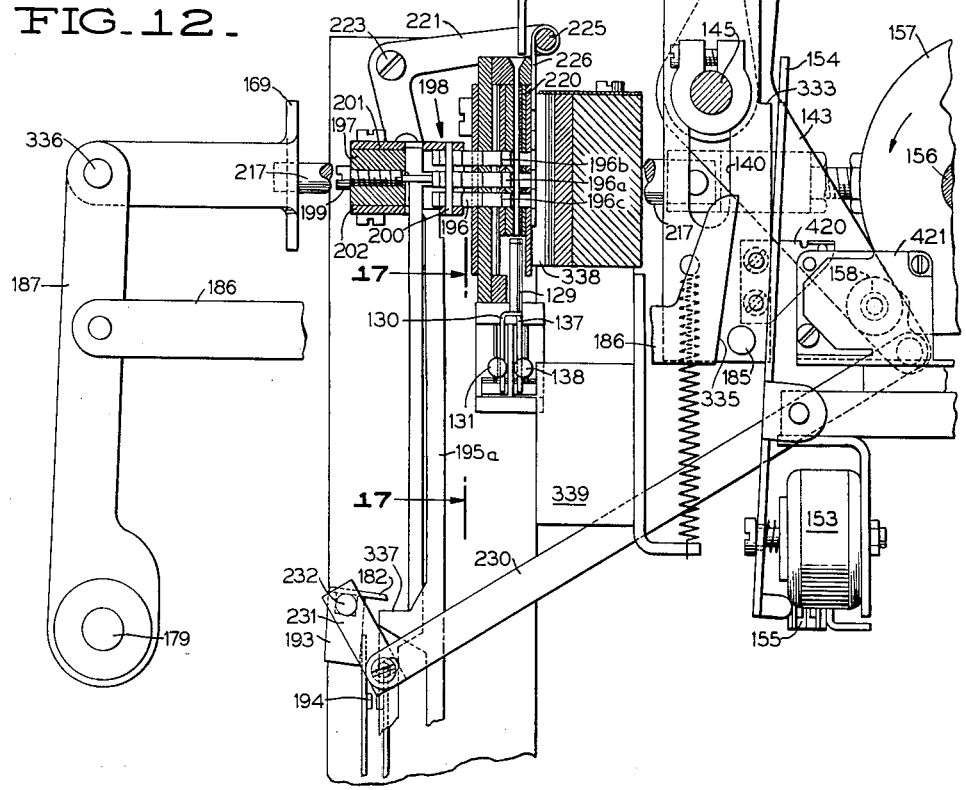
FIG. 12 is an elevation, with parts in section, taken along sectional lines 12—12 of FIG. 18.

Referring to FIG. 12, a trip card 51 such as is shown in FIG. 5, is inserted into the opening of card receiver 120 and moved downwardly. The position of card receiver 120 with respect to the toll recorder, is shown in FIG. 9. As the leading edge of the trip card engages card lever 121, the latter lever is moved in a counterclockwise direction about pivot stud 122. This action releases pin 123 from engagement with projection 328 of lever 121, to thereby permit arm 124 to which pin 123 is fixed to move, under the urging of a spring, in a clockwise direction about pivot stud 329. Since the lower lip of arm 124 is in engagement with spring-biased card braking member 125, member 125 is also moved with arm 124, and in a clockwise direction about pivot 126. The afore-mentioned clockwise movement of arm 124 causes a pin 123 to close a pair of card inserted contacts 127 (see also FIG. 14) which when closed, as will be described in detail hereinafter, indicate that a card has been inserted in the card receiver.

Secured to the lower portion of card braking member 125 are brake shoes 128 which, upon the disengagement of pin 123 and projection 328 of card lever 121, are moved against the back side of the trip card. Since the brake shoes 128 are made from a non-skid material, rubber for example, an extremely high frictional contact is obtained between the trip card and the brake shoes. Thus, it is to be observed, after a card is within the card receiver, and the brake shoes are brought into contact with one another, the card is prevented from being removed out of card receiver 120 due to this braking action. However, the trip card may be inserted further, i.e., downwardly, into card receiver 120 because member 125 may be readily moved in a counterclockwise direction against the action of its spring.

As mentioned previously in General System Description, and as to be described in detail hereinafter in connection with the circuit diagram, electric circuits for causing a toll recorder cycle may be rendered operative upon the complete insertion of the trip card with proper regard to the position of corner cut. The complete insertion of the trip card into card receiver 120 is indicated when the leading edge of the trip card engages stem 129 (see also FIG. 17) to thereby move associated bell crank 130 in a clockwise direction about pivot 330 and link 131 to the left in order to close a pair of card fully inserted contacts 132. If the trip card has been inserted into card receiver 120 with proper regard to corner cut, stem 135 is not acted upon by the card, and a pair of normally closed corner cut contacts 136 will remain closed since bell crank 137 and adjoining stem 138 are not moved. The absence of a corner cut in the proper position will cause the leading edge of the trip card to act upon stem 135 which, in turn, will pivot bell crank 137 about point 331 and move link 138 so as to open the afore-mentioned corner cut contacts. The use of these contacts will also be described in detail hereinafter in connection with the circuit diagram.

In the event a trip card is improperly inserted in card receiver 120 and it is desired to remove the card so as to insert the same therein properly, a card release mechanism by which card braking member 125 (FIG. 12) is moved in a counterclockwise direction whereby brake shoes 128 are moved out of engagement with the trip card, is provided. This card release mechanism includes a card release handle 139 which is pulled upwardly an amount limited by the length of slot 140 therein. This upward movement of handle 139 causes camming surface 141 thereof to engage pin 142, to thereby move a cam follower arm 143 and a cam follower arm 144 in a clockwise direction. Arms 143 and 144 are loosely positioned on hammer bail shaft 145 but are rigidly joined to one another for common movement. Inasmuch as arm restoring link 146 is fixed to arm 144, the aforesaid clockwise movement causes link 146 to move to the right and carry with it arm 124 which is in engagement with link 146 via a pin and slot connection 332. Arm 124 is carried back an amount which is sufficient for arm latch 147 to engage pin 123 (see FIG. 15). Arm 124, in turn, acts upon card braking member 125 in such a manner as to remove the braking action of brake shoes 128 on the trip card. As is shown in FIG. 15, brake shoes 128 are prevented at this time from acting upon the trip card in the card receiver even though card lever 121 is in engagement with the trip card. This is due to the fact that latch 147 is now in engagement with pin 123, to thereby hold arm 124 in its most rearward position and member 125 in its most counterclockwise position.

Complete removal of the trip card from card receiver 120 permits spring-biased card lever 121 to move in a clockwise direction to its normal position shown in FIG. 12. Inasmuch as card lever spring 148 for card lever 121 is stronger than arm latch spring 149 for latch 147, the upper projection 328 of lever 121 acts upon latch 147 in a manner such that the latch is disengaged from pin 123 which then engages the projection 328 of lever 121. This action returns the card braking mechanism to its normal position.

After a trip card has been properly inserted in card receiver 120, and after a tool recorder operation, or cycle, is begun by the recorder mechanism, release card interposer magnet 153 (FIG. 12) is energized through circuits to be described hereinafter, and causes release card interposer 154 to engage a step 333 in card release handle 139. This action locks handle 139 in a downward position, thereby assuring the nonremoval of a trip card during a tool recorder cycle. The lower end of release card interposer 154 closes a pair of release card interposer contacts 155 when magnet 153 is energized.

It will be shown subsequently that during a toll recorder cycle, shaft 156 (see also FIG. 11) is caused to revolve. Shaft 156 has attached thereto a release card cam 157 which is in engagement with a cam follower roller 158, said cam follower roller being attached to arm 143. This cam causes arm 143 to move in a clockwise direction so that the card braking mechanism is rendered ineffective in the same manner as when camming surface 141 acted upon pin 142 during the manual removal of the trip card.

(B3) *Card Sensing Mechanism*

Inasmuch as a trip card does not have punched data thereon to be analyzed when it is inserted in the entrance station toll recorder 31 (FIG. 1), mechanism for sensing punched data is not required in this toll recorder. However, since information is punched in the trip card at the entrance station, a means for sensing this punched information is required to be in the exit station tool recorder 45. Consequently, one of the basic mechanical and electrical differences between an entrance station and an exit station toll recorder is the presence of a card sensing mechanism in only the exit station toll recorder.

As was mentioned hereinbefore in General System Description, complete insertion of the trip card with proper regard to the position of corner cut will condition for operation electric circuits in the exit station toll recorder, whereby a card sensing mechanism is caused to analyze the trip card. These circuits will be described in detail hereinafter in connection with the circuit diagram, it being sufficient for the present to say that proper insertion of the trip card into the toll recorder card receiver will cause card sensing solenoid 165 (FIG. 18) to become energized. This causes core 166 to be moved to the left and arm 167 to pivot in a clockwise direction about a pin 168 extending from member 170. As is shown, arm 167 is connected to core 166 by a conventional pin and slot connection so as to permit a freedom of movement of arm 167 with respect to core 166. Sensing bail 169 is attached to spring-biased member 170 by an adjustable screw 171 (see also FIG. 16), and a holding screw 180. As is apparent, adjustable screw 171 is used as a stop for arm 167 in order to provide a proper overlap between the end of arm 167 and the end of link 173.

Figure 18:
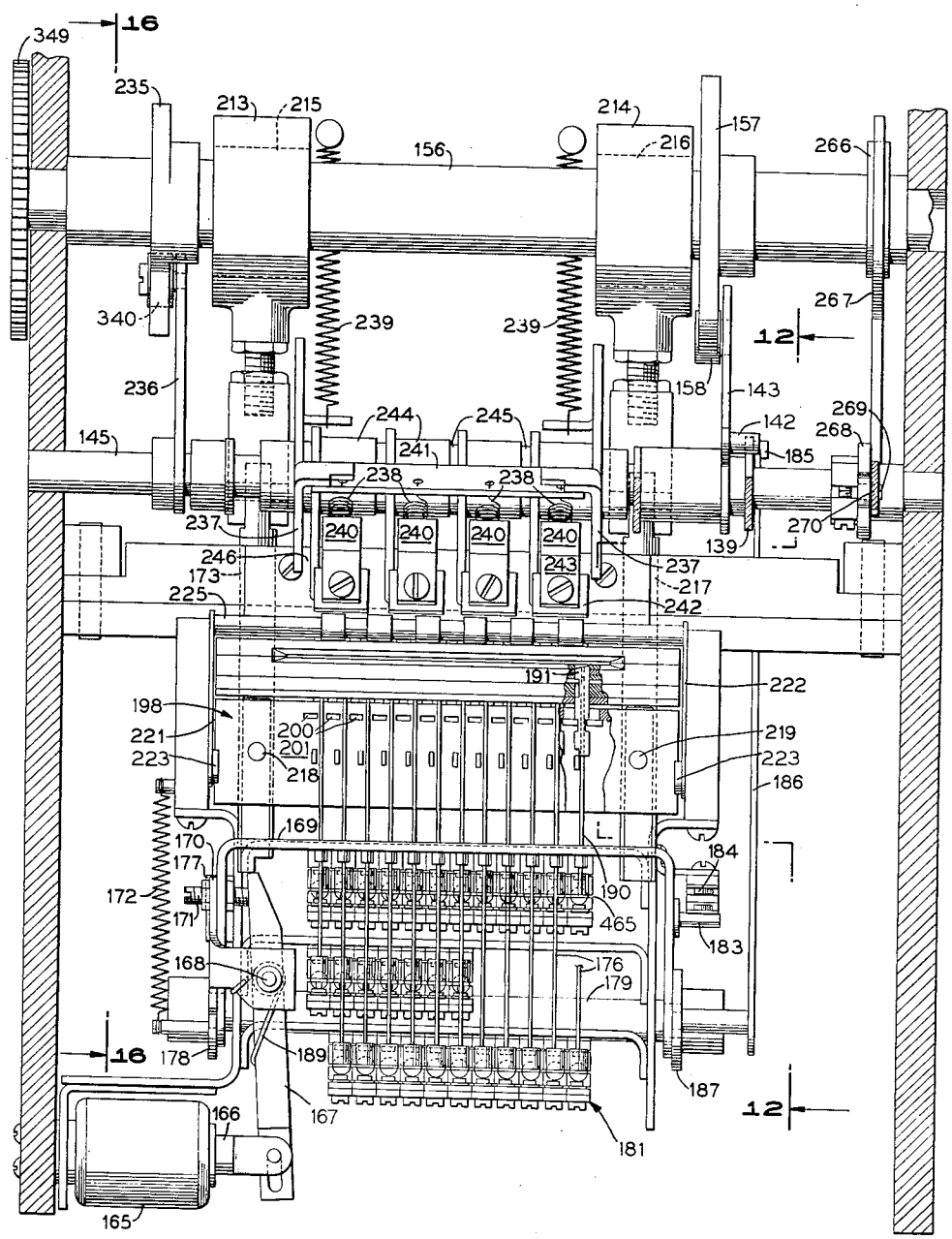
FIG. 18 is a plan view, somewhat diagrammatic in character and with parts in section, of a toll recorder card sensing, punching and printing mechanism.

The forward movement (upward movement as shown in FIG. 18) of sensing bail 169 and member 170 under the urging of spring 172, is limited by a stop block 177 (see also FIG. 16) which engages arm 178, said arm 178 being rigidly attached, at one end, to shaft 179, and, at the other end, loosely connected to member 169 by a pin 334. Thus, the energization of solenoid 165 (FIG. 18) causes arm 167 to disengage from the high point at the end of link 173, and to thereby permit the afore-mentioned forward movement of sensing bail 169 under the urging of spring 172; the forward movement of the sensing bail being limited, as mentioned previously, by the position of stop block 177 with respect to arm 178.

As stated previously, information is punched in the trip card 51 (FIG. 5) along rows 1 through 3 at the entrance station, and along rows 3 through 5 at the exit station. Furthermore, as will be clearly brought out in Circuit description, the exit station toll recorder has three rows of sensing pins for reading trip card rows 1 through 3. In addition, as explained hereinbefore, to avoid an unnecessarily complex specification, only the mechanism in entrance toll recorder 31 (see also FIG. 1) is described whenever the exit and entrance toll recorder mechanisms are similar. However, the trip card sensing mechanism being described presently may be found only in the exit station toll recorder. Thus, inasmuch as the center row of card punches 196 (FIG. 12) is substantially in the same plane with links 173 (see also FIG. 18) and 217, the three rows of sensing pins 176 (FIG. 16) are arranged above link 173 so as to be capable of reading afore-mentioned rows 1 through 3.

Referring to FIGS. 16 and 18, the movable transfer strap 174 of each sensing contact 181 is spring biased against sensing bail 169 by an associated leaf spring 175. A sensing pin 176 for determining whether a hole is punched in a corresponding index position of the trip card, is connected to each sensing contact transfer strap 174. A sensing pin plug 188 is rigidly attached to an associated sensing pin 176 for movement therewith, said plug being maintained up against bail 169 by a related leaf spring 175. Hence, the motion of sensing bail 169 towards the trip card in the card receiver (movement to the left in FIG. 16) when solenoid 165 is energized, allows the leaf springs 175 to move their respective transfer straps 174 with the sensing bail. In addition, as transfer straps 174 are moved with sensing bail 169, their respective sensing pins 176 are also moved in a direction to engage the trip card which is positioned in card receiver 120. Wherever a perforation is present in the trip card, a correspondingly positioned sensing pin 176 is caused to pass through the hole under the urging of an associated leaf spring 175, to thereupon cause the normally open straps of the sensing contacts 181 to close. However, the absence of a punched hole causes a sensing pin to be stopped when it engages the face of the trip card. Thereupon, the normally closed straps of contacts 181 are prevented from opening.

It is to be observed in FIG. 18 that a pin 183 which is fixed to sensing bail 169, acts upon sensing bail contacts 184 so as to close the latter contacts when the sensing bail is in an operated position.

As will be described hereinafter in connection with the Circuit description, a toll collector may occasion the necessity for removing a trip card from the card receiver of an exit station toll recorder after the sensing mechanism has been rendered operated and prior to the completion of a recorder cycle. It has been described previously with reference to FIG. 12 how an upward movement imparted to card release handle 139 will cause the card braking mechanism to be disabled and rendered ineffective. It is to be observed that when a trip card is to be removed from the card receiver after the card sensing mechanism has been rendered operative and the pins 176 (FIGS. 16 and 18) thereof moved towards the trip card, it is necessary to move the card sensing pins 176 out of engagement with the trip card and out of the trip card line. In other words, the removal of a trip card from the card receiver of an exit station toll recorder necessitates disabling not only the aforedescribed card braking mechanism but the card sensing mechanism as well.

Referring to FIG. 12, the upward movement imparted to handle 139 causes a pin 185 to engage the camming surface 335 of the sensing bail restoring arm 186. This action, in turn, causes arm 186 to be moved to the left carrying with it arm 187, said arm being connected to bail 169 by a pin 336. Hence, inasmuch as arm 187 is moved in a counterclockwise direction with shaft 179 to which it is pinned, sensing bail 169 is also moved to the left, or as is shown in FIG. 18, sensing bail 169 is moved in a downward direction. There are two arms, namely arms 178 and 187, pinned to shaft 179 which is used as a torsion member to make both ends of the sensing bail move together. The movement imparted to the sensing bail 169 causes the latter to act upon the sensing pin plugs 188 (FIG. 16), whereby the sensing pins 176 which are rigidly attached to the plugs 188 are carried out of engagement with the trip card in the card receiver. The movement imparted to sensing bail 169 also causes member 170 to be moved a distance such that arm 167 (FIG. 18) is free to move in a counterclockwise direction about pin 168 and against adjusting screw 171, under the urging of its spring 189. Hence, after the trip card has been removed from the card receiver, and the card release handle 139 has been restored to its normal position in a downward direction, arm 167 will remain in engagement with the high point at the end of link 173 so as to keep the sensing pins 176 out of the card receiver card path or card line.

As was mentioned previously in the General System Description, the trip card is analyzed at the exit station so as to determine, among other things, the presence or absence of a cancelation perforation therein. Inasmuch as a cancelation perforation is punched in a trip card at the exit station only, and only after the sensing operation thereat is completed, the operation for checking for a cancelation perforation is to prevent the reuse of a trip card after it has once been processed in a toll recorder at an exit station. Referring to FIG. 18, cancelation hole sensing pin 190 is arranged within a hollow cancelation punch 191. Thus, when sensing bail 169 is moved in a direction towards the trip card as described previously, sensing pin 190 is moved therewith, and through the hollow punch 191. As the description advances, the circuit operation will be described in detail to show that if pin 190 senses the absence of a cancelation perforation in the trip card, the hollow punch 191 will subsequently during a punching operation of the toll recorder cycle cause a cancelation perforation to be entered in the card. However, if a cancelation perforation is sensed by pin 190, circuits will be set up whereby the exit toll recorder cycle for processing the trip card, will be prevented. In addition, a visual signal is operated so that the toll collector will be made aware of the fact that a reuse of a previously processed trip card is being attempted.

The manner in which the sensing mechanism is restored during a toll recorder cycle will be described hereinafter under Card Punching Mechanism.

(B4) *Card Punching Mechanism*

The information recorded on the trip card at the entrance station and the exit station as perforated data, is enumerated in General System Description. It will be recalled that some of the items of information punched in the trip card are common to all trip cards that are punched at a given station toll recorder. For example, the entrance station number punched in columns F through L of row 2 (FIG. 5) is such an item of information which is the same in all trip cards punched at a particular entrance station toll recorder. On the other hand, other items of information will vary from one card to the next because the punching mechanism for recording this information is selectively set up either manually or automatically. An example of this latter type of varying information is the number of axles carried by the vehicle punched in columns B through D of row 3.

Inasmuch as the punching mechanism in the entrance toll recorder 31 (FIG. 1) is similar to that in exit toll recorder 45, only the aforesaid mechanism in recorder 31 will be described so as to avoid undue prolixity.

A punch which is to perforate a trip card each toll recorder cycle is preset to do so. This will cause unvarying information to be entered upon each trip card. However, a punch which does not necessarily perforate the trip card every recorder cycle, is selectively controlled for operation by an electromagnet actuated interposer associated with the punch. Since punching machines having electromagnet actuated interposers are well known to persons familiar with this art, and since such a machine is described in the prior art, for example U.S. Patent No. 1,878,935 issued to F. L. Lee, a detailed description of this type punching mechanism is believed to be unnecessary.

Referring to FIG. 9, an energized electromagnet 351 causes its interposer 195a (see also FIG. 12) to be moved upwardly an amount sufficient to position the upper portion of the interposer between its related punch 196a and the backing member 197 of punch carrier 198. As is to be described in detail shortly, punch carrier 198 is caused to move to the right during a punching operation, and only those punches 196a whose interposers have been moved upwardly, will be moved with the carrier. That is, the backing member 197 acts upon the upper portion of the interposer moved between the member and a punch 196a so that the interposer, in turn, may act upon the punch. Of course, the absence of an interposer between the backing member 197 and a punch 196a results in only a movement of the backing member, and not the punch. A punch engaging screw 199 may be inserted in member 197 in alignment with an associated punch that is to perforate the trip card each recorder cycle, whereby movement of the backing member will cause screw 199 to engage and to move therewith during the forward motion thereof, its punch 196c.

The tails of punches in each of the three rows are shown in FIG. 27. The interposer 195a for operating a punch located in the lower row may be moved upwardly between the punch carrier backing member 197 (see also FIG. 12) and the right-hand tail recess in punch 196a. The interposer 195b for operating a punch located in the upper row may be moved upwardly between the backing member 197 and the left-hand tail recess in punch 196b. However, should interposer 195b fail to be moved upwardly, whereby it will remain in alignment with the deep left recess in punch 196c, the said interposer will not act upon punch 196b. In the absence of a punch engaging screw 199, punch 196c will not be acted upon even through interposer 195b is not moved upwardly.

As described previously with reference to FIG. 18, movement of sensing bail 169 causes pin 183 attached thereto, to close sensing bail contacts 184. As is shown in FIG. 12, an upward movement of any one interposer 195a causes a protrusion 337 thereof to engage an interposer bail 182, so that the latter bail will move a block 193 to which the bail is attached, so as to cause this block to close punch interposer bail contacts 194. As to be described in detail hereinafter in connection with the circuit diagram, the closing of contacts 184 (FIG. 18) and 194 (FIG. 12) complete circuits which will render the punch and print electromagnet 203 (FIG. 11) in a condition to be energized. Energization of magnet 203 causes the armature 204 to be attracted thereto, to thereby release clutch dog 205 for engagement with clutch ratchet 206. It is sufficient for the present to state that the toll recorder circuits are so arranged that motor 68 is continuously operating as long as electric power is applied to the toll recorder. Power may be disrupted, for example, by removal of the toll collector's key 341 (see FIG. 12) from the toll recorder. Hence, as long as power is applied to the toll recorder, clutch ratchet 206 (FIG. 11) is continuously revolving in a counter-clockwise direction, as shown, by a driving train including gear 70, timing belt 72, and gears 74, 75 and 207. Gear 207 is fixed to a sleeve 211 to which ratchet 206 is also fixed, said sleeve 211 being loosely positioned on shaft 156.

The engagement of dog 205 and ratchet 206 will cause shaft 156 to rotate in a counterclockwise direction because dog 205 which is mounted to pivot about a pin 208, is attached to a disc 209, said disc being connected, in turn, to shaft 156. Inasmuch as the time duration of the voltage impulse applied to magnet 203 is less than the time required for shaft 156 to complete one revolution, armature 204 will be in position to declutch dog 205 prior to the completion of one revolution of shaft 156. That is, the operating end of armature 204 will be in a position to engage the dog as is shown in FIG. 11, so as to cause disengagement between the dog 205 and the ratchet 206 after a single revolution of shaft 156. Detent 210 will engage a notch in disc 209 so as to prevent a rebound of shaft 156 and mechanism associated therewith in a clockwise direction when the dog 205 is disengaged from ratchet 206.

Referring to FIGS. 16 and 18, punch drivers 213 and 214 are loosely positioned on related eccentrics 215 and 216, respectively, which, in turn, are rigidly connected to shaft 156. Hence, the rotation of shaft 156 and eccentrics 215 and 216 by the mechanism described hereinbefore, causes the punch drivers 213 and 214 to be moved so that their respective links 173 and 217 attached thereto, are reciprocated. The links are first moved in a direction towards shaft 156 (upward as shown in FIG. 18), and then moved away from the shaft. Referring particularly to FIG. 18, the connecting links 173 and 217 are each attached to the punch carrier 198 by connecting pins 218 and 219, respectively. Thus, the reciprocating movement accorded the aforesaid links will cause a similar movement to be imparted to the punch carrier. That is, with reference to FIG. 12, punch carrier 198 is first caused to move to the right so as to carry with it selected punches 196 which are to perforate the trip card, and then is caused to move to the left to its home position so as to remove all of the punches from the card receiver card path.

Referring now to FIGS. 12 and 18, punch retractor pins 200 are arranged between a punch carrier upper plate 201 and a lower plate 202. Each pin 200 is positioned within oppositely arranged notches 192 (FIG. 18) in adjacent punches. Hence, as the carrier 198 is moved in a rearward direction, each pin is caused to engage the back side of the notches 192 in the operated punches in order to move those punches out of the card receiver card path. Of course, the punches not used to perforate a trip card during the punching motion of carrier 198 are not in a position to be engaged by the pins 200 during the return motion of the carrier. Inasmuch as these punches are not moved in the card receiver card path to begin with, it is not necessary to restore them.

The movement of punch carrier 198 as afore-described, whereby the punches 196 are caused to perforate the trip card, causes the card chips to be moved through the die 220 (FIG. 12) and into a chip chamber 221. So as not to permit a great amount of card chips to become a solidly packed mass in chamber 338, a conventional chip agitator is provided. Referring to FIGS. 12 and 18, bell cranks 221 and 222 are caused to oscillate about their respective pivot points 223 while carrier 193 is caused to reciprocate. Stem 225 is attached to bell cranks 221 and 222, whereby the stem is caused to reciprocate in a vertical direction as the bell cranks oscillate. A chip agitator 226 is hung on stem 225 and, accordingly, is also reciprocated in a vertical plane. The agitator consists of a wire lattice network which, during its movement, agitates the chips within chamber 338 to keep the same in a loose state within the said chamber so that they drop into chamber 339. A rotating worm screw (not shown) is used to carry the chips that fall from chamber 338 into chamber 339, to a removable chip box readily accessible to the toll collector.

As described in Sensing Mechanism description, arm 167 (FIG. 18) is moved into the low cut in the end of link 173 when solenoid 165 is energized. It will be recalled too that this movement of arm 167 is limited by the position of stop block 177 (see also FIG. 16) which engages arm 178. During the card punching period of the toll recorder cycle when the links 173 and 217 (FIG. 18) are moved in a direction toward punch shaft 156, the movement is caused to be sufficient to disengage arm 167 and link 173. This action permits spring 189 to move arm 167 in a counterclockwise direction against the end of adjusting stop screw 171 so that the high end of link 173 will once again engage the end of arm 167 when the links 173 and 217 are moved in a direction away from punch shaft 156.

As mentioned in the Card Receiver Mechanism description, shaft 156 (FIG. 12) has fixed thereto a release card cam 157 which acts against the cam follower roller 158 that is attached to arm 143. Near the end of the recorder cycle, and after the trip card sensing, punching and printing operations, arm 143 is caused to move in a clockwise direction with respect to shaft 145 when the cam follower roller 158 rides on the high point of cam 157. This renders the card braking mechanism ineffective, or disabled, in a manner described previously. In addition, interposer bail operating arm 230 which is connected, at one end, to arm 143, and, at the other end, to link 231, is caused to move in a direction so as to cause link 231 to pivot in a clockwise direction. Since link 231 is secured to shaft 232 as are interposer bail 182 and member 193, any interposers 195 in an upward position are moved downwardly by the clockwise motion of bail 182. In addition thereto, contacts 194 are opened by the removal therefrom of the force exerted by member 193 upon the contact straps.

(B5) Card Printing Mechanism

It was stated previously that during a toll recorder cycle, shaft 156 (FIG. 11) is caused to complete a single revolution after the punch and print electromagnet 203 is energized. As shaft 156 (see also FIG. 18) is rotated, the punch drivers 213 and 214 are moved so that the punch mechanism will cause the trip card in the toll recorder card receiver to be perforated. Immediately thereafter, and during the toll recorder cycle, the printing mechanism will cause items of information previously enumerated in General System Description, to be printed upon the face of the trip card. Referring to FIG. 5, this printed information includes the following items:

(1) The identification number, e.g., H/3, of the entrance station toll collector.

(2) The number of the station lane, e.g., 1/8, through which the vehicle passes to enter or leave the highway.

(3) The time and the day, e.g., 18:26 and 265, respectively, at which the trip card has the information entered thereupon.

(4) The transaction number, e.g., 1593, of the card processed in the toll recorder.

Referring to FIGS. 16 and 18 again, cam 235 is fixed to shaft 156 and restoring cam follower 236 is fixed to shaft 145. Two print bail arms 237 are also fixed to shaft 145. Each arm is connected, at one end, to a print bail 241, and at the other end, to a bail spring 239. Inasmuch as one end of a hammer spring 238 is connected to its hammer 240 which is freely arranged on shaft 145, and the other end of the spring 238 is connected to bail 241, a hammer 240 is normally held against the print bail 241 which is attached to print bail arms 237. It is to be observed that the other end of bail spring 239 is connected to a frame spring post, to thereby bias the print bail mechanism in a clockwise direction.

As is shown in FIG. 18, there are four hammers 240 each of which is normally held against print bail 241 by the action of associated hammer springs 238. In addition, each hammer includes a suitable platen 242 which is held in place by a hammer head 243. Each hammer is also connected to a collar 244 which is freely arranged on shaft 145, each of the collars being separated by suitable spacers 245.

Referring to FIG. 16, as shaft 156 rotates in a clockwise direction, cam follower 236 having cam follower roller 340 attached thereto, causes the print bail mechanism to move in a counterclockwise direction about shaft 145. This movement actually cocks the print bail mechanism and the hammers 240, for rapid movement when cam follower 236 is released off the high dwell of cam 235. At this time, i.e., during the release of cam follower 236, print bail 241 acts upon hammers 240 to cause the latter to move in a clockwise direction about shaft 145. The momentum of the hammers 240 will cause the same to continue their clockwise movement even after print bail 241 has stopped moving. It is during this additional continued movement that platens 242 strike the trip card in the card receiver, and to thereby effect a printing stroke. The hammers 240 are returned to their normal position against bail 241 by springs 238. A positive return of the hammers is assured by a rod 246 which is connected to and carried by print bail arms 237. Quite soon after cam follower 236 falls off the high dwell of cam 235, the cam follower is moved in a counterclockwise direction, as is rod 246, about shaft 145. Hence, any hammer bounce will be restrained and restricted with the limits set up by bail 241 on the one side and rod 246 on the other side. Immediately after a printing stroke, rod 246 is in a position to prevent the hammer platens 242 from striking the trip card. It is to be observed that an adjustable rubber stopper 247 cushions each print bail arm 237 to a stop when the arm engages the stopper after cam follower 236 falls off the high dwell of cam 235.

The platen on the extreme left as shown in FIG. 18, causes the sequential operation number of the toll recorder cycle to be printed upon the trip card. The printing counter for setting up this information is a mechanical pulse type counter quite common and conventional in the art. Referring to FIG. 16, member 250 is fixed to shaft 145 and is connected to a link 251. Link 251, in turn, is connected to rocker 252 which is connected by conventional means to arm 253, both of which are rotatably mounted on a stud 254. Arm 253 has a pawl 255 pivotally attached thereto at its upper end, and spring biased so that the pawl constantly engages ratchet 256 which is joined to the units wheel 257 of the sequence counter. Thus, when member 250 is moved in a counterclockwise direction, arm 253 is moved in a clockwise direction about stud 254, to thereby cause pawl 255 to engage the next notch of ratchet 256. During the return movement of member 250 in a clockwise direction, arm 253 will be moved in a counterclockwise direction, carrying with it pawl 255 and ratchet 256, whereby counter wheel 257 will be advanced one increment. During the movement of counter wheel 257 from a 9 to 0, the conventional deep-tooth transfer carry is used to advance the tens wheel one position.

The right-hand platen 242 shown in FIG. 18 causes the identification number of the toll collector and the lane number, to be printed on the trip card. Referring to FIG. 12, a type face 260 designating the toll collector's identification number is embossed on a toll collector's key, key 341 for example. As mentioned previously, this key is assigned to a toll collector for insertion into the toll recorder at the start of his tour of duty, and for removal from the toll recorder at the end of his tour of duty. In addition to providing a type face which has thereon the toll collector's identification number, key 341 causes collector key contacts 261 to close when extension 259 engages the contact operating arm 262. The purpose of contacts 261 will be described in detail in connection with the circuit diagram.

(B6) Ribbon Drive Mechanism

Figure 20:
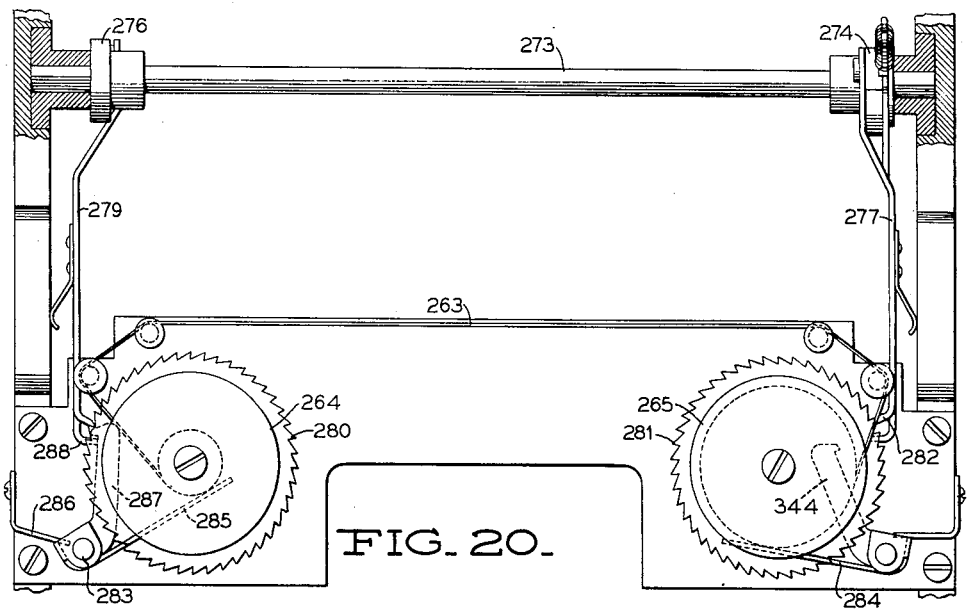
FIG. 20 is a plan view of a toll recorder ribbon spacing mechanism.
Figure 21:
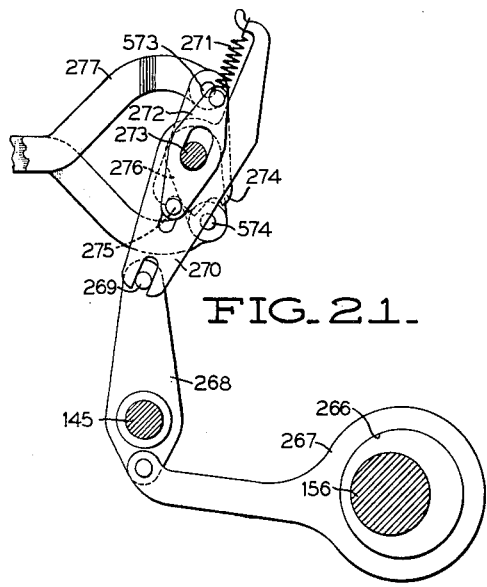
FIG. 21 is a detail view of a portion of the ribbon spacing drive mechanism.

The ribbon drive mechanism which becomes operative to effect ribbon spacing immediately after a printing stroke occurs, is shown in FIGS. 20 and 21. It may be pointed out at this time that the ribbon drive mechanism in the entrance toll recorder 31 (FIG. 1) is similar to that in the exit toll recorder 45. The ribbon 263 (FIG. 20) is wound on spools 264 and 265 each of which are positioned so as to operate in the usual manner, one spool to unwind as the other spool winds the ribbon. The rotation of shaft 156 (FIG. 21) to recock the print bail and hammer mechanism after it has been tripped as described previously, causes eccentric 266 (see also FIG. 18) to move driver 267 in a direction away from shaft 156. The extreme end of driver 267 is connected to arm 268 which is freely positioned on hammer shaft 145. Hence, this rotation of shaft 156 causes driver 267 to be moved towards the front of the machine, or towards the left, as viewed in FIG. 21. A stud 269 on arm 268 moves the lower end of a lever 270 to the right. The upper end of lever 270 is connected by a spring 271 to an arm 272 which is positioned by the pivot shaft 273 passing therethrough and also by a slot in lever 270. Thus, the notched end of a member 274 is positioned so that a stud 275 on the arm 272 is seated in one of two notches. Member 274 is secured to the right end of the pivot shaft 273 for movement therewith, and a similar member 276 is fastened to the other end, but is inverted in its position with respect to member 274. The mechanism is thus arranged so that pivotal movement of the lower part of lever 270 to the right causes a ribbon feed arm 277 connected to the member 274 by a loose pin connection 573 to move to the left and at the same time also causes another ribbon feed arm 279 connected to the member 276 by a loose pin connection 574 to move to the right. Referring to FIG. 20, it may be seen that the ends of the arms 277 and 279 identified generally by reference numerals 282 and 288, respectively, are bifurcated and cooperate with respective ribbon spool ratchets 280 and 281. However, due to the toggle mechanism construction shown in FIG. 21 and to be described shortly, only one of the two arms 277 and 279 is permitted to extend outwardly during its forward movement far enough to operatively engage its corresponding ribbon spool ratchet. This inoperative action is determined by the notch in the member 274 in which the stud 275 is seated. When this stud is in the forward, or left, notch and arm 268 is caused to operate, the arm 277 will move towards the front, or to the left, to feed the ribbon spool ratchet 281 ahead one tooth by the engaging of the projection 282 with this ratchet. At the same time, arm 279 is being moved toward the rear of the machine away from its ratchet 280. On the return rocking stroke of arm 268, the movement of the arms 277 and 279 is reversed for each, that is the arm 277 moving away from its ratchet 281 and the arm 279 moving towards its ratchet 280. However, with the stud 275 seated in the forward, or left, notch, the arm 279 will never move out far enough to operatively engage ratchet 280.

Reversing mechanism for the ribbon is provided and has the effect of throwing the toggle mechanism so that the stud 275 moves out of the notch of member 274 in which it is positioned and into the other notch in this member. Thus, the arm 277 or 279 that was causing the ribbon spacing, will at this time be pulled back out of the way and the other arm moved into an operating relationship with its ratchet. The ribbon reversal sensing mechanism to determine that the ribbon has been fed far enough in one direction comprises a pawl member 283 (FIG. 20) associated with the ribbon spool 264 and a similar pawl member 284 associated with the ribbon spool 265. In FIG. 20 the pawl member 283 is shown in an operative "ribbon reversal" position due to the fact that the quantity of wound ribbon on spool 264 is low, whereby an arm 285 on the pawl member is caused to move towards the ribbon spool center under the urging of a flat spring 286. Thus, a pawl 287 attached for movement with arm 285 has consequently been permitted to move in a counterclockwise direction sufficiently to engage a projection 288 on the arm 279. And, when arm 279 attempts to pursue its normal rearward travel, it is prevented in doing so by the engaging pawl 287. This results in the toggle mechanism being thrown so that the stud 275 is seated in the other notch, i.e., the right notch, of member 274. Consequently, the arm 279 becomes effective to feed the ratchet 280 and to wind the ribbon in the reverse direction upon further printing operations.

(B7) Tour-of-Duty Recorder Mechanism

The tour-of-duty recorders 28 (FIG. 1) and 42 are similar in construction, function and purpose. Each recorder is used to prepare a report of transactions at an associated station lane. In particular, a tour-of-duty recorder operation will occur in response to the insertion or removal of the toll collector's identification key, the resumption of power immediately after a power failure, a reverse movement across a weighing platform treadle, a forward movement across a weighing platform treadle when the toll collector's key is out of the toll recorder, and the processing of a trip card for a vehicle having an overweight axle thereon. In additon, the tour-of-duty recorder may be caused to operate automatically every hour on the hour, and manually by the operation of a control switch.

The information printed on the tour-of-duty summary sheet (see FIG. 24) includes the following items:

(1) *Total axles keyed.*—An accumulation of the number of axles indicated by the axle keys operated in an axle key unit such as unit 33 (see also FIG. 1), for example, by the toll collector.

(2) *Forward axle count.*—An accumulation of the actual number of vehicle axles that have passed over an axle counting treadle in a forward direction.

(3) *Sequence number count.*—A successive count number to represent the total number of toll recorder cycles or operations.

(4) *Station number and lane number.*—The type wheels for printing this information are preset so that the report from a particular tour-of-duty recorder may be associated with a specific lane in a definite station.

(5) *Day and time.*—The day and the time of the day that a tour-of-duty recorder operation is effected.

(6) "*V.*"—To indicate an overweight axle.

(7) "*R.*"—To indicate a reverse motion across the weighing platform treadle.

(8) "*\**" (*asterisk*).—To indicate a forward movement across the treadle while the toll collector's key is out of the toll recorder.

(9) "*\**" *and* "*R.*"—To indicate a reverse movement across the weighing platform treadle while the toll collector's key is out of the toll recorder.

Figure 22:
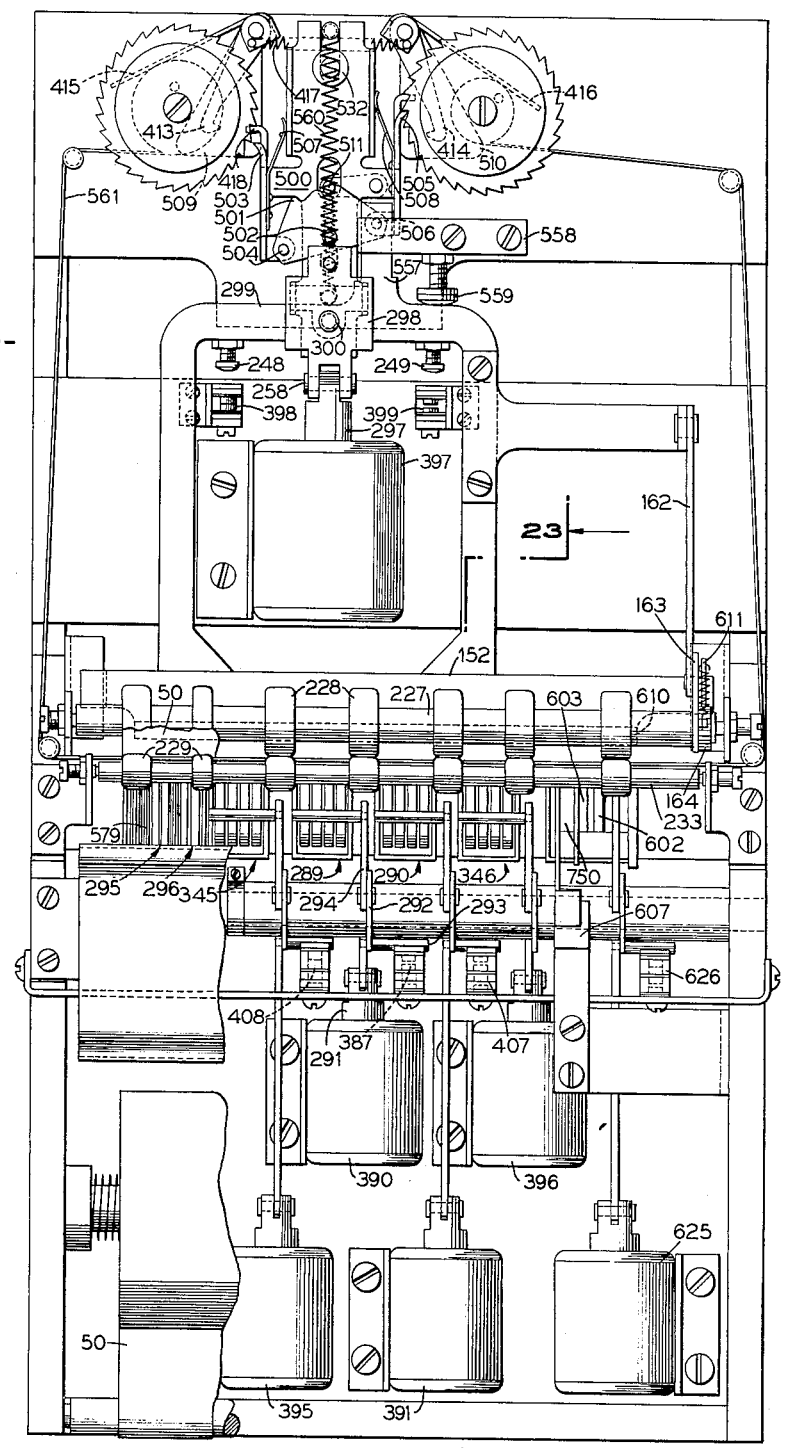
FIG. 22 is a plan view of a tour-of-duty recorder.

Referring to FIG. 22, the tour-of-duty recorder in general comprises a plurality of printing counters, a summary record feed, a ribbon drive mechanism, and a print stroke effecting mechanism. As will be described in detail hereinafter, forward axle counter magnet 390 is energized each time a vehicle axle passes over the treadle in a forward direction. Total axles keyed magnet 395, on the other hand, is energized during a toll recorder operation a number of times corresponding with the number of axles represented by the axle keys operated manually, whereas sequential count magnet 391 is energized once for every toll recorder operation. By means of a mechanical linkage essentially similar to that for the toll recorder sequence counter wheel 257 shown in FIG. 16, forward axle counter 289, sequential operation counter 290 and total axle keyed counter 345 are each advanced by a value of one every time their respective counter magnets 390, 391 and 395, respectively, are energized. When counter magnet 390 (see also FIG. 23), for example, is energized, core 291 is moved downwardly as viewed in FIG. 22, carrying with it link 292 and contact operating pin 293. As is shown more clearly in FIG. 23, link 292 is connected to an arm 570 which is pivotally mounted on a support shaft 571. The upper end of lever 570 is connected to an arm 294 at a point 572, the arm 294 being provided in order to cause a counter pawl (not shown) to engage a new tooth of the units counter wheel ratchet (not shown), whereby the return movement of the arm 294 will advance the units position counter wheel of counter 289 one increment. The non-operating end of arm 294 is connected by a spring 573 to the end of lever 570, to thereby maintain the operating end of arm 294 in engagement with the counter pawl carrying rod 574. As should be apparent at this time, when magnet 390 is energized, the lower end of lever 570 is carried to the left as shown in FIG. 23, and the upper end of lever 570 is moved to the right, carrying with it arm 294. In response to the deenergization of magnet 390, spring-biased lever 570 restores link 292, and its upper end is caused to be moved to its leftmost position. In doing so, the counter 289 is advanced one increment. It is to be observed that the energization of magnet 390 causes pin 293 to maintain forward contacts 387 open so long as magnet 390 is energized.

The station identity symbol printing wheels 295 (FIG. 22) and the lane identification printing wheels 296, are manually preset in order to print the same information during every tour-of-duty recorder printing stroke. The mechanism to control the printing of an asterisk is shown in FIG. 26; inasmuch as similar mechanisms are used to control the printing of a V and an R, only that structure for controlling the printing of an asterisk need be described. An armature 575 is mounted for pivotal movement at its lower end on rod 576, and is connected to a type element control arm 577 by conventional means. A spring 578 is employed to maintain arm 577 in engagement with type wheel 579. The type element 580 is normally positioned in the printing line. However, in response to the energization of magnet 810, armature 575 will be attracted thereto, whereby arm 577 will be moved to the left and type wheel 579 caused to turn slightly in a counterclockwise direction about wheel support shaft 582. The movement of wheel 579 is sufficient to cause type element 580 to be moved without the printing line. That is, consequent upon the energization of magnet 580, an imprint of the type element 580 will not be effected. In response to the de-energization of magnet 810, the print control mechanism will be restored by the urging of armature biasing spring 583. As the description advances, the circuit control for the V, asterisk and R print control magnets will be described in detail.

The tour-of-duty recorder time printing mechanism is controlled by a master pulse time unit. Inasmuch as this unit includes a synchronous motor having a minute impulse cam mechanism similar to that already described with respect to the timing mechanism shown in FIG. 10, this afore-mentioned unit will be described only briefly herein. Referring to FIG. 28, shaft 587 of continuously operating synchronous motor 588 completes one revolution each minute. Cams 589 and 590, and gear 591 are connected to shaft 587, and also complete one revolution each minute. Cam follower 594 is pivotally connected to a stud shaft 595, and to cam follower 596 at connection point 597. Cam follower 596 will first drop off the high dwell of cam 590 to thereby close minute impulse contacts 598 as follower 596 pivots in a clockwise direction about connection 597. Shortly thereafter, i.e., 0.3 second later for example, cam follower 594 will drop off the high dwell of cam 589, carrying with it connection 597 as follower 594 moves in a counterclockwise direction about stud 595. During this latter movement, the contact operating end 599 of cam follower 596 is caused to move away from contacts 598 inasmuch as the cam follower now pivots in a counterclockwise direction about the point of contact between the cam follower 596 and cam 590, to thereby cause contacts 598 to open. On the other hand, contacts 601 are closed once every hour by the action thereupon by cam 586 which is driven through a conventional gear train including gear 591.

The minute impulse caused to be transmitted due to the closing of contacts 598, is directed to magnet 625 (FIG. 22) for controlling a mechanism substantially similar to that already described with respect to magnet 390 (see also FIG. 23). Briefly, referring to FIG. 22, each minute period in response to the minute impulse applied thereto, magnet 625 is energized to advance the units position minute type wheel 602. This type wheel 602 has arranged on the outer periphery thereof the digital type elements for printing 0 through 9 minutes, whereas tens position type wheel 603 may print 0 through 9. In addition, the minute type wheel 603 is connected to the hour type wheel 750 in a conventional manner so that the hour wheel is advanced one hour position whenever the minute type wheels are advanced from 59 minutes to 00 minutes. The hour type wheel 750 has successively arranged on the periphery thereof type elements for printing from 00 through 23 hours. Furthermore, type wheel 750 has secured thereto for rotation therewith a cam 604 (see also FIG. 26) having a notch thereon, said notch being provided to operate upon bell crank 605 when the hour type wheel 750 is advanced from 23 to 00. That is, bell crank 605 will be moved in a counterclockwise direction about stud shaft 606 once every 24th hour. As is shown in FIG. 25, the operating end of bell crank 605 acts upon day of year contacts 607 so as to close the same, and thereby complete a circuit to day of year magnet 396 (see also FIG. 22), as will be described in detail hereinafter in connection with the circuit diagram. Referring once again to FIG. 25, latch lever 609 maintains contacts 607 closed after the contacts are initially closed due to the action of bell crank 605. This is for the reason that cam 604 acts upon bell crank 605 for a very short time. When magnet 396 (see also FIG. 22) is energized, the day of year type wheels 346 are advanced in much the same manner as were the type wheels in counter 290 and the latch lever 609 (FIG. 25) is restored to a position so as to no longer maintain contacts 607 closed.

The energization of tour-of-duty recorder print control solenoid 397 effects a printing stroke, a paper feed and a ribbon feed. Operating studs 248 and 249 are attached to yoke 299 for movement therewith in order to close their respective contacts 398 and 399 when solenoid 397 is energized to move core 297 downwardly. Core 297 is connected to member 298 by a pin 258, and member 298 is also connected to yoke 299 by a pin 300. The upper extension 557 of yoke 299 slides within a fitted opening in guide member 558 which prevents a sidewise movement of the yoke. Bumper 559 is attached to member 558 in order to stop the upward movement of the control solenoid mechanism under the urging of spring 560 when magnet 397 is de-energized. A platen bar 152 including a resilient platen 610 is attached to yoke 299. Arm 162 is also connected to yoke 299 for movement therewith, whereas spring-biased paper feed pawl 163 is connected to arm 162. Pawl carrying member 163 has a pawl 611 mounted thereon, said pawl being provided to engage a ratchet 164 which is fixed to paper feed shaft 227. Thus, each reciprocating movement of arm 162 as a result of magnet 397 being energized and de-energized, causes pawl 611 to engage a succeeding notch on ratchet 164, whereby shaft 227 is advanced an amount equivalent to the spacing provided between lines of printing on sheet 50. Interposed between the rubber rolls 228 which are fixed to shaft 227, and the rubber rolls 229 which are fixed to idler shaft 233, is the record sheet 50. Thus, the movement imparted to shaft 227 due to the reciprocating action of arm 162 when magnet 397 is energized and subsequently de-energized, causes the sheet 50 to be advanced.

Slide member 500 is connected to member 298 for movement therewith by a pin 300. This member is bifurcated to engage guide stud 532 which prevents a sidewise movement of the slide member 500. Toggle element 501 is pivotally connected to stud 502 which, in turn, is attached to slide member 500. Left ribbon spool advancing pawl 503 is pivotally connected to toggle 501 at point 504, whereas right ribbon spool advancing pawl 505 is pivotally connected to the toggle at point 506. Leaf springs 507 and 508 are each connected, at one end, to pawls 503 and 505, respectively, in order to position the pawls against their respective guides 509 and 510. Spring-biased detent stud 511 engages one of two dwells in toggle 501 to spring lock the toggle in a position so that only one of the two pawls is permitted to extend far enough to reach its corresponding ribbon spool ratchet. When this stud is in the right dwell as is shown in FIG. 22, and slide 500 is moved downwardly due to the energization of control magnet 397, pawl 505 will engage a notch on the right ribbon spool ratchet. On the return stroke of slide 500 under the urging of spring 560 when magnet 397 is de-energized, pawl 505 will advance the ribbon spool associated therewith. It may be seen in FIG. 22 that pawl 503 does not move sufficiently far enough on the return stroke to advance its corresponding ribbon spool.

Reversing mechanism for the ribbon spool is provided, and it operates in a similar fashion to the ribbon reversing mechanism provided in the toll recorder. The sensing mechanism to determine that the ribbon has been fed far enough in one direction comprises a pawl member 413 associated with left ribbon spool and a similar pawl member 414 associated with the other spool. In addition thereto, a flat arm 415 is attached to pawl member 413 and a flat arm 416 is attached to pawl member 414; each of the arms being maintained in contact with the ribbon wound on the corresponding spool by spring 417. A pawl member, for example member 413, is placed in an operative position when the ribbon windings carried by the associated spool have decreased so that member 413 engages the arm 418 carried with pawl 503. Thus, when slide 500 is moved downwardly due to the energization of solenoid 397, pawl 503 is prevented from moving therewith. This results in the toggle mechanism, including toggle 501, being thrown so that detent stud 511 will engage the left dwell in the toggle. Consequently, pawl 503 becomes operative to feed the left ribbon spool ratchet and to wind the ribbon in a reverse direction, whereas pawl 505 is rendered inoperative.

In summation, the energization of control solenoid 397 causes platen 610 to move against record sheet 50 and the ribbon 561 which is interposed between the platen and the type wheels, to effect an imprint upon the sheet. During the return movement of the solenoid mechanism, shaft 227 is caused to advance to thereby feed record sheet 50 a suitable amount, and a ribbon spool is rotated one notch in order so as to advance the ribbon 561.

(B8) *Key Mechanism*

Figure 19:
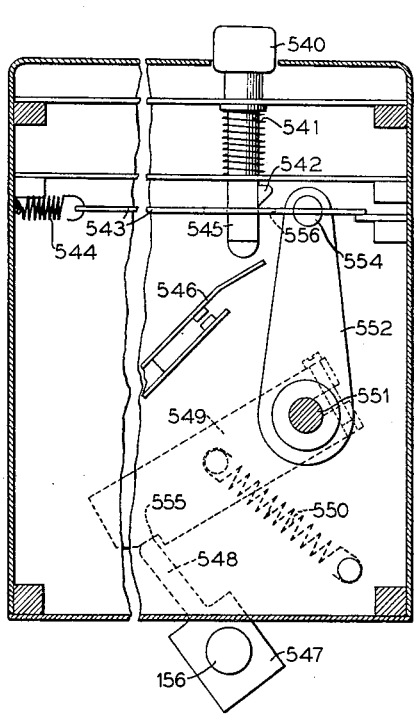
FIG. 19 is an elevation with parts in section of a manually operated key unit mechanism.

The operating features of the key mechanism associated with key unit 33 (FIG. 1), for example, are shown in FIG. 19. Key 540 is biased upwardly by a spring 541 so that catch lock 542 is normally above slide plate 543. This plate is urged to the left by a spring 544. The stem 545 to which catch lock 542 is attached passes through a plate 543 in a position such that the camming surface of lock 542 will engage plate 543 when the key 540 is depressed. The camming surface of lock 542 causes the slide plate 543 to move towards the right against the action of spring 544 until the flat upper surface of the catch lock 542 is below the lower surface of the plate 543. At this time, the plate 543 is released to return to its home position, to the left, whereby key 540 is held in a depressed position due to the engagement between the upper surface of catch lock 542 and the lower surface of slide plate 543. In the event another key (not shown) in the key unit is depressed, the resulting movement of the slide plate 543 due to the camming surface of the catch lock attached to this other key, will be sufficient to disengage lock 542 from plate 543. Thus, key 540 will move upwardly under the urging of spring 541.

As is shown, key stem 545 operates upon associated key contacts 546 so long as the key is in a downward position. In other words, the key contacts associated with the key which is depressed, remain in an operated condition until the key is caused to move upwardly.

Member 547 is fixed to shaft 156 (see also FIGS. 9 and 11) for rotation therewith when magnet 203 is energized. Arm 548 is secured to member 547 and acts upon bar 549. This bar is biased in a counterclockwise direction by spring 550. Bar 549 is fixed to stud 551 as is slide plate operating arm 552. Arm 552 has attached thereto a slide plate engaging element 554 for acting upon slide plate 543. During the period dog 205 (see also FIG. 11) is disengaged from clutch ratchet 206 so that shaft 156 does not revolve, arm 548 is in the first step 555 of bar 549. It is in this position of arm 549 that element 554 does not act upon slide plate 543. Consequently, as mentioned previously, a downward motion applied to key 540 need simply overcome the relatively light spring tension caused by springs 541 and 544. However, as soon as shaft 156 starts to rotate in a counterclockwise direction, bar 549 is released from arm 548 for movement in a counterclockwise direction under the urging of spring 550. This movement is stopped when element 554 engages sidewall 556 in plate 543. As element 554 engages plate 543, and inasmuch as spring 550 exerts a comparatively large force upon bar 549, the depression of any key 540 during a toll recorder cycle when shaft 156 is rotating, requires considerable downward force. This, of course, is for the reason that the combined forces of springs 544 and 550 along with the individual springs such as 541, must be overcome to move spring plate 543 to the right.

Near the completion of the toll recorder cycle, arm 548 will engage the lower surface of bar 549 to thereupon move the latter in a clockwise direction about shaft 551. This movement imparts a movement to the right to plate 543 whereupon all catch locks 542 are released from the plate. Thus, it is at this time that all of the key contacts 546 are once again caused to be in an inoperative position.

(C) CIRCUIT DESCRIPTION

As explained previously, whenever any one of the various component recorder mechanisms already described is located in both the entrance station and the exit station apparatus systems, the mechanism has been described in connection with only the entrance station so as to avoid undue prolixity and unnecessary complexity. This, of course, is for the reason that the exit station mechanism in these instances is the same as that to be found at the entrance station. In order to avoid confusion in the Circuit Description between the entrance station and the exit station wiring diagrams as a result of the foregoing, any electrical apparatus described hereinbefore in connection with a mechanism will be identified in the entrance station wiring diagram by the suffix "N" and in the exit station wiring diagram by the suffix "X." For example, the toll collector key contacts 261 (FIG. 12) are designated 261N (FIG. 31d) in the wiring diagram for the entrance toll recorder 31 (see also FIG. 1), and are identified by the reference designation 261X (FIG. 32d) in the wiring diagram for the exit toll recorder 45. In a similar fashion the punch and print clutch magnet 203 (FIG. 11) is designated 203N (FIG. 31e) in the wiring diagram for the entrance toll recorder, and 203X (FIG. 32e) in the wiring diagram for the exit toll recorder.

Figure 32D:
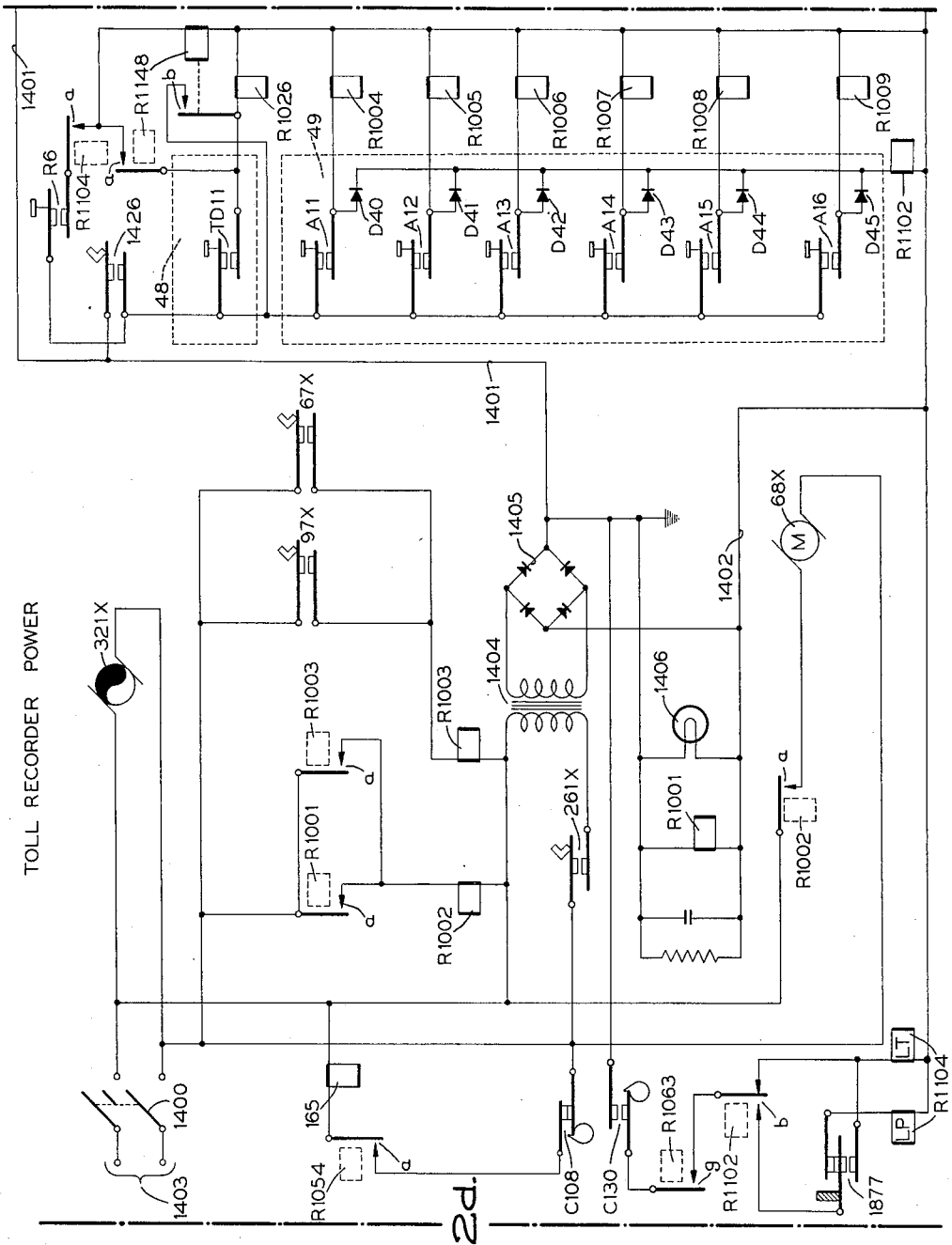
Figure 32F:
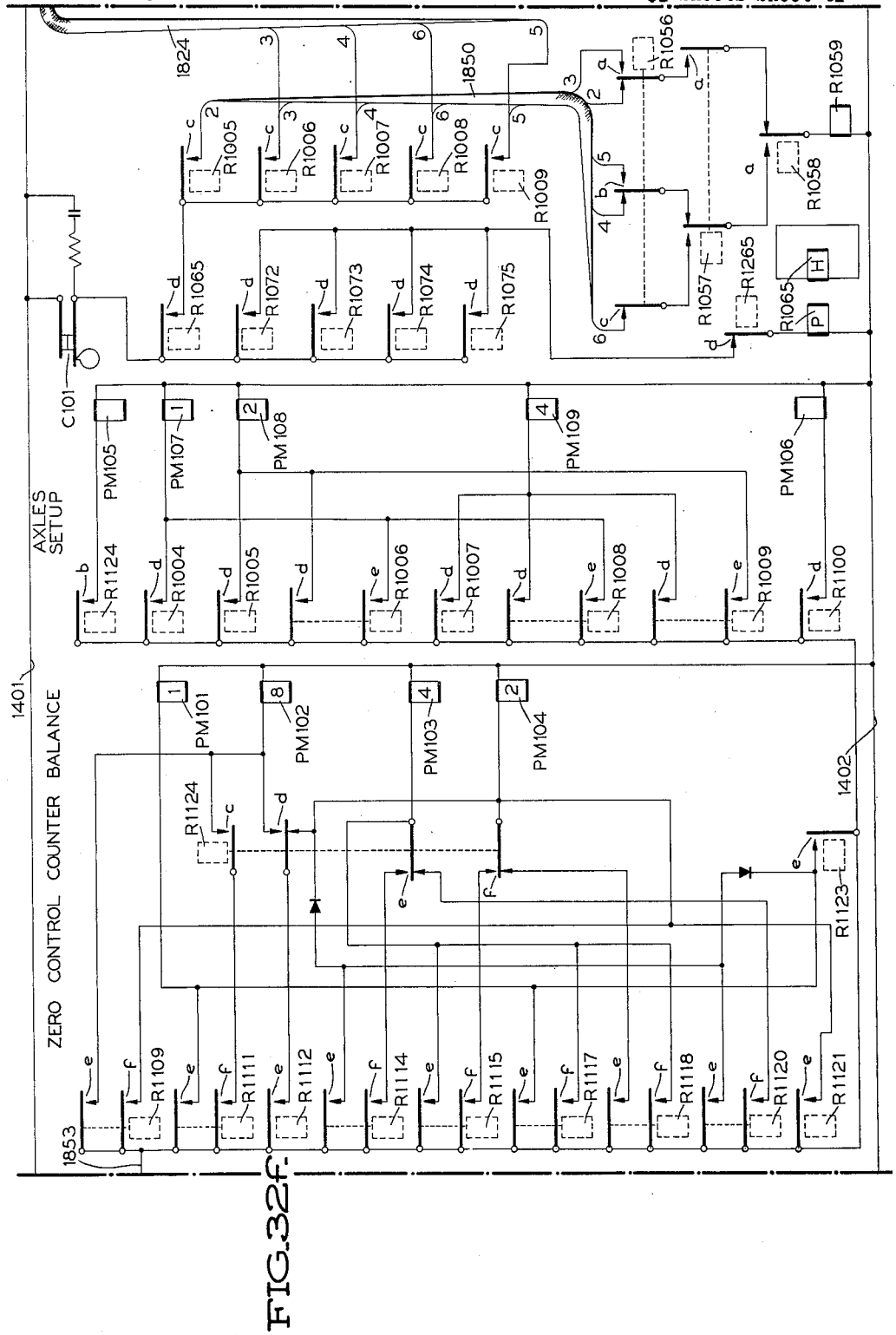
Figure 32:
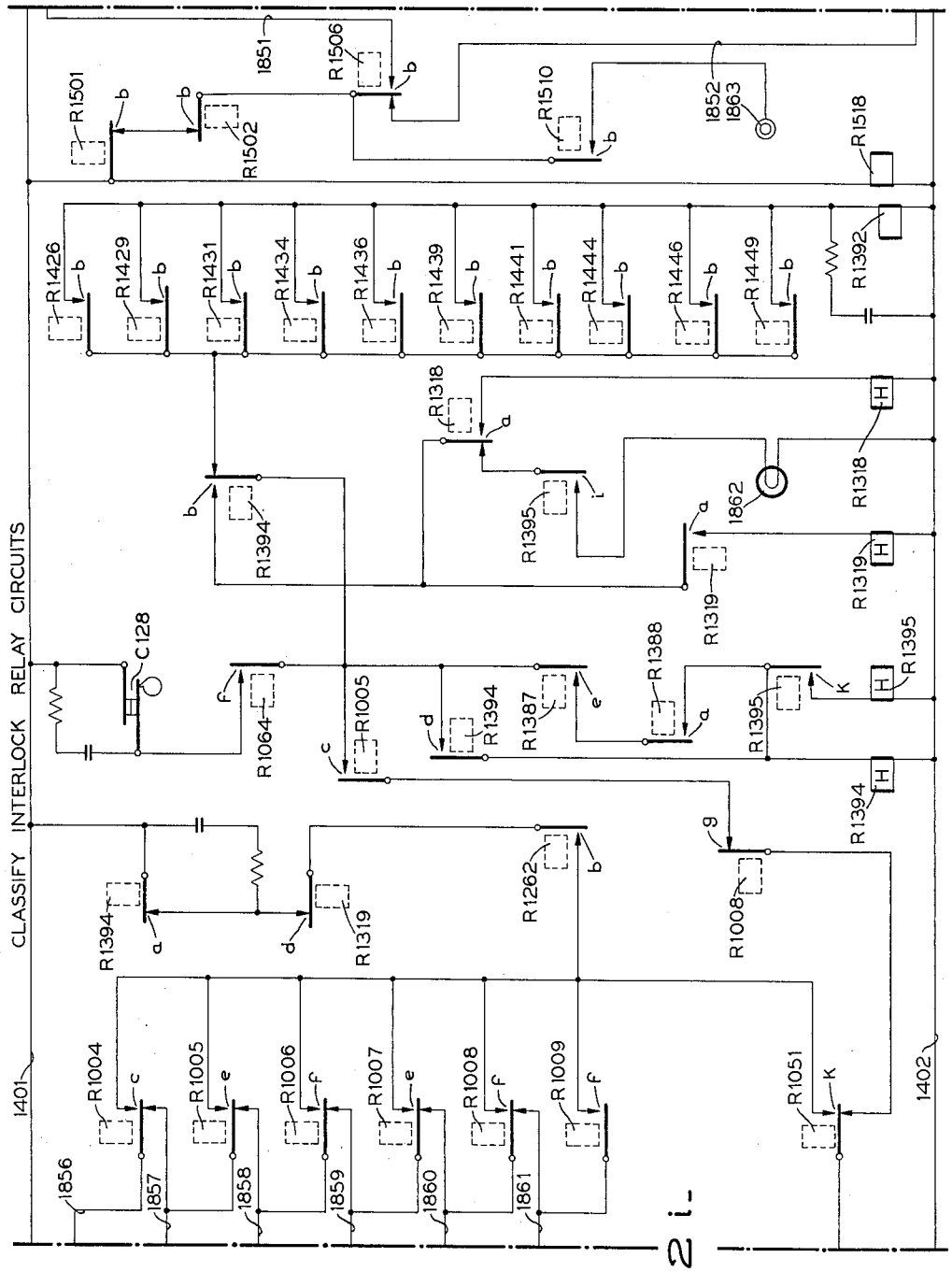

An examination of the entrance station and exit station wiring diagrams will reveal that many circuit networks thereof are similar. As a result, in order to simplify the description of the present invention as much as possible, circuit components, contacts, etc., which are used in the exit station apparatus for substantially the same purpose as that in the entrance station apparatus, are identified by reference numerals in the 1,000 series. For example, the entrance station end classify relay R394P (FIG. 31p) may be correlated with the exit station end classify relay by the reference numeral thereof which is R1394P (FIG. 32u). In a similar fashion, the toll recorder lines 401 (FIG. 31dl) and 402 in the entrance station apparatus correspond with the exit station toll recorder lines 1401 (FIG. 32d) and 1402.

Where relays may be controlled by pick (P) and/or hold (H) coils, these will be identified by the relay numbers and the letters P or H within the block in the drawing representing the relay coil. As an example, reference may be had to FIG. 31i wherein relay coils R201P and R201H are shown. It may be mentioned here, too, that quite often throughout this description, these coils will be referred to simply as relays, i.e., relay R201P for example.

The coils for controlling latch type relays will be identified by the relay numbers and the letters LP for latch pick and LT for latch trip. For example, coils R228LP and R228LT in FIG. 31i are such relay coils. Persons familiar with the relay art will recognize that a latch pick relay will remain in a picked condition due to mechanical latching means, after the LP coil has been energized. This mechanical latching means may be disabled when the LT coil is energized. It will be found quite often throughout this description that these coils will also be referred to simply as relays.

(C1) *Entrance Toll Recorder—General*

Prior to describing the entrance station system apparatus, the entrance station toll recorder will be described in a general way with reference to the block diagram shown in FIG. 29. As is shown in FIG. 1, the entrance station toll recorder 31 is caused to cooperate with other apparatus so as to afford an entrance station toll recorder system.

Referring once again to FIG. 29, the entrance station toll recorder is shown to include a 3 kilocycle (kc.) carrier oscillator 780. As will be described later, the design of this oscillator circuit is such as to provide an extremely stable output voltage. It may be pointed out here that the oscillator frequency may vary plus or minus ten percent, but the output voltage must be accurately controlled inasmuch as it is directed to the load cells 782, the output from which is indicative of the load, e.g., an axle weight, applied to the weighing platform 24. In the preferred embodiment of this invention, a pair of load cells are associated with the weighing platform, each load cell including a conventional strain gage resistor bridge network capable of producing a two millivolt output per one volt input for every 20,000 pounds applied to the weighing platform. It should be apparent at this time then that a 3 kc. carrier wave will be directed from the load cells to the carrier amplifier 783; the amplitude of this carrier wave being directly proportional to the dynamic load applied to the weighing platform.

After the carrier wave is amplified by the amplifier circuit 783, the signal is demodulated by a phase-sensitive demodulator 784. As the description advances, it will be shown and described that this demodulator is for all practical purposes effective to demodulate only a 3 kc. signal which is in phase with the oscillator output signal. As a result of this demodulation, a direct current signal indicative of the dynamic load applied to weighing platform 24 is caused to be filtered by the apparatus identified by reference numeral 785, prior to being stored within the condenser storage units designated 790 and 793.

The power supply 786 is also an extremely stable unit inasmuch as it is desired to apply a constant voltage to line 641. This voltage, preferably +250 volts, is directed to oscillator 780, amplifier 783 and a weight voltage compare circuit 787. In order to have a close tie-in between the power supply 786 and oscillator 780, inasmuch as the power supply output voltage is directed to circuit 787 and the oscillator output is directed to storage unit 793, a reference rectifier 781 is employed to rectify the constant amplitude 3 kc. oscillator output prior to directing the D.C. signal resulting therefrom to the power supply. As will be described in detail hereinafter, the D.C. signal output from rectifier 781 is used in the power supply circuit as a reference voltage upon which the magnitude of the power supply output voltage is based.

The actual axle weight voltage storage 790 includes a condenser for storing the axle weight representing D.C. signal being directed from filter 785. This voltage which is stored in the afore-mentioned condenser is compared in an overweight axle check circuit 791 with a maximum axle weight voltage directed from a circuit apparatus represented by block 792. The effect of the overweight axle check is such that if the load voltage stored within the apparatus of block 790 is of greater magnitude than the axle weight voltage standard within the apparatus of block 792, an overweight axle condition will be signified. This condition will affect the toll recorder interlock control circuits represented by block 798 to prevent an automatic toll recorder cycling operation. In addition, an indicator panel light system will apprise the toll collector of the overweight axle condition.

The weight storage apparatus 793 includes a plurality of storage condensers, each of which is in a circuit similar to the "overweight" condenser mentioned hereinabove. Every one of these plurality of condensers is controlled so that only the D.C. signal voltage due to a single axle is stored in a single corresponding condenser. This control is provided by the read-in advance ring 794 which readies a next following condenser for axle weight voltage storage after a preceding condenser has had stored therein a voltage corresponding to a vehicle axle weight. In short, the plurality of condensers are controlled so that the voltage due to successive axles are directed to correspondingly successive condensers.

In order to obtain the total vehicle weight, it is necessary to simply add the individual vehicle axle weights. This is done in the weight storage output apparatus 793b by combining the storage condensers corresponding to the axles carried by a single vehicle so that the combined condenser voltages will represent the total vehicle weight. A readout advance ring 795 is employed to govern the operation of the weight storage output 793b so that the proper condensers associated with the axles per vehicle are combined to provide an output voltage which corresponds to the vehicle weight.

As mentioned hereinbefore, the classification of a vehicle is determined from the weight of the vehicle. Thus, for example, a vehicle under 8,000 pounds may be placed in classification 1, whereas a vehicle having a weight between 8,000 and 11,000 pounds may be placed in classification 2. Inasmuch as a voltage which is indicative of the total vehicle weight is available from weight storage output 793b, the classification of a vehicle may be automatically determined by comparing this total vehicle weight voltage with various standard voltages applied in a weight voltage compare circuit 787. This compare circuit is controlled by a ripple circuit ring 788 which in effect causes a step-by-step comparison between the weight storage output voltage and the standard voltages, each of which corresponds to a different classification. As the description advances, it will be shown that when the weight storage output voltage magnitude is exceeded by a standard classification representing voltage, the classification of the vehicle will be stored by apparatus represented to be within block 789.

A photoelectric unit 29 is used to provide a means for detecting the presence of a vehicle a certain distance ahead of a toll booth, for example, toll booth 21 (see also FIG. 1). During this period of photoelectric detection, the number of the vehicle axles passing over an axle count treadle 23 are accumulated and grouped within an axle grouping unit 30. For example, if a two-axle vehicle follows a three-axle vehicle over treadle 23, the five axle detected by the treadle will be grouped by the apparatus within unit 30 into a three axle per vehicle group and a two axle per vehicle group. It should be apparent that without the unit 30 in the preferred embodiment of this invention, it would not be possible to associate any of the axles with their respective vehicles.

As mentioned previously, the number of axles determined by the toll collector to be carried by a given vehicle is indicated by the operation of a corresponding axle count key within a unit such as unit 33. That is, should the toll collector determine that a vehicle has three axles, he would manually operate the three-axle key within unit 33. As is shown in FIG. 29, the output from axle key unit 33 is directed to an axle per vehicle compare apparatus 797 as is the output from axle grouping unit 30. Thus, the axles per vehicle automatically grouped by unit 30 are compared with the number of axles represented by the manually operated key within key 33. The comparison output from unit 797 is used to control the toll recorder interlock apparatus 798 as will be described in detail hereinafter.

(C2) *Exit Toll Recorder—General*

Figure 29:
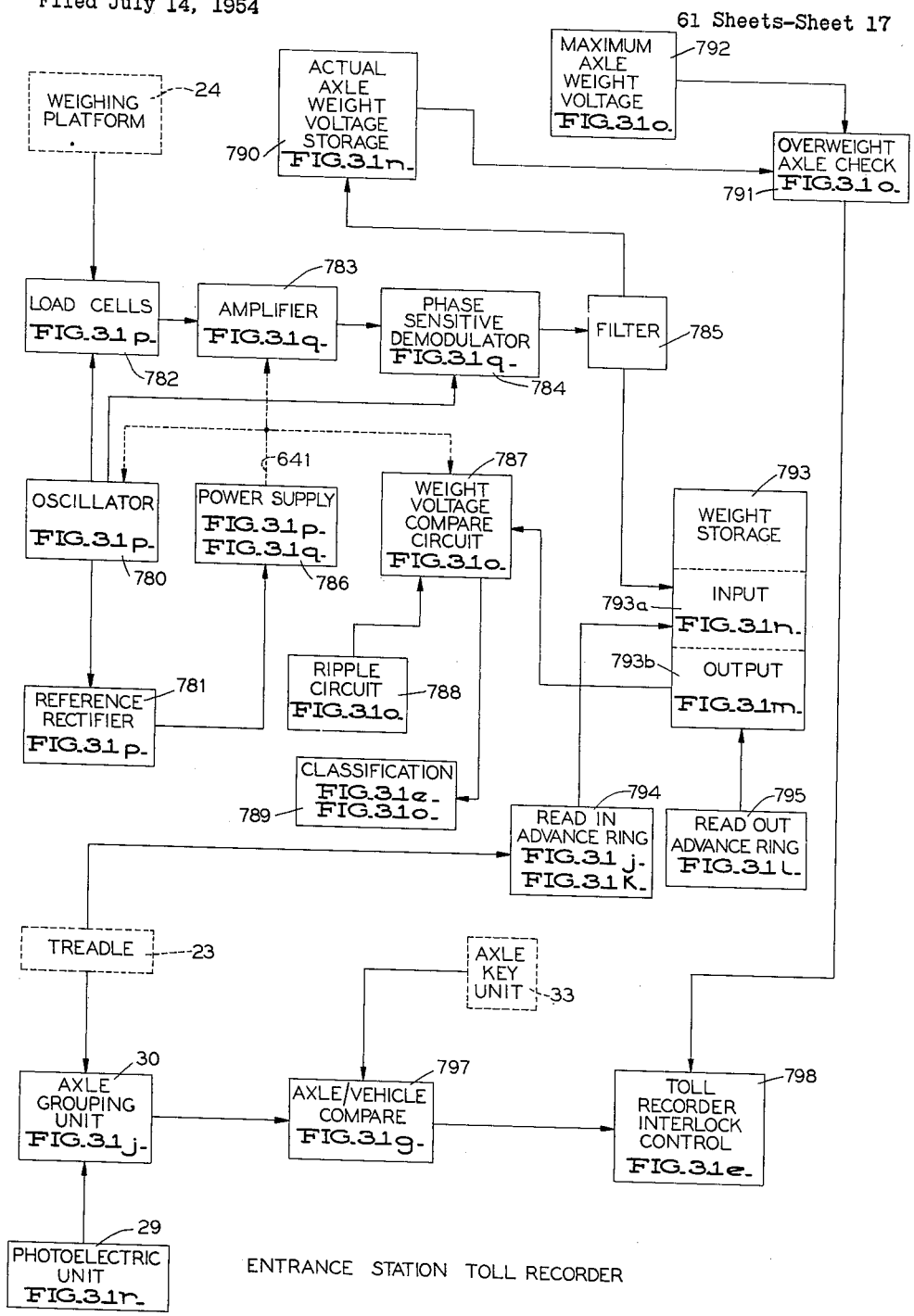
FIG. 29 is a block diagram of an entrance station toll recorder.

The exit station toll recorder shown in block diagram form in FIG. 30 includes a number of units similar in arrangement and function to units already described with respect to the entrance station toll recorder shown in FIG. 29. As may be seen by comparing FIGS. 29 and 30, these afore-mentioned similar units may be associated one with the other by the reference numerals used; that is, for example, entrance recorder carrier amplifier 783 (FIG. 29) is similar to exit recorder carrier amplifier 1783 (FIG. 30) and entrance recorder ripple circuit 788 (FIG. 29) is similar to exit recorder ripple circuit 1788. In order to avoid undue prolixity, those units in the exit station toll recorder which are similar to units in the entrance station toll recorder, will not be described again at this time.

The exit station toll recorder comprises a trip card sensing station, whereby, after the trip card is fully and properly inserted into the card receiver thereof, perforated information which had been entered into the trip card at the entrance station, is analyzed. This information includes the axles per vehicle identified in FIG. 30 by reference numeral 1801, the time of trip start identified by reference numeral 1803, and the classification of the vehicle as determined at the entrance station. The entrance station vehicle classification, identified in FIG. 30 by reference numeral 1802, is checked against the exit station classification determination made by the apparatus within unit 1789, in classification check unit 1807. The preferred embodiment of this invention provides for a condition where the entrance station classification may be lesser by one than the exit station classification. In the event the two classification determinations differ by a classification value greater than one, the exit station toll recorder interlock control circuit identified by block 1798 will be signaled by unit 1807 to prevent an automatic operation of the exit recorder. As the description advances, it will be clear that this is simply a preferred manner of operation, and that the interlock control circuit may be effective if the exit and entrance station classification values are not equal.

The time of trip start punched in the trip card at the entrance station, and identified in FIG. 30 by reference numeral 1803, is compared with the time value at which the trip card is placed in the card receiver of the exit station toll recorder. This latter time is directed from an exit station time apparatus 1806 to an allowable time of trip check unit 1805 wherein the exit station time and the entrance station time of trip start are compared. As will be described in detail hereinafter, the allowable time of trip check unit is used to determine whether a vehicle passing within a single zone of predetermined area limits required an amount of time in excess of a designated amount of time. In the event excess time had been required by a vehicle operator to move his vehicle from an entrance station to the exit station, both of which are in a zone checking area, a signal is directed from unit 1805 to the toll recorder interlock control unit 1798 to, once again, prevent an automatic operation of the exit station toll recorder.

The axles per vehicle value punched in the trip card at the entrance station and identified in FIG. 30 by reference numeral 1801, is compared in an axles-in-error check apparatus 1804 with the number of axles per vehicle value represented by the axle key operated within axle key unit 49. Thus, should the determination by the exit station toll collector of the number of axles carried by a vehicle differ from the axles per vehicle value punched in the trip card at the entrance station, an unmatched axles per vehicle signal will be directed from unit 1804 to the toll recorder interlock control unit 1798. This latter signal will have the effect of preventing an automatic operation of the exit recorder.

As is shown in FIG. 1, an axle treadle 39 is positioned in the toll highway exit lane beyond toll booth 35 so that after a trip card for a given vehicle is processed at the exit station, the vehicle will pass over the treadle 39. Of course, inasmuch as the trip card associated with a vehicle has already been completely processed at the exit station prior to the said vehicle passing over treadle 39, the data entered into the exit station apparatus as a result of the said vehicle passing over treadle 39 is recorded on the trip card associated with a next following vehicle. As will be described in detail hereinafter, axle treadle 39 (refer also to FIG. 30) causes an axle count to be directed to a zero control counter identified by reference numeral 46. However, prior to an axle count for any given vehicle being directed from treadle 39 to counter 46, the toll collector will have operated an axle key within unit 49. This key, it will be recalled, corresponds to the number of axles carried by the vehicle. During the time that the trip card for the said given vehicle is processed at the exit station, an axle count corresponding to the number of axles represented by the manually operated key within unit 49 is entered into counter 46. Thereafter, as the said vehicle passes over treadle 39, the axle representing pulses which are directed from treadle 39 to counter 46 as a result of each axle passing over the treadle, are caused to be entered in a complement value form as compared with the axle count value directed from unit 49. It should be apparent then, that if the count directed to counter 46 from unit 49 is equal to the count directed to the said counter from treadle 39, after the said given vehicle has passed completely over treadle 39, a zero balance should remain in the counter. However, should the counts from unit 49 and treadle 39 differ, a plus or minus value will remain in counter 46, the type of value being determined as a result of either the treadle count or the axle key count being the greater. This counter value, be it either zero or any other number, will be entered upon the card associated with the next following vehicle during the trip card processing operation at the exit station toll recorder for the next following vehicle.

(C3) *Similar Entrance and Exit Station Apparatus Circuits*

It has been indicated hereinbefore that there are similar entrance and exit station apparatus circuits. Thus, so as to avoid undue prolixity and unnecessary complexity, only the entrance station apparatus circuits will be described in detail where the entrance and exit station circuits are similar. The exit station circuits in turn will simply be mentioned and, where necessary, described only briefly. It may be pointed out here that the reference numerals used to identify similar circuit components in the entrance and exit stations, will help to correlate the two station circuits.

(C3a) *Toll and tour-of-duty recorders power supply.*—Referring to FIG. 31d, power is applied to the synchronous motor 312N when entrance station toll recorder main line switch 400 is closed, to thereby operate the motor and the time control mechanism for the entrance station toll recorder described previously in connection with FIG. 10. Similarly, direct current power is applied to lines 401 and 402 consequent upon the main line power being applied from power source 403 to transformer 404 and bridge rectifier 405 after main line switch 400 and toll recorder identification key contacts 261N are closed. As the description advances, it will become clear that the power directed to the toll recorder lines 401 and 402 is applied to only the entrance station toll recorder 31 (see also FIG. 1). It may be mentioned here that this is desirable in order to keep the various toll recorders electrically separated from all other equipment as, for example, other toll recorders and all tour-of-duty recorders.

With reference to FIG. 12, it will be recalled that the insertion of the toll collector's key 341 into a key slot provided therefor in the toll recorder, causes a pair of key contacts 261 to close. It will be recalled, too, that the collector's key must be inserted in the toll recorder at the start of a toll collector's tour of duty and must be removed from the toll recorder at the end of a tour of duty. This is important because a key 341 which is assigned to a toll collector has embossed thereon a type face for printing the toll collector's identification number on each trip card that is validated in the toll recorder. Reference on this point may be had to the showing of the printing on the face of a trip card in FIG. 5. Hence, in order to provide an assurance that the toll collector's key is inserted into the toll recorder, power will not be applied to the toll recorder lines, e.g., lines 401 (see FIG. 31d) and 402, until the key has been inserted. The direct current power which is applied to lines 401 and 402 is obtained after the electrical power is rectified by the conventional bridge rectifier 405. It is to be observed that since power light 406 is connected across the toll recorder lines, the light will be energized as soon as the toll collector's key for operating contacts 261N is inserted in the toll recorder. As is shown, relay R1 is connected in parallel circuit to light 406 so that the closing of key contacts 261N will cause the energization of relay R1 which, in turn, will cause the energization of relay R2 when contacts R1a close. Upon becoming energized, relay R2 will cause contacts R2a to close, to thereby apply power to minute advance motor 68N (see also FIGS. 9 and 11). Furthermore, motor 68N is rendered operated so long as the toll collector's key is inserted in the toll recorder to maintain key contacts 261N closed. It must be pointed out here, however, that it is not only desirable but necessary, that the time control mechanism described previously with reference to FIG. 10, be permitted to operate continuously even though a toll collector's key is not present in the toll recorder to keep contacts 261N closed. With particular reference to FIGS. 10 and 31d, it will be recalled that minute advance warning contacts 97N are closed approximately 0.4 second prior to the time that latch arm 317 is moved to the left as a result of dropping off the high dwell of cam 313. It is to be remembered, too, that synchronous motor 312N operates continuously. The moving of latch arm 317 to the left causes latch member 320 to close minute advance motor contacts 67N. As may be seen in FIG. 32d, minute advance relay R3 is energized when minute advance warning contacts 97N close, and will be maintained energized during the time the minute advance motor contacts 67N are closed. During this period relay R2, whose contacts R2a complete a circuit to motor 68N, will be energized through the contacts R3a.

Referring to FIG. 31a, when tour-of-duty recorder main line switch 408 is closed, power is applied from source 407 to transformers 409 and 417. The power appearing on the secondary side of transformer 409 is directed to lines 410 and 411, whereas the power directed through transformer 417 is applied to bridge rectifier 412, to thereby cause a direct current power to be applied to lines 413 and 414.

Power is applied to exit station toll recorder lines 1401 (FIG. 32d) and 1402 when main line switch 1400 and exit toll recorder key contacts 261X are closed. It may be mentioned here that a time advance will be effected in the exit station toll recorder under control of contacts 97X and 67X in a manner similar to that which takes place in the entrance station recorder. The tour-of-duty recorder power lines 1410 (FIG. 32a), 1411, 1413 and 1414 have power applied thereto when switch 1408 is closed to connect power source 1407 to parallel circuit transformers 1409 and 1417.

(C3b) *Forward vehicle motion over axle count treadle.*—Referring to FIG. 1, it will be recalled that prior to being stopped opposite toll booth 21, vehicle 20 will pass over axle treadle 23. As is shown in FIG. 31a, axle treadle 23 includes two switches 23a and 23b. These switches are appropriately termed forward and reverse switches, respectively, inasmuch as switch 23a is closed first in the event the vehicle axle passes over treadle 23 in a forward direction, and switch 23b is closed first when the vehicle axle passes over the treadle in a reverse direction. As the description advances, it will be shown that a forward count is not entered into the forward axle counter 289 (see also FIG. 22) which is controlled by magnet 390N (see also FIG. 31c) until the wheels associated with one vehicle axle have completely passed over both the forward treadle switch 23a (FIG. 31a) and the reverse switch 23b successively. That is, the closing of either switch alone or the closing of the switches in an improper order will not cause a forward axle count to be entered into the afore-mentioned forward axle counter.

As the axle wheels associated with the front axle, for example, of two-axle vehicle 20 (FIG. 1) close switch 23a (FIG. 31a), a circuit will be completed from line 413 through switch 23a, relay R501, to line 414. The energization of relay R501 permits energization of relay R504 when a circuit is completed from line 413 through contacts R501c and R505a normally closed (n/c), relay R504, to the other side of the line. Inasmuch as the vehicle is moving over treadle 23, the wheels associated with the front axle will pass over reverse switch 23b of the treadle so as to cause both treadle switches 23a and 23b to be closed simultaneously for a short period. Hence, relay R502 will be energized from line 413 through switch 23b, relay R502, to line 414. In view of the fact that there is an interim period during which forward and reverse switches 23a and 23b are closed simultaneously, e.g., while the wheels are moving from switch 23a to switch 23b, the hold circuit for relay R504 will be maintained even after relay R501 is deenergized, when switch 23a is caused to open, through the circuit from line 413 through contacts R502d, R504b and R505a n/c, relay R504, to the other side of the line. At this time relay R506 will become energized through a circuit including contacts R502c, R504a normally open (n/o), and R501a. A hold circuit to relay R506 will be formed from line 413 through relay contacts R516e, R518a n/o, R506a and R501a, relay R506, to line 414. Suffice it to state at this time that the relay contacts R518a will be transferred inasmuch as power is applied to the toll recorder lines 401 (FIG. 31i) and 402 in order to maintain relay R518 energized. As the description advances, the function of relay R518 will become clear.

When the wheels associated with the first axle of the vehicle are moved in a forward direction an amount so that reverse switch 23b (FIG. 31a) is finally caused to open (and switch 23a is permitted to remain open), relays R501, R502 and R504 will be de-energized. Relay R506, however, will remain energized through the hold circuit described hereinabove. Thus, a circuit will be completed to tour-of-duty recorder forward axle counter magnet 390N (FIG. 31c) from line 410 through contacts R501f, R502f, R506f, R506e, 387N n/c (see also FIG. 22), and R516c, magnet 390N, to line 411. The energization of this counter magnet will cause a mechanical linkage to add a one to the forward counter 289 as well as to cause a transfer of forward contacts 387N, whereby the circuit to magnet 390N will be opened and a circuit to relay R516 closed. This latter circuit includes the contacts 387N n/o. A hold circuit for relay R516 is formed immediately when contacts R516a close to shunt contacts 387N n/o. Of course, the de-energization of magnet 390N will permit restoration of the afore-mentioned mechanical linkage associated with forward axle counter 289 (FIG. 22), whereby forward axle contacts 387N will be returned to their normal status. Magnet 390N will not be energized this time, however, inasmuch as contacts R516c will still be open due to the energization of relay R516 which will be dropped out when contacts R506f and R506e open. Referring once again to FIG. 31a, the hold circuit to relay R516 is caused to open when contacts R516e open.

It is to be observed that if the vehicle reverses its direction of motion after switches 23a (FIG. 31a) and 23b are acted upon successively, but prior to causing reverse switch 23b to open, relay R501 will be energized through forward treadle switch 23a as aforedescribed. The energization of relay R501 will cause the de-energization of relay R506 when contacts R501a open. Of course, so long as relay R506 is de-energized, the forward axle counter magnet 390N (FIG. 31c) cannot possibly be energized.

An examination of the exit station apparatus shown in FIG. 32a will reveal that the circuits thereof are quite similar to those for the entrance station apparatus. Briefly, a vehicle passing over exit station treadle 39 (see FIGS. 1 and 32a) will first close contacts 39a whereby relay R1501 will be energized, and then close contacts 39b, to thereby energize relay R1502. As soon as relay R1501 has been energized, relay R1504 will be energized via contacts R1501c. In addition thereto, immediately upon the de-energization of relay R1501 as a result of the forward motion of the vehicle, relay R1506 will be energized via contacts R1502e, R1504a n/o and R1501a. As a result thereof, exit station forward axle count magnet 390X (FIG. 32c) will be energized from line 1410 through contacts R1501f, R1502f, R1506f, R1506e, 387X n/c and R1516c, magnet 390X, to line 1411.

Figure 32J:
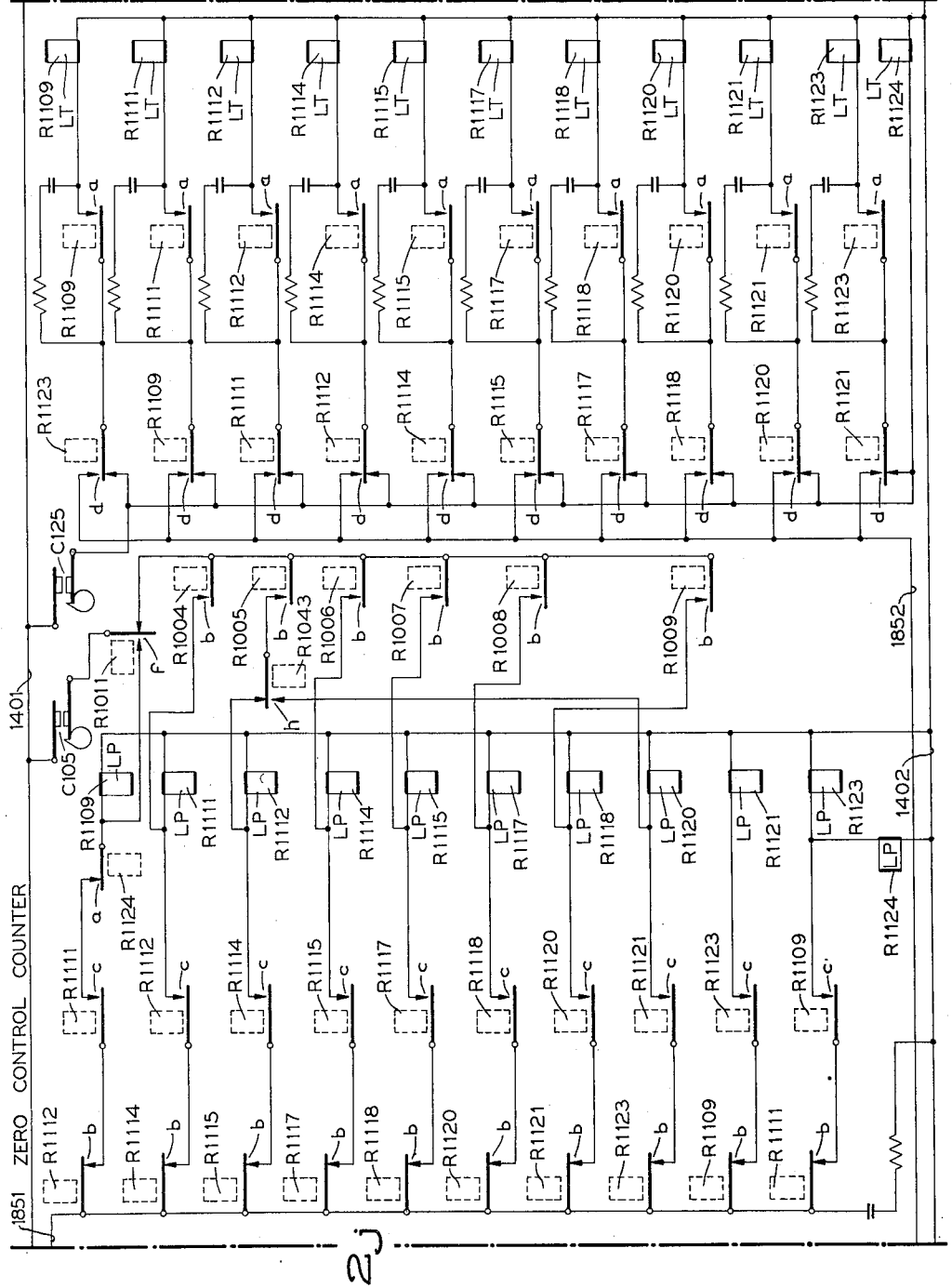
Figure 321:
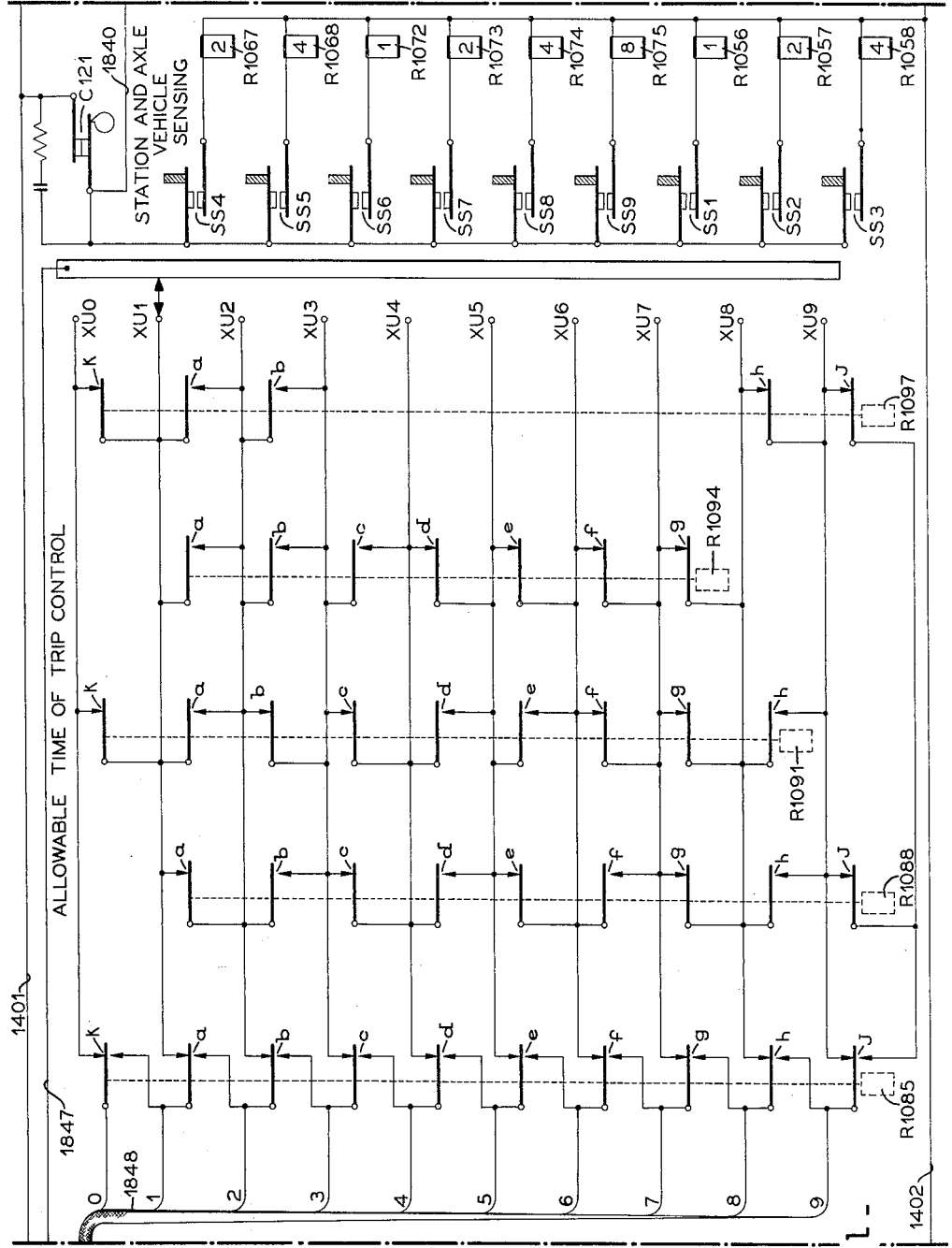
Figure 32M:
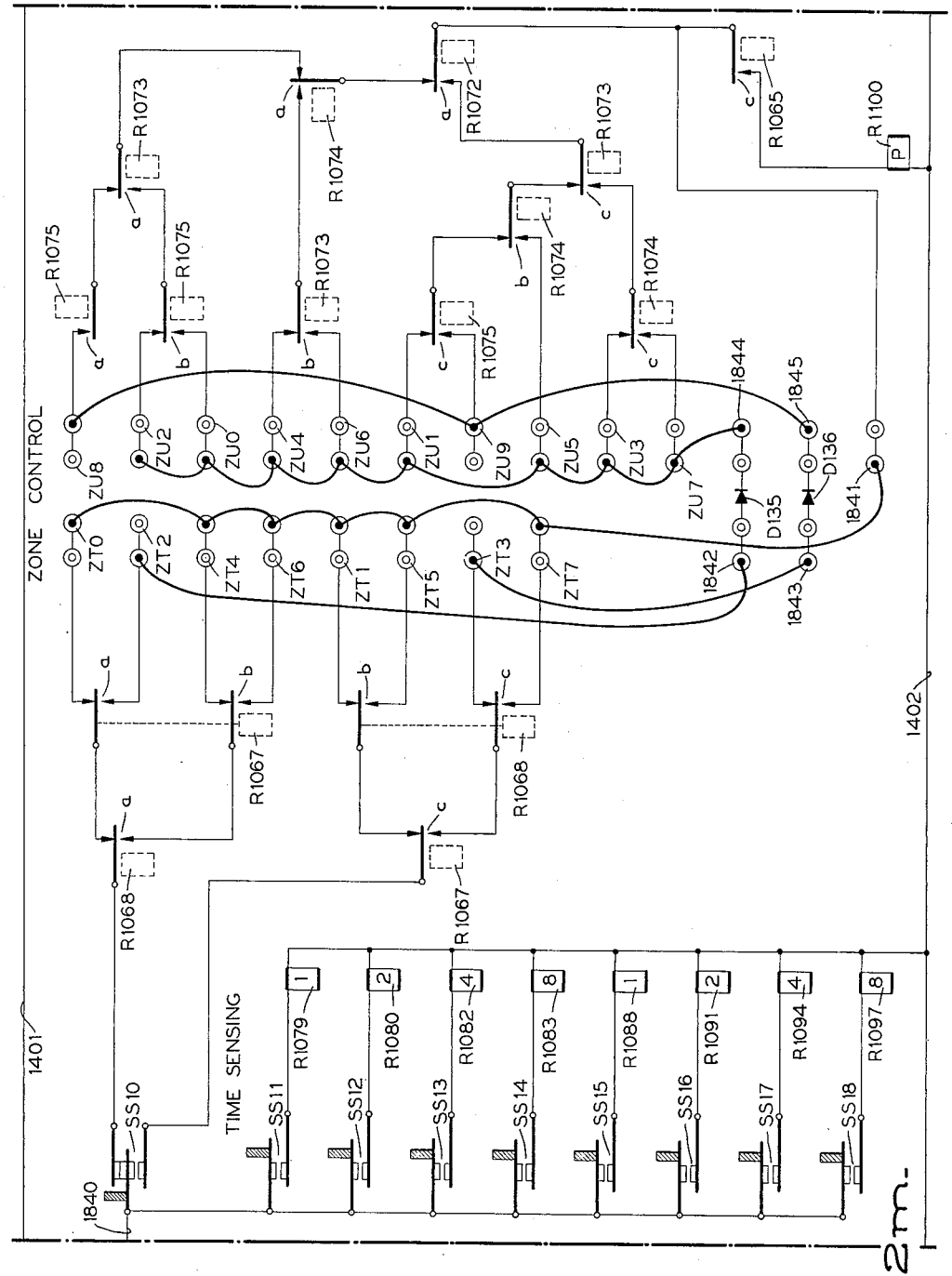

As will be described in detail hereinafter, these circuits which are associated with treadle 39 are employed to control the operation of the zero control counter 46 (FIG. 1), the circuits for which are shown in FIGS. 32j and 32k.

(C3c) *Reverse vehicle motion over axle count treadle.*—When the wheels associated with an axle are moved completely over entrance station treadle 23 in a reverse direction, reverse switch 23b (FIG. 31a) will be closed first, whereby relay R502 will be energized as described hereinbefore. The energization of relay R502, at this time, will result in relay R505 becoming energized when a circuit is completed from line 413 through relay contacts R502c and R504d n/c, relay R505, to line 414. A parallel hold circuit is formed when contacts R505b close. As the axle continues to move in a reverse direction, forward switch 23a will be closed to energize relay R501 during the interim period during which both switches, i.e., switches 23a and 23b, are closed. Thus, a hold circuit for relay R505 will be completed through contacts R501d and R505d prior to the subsequent opening of contacts R502d when relay R502 becomes de-energized as a result of treadle switch 23b opening. Immediately upon the re-energization of relay R502, relay R510 will become energized when a circuit is completed from line 413 through contacts R501c, R505a n/o and R502a, relay R510, to line 44. Hence, when the vehicle moves in a reverse direction a sufficient amount to permit the de-energization of relay R501, a tour-of-duty recorder heavy duty print relay R530 (FIG. 31) will become energized from line 410 through contacts R501f, R502f, R510d and R510e, relay R530, to line 411. As to be described in detail hereinafter, the energization of this relay results in a tour-of-duty recorder print operation. It must be pointed out at this time, however, that during the tour-of-duty recorder print operation, contacts 398N (see FIGS. 22 and 31a) separate so as to open the hold circuit to relay R510, said hold circuit comprising contacts 398N, R510a n/o, and R502a.

If the vehicle reverses its direction once again so as to move in a forward direction, to thereby close reverse switch 23b (FIG. 29a) before forward switch 23a is permitted to open (it is to be remembered that both switches may be closed simultaneously), the energization once again of relay R502 will cause the hold circuit to relay R510 to open, the contacts of which, in turn, will prevent the circuit described previously to relay R530 (FIG. 31c), to form.

In summation, the forward axle counter magnet 390N will be energized once only if the forward treadle switch 23a is closed first, the reverse treadle switch 23b is closed before switch 23a is opened, and the reverse treadle switch 23b is caused to open after the forward treadle switch is opened. On the other hand, a tour-of-duty recorder print operation is effected as a result of a vehicle reverse motion only if the reverse treadle switch 23b is closed first, the forward treadle switch 23a is closed before switch 23b is opened and the forward treadle switch is opened after the reverse treadle switch is opened.

Referring to FIG. 32a, it may be seen that a reverse motion of a vehicle over treadle 39 will cause relay R1502 to pick when contacts 39b are closed. The resulting closure of contacts R1502e will cause relay R1505 to become energized via the aforesaid contacts and contacts R1504a n/c. Continued reverse motion of the vehicle will cause switch 39a to close and treadle switch 39b to open, whereby relay R1501 will become energized. At this time a circuit will be completed to relay R1510 via contacts R1501c, R1505a n/o and R1502a. Immediately upon the energization of relay R1510, a hold circuit will be formed through contacts 398X, R1510a n/o and R1502a.

(C3d) *Forward movement complete relay R201.*—Referring to FIG. 31i, when relays R501 (see also FIG. 31a) and R502 are de-energized after relay R506 has been energized, relay R201 will become energized as a circuit is completed from line 401 through contacts R501b, R502b, and R506b. In response thereto, contacts R201a will close to short circuit the coil winding for relay R201H. This will have the effect of slightly delaying the drop out of relay R201 when contacts R506b open, as a result of the transformer action by the field produced by coil R201H.

*Forward movement complete relay R1201.*—Relay R1201 serves the same purpose in the exit station apparatus that relay R201 serves in the entrance station apparatus. However, inasmuch as the circuits for controlling the two relays are different, that for controlling relay R1201 will now be described in detail.

Referring to FIG. 32n, when the forward motion of a vehicle over treadle 37 causes contacts 37a to close, relay R1291 will be energized. As a result, relay R1294 will be energized via contacts R1291c and R1295a n/c. A continued forward motion of the vehicle will cause contacts 37b to close, whereupon relay R1292 will be energized along with relay R1291. At this time, a still further forward motion of the vehicle will permit contacts 37a to open, to thereby drop out relay R1291. A circuit will now be completed to relay R1296 from line 1401 through contacts R1292c, R1294a n/o and R1291a, relay R1296, to line 1402. In response to the continued forward motion of the vehicle so that contacts 37b will open, to thereby permit relay R1292 to de-energize. A hold circuit to relay R1294 will open and R1296 will continue to remain picked. It is at this time that a circuit is completed to relay R1201P from line 1401 through contacts R1292b, R1291b and R1296b, relay R1201P, to line 1402. The hold coil for relay R1201H is short circuited by contacts R1201a to delay the drop out of the relay when contacts R1296b are caused to open.

(C3e) *Reverse movement relays R242 and R245.*— In a similar manner to that for picking relay R201, when relays R501 and R502 are de-energized after relay R510 has been energized, relays R242 (FIG. 31i) and R245 will be energized through contacts R501b, R502b and R510b.

*Reverse movement relays R1242 and R1245.*—These exit station reverse movement relays, shown in FIG. 32n, are controlled in part by reverse movement lock relay R1297. A reverse motion of a vehicle axle over treadle 37 will cause contacts 37b to close first, to thereby energize relay R1292. The energization of this relay will cause a circuit to be completed to relay R1295 via contacts R1292c and R1294a n/c. A continued reverse motion of the vehicle axle will cause contacts 37a to close prior to contacts 37b opening so that contacts 37a and 37b will be closed for an interim period simultaneously. When relay R1292 is caused to drop out, a circuit will be completed to R1297 from line 1401 through contacts R1291c, R1295a n/o and R1292a, relay R1297, to line 1402. A hold circuit to relay R1297 will be formed immediately through contacts R1239m, R1297a and R1292a. In addition thereto, a circuit will be completed to relays R1242 and R1245 via contacts R1292b, R1291b and R1297b.

(C3f) *First axle storage control-relay R273.*—It may be pointed out here at the outset that relay R273 (FIG. 31i) is caused to be in a de-energized state during the passage of a first vehicle axle over treadle 23 (see also FIG. 31a). As to be explained in detail hereinafter, photo control relay R451 (FIG. 31r) is caused to pick in response to any one of the three photo light beams (see also FIG. 3) being broken. As may be surmised, the photo light beams are always broken a considerable period ahead of a first vehicle axle passing over the treadle inasmuch as vehicles have overhanging bumpers and the like, which are ahead of the first axle wheels. Thus, when relay R201 (FIG. 31i) is picked in the manner aforedescribed, relay R227 will be energized through relay contacts R451a, R273m n/c and R201c n/o. A hold circuit for relay R227 will be formed immediately through contacts R451a and R227a. After relay R506 (see also FIG. 31a) drops out as a result of relay R516 being energized, so as to allow relay R210 to drop out, relay R228LP (FIG. 31i) will be energized when a circuit is completed from line 401 through contacts 451a, R273m n/c, R201c n/c and R227c, relay R228LP, to line 402. As a result thereof, relay R273 will be energized through contacts R242i n/c and R228c. It is necessary in order to understand this operation that relay R273 will become energized prior to a second axle passing over the treadle. It may be added that relay R273 will remain energized so long as the axles relating to one vehicle continues to pass over the treadle. This, of course, is due in part to the operation of photo control relay R451.

When a vehicle passes beyond the treadle, and outside the range of the light beams, the afore-mentioned photo control relay R451 (see also FIG. 31r) will drop out. Thus, relay R227 (FIG. 31i) will be caused to drop out. However, inasmuch as relay R228 is a latch type relay; i.e., a relay which remains picked mechanically after only the LP coil is energized, relay contacts R228c will remain closed and relay R273 will be maintained energized. Consequent upon a second vehicle interrupting the photo light beam, relay R451 will pick once again, and a circuit will be completed to relay R228LT from line 401 through contacts R451a, R273m n/o, R227d and and R228a, relay R228LT, to line 402. This will cause cause relay R228 to drop out, whereby relay R273 will become de-energized when contacts R228c open. It should be clear at this time, that relay R273 will be de-energized prior to the passage of a first vehicle axle over the treadle. It may be stated here, once again, that prior to the passage of subsequent vehicle axles which are associated wtih the vehicle over the treadle, relay R273 will be energized in the manner described previously.

*Relay R1273.*—In response to any one of the three photo light beams being broken, exit station photo control relay R1451 (FIG. 32x) will be energized. Thus, when relay R1201 is energized to signify a complete forward movement of an axle over treadle 37 (see also FIG. 32n), a circuit will be completed to relay R1227 through contacts R1451a, R1273m n/c and R1201c n/o. A hold circuit for relay R1227 will be formed immediately through contacts R1451a and R1227a. Consequently upon the drop out of relay R1201, a circuit will be formed to relay R1228LP through contacts R1451a, R1273m n/c, R1201c n/c and R1227c n/o. This action, in turn, will permit a circuit to be formed to relay R1273 via contacts R1242i n/c and R1228c. Hence, in a pattern similar to that for the entrance station apparatus, relay R1273 will be picked after the first vehicle axle has passed completely over the treadle. Inasmuch as relay R1228 is a latch type relay, and since coil R1228LP has been energized, the said relay will be maintained picked so long as axles being carried by the same vehicle are caused to pass over the treadle. However, when the second vehicle is moved past treadle 37, relay R1451 will be energized once again, whereupon a circuit will be completed to relay R1228LT via contacts R1451a, R1273m n/o, R1227d and R1228a. Hence, relay R1273 will be dropped out when contacts R1228c separate. This means that relay R1273 will be in a deenergized condition during the period that a first axle is moving over the treadle.

(C3g) *Read-in advance control pick relays.*—It will be recalled that relay R201 (FIG. 31i) is picked in response to the passage of an axle over an axle counting treadle. Hence, it may be stated that a voltage will be applied to line 423 as a result of the passage of an axle over the treadle; i.e., due to the transfer of relay contacts R201d so as to connect lines 401 and 423. Assuming that one of the read-in advance control ring relays R211 (see also FIG. 31j) through R224 is picked, relay R211 for example (at least one of these relays must be picked always), a voltage applied to line 423 will be directed to relay R212LP via contacts R224b, R242b n/c, R211c and R245b n/c. It is to be observed that at this time both of the relays R211 and R212 are picked. Relay R211 will drop out when R211LT (see also FIG. 31k) is energized as relay contacts R201b (see also FIG. 31i) return to a normal status as a result of the drop out of relay R201. That is, a circuit to energize relay R211LT (FIG. 31k) will be formed from line 401 (FIG. 31i) through contacts R201b n/c R208c and R208a n/c, line 424 (see also FIG. 31k), contacts R212d, R248a n/c, R211a, R238c and R261c, relay R211LT, to line 402. Thus, as a result of a single axle passing over the treadle, the read-in advance ring circuit will have been advanced one relay position by the picking of relay R212 and the drop out of relay R211. In other words, the read-in advance control ring may be described as having been advanced one step.

In a similar fashion, another axle passing over the treadle 23 (FIG. 31a) will cause a voltage to be applied to relay R214LP (FIG. 31j) through contacts R211b, R242c n/c, R212c and R245c n/c. Relay R212 will drop out in response to the de-energization of relay R201 when a circuit is completed from line 401 (FIG. 31i) through contacts R201b n/c, R208c and R208a n/c, line 424 (see also FIG. 31k), contacts R214d, R248b n/c, R212a, R229c and R252c, relay R212LT, to line 402.

In summation, the read-in advance control ring circuit relays R211 through R224 may be caused to advance a relay position, in a step-by-step fashion, in response to an axle passing over treadle 23 (see also FIGS. 1 and 31a).

*Reverse motion.*—It has just been explained that the read-in advance control ring relays will be advanced a relay position in response to an axle passing over treadle 23. Should the vehicle whose axles have passed over the treadle in a forward direction reverse its motion so that one or more axles will pass over the treadle in a reverse direction, it is necessary that the read-in advance control circuit relays advance a relay position in a reverse direction in response to an axle passing over the treadle.

It will be recalled that relays R242 (FIG. 31i) and R245 are energized simultaneously in response to a vehicle axle passing over the treadle in a reverse direction. As a result, the contacts associated with these relays, and shown in FIG. 31j, will be transferred. If for instance, relay R215 is up prior to the passage of an axle over the treadle in a reverse direction, relay R214LP will be energized consequent upon the reverse axle motion. The circuit to energize relay R214LP will be from line 401 (FIG. 31i) through contacts R201b n/c, R265a, R208a n/o (relay R208 is energized when contacts R242i transfer), and R245m, line 423 (see also FIG. 31j), contacts R217b, R242e n/o R215c and R245e n/o, relay R214LP, to line 402.

Referring once again to FIG. 31i, it may be seen that when contacts R208b close, relay R206P will be energized. The energization of this relay will cause contacts R206c to close, whereby relays R248 and R239 will be energized simultaneously. The energization of relay R248 will cause its contacts shown in FIG. 31k to transfer so that when contacts R214d close in response to the aforedescribed energization of relay R214LP, a circuit will be completed to relay R215LT from line 401 (FIG. 31i), contacts R201b n/c, R208c and R208a n/c, line 424 (see also FIG. 31k), contacts R214d, R248b n/o, R215a (prior to the energization of R215LT, contacts R215a will be closed), R231c and R254c, relay R215LT, to line 402. At this time, inasmuch as relay R214LP (see also FIG. 31j) has been energized and relay R215LT has been energized, only relay R214 will remain picked. Another axle passing over the treadle in a reverse direction will cause the energization of relay R212LP and relay R214LT in a similar manner to that described hereinabove.

In summation, it may be stated that the read-in advance control circuit relay ring which includes relays R211 through R224 is caused to advance a relay position in response to an axle passing over a treadle in a forward direction, and is caused to advance, or to step back, a relay position in a reverse direction in response to a reverse motion axle passing over the treadle.

*Exit station read-in advance control ring.*—By referring to FIG. 32o it may be seen that the pick circuits for control relays R1211LP through R1224LP are similar to those described in connection with the entrance station circuits shown in FIG. 31j. The exit station trip circuits for these relays are shown in FIG. 32p, and an examination thereof will reveal that they are similar to those circuits already described and shown in FIG. 31k. For this reason, it is believed unnecessary to describe the exit station read-in advance control ring circuits any further.

(C3h) *First axle storage pick relays.*—It will be recalled that relay R273 (FIG. 31i) is de-energized during the time that the first vehicle axle is passing over the treadle, and is energized for the period during which all of the remaining axlese per vehicle pass over the treadle. The contacts for relay R273 are shown in FIG. 31j to be connected in parallel circuit with associated read-in advance control relays R211LP through R224LP.

It will be recalled that in the set of conditions cited previously, relay R212LP had been energized due to the first vehicle axle passing over the axle counting treadle. Inasmuch as relay R273 will not be picked at that time, contacts R273a will be separated, and a circuit to relay R229LP will not be formed. However, at the time that voltage is applied to "second axle" relay R214LP so as to energize the same, contacts R273b are closed due to the energization of the controlling relay therefor, so that relay R230LP will be energized. In other words, the first axle storage pick relay corresponding to the first vehicle axle, is not energized, whereas those first axle storage pick relays corresponding to the axles per vehicle other than the first axle, are energized.

The manner in which the first axle storage relay contacts 229d (FIG. 31m) through 238d control the bumper lights (see also FIG. 8) on the indicator panel 352, will be described in detail hereinafter.

*Reverse motion.*—Whenever a vehicle axle is moved over a treadle in a reverse direction, it is necessary that the first axle storage relays be taken care of accordingly. Thus, for example, should a vehicle axle be moved over the treadle in a reverse direction after relay R215LP (FIG. 31j) has been picked, the reverse motion will cause read-in advance control relay R214LP to become energized as described previously. After relay R214LP has been picked, and a voltage has been applied to line 424 (see also FIG. 31i) in the manner described hereinbefore, a circuit will be completed to relay R215LT (FIG. 31k). In addition thereto, a parallel circuit will be formed from contacts R215a (FIG. 31k) and R239c n/o (it will be recalled that relay R239 is picked with relay R248), diode D9, to cable connection 3, cable 823 (see also FIG. 31l), cable connection 3, contacts R231a, relay R231LT, to line 402. It may be seen now that first axle relay R231LP (FIG. 31j) is caused to be energized when relay R215LP is energized, and relay R231LT (FIG. 31l) is energized when relay R215LT (FIG. 31k) is energized. Hence, the first axle storage pick relay ring which comprises relays R229 through R238 is caused to move in step with the read-in advance control relay ring.

Figure 32O:
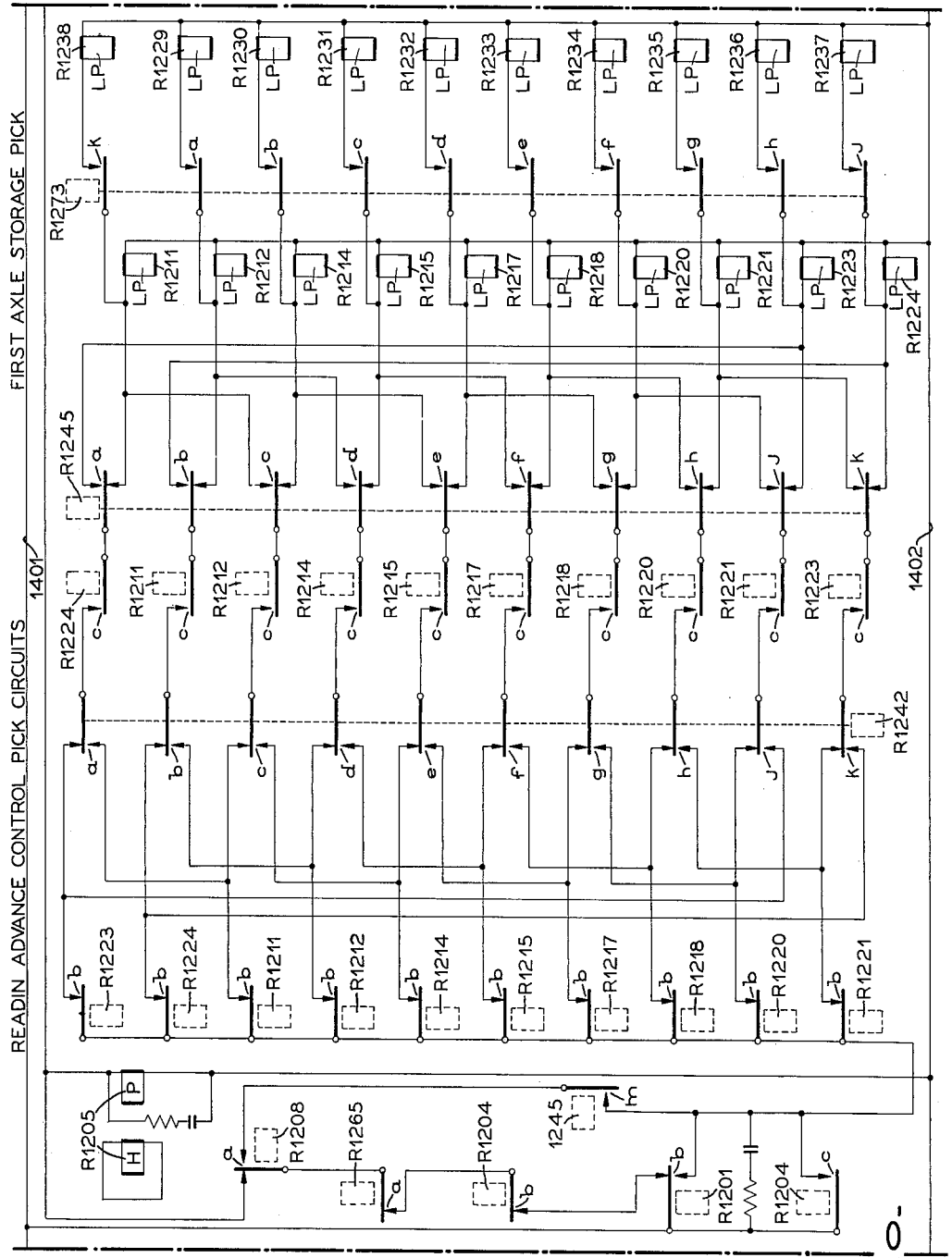
Figure 32P:
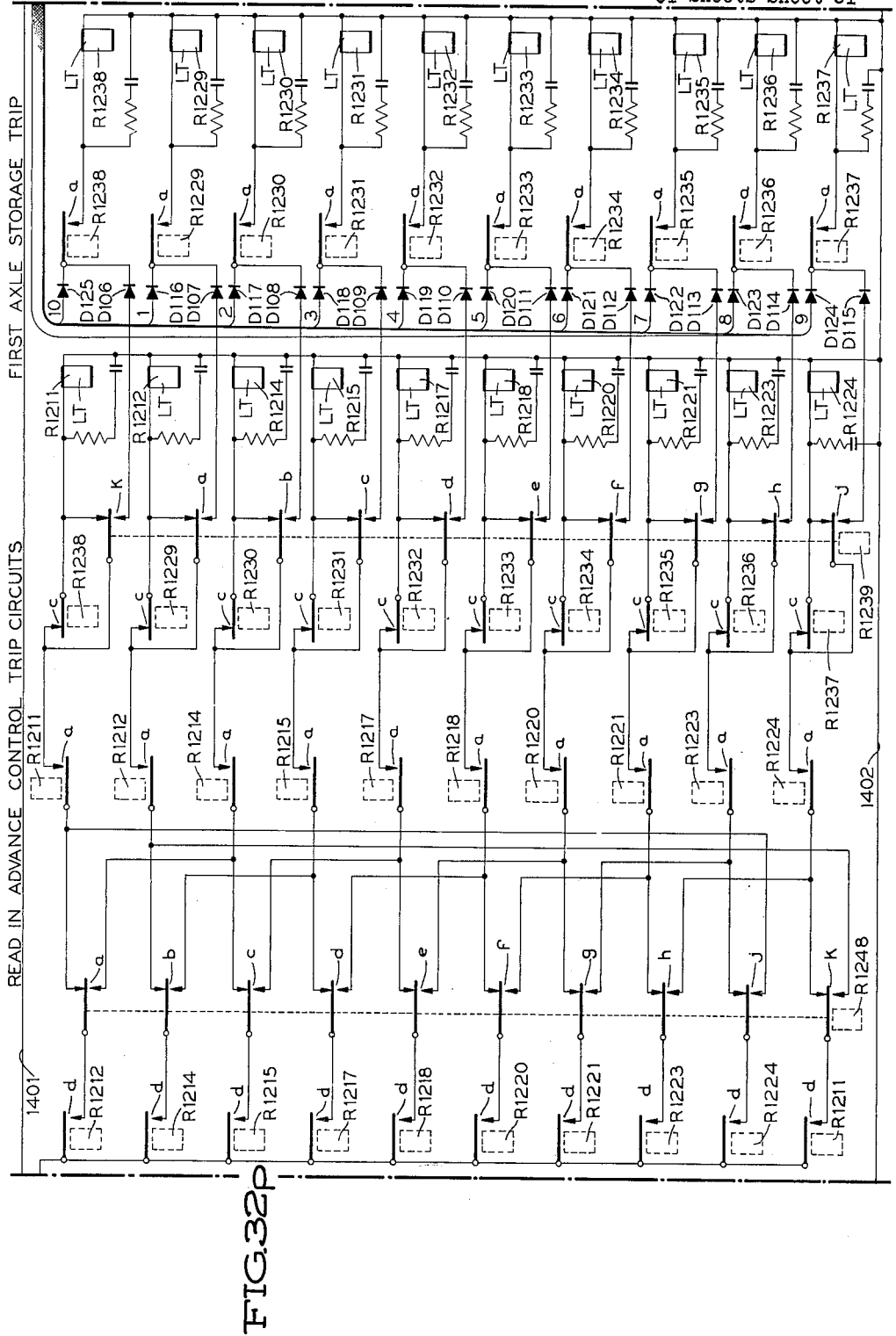

Reference to FIGS. 32o and 32p will show that the first axle storage relay circuits are similar in all respects in the exit station to the first axle storage relay circuits in the entrance station, just described. Thus, after relays R1215LP (FIG. 32o) and R1231LP have been energized simultaneously, should a vehicle be moved in a reverse direction over the axle counting treadle so that relay R1214LP will be energized, a circuit will be subsequently formed to relay R1215LT (FIG. 32p) and to relay R1231LT. This latter circuit will include contacts R1214d, R1248d n/o, R1215a and R1239c n/o, diode D109, contacts R1231a and relay R1231LT.

(C3i) *Weight storage condenser input control.*—Referring to FIG. 31i, it may be seen that relay R205P is normally energized by a circuit from line 401 through contacts R201b n/c, R208c and R208a n/c, relay R205P, to line 402. The hold coil R205H for this relay is short circuited as is shown so as to cause a slight delay in relay pick up and drop out time.

Inasmuch as relay R205 is normally picked, a circuit will be completed to one of the condenser weight storage input control relays such as relay R401 for example, via a circuit from line 401 through contacts R242m, R201h, R205a, R239i and R211e, relay R401, to line 402.

Suffice it to state for the present that the weighing platform load cell circuits shown in FIG. 31p translate the weight of an axle to a corresponding voltage which is applied via lines 424 and 425 (FIG. 31n) and one of a plurality of weight storage condenser input control relay contacts to the weight storage condensers S1 through S10. That is, a voltage indicative of an axle weight will be stored in one of these condensers which is associated with a particular axle passing over the weighing platform.

Figure 32Q:
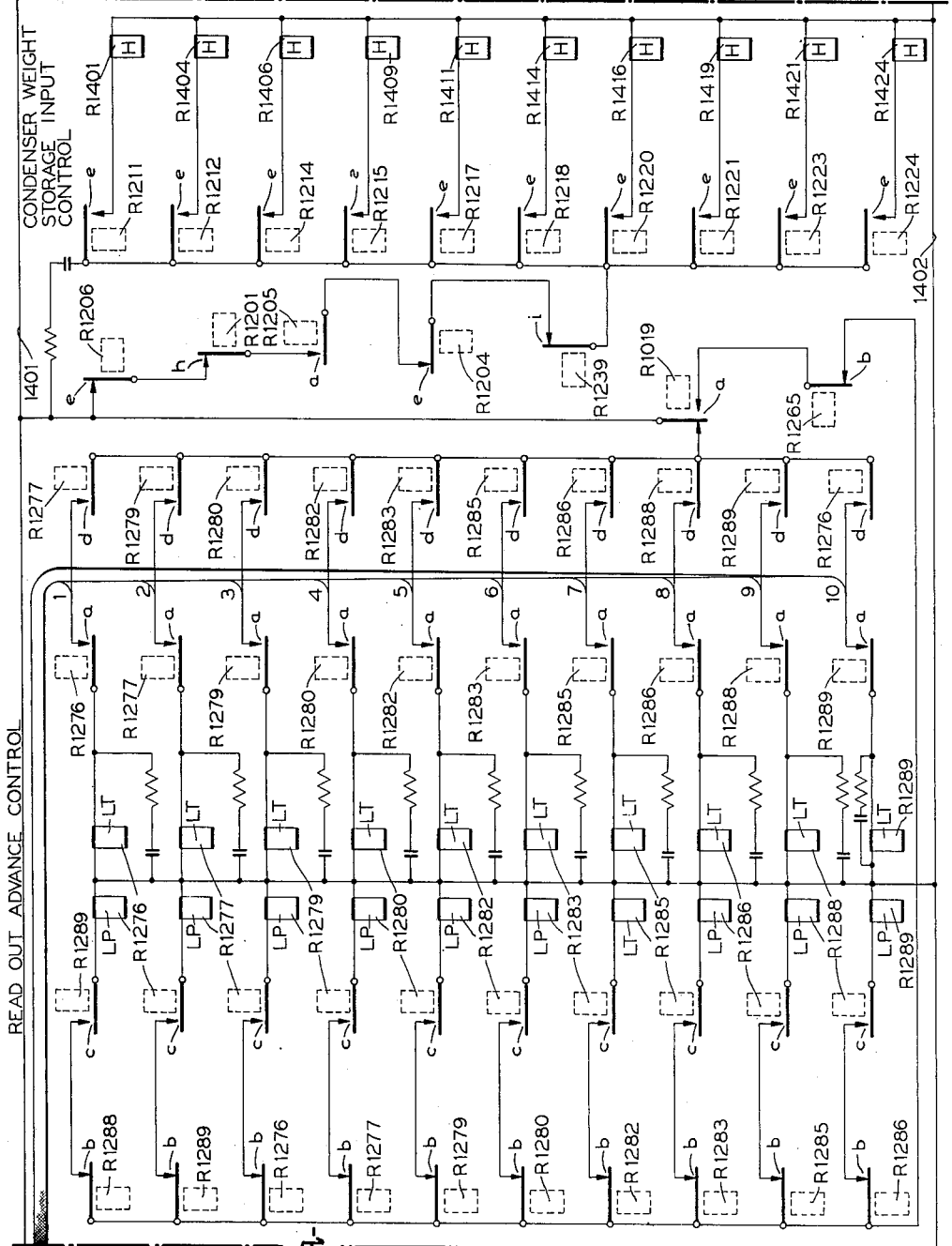

The weight storage condenser input control relays for the exit station apparatus are shown in FIG. 32q. Inasmuch as the circuits shown therein are similar in all respects to the entrance station circuits already described, it is believed that any further explanation is unnecessary. Hence, it may simply be stated that a weight storage condenser input control relay will be picked when a corresponding read-in advance control relay is up, so that an axle weight representing voltage may be applied via a pair of weight storage condenser input control relay contacts to the weight storage condensers S11 through S20 shown in FIG. 32t.

(C3j) *Axle key unit.*—With reference to FIG. 1, it will be recalled that the vehicle 20 which is stopped at entrance station toll booth 21, is examined by the toll collector stationed there, for the number of axles carried by the vehicle. After having made this examination, the toll collector will operate an axle key in an axle key unit 33, so that the number of axles represented by the key depressed will correspond to the number of axles determined by the toll collector to be carried by vehicle 20. Referring once again to FIG. 31d, unit 33 is shown to include a plurality of axle keys which control respective axle key contacts A1 through A6. The said contacts are arranged to control respective relays R4 through R9. In addition thereto, axle unit 33 includes key latch plate contacts 426 which are timed to make slightly after any of the contacts A1 through A6 close, and are timed to break slightly ahead of the time that these contacts separate. This, of course, is so that an axle key will be latched down before the axle key circuit is completed, and so that the contacts 426 absorb the make and break of the circuits.

The key contacts A2, for example, are closed for a two-axle vehicle whereas key contacts A6 are closed to represent a six-axle vehicle. Accordingly, the energization of rela R5 is indicative of a two-axle vehicle, and the energization of relay R9 is representative of a six-axle vehicle.

A comparison of the exit station axle unit shown in FIG. 32d will reveal a similarity to the entrance station unit shown in FIG. 31d. For this reason, it is believed that any additional description relative to the exit station unit is unnecessary.

(C3k) *Readout advance control relays.*—In much the same manner that the read-in advance control ring relays R211 (FIG. 31j) through R224 may be looked upon as a means for distinguishing the read-in information associated with one axle with the read-in information associated with any other axle, the readout advance control ring relays R276 (FIG. 31l) through R289 are used to distinguish the readout information corresponding to any specific axle with the readout information relating to any other axle.

In keeping with the conditions assumed previously, i.e., that read-in advance control relay R211 (FIG. 31j) is picked prior to the first vehicle axle passing over treadle 23 (see also FIGS. 1 and 31a), readout advance control relay R276 (FIG. 31l) may also be assumed to be up. Thus, prior to a first vehicle axle passing over the treadle, the no axles stored relay R265 (FIG. 31m) will be energized to signify that the so-called read-in and readout advance control rings are in step. The no axle storage relay R265 will be energized by a circuit from line 401 through contacts R276e n/o, R211f, R212f n/c, R214f n/c, R215f n/c, R217f n/c, R218f n/c, R220f n/c, R221f n/c, R223f n/c and R224f n/c, relay R265, to line 402. It may be pointed out here that the energization of relay R265 will also indicate, of course, that there are no axle weights stored in the afore-mentioned weight storage condensers shown in FIG. 31n.

It may be observed in FIG. 31m that read-in advance control relay contacts R211f through R224f correspond to readout advance control relay contacts R276e through R289e, respectively, whereby the simultaneous energization of any two corresponding relays will cause the energization of relay R265, to thereby signify that there are no axles stored in the toll recorder system. Assuming, as stated previously, that relays R276 and R211 are picked prior to a first vehicle axle passing over the treadle, relay R276 may be used as a reference point by which the number of axles crossing the treadle may be determined. It will be recalled that the passing of an axle over the treadle will cause the read-in advance control ring relays to become energized successively, or in a step-by-step fashion, so that by comparing the read-in advance control relay which is energized after a vehicle has completely passed over the treadle, with the readout advance control relay energized prior to the first axle thereof passing over the treadle, the number of axles stored in the entrance station apparatus may be determined. To explain this more fully, let it be assumed that a three-axle vehicle has passed over the treadle, and that relays R211 and R276 were picked prior to the time that a first axle of the vehicle moved over the treadle. In the manner described previously, read-in advance control ring relays R212LP (FIG. 31j), R214LP and R215LP will be picked one by one, and in the order given, consequent upon each one of the three axles passing over the treadle. Along with the energization of these latch pick relays, it will be recalled that the read-in advance control latch trip relays R211LT (FIG. 31k), R212LT and R214LT, will be energized in the order named. Thus, after the three-axle vehicle will have completely passed over the treadle, only the read-in advance control relay R215 will remain picked.

Referring once again to FIG. 31m, inasmuch as relay R215 is up, as is readout advance control relay R276 since the readout advance control ring circuit has not as yet been advanced, the no axles stored relay R265 will be de-energized, to thereby indicate that the weight storage condensers have stored therein the weight of one or more axles; in this instance, three axle weights.

As the description advances, it will become clear that the read-in advance control ring can never get behind the readout advance control ring, nor can the readout advance control ring ever get ahead of the read-in advance control ring. The latter statement has application particularly to the situation wherein the vehicle axles are moved in a reverse direction over the treadle.

It will be sufficient for the present to state that relay R19 (FIG. 31b) is energized and de-energized once during a toll recorder cycle for each axle represented by the axle key operated by the toll collector. Relay R19 may appropriately be termed the readout advance control ring relay inasmuch as the contacts R19a (FIG. 31l) are arranged between the main toll recorder line 401 and the readout advance control latch trip relays R276LT through R289LT.

In keeping with the assumption that relay R276 was picked prior to the three-axle vehicle passing over the treadle, relay R277LP will be energized during the time that relay R19 is operated for the first time. The circuit to energize relay R277LP will be formed from line 401 through contacts R19a, n/o, R265b, R289b and R276c, relay R277LP, to line 402. Consequent upon the de-energization of relay R19, a circuit will be formed to relay R276LT through contacts R19a n/c, R277d and R276a. Hence, in response to the energization and de-energization of relay R19, the readout advance control ring will have been advanced one relay position; that is, from relay R276 to R277. In a similar fashion, during the second operation of relay R19, relays R279LP and R277LT will be energized, whereas during the third operation of relay R19, relays R280LP and R279LT will be energized.

Immediately upon the energization of relay R279LT, the no axle stored relay R265 (FIG. 31m) will be energized when a circuit is completed from line 401 through contacts R276e n/c, R277e n/c, R279e n/c, R280e n/o, R215f n/o, R217f n/c, R218f n/c, R220f n/c, R221f n/c, R223f n/c and R224f n/c, relay R265, to line 402. Hence, once again it may be stated that the read-in and readout advance control rings are in step.

(C3l) *First axle storage trip relays.*—It should be clear at this time that when the readout advance control ring is advanced during a toll recorder operation, it will be necessary to clear out the information represented by the first axle storage relays. A circuit for accomplishing this is shown in FIG. 31l. When a circuit is completed from line 401 through contacts R19a n/c, R277d and R276a to energize relay R276LT, a parallel circuit will also be formed to energize first axle storage relay R229LT from line 401 through contacts R19a n/c and R277d, diode D16, contacts R229a, relay R229LT to line 402. In a similar fashion, when the circuit is completed to energize relay R277LT, a parallel circuit will be formed via diode D17 to energize relay R230LT. In other words, the latch trip coils of the first axle storage relays are energized in step with the advancement of the readout advance control ring.

An examination of the readout advance control ring shown in FIG. 32q will reveal the similarity thereof to the entrance station readout advance ring. Also, the control for the first axle storage latch trip coils (see also FIG. 32p) is similar to the circuits for the entrance station first axle storage latch trip relays. For this reason, and to avoid undue prolixity, a detailed description of the exit station circuits is deemed unnecessary.

(C3m) *Readout storage relays.*—As is shown in FIG. 31m, one of the readout storage relays, relay R301 for example, will be energized when a corresponding readout advance control relay, relay R276 for example, is picked. Accordingly, readout storage relay R304 will be energized when relay R277 is up, and relay R307 will be energized when relay R279 is picked, etc.

Figure 32R:
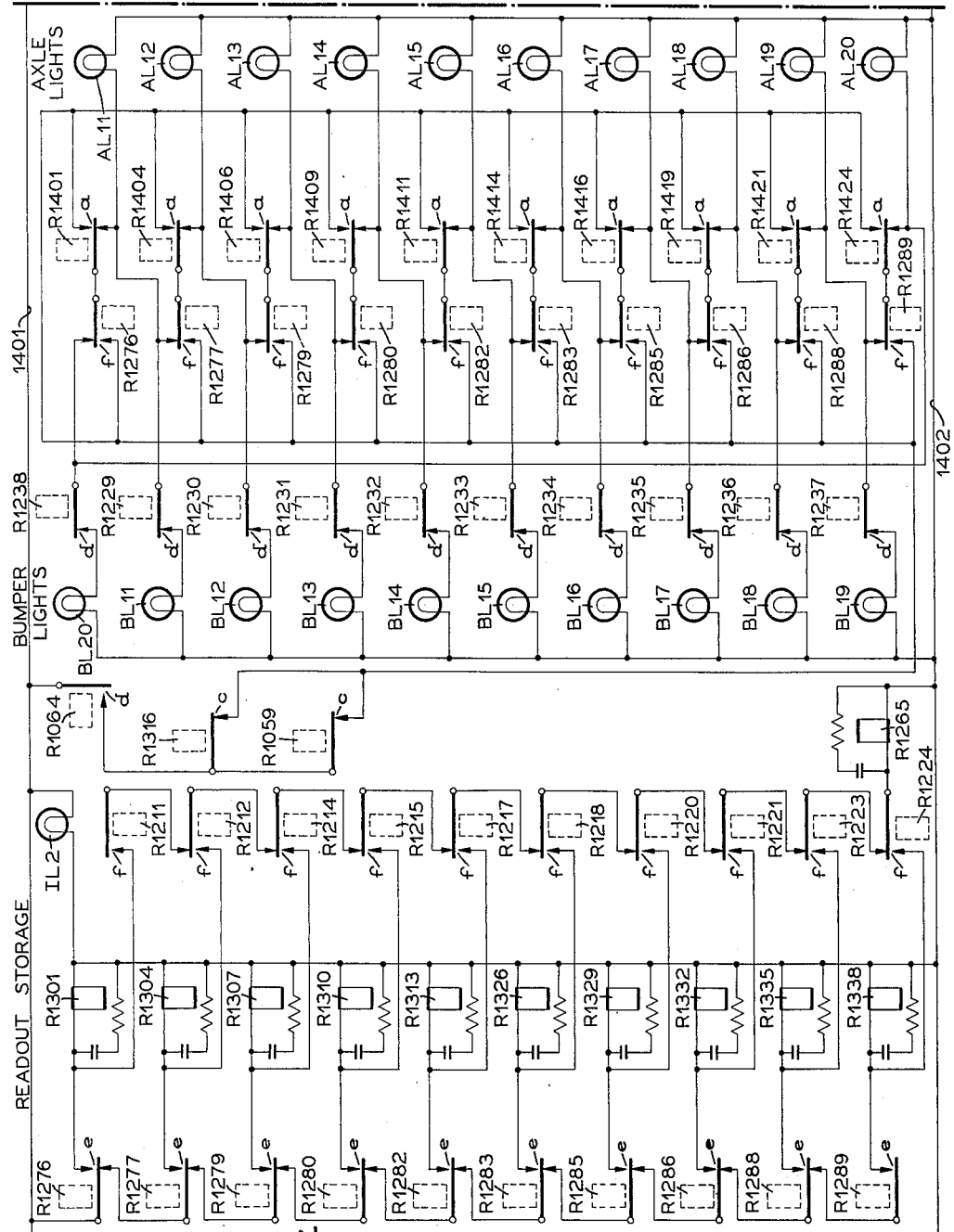
Figure 32U:
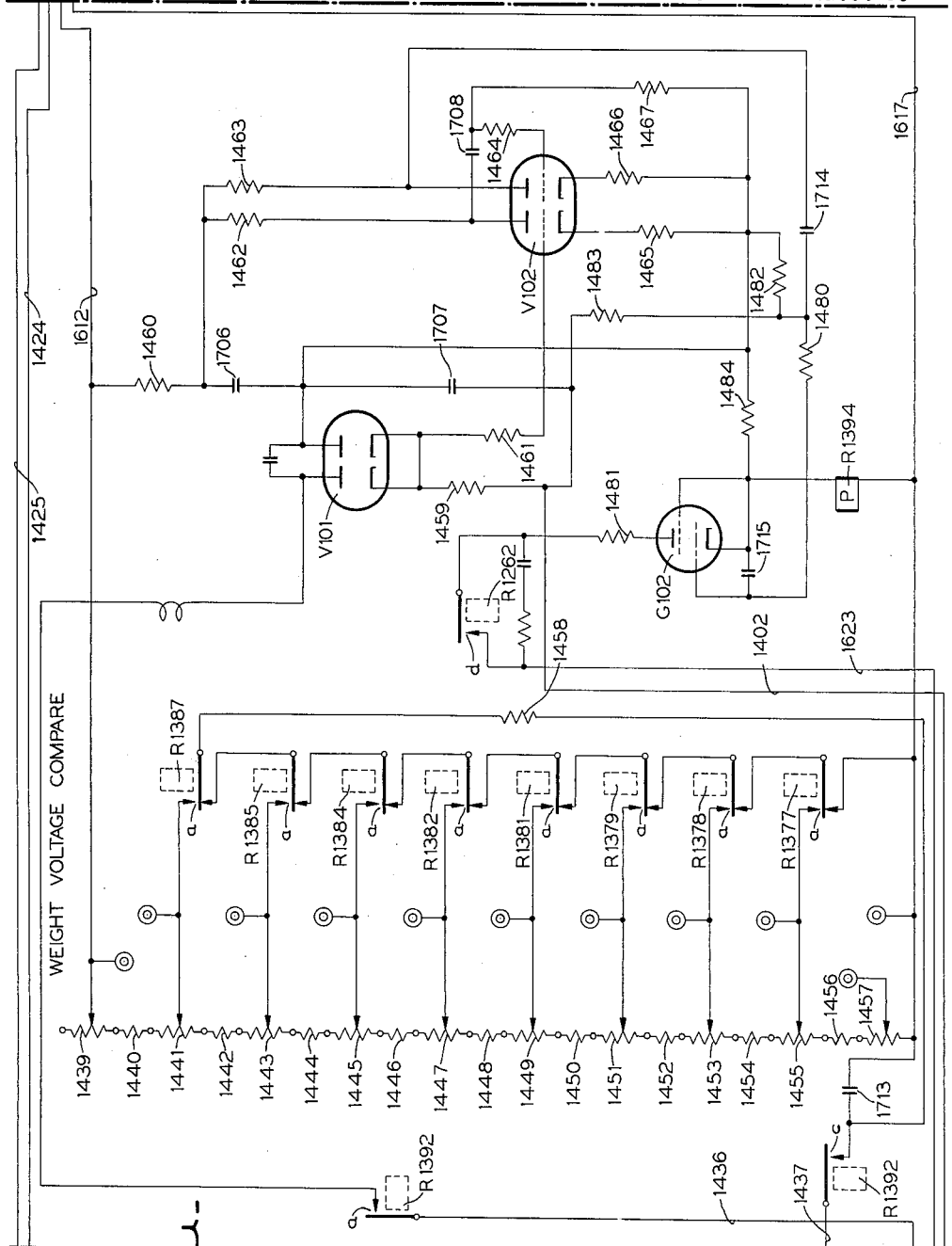
Figure 32:
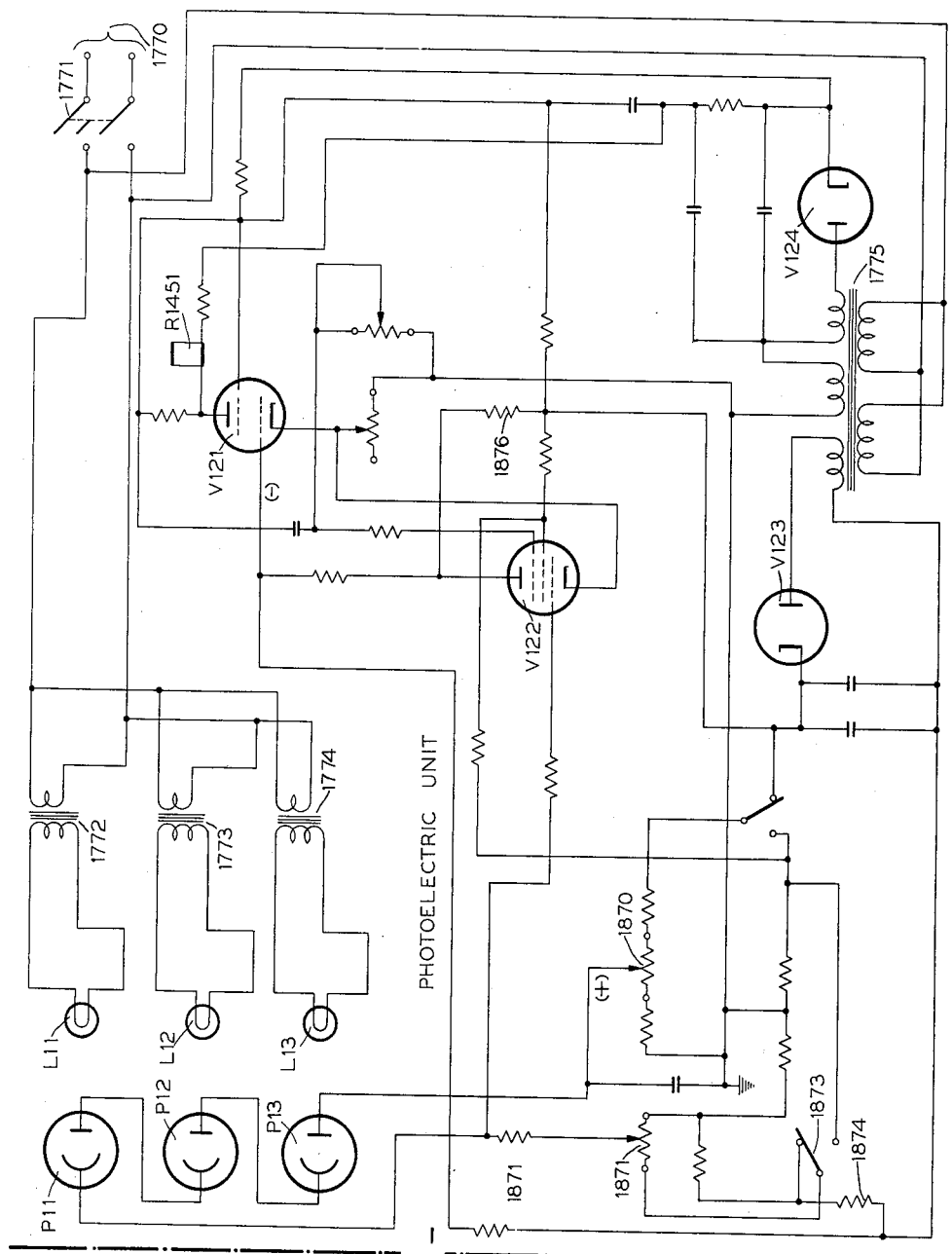

The exit station apparatus readout storage relays R1301 through R1338 are shown in FIG. 32r, and the control therefor is similar to that for the entrance station relays described above.

(C3n) *Axles per vehicle check relay R316.*—In carrying on with the conditions assumed previously, as the first axle of the three-axle vehicle passes over the treadle, first axle storage relay R229LP (FIG. 31j) will be energized along with read-in advance control relay R212LP. The circuits for energizing these relays have been described hereinbefore and, it is believed, need not be explained once again at this time. It will be recalled, however, that only the first axle storage relay which corresponds with the first axle of a vehicle, is picked. The relays which correspond to the other axles of the vehicle are not picked because of the de-energization of relay R273.

It will be recalled, too, that prior to the vehicle passing over the treadle, readout storage relay R301 (FIG. 31m) will be picked inasmuch as readout advance control relay R276 (FIG. 31l) is up. Referring once again to FIG. 31g, if at the time the three-axle vehicle mentioned previously is opposite toll booth 21 (see also FIG. 1) the toll collector will operate the three-axle key A3 (see also FIG. 31d), to thereby energize relay R6 from line 401 through contacts 426 and A3, relay R6, to line 402. Hence, a circuit will be completed to relay R316P (FIG. 31g) from line 401 (FIG. 31e), cam contacts C1, line 427 (see also FIG. 31g), contacts R6b, R301h, R232b n/c, R231b n/o, R230b n/o and R301m, relay R316P, to line 402. It is necessary to point out at this time that each of the first axle storage relays R230 and R231 will be picked due to the second and third axles, respectively, corresponding thereto that passed over the treadle.

An examination of the circuit network shown in FIG. 31g will reveal that had the two-axle key in unit 33 (see also FIG. 1) been depressed by the toll collector so as to energize relay R5, a circuit would have been completed through contacts R5b and R301g to R231b. The circuit to relay R316P would have been open at this point, i.e., contacts R231b, inasmuch as these contacts would have been transferred as a result of the second axle of the vehicle passing over the treadle. On the other hand, had only a two-axle vehicle passed over the treadle, the operation of the three-axle key to energize relay R6 would not have caused a circuit to relay R316P to be completed. It may be seen in FIG. 31g that a partial circuit would have been formed from line 427 through contacts R6b, R301h and R232b n/c. Relay contacts R231b would not at this time be transferred due to the absence of a third vehicle axle. The first axle of the two-axle vehicle would have caused relay R229 to indicate a first axle storage, and the second axle would have caused relay R230 to pick to indicate a second axle storage.

The relay R316H hold circuit includes contacts C1 (FIG. 31e), 155N, R26d, R317g n/c, R64a and R226c, line 855 (see also FIG. 31g), contacts R316d, relay R316H, to line 402.

In summation, it may be stated that relay R316P will be energized when a circuit is completed through the axles per vehicle check circuit network shown in FIG. 31g, only if the axle count and axle per vehicle grouping determined automatically, matches the axle per vehicle count indicated by a manual operation of the toll collector's axle key.

The exit station axles per vehicle check circuit network shown in FIG. 32g is quite similar to that for the entrance station already described. For this reason, the exit station apparatus will be described only briefly. Assuming that the exit station toll collector operates a three-axle key so as to energize relay R1006 (see also FIG. 32d), and assuming that first axle storage relays R1229, R1230 and R1231 correspond to the first through third, respectively, vehicle axles, a circuit will be completed to energize relay R1316P from line 1401 (FIG. 32f) through contacts C101, R1065d and R1006c, cable 1824 (see also FIG. 32g), contacts R1301h (it is assumed that readout storage relay R1301 is picked in accordance with the conditions prevailing in the entrance station), R1232b n/c, R1231b n/o, R1230b n/o and R1301m, relay R1316P, to line 1402. In much the same manner as described hereinabove for the entrance station axles per vehicle check circuit network, should an incorrect axles per vehicle key be depressed by the toll collector or should there by an incorrect automatic axle count or axles per vehicle grouping, the check relay R1316 will not be picked.

(C3o) *Weight storage condenser output control relays.*—These control relays, such as relay R426 for example, are shown in FIG. 31h, and are for the purpose of combining the weight storage condensers associated with the axles of a single vehicle so that the combined condenser voltages will represent the total weight of the vehicle. To clarify this point, it will be recalled that each of the weight storage condensers S1 (FIG. 31n) through S10 has stored therein a voltage which corresponds to an axle weight of a relating vehicle axle passing over the treadle. Inasmuch as it is necessary for dynamic weight classifying to have available the total vehicle weight, which is actually represented by the combined weights of the individual axles, electric circuit means are provided to arrange in proper combination those condensers that have stored therein the voltages which correspond to the axle weights associated with the axles per single vehicle.

In keeping with the conditions assumed throughout this description thus far, it will be recalled that the first axle weight of the three-axle vehicle passing over the treadle was stored in condenser S1 (FIG. 31n) because weight storage condenser input relay 401 was energized while the first axle moved over the weighing platform. The respective weights of the second and third axles of the vehicle were stored in condensers S2 and S3 under control of weight storage condenser input relays R404 and R406. It should be clear then that by connecting condensers S1 through S3 in series circuit, the combined voltages thereof will represent the total weight of the three-axle vehicle.

Referring to FIG. 31h, after the overweight axle interlock relay test for relay R317, to be described hereinafter, has been made, start classify No. 1 relay R262 (see also FIG. 31e) may become energized, to thereby transfer its contacts R262a through R262k. The energization of this relay, along with the energization of the three-axle key relay R6, will close three circuits, one to each of the relays R426, R429 and R431. In particular, relay R426 will be energized through contacts R6e n/o, R5d n/c, R4b n/c, R301a and R262a n/o; relay R429 will be energized through contacts R6e n/o, R5d n/c, R301b and R262b; and relay R431 will be energized via contacts R6e n/o, R301c and R262c n/o. As will be explained shortly, the energization of these relays will group the three condensers each of which has stored therein the individual axle weights corresponding to each of the axles of the single three-axle vehicle, whereby the total vehicle weight will be available. It may be observed at this time that one of the reasons why the vehicle axle count must be accurate, is that the control of the condenser weight storage output relays is, in part, determined by the axle count. For example, if a two-axle key is operated by the toll collector for a three-axle vehicle, to thereby energize relay R5 and cause contacts R5d (FIG. 31h) to transfer, only storage output control relays R426 and R429 will be energized. This, as may be seen, will group only the first two-axle weight storage condensers and will omit the third-axle weight storage condenser. Hence, an inaccurate and underweight total vehicle weight value will result. If, on the other hand, the four-axle key is operated by the toll collector so as to cause contacts R7d to transfer, storage output control relays R426, R429, R431 and R434 will become energized, whereby condensers S1 (see also FIG. 31n) through S4 will be grouped to provide an inaccurate and overweight vehicle weight value. This, of course, is for the reason that condenser S4 would more than likely have stored therein a voltage corresponding to the first axle weight of the next following vehicle after the three-axle vehicle that has been cited thus far for illustrative purposes.

The exit station condenser weight storage output control relays are shown in FIG. 32h. If, for example, a three-axle key within axle key unit 49 (see also FIG. 1) is operated for a three-axle vehicle, and if readout storage relay R1301 is assumed picked prior to the toll recorder operation, a circuit will be completed from line 1401 (FIG. 32i), contacts R1394a, R1319d, R1262b, R1006f n/o, R1005e n/c, R1004c n/c and R1301a (FIG. 32h), relay R1426, to line 1402. Another circuit will be completed from contacts R1005e n/c (FIG. 32i) and R1301b (FIG. 32h) to relay R1429, whereas a third circuit will be completed from contacts R1006f n/o (FIG. 32i) and R1301c (FIG. 32h) to relay R1431. In other words, relays R1426, R1429 and R1431 will be energized simultaneously so as to provide a voltage which will represent the total vehicle weight. As mentioned in connection with the entrance station apparatus, should an incorrect axle key be operated, too few or too many weight storage condenser output control relays will be energized, whereby an incorrect total vehicle weight voltage value will result.

(C3p) *Weight storage condenser readout-total vehicle weight.*—Referring now to FIG. 31n, consequent upon the energization of entrance station weight storage condenser output control relays R426, R429 and R431 for the conditions assumed hereinbefore, the condensers S1 through S3 will be connected in series circuit across lines 436 and 437 via the circuit formed from line 437 through condenser output control contacts R449e and R426c, line 438, condenser S1, contacts R401e n/c, R404b n/c and R429d n/o, condenser S2, contacts R404e n/c, R406b n/c and R431d n/o, condenser S3, contacts R406e n/c, R409b n/o, to line 436. Thus, condensers S1, S2 and S3 will be connected in series circuit and the combined axle weight representing voltages thereof will be available at lines 436 and 437.

Inasmuch as the foregoing circuit included contacts R409b n/o, it must be assumed that a next following vehicle has not as yet caused an axle to pass over the treadle and weighing platform. This, of course, is for the reason that the first axle of a next following vehicle would have caused relay R409 (FIG. 31i) to drop out due to the separation of read-in advance control relay contacts R215e. In the event such a second vehicle axle has passed over the treadle, whereby relay contacts R409b are caused to be normal, the combined voltages of condensers S1 through S3 will nevertheless be placed across lines 436 and 437 through contacts R409b n/c (FIG. 31n) and R434d n/c. Relay R434 (FIG. 31h) will not be picked so long as the three-axle key for the three-axle vehicle is depressed in order to energize relay R6.

Inasmuch as the exit station weight storage condenser readout network shown in FIG. 32t is similar to the entrance station readout network shown in FIG. 31n, the exit station circuit will be described only briefly herein. It will be recalled that storage output control relays R1426, R1429 and R1431 were energized as a result of the three-axle vehicle passing through the exit station. As a result thereof, the axle weight representing voltages stored in condensers S11 through S13 will be combined and placed across output lines 1436 and 1437 via a circuit formed from line 1437 through contacts 1449e and 1426c, line 1438, condenser S11, contacts R1401e n/c, R1404b n/c and R1429d n/o, condenser S12, contacts R1404e n/c, R1406b n/c and R1431d n/o, condenser S13, contacts R1406e n/c, R1409b n/c and R1434d, to line 1436. In the event that relay R1409 is energized so that contacts R1409b are transferred, the series circuit voltages of condensers S11 through S13 will nevertheless be placed across lines 1436 and 1437 as is shown.

(C3q) *Vehicle classifying.*—As vehicles approach the toll booths, there is an automatic weighing of vehicles in motion, i.e., a dynamic weighing. The application of dynamic weight classifying for toll highway operations requires the setting up of vehicle classifications by weight. In the preferred embodiment of this invention, nine classes appear to permit ample flexibility for setting classes within variable weight groups.

Briefly, the operation of the present invention whereby a vehicle is classified, includes means for comparing the total vehicle weight with a weight standard for a given class. It may be more accurately stated that the voltage which represents the total vehicle weight is compared in a step-by-step fashion with different voltage standards each of which represents a vehicle class.

*Weight voltage compare circuit.*—As is shown in FIG. 31o, the primary winding of transformer 620 is connected to power source 618 when the switch 619 is closed, to thereby cause an alternating current supply to be applied to the secondary transformer lines 621 and 622. As will be described in detail shortly, the classifying ripple circuit which includes coils R376LP through R390LP and R376LT through R390LT, is controlled so that a latch pick relay, for example R377LP, is energized during the period that line 622 is positive, and a latch trip relay, for example, relay R377LT is energized during the period that line 621 is positive.

Diode D28 is connected between lines 622 and 623 so that a positive voltage is applied to the plate of vacuum tube V5 (see also FIG. 31p) whenever line 622 goes positive. Line 621, on the other hand, is connected between diodes D26 and D27 which channel the ripple circuit current so that the latch pick relays are energized during the positive one-half of a sine wave, and the latch trip relays are energized during the other, or negative, half of the sine wave.

The classifying compare circuit, shown in FIG. 31o, includes the following resistors:

| Resistor: | Value in ohms |
|---|---|
| 439 | 3000 or 3K |
| 440 | 5K |
| 441 | 2K |
| 442 | 2.5K |
| 443 | 1.5K |
| 444 | 2.25K |
| 445 | 1K |
| 446 | 1.25K |
| 447 | 1K |
| 448 | 1K |
| 449 | 2.5K |
| 450 | 0.5K |
| 451 | 0.75K |
| 452 | 0.3K |
| 453 | 0.5K |
| 454 | 0.2K |
| 455 | 0.5K |
| 456 | 1.25K |
| 457 | 0.25K |
| 745 | 2.5K |
| 458 | 3.5K |
| 833 | 1.5K |

A +250 volt potential is directed from a power supply 786 (see also FIG. 29) to be described in detail hereinafter, along line 612 to the classifying compare circuit. The resistance values selected are such that the potentails available at each of the contatcs R376a (FIG. 31o) through R388a are 0, +18.4, +24.6, +34, +47.4, +69.2, +93.2, +125.4, +168.4 and +250, respectively, to correspond with zero and 1 through 9 classes. Should it be desired to classify vehicles on a different weight per class basis, the voltages available as a comparison standard simply need be changed.

*Ripple circuit.*—When start classify No. 2 relay R392 (FIG. 31f) is energized, start classify No. 3 relay R391 will be picked through a circuit including line 622 (FIG. 31o), contacts 394f n/c and R392f, relay R391LP, diode D27, to line 621. Of course, inasmuch as relay R391 is a latch pick relay, the relay will remain picked mechanically until the latch trip coil thereof, R391LT, is energized.

During the time that line 622 is positive, immediately after relay R391 is caused to pick, a circuit will be completed to relay R376LP from line 622 through contacts R390d, R388c n/c and R391b, relay R376LP, contacts R394e, diode D26, to line 621. It must be pointed out here that relay R390 is the ripple circuit reset relay, and as will be described shortly, relay R390 is always picked after a classification determination when the classify ripple circuit is reset. Hence, relay R390 will always be up at the start of a new classification operation.

During the following 180° of the alternating current sine wave, i.e., during the period that line 621 is positive, relay R390LT will be energized from line 621 through diode D27, relay R390LT, contacts R390c n/o and R376d, to line 622. During the next 180° of the sine wave when line 622 goes positive, relay R377LP will be energized from line 622 through contacts R376d and R390c n/c, relay R377LP, contacts R394e, diode D26, to line 621.

When line 621 goes positive once again, a circuit will be completed from line 621 through diode D27, relay R376LT, contacts R376c n/o and R377d, to line 622. In similar fashion, during each half of a sine wave as the lines 621 and 622 go positive alternately, the ripple circuit relays may be energized in a sequence which will continue with relays R378LP, R377LT, R379LP, R378LT, R381LP, R379LT, etc.

In short, the classifying ripple circuit described hereinabove is essentially a timing ring wherein the latch pick coils are energized during the periods that line 622 goes positive, and the latch trip coils are energized during the periods that line 621 goes positive.

It may be stated here that were it not for end classify relay contacts R394e (FIG. 31o), the ripple circuit relay timing ring would continue to advance continuously in a closed loop. However, as will now be described, end classify relay contacts R394e are caused to open when the classification of the vehicle has been automatically determined on the basis of dynamic weighing as a result of a comparison between the vehicle weight representing voltage and the voltage standard available at the classifying compare circuit resistors 439 through 457.

*End classify relay R394.*—The left plate of vacuum tube V1, preferably a 5726 type tube, shown in FIG. 31o is connected through a 2.5 millihenry choke to relay contacts R392a, where as the right plate of the said tube is connected to ground via line 617 (see also FIG. 31p). The two plates are connected by a .002 microfarad filter condenser. The two cathodes of vacuum tube V1 are interconnected at one end of 2.7 megohm resistor 459 and 1 megohm resistor 461. The other end of resistor 459 is connected to 0.25 microfarad condenser 707 which, in turn, is connected to a 10 microfarad condenser 706. The latter condenser is connected to +250 volt line 612 via 10,000 ohm resistor 460. The other end of resistor 461 is connected to the left control grid of vacuum tube V2, preferably a type 5751 tube, and the right control grid of this tube is connected to 1,000 ohm resistor 464 which, in turn, is connected to the common junction of .02 microfarad condenser 708 and 1 megohm resistor 467. The right plate of vacuum tube V2 is connected to a point between 470K resistor 463 and a 0.01 microfarad condenser 714 (see also FIG. 31p). The other end of resistor 463 is connected to one end of resistor 460 and one end of 470K ohm resistor 462. This latter resistor is connected to the left plate of vacuum tube V2, and one end of condenser 708. A 1 megohm resistor 467 is connected between ground and one end of condenser 708. The screen and cathode of gas tube G2 (FIG. 31p) are innerconnected at a point common to relay R394P, the other side of which is connected to line 624. The cathode of the gas tube, preferably a 2D21 type tube, is connected to a 2.7K ohm resistor 484 and a 25 micro-microfarad condenser 715. The other end of this condenser is connected to the control grid of the tube and to one end of 470K resistor 480. The other end of this resistor is connected to a pair of resistors 482 and 483 each of which has a value of 470K ohms. The plate of the tube is connected through a resistor 481 to contacts R262m.

As the ripple circuit ring which includes relays R376

(FIG. 31o) through R390 advances relay-by-relay in a step-by-step fashion so as to cause a comparison of a different voltage standard with the voltage which represents the total vehicle weight, circuits are formed whereby a resultant comparison voltage impulse is applied to the left plate of vacuum tube V1. For example, after relay R376LP is energized, a circuit will be completed from line 437 through contacts R392c, resistor 458, contacts R388a n/c, R387a n/c, R385a n/c, R384a n/c, R382a n/c, R381a n/c, R379a n/c, R378a n/c, R377a n/c and R376a n/o, resistors 457 through 439, to the +250 volt line 612. It will be recalled that the total vehicle weight voltage appears across lines 436 and 437 because, it will be recalled, this weight voltage actually is the sum of the voltages stored in the individual axle weight condensers which have been combined on an axle per vehicle basis. In order for the comparison circuit to function properly, the polarity of the total vehicle weight voltage must be positive along line 437 and negative along line 436. Hence, so long as the standard comparison voltage picked off any of the resistors 439 through 457 is of a lower magnitude than the total weight voltage stored in the combined axles per vehicle condensers (see also FIG. 31n), a negative voltage will be applied to the left plate of a vacuum tube V1. However, as soon as a ripple circuit relay, such as relay R385LP for example, is energized, to cause a positive voltage to be applied to the left plate of vacuum tube V1, end classify relay R394P (FIG. 31p) will be picked. In particular, if it is assumed that relay R385 has just been picked, a circuit will be completed to the left plate of vacuum tube V1 from +250 volt line 612 through resistors 439 through 443, contacts R385a n/o, R387a n/c, and R388a n/c, resistor 485, contacts R392c, line 437 (see also FIG. 31n), the total vehicle weight storage condensers, line 436 (see also FIG. 31o), and contacts R392a. Inasmuch as the standard voltage is greater than the stored voltage, this will cause the left half of tube V1 to conduct, whereby the cathodes will go positive, and above ground potential. Inasmuch as the right plate of tube V1 is connected to ground via line 617, that portion of the tube will stop conducting and a positive pulse will appear at the control grid of the left triode of vacuum V2. This will cause a negative pulse to appear on the right grid of the tube V2, whereby a pulse sufficiently higher than the cathode potential will be directed to the control grid of gas tube G2 (FIG. 31p). As a result thereof, the gas tube will fire, and when the cathode potential thereof is increased, relay R394P will be energized. It is to be observed that although the plate of gas tube G2 is connected to line 623 which, in turn, is connected to line 622 (FIG. 31o) via diode D28, the gas tube can fire even when the line 622 goes negative, due to the charge remaining in condenser 712. To clarify this operation, assume for instance that after relay R385LP (FIG. 31o) has been energized, end classify relay R394P (see also FIG. 31p) will be energized. The ripple circuit arrangement is such that even after relay R394 has been energized, when line 621 goes positive, relay R384LT will be energized via contacts R384c n/o and R385d. However, during the following half cycle when line 622 goes positive, contacts 394e will be separated to prevent a circuit from being formed to any of the ripple relay latch pick coils. Thus, only ripple circuit relay R385 will remain picked.

The hold circuit for relay R394 is shown in FIG. 31f to include line 435, contacts R394d, relay R394H, and line 402. In the event that the ripple circuit, during a single operation thereof, advances to a point at which relay R390 (see also FIG. 31o) is picked, the advancement will be stopped consequent upon contacts R388e and R390e forming a circuit to relay R394H.

*Ripple circuit reset.*—During a toll recorder operation which will be described in detail hereinafter, start classify No. 2 relay contacts R392a (FIG. 31o) are caused to separate, to thereby remove the positive potential applied to the left plate of vacuum tube V1. In addition thereto, the hold circuit to end classify relay R394H (FIG. 31f) will be opened when cam contacts C1 (see also FIG. 31e) separate. As a result, relay R394 will drop out and contacts R394e (FIG. 31o) will close, whereupon the classification ripple circuit will continue from the last relay point reached during the classification operation. Assuming that the last ripple circuit relay picked was R385, consequent upon the de-energization of end classify relay R394, the ripple circuit timing ring would advance from relay R387LP, R385LT, R388LP, R387LT, R390LP and R388LT. It may be seen that relay R376LP cannot be energized at this time because start classify No. 3 relay contacts R391b are separated. Inasmuch as relay R376 cannot be picked, relay R390LT cannot be energized because contacts R376d are sepaarted. As a result, the ripple circuit timing ring will be reset to a position where only relay R390 will remain picked until another dynamic weight classification determination is to be made, at which time the start classify relay, such as relay R391 for example, will be energized.

The exit station classification circuits are shown in FIG. 32s, whereas the compare circuit and end classify circuit are shown in FIG. 32u. Inasmuch as these circuits are substantially the same as those described in connection with the entrance station apparatus, the exit station apparatus will not be described in detail. As the description advances, any differences will be brought out at the proper place in the specification.

(C3r) *Carrier oscillator.*—Prior to describing the individual axle load signal generating and handling components, an over-all but brief description thereof will be provided first.

The toll recorder system, such as is shown in block diagram form in FIG. 29 for example, is used to convert an applied axle load in pounds to a classification value which is determined by the relative magnitude of the voltage at the output of filter 785 and some predetermined portion of the reference voltage along line 641, more frequently referred to as a voltage standard.

The oscillator 780 generates a nearly constant amplitude voltage at a frequency of approximately 3 kc. This voltage is applied as an excitation voltage to load cells 782, as a control voltage to the reference rectifier 781, and as a control voltage to the demodulator 784. The output of the load cells 782 is an A.C. voltage which is proportional to the axle load applied to weighing platform 24, and to the magntiude of the afore-mentioned excitation voltage.

The output of the load cells is amplified by amplifier 783 whose amplification is nearly constant. The output of amplifier 783, in turn, is rectified by a phase sensitive demodulator 784 whose output is a variable D.C. voltage which is filtered by filter 785 and stored in a weight storage capacitor S1 through S10 (see also FIG. 31n) integral with filter 785.

Hence, the voltage stored in any one of the axle weight storage condensers will be proportional to the axle load applied, the magnitude of the excitation voltage, the amplification of amplifier 783, and the characteristics of the demodulator 784 at the period when the axle weight storage capacitor was last connected to the filter circuit. Such a storage condenser may be connected to compare circuit 787 in order to be compared to a portion of the reference voltage along line 641. This will result in a classification value determination which is based on the axle load applied at the time when the given condenser was connected to filter 785.

The reference rectifier 781 is used to convert a portion of the A.C. oscillator voltage to a D.C. voltage. This is used to control the magnitude of the reference power supply voltage along line 641. Thus, the classification arrived at will be independent of the magnitude of the oscillator voltage.

As described previously, an oscillator 780 is caused to direct its 3 kilocycle (kc.) output to a reference rectifier 781, the weighing platform load cells identified by block 782, and demodulator 784. The oscillator has been designed to provide an extremely stable voltage output; that is, a 3 kc. output of nearly constant amplitude. The reference rectifier within block 781 is used to apply a direct current voltage which is proportional to the amplitude of the oscillator output, to the power supply 786. This is done so that the power supply output voltage along line 641 may be referenced to the oscillator output voltage as a basis therefor. More particularly, if for any reason, such as a tube variation for example, the amplitude of the oscillator output voltage should vary within reasonable limits, it is necessary that the reference voltage along line 641 change accordingly a proportional amount. Hence, this power supply reference voltage is used as a high voltage supply to the oscillator 780, the carrier frequency (3 kc.) amplifier 783, and is applied as a reference voltage to the classify voltage compare circuit identified by reference numeral 787.

It may at this time appear to be an anomaly when it is first stated that an extremely stable oscillator is provided, and afterwards it is stated that circuit provisions have been made to compensate for a variance in the oscillator output. It should be made clear at this time that voltage along line 641, i.e., the so-called +250 reference voltage line, is directed to the weight voltage compare circuit 787 whereat that voltage which is stored in the various axles per vehicle condensers is compared with the voltage standards which are based on the line 641 voltage as a reference. If, however, for some reason the oscillator output voltage should change, an incorrect vehicle classification may result. This, it is believed, should be clear when it is considered that the oscillator output voltage is directed to the axle weight storage input 793a. The reference voltage along line 641 is used as a standard for comparison, and, it is for this reason, that the value of the voltage along line 641 is actually referenced to the oscillator output. Thus, if the oscillator output voltage should decrease for any reason whatsoever, the voltage along line 641 will decrease accordingly, and there will be no relative voltage change.

The output from the load cells 782 is amplified by the apparatus within block 783 prior to being demodulated by the phase sensitive demodulator 784.

Referring to FIG. 31*p*, vacuum tube V8, preferably a 6AQ5 type vacuum tube, is shown to have its plate connected to a .05 microfarad condenser 722 and a coil 642. The screen grid thereof is connected to the other end of inductance 642 and condenser 722, and to reference voltage line 641. The control grid thereof is connected between a 560K ohm resistor 497 and a .001 microfarad condenser 643, whereas the suppressor grid is connected to the cathode thereof which, in turn, is connected to a 330 ohm resistor 498 and a one microfarad condenser 721. The values of the circuit components are such that with proper feedback to be described shortly, a 3 kilocycle, 100 volt output appears across coil 642.

As a result thereof, an approximately 20 volt output appears across winding 644 so as to be applied across a bridge type of resistor arrangement comprising a 15K ohm resistor 650, a 1K ohm potentiometer 651, a 1.8K ohm resistor 652, a 1.3K ohm resistor 746, and the resistors within the lamps identified by reference numeral 645. These lamp resistors are variable inasmuch as a resistance differential may be obtained by varying the temperature of the filaments within the lamps by changing the current flow therethrough. At a time when 20 volts is applied across coil 644, the combined resistance of the filaments within lamps 645 is approximately ⅛ the value of resistor 746, i.e., approximately ⅛ of 1.3K ohms.

The movable arm of potentiometer 651 is connected to the control grid of vacuum tube V7, preferably a 6136 type tube. The anode thereof is connected to a 470K ohm resistor 494 which, in turn, is connected to a .25 microfarad condenser 719, a 10K ohm resistor 493 and a 1.5 megohm resistor 495. The other end of resistor 493 is connected to the reference voltage line 641, and the other end of resistor 495 is connected between the screen grid and a .005 microfarad condenser 646. In addition thereto, the anode is connected to the other side of coupling condenser 643, whereas the suppressor grid is connected to the cathode which, in turn, is connected to ground via a 3.3K ohm resistor 496 and a 0.1 microfarad condenser 720.

If, for example, a load should be applied to the oscillator so that the voltage across coil 642 starts to decrease, this will be reflected by a decrease in the voltage across coil 644. As a result thereof, the A.C. voltage difference between the bridge line 647 and ground will change so as to change the output of the voltage amplifier tube V7. A change in the output of tube V7 will be applied to the control grid of vacuum tube V8 through condenser 643, whereby a change in the output thereof will appear so as to counteract the initial voltage change.

Inasmuch as the carrier oscillator for the exit station apparatus is similar to the entrance station carrier oscillator, the exit station oscillator shown in FIG. 32*v* will not be described in detail herein.

(C3s) *Reference rectifier.*—With a 100 volt output across coil 642, approximately 500 volts will appear across coil 648. This 3 kc. potential will be applied to the two plates of a full wave rectifier vacuum tube V16, preferably a 6202 type tube. The direct current output is caused to pass through input coil 649 which is connected to a one megohm resistor 654 and a .25 microfarad condenser 651.

This reference rectifier is similar to the one shown in FIG. 32*v* for the exit station apparatus, and for this reason, the latter rectifier will not be described in detail herein.

(C3t) *Power supply 636.*—Referring to FIG. 31*q*, an alternating current voltage is applied to the plates of vacuum tube V15, preferably a 5690 type tube, when line switch 752 is closed so as to connect transformer 753 to power source 754. The direct current output from vacuum tube V15 is filtered by condenser 733, a choke 755 and condenser 732.

Vacuum tubes V13 and V14, preferably 6216 type tubes, are used as rheostats to cause the approximately +420 volts which appears at the junction point between condenser 732 and choke 755, to be cut down to a +250 volts which appears along line 641. The screen grids of each of the tubes V13 and V14 are connected to the aforementioned +420 volt line, whereas the suppressor grids thereof are connected to their respective cathodes which, in turn, are connected to the power supply output voltage line 641. The control grids of tubes V13 and V14 are connected in parallel circuit to one end of 470K ohm resistor 700, and to the plate of vacuum tube V12, preferably one half of a 5965 type tube. The other end of the resistor 700 is connected to a 5.6 megohm resistor 701 and a 180K resistor 756, whereas the other end of resistor 701 is connected via line 760 to the cathodes of vacuum tube V9, preferably a 5751 type tube.

The cathode of vacuum tube V12 (FIG. 31*q*) is connected to the power supply output voltage line 641 through a 22K ohm resistor 668. The cathode is also connected to ground through a 39K ohm register 669 and a .01 microfarad condenser 731, whereas the control grid thereof is connected to the left plate of vacuum V9 (see also FIG. 31*p*) via line 658. This plate is also connected to line 641 through a 470K ohm resistor 655 and a 220 microfarad condenser 724. The right plate is connected to the line 641 through a 470K ohm resistor 656. The left grid is connected to the other end of resistor 654 and to the connected ends of a 500K ohm resistor 653 and a .25 microfarad condenser 726. The right grid is connected to one end of a .01 microfarad condenser 725 and the movable arm of 5K ohm potentiometer 658. The 50K ohm resistor 657 and the 20K ohm resistor 659 are connected in series circuit with potentiometer 658 so that the arm thereof may be set to provide approximately 80 volts to the right grid of tube V9. The cathodes of tube V9 are connected to line 760 as mentioned prevoiusly, and to the 220K ohm resistor 660.

In the event that the voltage applied to line 641 should decrease for some reason, for example a vacuum tube malfunction, the potential applied to the right grid of vacuum tube V9, i.e., the potential obtained from potentiometer 658, will also decrease. As a result, the cathode potential thereof will decrease a like amount. Inasmuch as the potential applied to the left cathode, e.g., approximately 80 volts, is dependent upon the direct current output from the reference rectifier 781 which, in turn, is dependent upon the 3 kc. output from the oscillator 780, a decrease of the cathode potential within vacuum tube V9 will be reflected as an increase in the potential at the left grid of the said tube. This, of course, will tend to make the left triode portion of the tube conduct more readily, whereby the voltage applied to line 758 (see also FIG. 31q) will decrease. This decrease will be reflected as an increase to the control grids of vacuum tubes V13 and V14 which, it will be recalled, simply act as rheostat tubes, so that the cathode potential thereof will be brought nearer to the plate potential. The fact of the matter is that the cathode potential will be changed so that the power supply output voltage value will remain at a level dependent, in part, upon the reference rectifier output.

In the event that the voltage along line 641 should tend to increase, a similar action will take place so as to apply a more negative potential to the grids of tubes V13 and V14, whereby the voltage along line 641 will be brought down to the reference level determined by the reference rectifier output. It must be pointed out once again that in the event the reference rectifier voltage output to the left grid of vacuum tube V9 (FIG. 29p) should change, the voltage along line 641 will change a corresponding amount in the same direction. This should be clear at this time inasmuch as the potential along line 641 is applied to the right grid of vacuum tube V9, and is in effect compared with that applied to the left grid of the said tube.

If the rectifier tube V15 voltage output should change, the reference voltage along line 641 would tend to change in the same direction. The feed-back circuit just described would not of itself provide a sufficient corrective factor to maintain the reference voltage at level coextensive with the reference rectifier output. A constant output voltage is obtained, however, due to the resistor 701 interposed between the filtered rectifier output and the cathodes of vacuum tube V9. For example, if the +420 volts which is applied to the plates of vacuum tubes V13 and V14 should decrease, the voltage appearing at the cathodes of vacuum tube V9 would also decrease due to the drop across resistor 701. The voltage at the cathodes would also decrease as a result of the drop in potential applied to the right grid of tube V9, this drop resulting from the drop in voltage along line 641. The decrease of the cathode potential as a result of the decrease in current conduction through the right triode section of tube V9, and to the drop across resistor 701, will be reflected as a considerable increase at the left grid of the said tube V9. This, as before, will tend to make the control grids of tubes V13 and V14 more positive, to once again raise the potential along line 641 to the reference rectifier determined value.

Since the exit station apparatus is similar to that already described for the entrance station, the former will not be described.

(C3u) *Load cells.*—Referring once again to FIG. 29p, the 3 kc. oscillator output causes a 3 kc. carrier frequency voltage to appear across coils 661 and 662. The load cells 632a and 632b are shown to be connected in series circuit between the primary winding of transformer 663 and ground. Inasmuch as the load cells per se are not a part of this invention, they will not be described in detail. Suffice it to say that they are designed to provide a 2 millivolt output for every volt input when a 20,000 pound load is applied to the weighing platform to which the load cells are connected. The potential normally found across coils 661 and 662 is 5.8 volts. Thus, a 20,000 pound load applied to the platform will cause a 23.2 millivolt output. This output is directed through transformer 663 to the control grid of vacuum tube V10 (see also FIG. 31q).

Since the exit station apparatus is similar to that already described for the entrance station, the former will not be described.

(C3v) *Carrier amplifier.*—Vacuum tube V10, preferably a 6136 tube, has its plate connected to a 560K ohm resistor 761 and a .01 microfarad condenser 764. The screen grid thereof is connected to a 1.2 megohm resistor 762 and a .25 microfarad condenser 727. The cathode thereof is connected to the suppressor grid, the other end of condenser 727, a 33K ohm reistor 664 and a 250 ohm resistor 665. In addition thereto, the cathode circuit includes a 3.3K ohm resistor 666 which is connected in parallel circuit with a 2 microfarad condenser 730. The control grid of vacuum V11, preferably one half of a 5965 type tube, is connected to one end of a 2.2 megohm resistor 763, whereas the plate thereof is connected to one end of a one microfarad condenser 728, the other end of which is connected to resistor 664. The cathode is connected to ground through a 1K ohm resistor 667 and a 1 microfarad condenser 729.

The 3 kc. load cell signal output is applied to the control grid of vacuum tube V10, whereby the signal is inverted and then directed to vacuum tube V11 where once again, the signal is inverted. The output of vacuum tube V11 is directed to the parallel circuit primary windings of transformer 765, the other end of each of which is connected to the power supply voltage line 641. A feedback is provided from tube V11 to tube V10 via a circuit including condenser 728, resistors 664 and 665.

Since the exit and entrance station carrier amplifiers are similar, only the entrance apparatus will be described.

(C3w) *Phase sensitive demodulator.* — The output from the amplifier 633 is directed through transformer 765 and to the demodulator vacuum tubes V17 through V20. The arrangement is such that when the voltage across coil 648 (see also FIG. 31p) is of one polarity, vacuum tubes V19 and V20 will conduct, whereas when the potential is of the other polarity, vacuum tubes V17 and V18 will conduct. Assume, for example, that an instantaneous voltage applied along line 766 (see also FIG. 31q) is positive. A positive potential will then be applied to the left plate of vacuum tube V19 so that this tube will conduct, as will the left tube of vacuum tube V20. Since the voltage drop within the tube is negligible, the cathodes will be raised to the plate potential. Inasmuch as the cathode of the left diode of tube V19 is connected to the anode of the right diode of tube V20, tube V20 will be caused to conduct. In a similar fashion, the right diode of tube V19 will also be caused to conduct.

If the axle weight representing variable amplitude 3 kc. carrier signal output from amplifier vacuum tube V11 is in phase with the oscillator output signal applied to lines 766 and 767, a D.C. signal voltage which corresponds to the axle weight will be developed across 500K ohm resistor 863. To clarify this point, if both diodes in tubes V19 and V20 are conducting, and if at this time the polariy of the signal applied to line 864 is positive, a voltage drop will develop across resistor 863. This voltage will actually be the demodulated signal which forms the envelope of the carrier frequency as a result of the axle passing over the weighing platform. When line 865 goes positive in phase with the conduction of tubes V17 and V18, a voltage having the same polarity as before will appear across resistor 863. It is this voltage which is applied via line 424 to the axle weight storage condensers SV and S1 through S10.

(C3x) *Tare correction apparatus.*—The D.C. signal output from filter 785 (FIG. 29) is applied to lines 424 (see FIG. 31p) and 425. These lines direct the aforementioned signal output to the axle weight condensers S1 (FIG. 31n) through S10.

In order to correct for the weighing platform mechanism tare, series circuit condensers 885 and 886, and resistor 887, are included in the afore-mentioned signal output circuit. Photo control relay contacts R451b and R451c are down during the period that there is no vehicle axle moving across the axle treadle and the weighing platform. Hence, any tare signal output will be applied from line 424 through contacts R201j, resistor 887, contacts R451c, condensers 886 and 885, contacts R451b n/c, to ground. As a result thereof, this signal will be stored in the condensers.

At the time a vehicle is detected by the photoelectric gating device, relay contacts R451b and R451c will transfer so that a circuit will be completed during the period an axle is moving over the weighing platform from line 424 through contacts R201j and R424c for example, condenser S10, contacts R424e n/o, condensers 886 and 885, contacts R451b n/o, to line 425.

It should be clear that the voltage applied to the series circuit connected axle and tare weight condensers will be distributed therebetween, and inasmuch as the capacity of tare condensers 885 and 886 is extremely small, for example 2000 micro-microfarads, whereas the capacity of a storage condenser is comparatively large, for example .05 microfarad, the charge remaining in the tare condenser will represent the axle weight.

(C3y) *Photoelectric unit.*—Inasmuch as the photoelectric unit circuit per se is not a part of this invention, it will be described only briefly herein. Referring to FIG. 31r, photoelectric tubes P1 through P3 are connected in series circuit between the movable arm of potentiometer 870 and one end of resistor 871. Associated lamps L1 through L3 are caused to be illuminated via their respective transformers 772 through 774 which are connected to power source 770 via line switch 771. Rectifier vacuum tube V23 is connected so that a positive potential is applied to the anode of photoelectric tube P3, and a negative potential is applied to one end of resistor 874 whereby a potential of approximately zero, or ground potential, volts is caused to be applied to the control grid of vacuum tube V22. It may be seen that the control grid thereof is connected via resistor 871, potentiometer 872, switch 873 and resistor 874 to the negative rectifier line 875, so that when the circuit including photoelectric tubes P1 through P3 is broken, a negative signal will be directed to the grid.

Vacuum tube V22 is caused to conduct during the period that all of the photoelectric tubes are conducting. As a result, the drop across tube V22 load resistor 876 causes a negative potential to be applied to the control grid of vacuum tube V21, whereby this tube is caused to be in a non-conducting state. As may be seen, the plate of tube V21 is connected to the positive output of a rectifier vacuum tube V24 similar to tube V23 through the photo control relay R451.

Consequent upon the interruption of any one of the three light beams being emitted from lamps L1 through L3, the series circuit including photoelectric tubes P1 through P3 will be broken, whereby a negative potential will be caused to be applied to the control grid of tube V22. This will cause the tube to be rendered non-conducting, so that the increase in plate potential will be reflected as a voltage increase at the control grid of tube V21. This, in turn, will cause the latter tube to conduct, whereby photo control relay R451 will be energized.

Hence, it may be stated in summation, that photo control relay R451 will be energized in response to any one of the photoelectric gating light beams being broken as a result of a vehicle passing through the station.

(C3z) *Tour-of-duty card circuit operation.*—It will be recalled that in addition to inserting a toll collector's key into the entrance station toll recorder at the start of a tour of duty, the toll collector is required to insert a tour-or-duty card 53 (FIG. 6) into the card receiver of the toll recorder. This card will serve the purpose of a job time card.

A tour-of-duty card toll recorder cycle will take place consequent upon the full insertion of the tour-of-duty card 53 into the card receiver, taking into account the position of corner cut, and the depression of a tour-of-duty key TD1 (FIG. 31d) represented to be within block 32 (see also FIG. 1). The operation of this key will cause the relay R26 to pick, whereby the voltage to contacts R317g n/c (FIG. 31e) will be removed when contacts R26d open. As will be described hereinafter, the circuit beyond contacts R317g includes various interposer punch magnets. Hence, the opening of contacts R26d will preclude any of the perforated data which is controlled by the various interposer punch magnets to be entered on a tour-of-duty card.

The insertion of a tour-of-duty card into the card receiver causes card inserted contacts 127N (FIG. 31e) to close, whereas the full insertion of the card into the card receiver with proper regard to the corner cut will cause contacts 132N to close and contacts 136N n/c to remain closed. This will cause a circuit to be completed to card registration relay R54P.

As a result, release card interposer magnet 153N will be energized through contacts C2, R26a, R317f and R54a. This, in turn, will cause release card interposer contacts 155N to close, whereby a circuit will be formed to relay R63P through contacts C1, 155N, C3, R3b, R26f and R391d. Contacts R63b will complete a hold circuit to relays R54H and R63H, whereas contacts R63d and R26b will complete a circuit to punch and print clutch magnet 203N. The energization of this magnet will cause one complete revolution of shaft 156 (see also FIG. 11), to thereby effect a tour-of-duty card toll recorder operation.

As is shown in FIG. 6, the printed information includes the sequences number of operation, the day, the time of day, the lane identification number, and the toll collector's identification key number. The punched information includes only the station number which is caused to be entered under the setting of interposer screws 199 (see FIG. 12).

The operation of the exit station toll recorder for a tour-of-duty card will not be explained inasmuch as it is similar to the operation of the entrance station. It may be pointed out at this time, however, that a zero control counter balance and a cancellation perforation are punched in the exit station tour-of-duty card.

(C4) *Other Entrance Station Apparatus Circuits*

The circuits described hereinbefore under the heading (C3) Similar Entrance and Exit Station Apparatus Circuits may be found in both the entrance station and the exit station systems. As explained previously, only the entrance station circuits have been described in detail in order to avoid undue prolixity and unnecessary complexity. However, as may be expected, there are circuits which relate to only the entrance or exit station systems. Such entrance station circuits will now be described in detail.

(C4a) *Overweight axle check.*—As mentioned hereinbefore, the overweight axle check apparatus is employed to determine whether the weight of an axle is more than an axle weight standard. This axle weight check is made because a vehicle weight check alone is not enough; that is, a vehicle may have one or more overweight axles, and yet, the weight of the vehicle may be under a maximum vehicle weight standard.

*Overweight axle storage relays.*—It will be recalled that a voltage is applied to line 423 (FIG. 31*i*) in response to the passage of a vehicle axle over the axle treadle 23 (see also FIG. 31*a*). This voltage is applied, of course, due to the transfer of contacts R201*d* so as to connect line 423 to line 401.

In keeping with the conditions assumed previously, i.e., relay R211 (FIG. 31*j*) is up prior to a first vehicle axle passing over the treadle, a voltage which is directed to line 423 (FIG. 31*i*) as a result of the first vehicle axle passing over the treadle, will be directed through relay contacts R224*b* (FIG. 31*j*), R242*b* n/c, R211*c* and R245*b* n/c to R270*a*. As will be described shortly, if the overweight axle detecting circuit recognizes an overweight axle, relay R270 (see also FIG. 31*p*) will be dropped out. Hence, it should be clear that if the first vehicle axle is over the maximum weight limit, the voltage impulse directed to contacts R270*a* (FIG. 31*j*), will be permitted to pass through these normally closed contacts, and contacts R296*a*, so as to energize relay R252LP. It may be pointed out here that relay R296 (FIG. 31*i*) is simply an overweight axle storage control relay and is caused to be picked through the R204*c* contacts after relay R204 is energized consequent upon the passage of an axle over treadle 23 (see also FIG. 31*a*) so that a circuit is completed through contacts R201*d*.

Of course, should the weight of the axle be under the maximum weight limit, relay R270 (FIG. 31*p*) will be picked, and a circuit to an overweight axle storage relay R252LP through R261LP will be opened.

In summation, referring once again to FIG. 31*j*, an overweight axle storage relay R252 through R261 may be picked as a result of a corresponding axle overweight condition. It is to be particularly noted that the overweight condition of any one axle is stored in a corresponding storage relay as a result of the electrical network controlled, in part, by the overweight axle detecting relay contacts R270*a* through R270*k*, and the read-in advance control ring which includes relays R211 through R224.

During a toll recorder operation, at the time that the readout advance control ring which includes relays R276 (FIG. 31*l*) through R289, is being advanced, a voltage impulse is applied through one of the diode connectors D16 through D25 and the cable connector 823 (see also FIG. 31*k*) to energize corresponding overweight axle storage latch trip coils. For example, when read-in advance control relay R212LP (FIG. 31*j*) is energized, first axle storage relay R229LP and overweight axle storage relay R252LP may be energized. During the toll recorder operation when the readout advance control relay R276LT (FIG. 31*l*) is being energized via contacts R277*d*, a voltage will be applied to cable connector 1 via diode D16, whereby first axle storage relay R229LT will be energized and overweight axle storage relay R252LT (FIG. 31*k*) will also be energized.

*Reverse motion.*—Whenever a vehicle axle is moved over a treadle in a reverse direction, it is necessary that the overweight axle storage relays and the vehicle first axle storage relays move in exact step with the read-in advance control relay ring. If, for example, a vehicle axle should be moved over the treadle in a reverse direction after read-in advance relay R215LP (FIG. 31*j*) has been picked, the reverse motion of the axle will cause relay R214LP to become energized in the manner described previously. After relay R214LP has been picked, and a voltage has been applied to line 424 (see also FIG. 31*i*), a circuit will be completed to relay R215LT (FIG. 31*k*). In addition thereto, a parallel circuit will be formed from contacts R215*a*, R239*c* n/o (it will be recalled that relay R239 is picked with relay R248), diode D9, contacts R254*a*, relay R254LT, to the other side of the line. Relay R254LT is the correct overweight axle storage latch trip relay to be energized, inasmuch as relay R254LP (FIG. 31*j*) may have been energized when relay R215LP had been energized.

*Actual axle weight voltage storage.*—It will be recalled that the direct current voltage output from the load cells shown in FIG. 31*p* is applied along lines 424 and 425, and that this voltage is a representation of the dynamic axle weight being applied to the weighing platform. Referring to FIG. 31*n*, it may be seen that overweight storage condenser SV is normally connected across lines 424 and 425 through contacts R201*i* n/c and R201*m* n/c. Hence, whenever an axle weight voltage is applied to lines 424 and 425 for storage in an axle weight condenser S1 through S10, this voltage is also applied to condenser SV. Immediately after this weight representing voltage has been stored in condenser SV, relay R201 (see also FIG. 31*i*), will be energized due to a complete forward motion, whereby the condenser voltage will be directed across lines 831 and 832. It may be seen in FIG. 31*i* that relay R204 is energized via the R201*d* contacts. It may also be seen in FIG. 31*o*, that line 832 is connected to contacts R20*a* which normally permit a circuit to be formed to potentiometer 745. The potentiometer setting is such that the voltage available at the movable arm thereof represents the maximum weight limit for a vehicle axle. Line 831, on the other hand, is connected through a choke to the left plate of a vacuum tube V3, preferably a 5726 type tube. Inasmuch as the circuits associated with vacuum tubes V3 and V4, and gas tube G3 (see also FIG. 31*p*), are similar to those circuits which have already been described in detail in connection with vacuum tubes V1 and V2, and gas tube G2, the former circuits will be described only briefly at this time.

Inasmuch as overweight axle relay R270 (FIG. 31*p*) should normally be energized when an axle is not overweight, to thereby maintain contacts R270*a* (see also FIG. 31*j*) through R270*k* open, the voltage available at the movable arm of potentiometer 745 (FIG. 31*o*) should normally be greater than the axle weight representing voltage caused to be stored in condenser SV (FIG. 31*n*). Accordingly, a circuit may be completed from the movable arm of potentiometer 745 through contacts R20*a* n/c, line 832 (see also FIG. 31*n*), contacts R204*a* and R201*m* n/o, storage condenser SV, contacts R201*i* n/o, line 831 (see also FIG. 31*o*), to the left plate of vacuum tube V3. So long as a positive potential is applied to this plate, a positive signal will be applied to the left control grid of vacuum tube V4, which, in turn, will cause a negative pulse to be applied to the right control grid of this tube. As a result thereof, a positive voltage will be applied from the right plate of vacuum tube V4 to the control grid of gas tube G3 so as to cause this tube to fire when contacts R201*f* (see also FIG. 31*p*) close to permit the energization of relay R270.

In the event that the voltage stored in condenser SV (FIG. 31*n*) is over the axle weight standard, a negative pulse will be applied to line 831, and, in turn, to the left plate of vacuum tube V3. This will cause a negative pulse to be applied to the control grid of gas tube G3 (FIG. 31*p*) so that during the period when contacts R201*f* are closed, the said tube will not fire and relay R270 will not be picked. The failure to energize this relay will permit its contacts shown in FIG. 31*j* to close, whereby a circuit may be completed to any one of the overweight axle storage relays R252LP through R261LP.

(C4*b*) *Tandem axle overweight axle check.*—An overweight axle comparing circuit for checking the weight of each axle passing over the entrance station weighing platform for an overweight axle condition, has just been described. There are localities, however, where the aforedescribed overweight axle checking apparatus would not go far enough. This is for the reason that tandem axles carried by a vehicle, i.e., axles spaced approximately four feet apart, are not permitted to carry as great a load as are so-called single axles. For example, a single axle may be permitted to carry a 22,400 pound limit whereas each tandem axle may be limited to a maximum load of only 18,600 pounds. For this reason, in those localities where such variable load limit rules apply, the foredescribed axle weight comparing apparatus must be altered for a tandem axle vehicle so that the weight of the tandem axles may be compared against an 18,600 pound limit, for example, instead of a 22,400 pound limit.

Referring first to FIG. 1, entrance station axle treadles 22 and 23 are spaced apart approximately four feet so that tandem axles will pass over both treadles simultaneously. In doing so a switch 26 will be operated in order to alter the axle weight comparing circuit in the entrance station toll recorder 31. Switch 26 will be disabled after the first one of the tandem axles passes over a treadle 36 which may be spaced approximately six feet beyond treadle 23.

Referring to FIGS. 31a and 31b, when a pair of tandem axles pass over treadles 22 and 23 simultaneously, treadle switches 23a, 23b and 22a may be closed simultaneously. As has been described previously, the forward passage of an axle over treadle 23 will cause forward movement relay R504 to energize. Thus, when tandem axles are passing over the aforesaid treadles, a circuit will be completed to relay R20LP from line 410 (FIG. 31b) through contacts 22a and R504d n/o, relay R20LP to line 416. The pick of relay R20 will cause contacts R20a (FIG. 31o) to transfer, whereby a lower voltage will be applied to line 832. This, of course, is due to the fact that the voltage available at potentiometer 833 is less than available at potentiometer 745. It should be clear at this time that inasmuch as the voltage applied to line 832 is less when tandem axles are passing through the entrance station, it will take a smaller axle weight stored voltage in condenser SV (FIG. 31n) to prevent the pick of relay R270 (FIG. 31p). This, it will be recognized, is exactly what is desired inasmuch as the axle weight limit for each tandem axle is less than the single axle weight limit.

When the first of the tandem axles passes over treadle 36 so as to close contacts 36a, the latch trip coil of relay R20 will be energized, and the contacts R20a (FIG. 31o) will be restored to normal, i.e., in condition for single axle vehicles. Treadle 36 is spaced beyond treadle 23 a sufficient distance to provide assurance for both tandem axles passing over the weighing platform prior to the drop out of relay R20.

(C4c) *Overweight axle interlock relay.*—Prior to the time that a vehicle classification is determined automatically, a test circuit is effective via the condenser weight storage output control network shown in FIG. 31h to energize the interlock relay R317P (see also FIG. 31f).

As has been described previously, overweight axle detection relay R270 (FIG. 31t) will fail to be energized in response to an overweight axle passing over the weighing platform in order that the contacts thereof shown in FIG. 31j may complete a circuit to a respective overweight axle storage relay R252 through R261. If, for example, the second axle of a three-axle vehicle is an overweight axle, and if read-in advance ring relay R214 corresponds to this second axle, the voltage impulse applied to relay R214LP (FIG. 31j) will be directed through contacts R270b and R296b to energize overweight axle storage relay R253LP. The energization of relay R253LP will cause to be stored in the toll recorder, the information that the second axle of the particular three-axle vehicle is overweight.

When the toll collector operates the three-axle key A3 (see also FIG. 31d) so as to energize relay R6, a circuit will be completed to energize relay R317 from line 401 (FIG. 31f) through end classify contacts R394a, line 428 (see also FIG. 31h), contacts R6e n/o, R5d n/c, R301b (it is assumed that readout storage relay R301 is picked prior to the toll recorder operation for this vehicle), R262b n/c and R253b, line 429 (see also FIG. 31f), relay R317P, to line 402. Similar circuits corresponding to the first and third axles are tested so as to determine whether or not the interlock relay R317 is to be picked. For the assumed conditions set up, these latter circuits will be open at overweight storage relay contacts R252b (FIG. 31h) and R254b. A hold circuit for relay R317H, however, will be formed via contacts C4 and R317H.

It will become clear as the description advances that the energization of overweight axle interlock relay R317P will prevent the toll recorder apparatus at the entrance station from automatically processing the trip card, and will render operated signal circuits whereby the toll collector will be apprised of the overweight axle condition.

(C4d) *Interlock control circuits.*—After operating the proper axle key, the toll collector at the entrance station will then take a trip card 51 (FIG. 5) from a convenient card rack, for insertion into the card receiver of the entrance toll recorder. Complete insertion of the trip card with proper regard to the position of corner cut 52 is necessary in order to condition for operation electrical circuits which cause a toll recorder operation or cycle.

Referring to FIG. 31e, card inserted contacts 127N (see also FIGS. 12, 14 and 15) are closed when the trip card being inserted in the card receiver of the toll recorder engages and moves the card lever 121, whereby arm 124 having pin 123 thereon is released to close the said contacts. Thus, as has been stated previously, the closing of card inserted contacts 127N will indicate the presence of a trip card in the card receiver of the entrance toll recorder.

Consequent upon the trip card being fully inserted in the card receiver, the leading edge, i.e., the bottom edge, of the trip card will act upon stem 129 (FIG. 17) to thereby close the card fully inserted contacts 132N (see also FIG. 31e). A proper insertion of the trip card with regard to corner cut will cause the corner cut 52 (see also FIG. 5) to align with stem 135 (FIG. 17). This, then, will cause corner cut contacts 136N (see also FIG. 31e) to remain closed. It will become clear as the description advances that contacts 132N and 136N n/c must be closed in order to condition the entrance station toll recorder for operation. In the event that the trip card is inserted into the card receiver improperly, the card may be removed by manually moving release card handle 139 (FIG. 12) upwardly, to thereby disable the aforedescribed card braking mechanism. This upward movement of handle 139 will also cause contacts 421N (see also FIG. 31e) to transfer due to the action thereon by operating arm 420, whereupon a circuit will be formed through contacts C2 and 421N n/o to release card light 466. It may be pointed out here that should a trip card be fully inserted in the card receiver with total disregard to position of corner cut, a circuit may be completed to release card light 466 via the corner cut contacts 136N n/o. Of course, the energization of this light with the handle 139 in a down position will indicate to the toll collector that the card has been inserted into the card receiver improperly.

*Relay R54P.*—Assuming full and proper insertion of a trip card into the card receiver of an entrance station toll recorder, a circuit will be completed to relay R54P via contacts C2, 421N n/c, 127N, 132N and 136N n/c.

*Release card interposer magnet 153N.*—As soon as card registration relay R54 is energized, and an axle key within axle key unit 33 (see also FIG. 1) is operated, a circuit will be completed to magnet 153N from line 401 (FIG. 31e) through contacts C2 and R265d, one of the axle key relay contacts, R4a through R9a, R317f, and R54a, magnet 153N to line 402. It will be recalled that relay R265 (see also FIG. 31m) is a no axles stored relay in the toll recorder. It should be apparent that if there are no axles stored in the entrance station toll recorder apparatus, there is no need for an entrance toll recorder operation. It is for this reason that contacts R265d (FIG. 31e) are placed in the release card interposer magnet 153N circuit, and contacts R265d will remain closed only so long as axles are stored in the entrance station toll recorder system.

Inasmuch as overweight axles relay R317 (see also FIG. 31f) is caused to be picked in the event there are one or more overweight axles carried by the vehicle for which a trip card is to be processed, contacts R317f (FIG. 31e) will remain closed so long as there is no overweight axle. Should it be desired to process the trip card for a vehicle having one or more overweight axles, a release key which is included within the entrance station axle key unit 33 (see also FIG. 1) may be depressed, whereby relay R226 (FIG. 31e) will be energized and contacts R226d will be closed to form a shunt circuit around overweight contacts R317f. The circuit for energizing classify delay relay R226 will be described in detail hereinafter.

Referring to FIG. 12, energization of the release card interposer magnet 153 will cause the release card interposer 154 to pivot in a counterclockwise direction. This will cause the upper end of the interposer to engage a step 333 in card release handle 319, and the lower end of interposer 154 to close a pair of release card interposer contacts 155N (see also FIG. 31e). As described previously under the Card Receiver Mechanism description, the foregoing action locks handle 139 in a downward position, to thereby prevent the disabling of the card braking mechanism, and to assure the non-removal of a trip card from the card receiver, during a toll recorder cycle. In summation, with the axle key operated and the full and proper insertion of a trip card into the toll recorder will cause the energization of magnet 153N which, in turn, will prevent the removal of the trip card from the entrance station card receiver until after the toll recorder cycle has been completed.

Magnet 153N shown in FIG. 31e will remain closed for the major part of the toll recorder cycle inasmuch as cam contacts C2 are made from 355° through 325° (see also FIG. 33). It will be recalled that the cam contacts, for example, contacts C2, are operated by cams fixed to shaft 347 shown in FIG. 11. Shaft 347 is driven by gear 348 which is in mesh with gear 349. Gear 349, in turn, is fixed to shaft 156 which, it will be recalled, completes one revolution each toll recorder cycle, or operation. Hence, cam shaft 347 and the cams attached thereto are caused to complete one revolution every toll recorder cycle.

*Relay R64.*—As soon as release card interposer 153N is energized, the contacts 155N (see FIGS. 12 and 31e) are caused to be closed, whereby a circuit is completed from line 401 (FIG. 31e) through contacts C1 and 155N, relay R64, to line 402.

*Classify delay relay R226.*—The closing of contacts R64a in response to the energization of relay R64 may complete a circuit to relay R226 from line 401 (FIG. 31e) through contacts C1, 155N, R64a, R316a, R317e and R205d, relay R226, to line 402.

As described in (C3n) Axles Per Vehicle Check Relay R316 description, relay R316 will be energized if the manually effected axles per vehicle manifestation correspond with the axles per vehicle grouped automatically. Hence, contacts R316a will be closed so long as the axles per vehicle groupings match. Contacts R317e will be closed so long as there is no overweight axle. Contacts R205d will be closed so long as there is no vehicle passing over the entrance station axle counting treadle 23 (see also FIG. 31a). Referring to FIG. 31i, it may be seen that relay R205P will be energized via contacts R201b n/c, R208c, and R208a n/c, relay R205P, to line 402.

*Start classify No. 1 relay R262.*—This relay will be energized as soon as contacts R226b close in response to the energization of relay R226. In addition thereto, the closing of contacts R226c and R226b will complete a hold circuit to relay R226.

*Clutch interlock relay R63P.*—After the vehicle associated with the trip card to be processed, has been classified by the dynamic weight classifying apparatus described hereinbefore, end classify relay R394 (see also FIG. 31p) will be energized, to thereby cause contacts R394c (FIG. 31e) to close. As a result, a circuit will be completed to relay R63P from line 401 through contacts C1, 155N, C3, R3b, R394c and R391d, relay R63P, to the other side of the line.

Referring to FIG. 31d, it is to be observed that the closing of minute advance warning contacts 97N (see also FIG. 10) will cause the energization of minute advance relay R3, which, in turn, will cause contacts R3b (FIG. 31e) to open. It will be recalled that relay R3 is energized just prior to a minute advance, i.e., just prior to the advancement of minute type wheel 94 (see also FIG. 10). Relay R3 (FIG. 31d) will be maintained energized through minute advance motor contact 67N (see also FIG. 10) for the major part of the minute advance.

As described previously under Time Control Mechanism (B1), cam 62 is caused to complete one revolution when drive clutch pawl 59 engages ratchet 60. As the cam follower end of bell crank 81 rides upon the periphery of cam 62, the bell crank is moved in a direction to close minute interlock contacts 82. The contour of cam 62 is such that contacts 82 are closed only after the minute type wheel 94 has been completely advanced, but before contacts 67 are opened. Referring to FIG. 31e, it should be apparent that clutch interlock relay R63P may be energized even though contacts R3b are caused to be open due to a minute advance. This, of course, will be due to the closing of minute interlock contacts 82N prior to the deenergization of relay R3 (see also FIG. 31d) which controls the contacts R3b.

In response to the energization of relay R63P, contacts R63b will close to complete circuits to hold relays R63H and R54H. In addition thereto, the closing of contacts R63a will permit a hold circuit to be completed to release card magnet 153N via contacts C2, R63b, R63a and R54a.

*Punch and print clutch magnet 203N.*—This magnet is shown in FIGS. 11 and 31e, and is energized from line 401 through contacts C1, 155N, C3, R63c, R63d and punch interposer contacts 194N, magnet 203N, to line 402. It has been described previously under (B4) Card Punching Mechanism description that contacts 194 (see also FIG. 12) will be closed when an interposer 195 (see also FIG. 9) is moved in response to a magnet 351 being energized. The insertion of contacts 194N in the circuit of magnet 203N simply means that prior to a toll recorder operation, it is necessary that the punch mechanism of the toll recorder be set up.

Referring for a moment to FIG. 11, the energization of clutch magnet 203N causes the dog 205 to engage the rotating clutch ratchet 206. This will cause punch shaft 156 to rotate in a counterclockwise direction, and the punch and print mechanism associated therewith, to operate. Inasmuch as cam contacts C3 break at 10° (see also FIG. 33), magnet 203N will be de-energized at that time. Cam contacts C1, however, remain closed until 180° in order to maintain the interposer punch magnets energized through the trip card punching period of the toll recorder cycle. It is to be observed that both cam contacts C1 and C3 each close again at 350°. A toll recorder cycle cannot repeat, however, because card inserted contacts 127N (see FIGS. 12 and 31e) will open prior to 350° when pin 123 and arm latch 147 engage. Since card inserted contacts 127N will remain open until card lever 121 is permitted to move in a clockwise direction by the removal of a trip card in the card receiver, a subsequent recorder cycle cannot occur until after a trip card is removed from the card receiver and another trip card is reinserted therein.

(C4e) *Punch interposer magnets.*—Referring briefly to FIG. 5, it will be recalled that the following information is punched in the trip card 51 at the entrance station:

(1) The classification of the vehicle (row 1, columns C through K), e.g., class 3.

(2) A proof of classification perforation (row 1, column B).

(3) The entrance station identification number (row 2, columns F through L), e.g., station No. 28.

(4) The number of axles per vehicle (row 3, columns B through D), e.g., two axles.

(5) The time of trip control value within which the vehicle should pass over a designated portion of the toll highway (row 3, columns E through L), e.g., a value of 55.

(6) An overweight axle marking if there is an overweight vehicle (row 1, column A).

All of the foregoing perforated information with the exception of the entrance station identification number is under the control of punch interposer magnets. The circuits whereby these magnets may be energized will now be taken up.

*Time control punch interposer magnets.*—As described previously under the (B1) Time Control Mechanism description, the gear ratio between gears 105 (FIG. 13) and 106 is such that the transfer wheel 107 (see also FIG. 10) will complete one revolution every half hour. This, of course, will cause the brushes on rotor 117 to move from one conducting segment to the next once each half hour. Similarly, the gear train for moving transfer gear 113 is so designed that the brushes carried by rotor 118 of time emitter 119 will be moved from one conducting segment 159 to the next once each five hours. The circuits associated with time emitters 111 and 119 are shown in FIG. 31f. Interposer punch magnets PM14 through PM17 are associated with the units value time emitter 111, whereas magnets PM18 through PM20 are associated with the tens value time emitter 119. More particularly, the magnets in the first group are energized either singly or in combination thereof to cause the units time control value to be punched in binary code in columns I through L of row 3 of the trip card 51 (see also FIG. 5), and the magnets in the second group are energized either singly or in combination thereof to cause the tens time control value to be punched in columns E through H of row 3 of the trip card. Since the time control value is punched in the trip card in accordance with a binary code, magnets PM14 and PM18 are each assigned a binary value 1, PM15 and PM19 are each assigned a binary value 2, PM17 and PM20 are each assigned a binary value 4, and PM16 and PM21 are each assigned a binary value 8.

Assuming an entrance station time control value of 55, the tens emitter brushes will be resting on conducting segments LT5 and RT5, and the units emitter brushes will be resting on segments LU5 and RU5. Thus, punch magnets PM14, PM17, PM18 and PM20 will be energized through the following circuits:

*PM14.*—From line 401 (FIG. 31e) through cam contacts C1, release card interposer contacts 155N, tour-of-duty card contacts R26d, overweight axle interlock relay contacts R317g, n/c, clutch interlock relay contacts R63e and R63f, line 834 (see also FIG. 31f), a common emitter strip 835, segment LU5 via the emitter brushes, magnet PM14, to line 402.

*PM17.*—A similar circuit to line 834, common emitter strip 836, segment RU5 via the emitter brushes, magnet PM17, to the other side of the line.

*PM18.*—A similar circuit to line 834, common emitter strip 837, segment LT5 via the emitter brushes, magnet PM18, to line 402.

*PM20.*—A similar circuit to line 834, common emitter strip 838, segment RT5 via the emitter brushes, magnet PM20, to line 402.

It may be recognized that all of the punch interposer magnets to be energized will be energized concurrently, whereby the interposers associated therewith will be moved upwardly concurrently between their associated punches 196 (see also FIG. 12) and the backing member 197 of punch carrier 198. It may be pointed out here once again that the upward movement of any one of the interposers 195 will cause the punch interposer bail contacts 194N to close, these contacts, as shown in FIG. 31e, being interposed in the print and punch clutch magnet 203N circuit.

*Axle count punch interposer magnets.*—The operation of an axle key by the toll collector will cause axle key relay contacts to close, whereby magnets PM11 (FIG. 31f) through PM13 are energized. Since the axle count value entered upon the trip card is punched according to a binary code, a hole punched as a result of energizing magnet PM11 will be indicative of a one-axle vehicle, a hole punched due to the energization of magnet PM12 will be indicative of a two-axle vehicle, and a hole punched due to the energization of magnet PM13 will be indicative of a four-axle vehicle. If, for example, the three-axle key A3 (see also FIG. 31d) is operated so as to energize relay R6, a circuit will be closed from line 834 through contacts R6c and magnet PM12 to line 402, and from line 834 through contacts R6d and magnet PM11 to line 402. The energization of these magnets will cause associated interposers 195 (see FIG. 9) to be moved upwardly into an operative position.

*Vehicle classification punch interposer magnets.*—It will be recalled that during a dynamic weight classifying operation, one of the ripple circuit relays R376 (FIG. 31o) through R390, will remain picked after end classify relay R394P (see also FIG. 31p) will have been picked. It will also be recalled that the ripple circuit relay remaining picked after end classify relay R394 has been picked, will be indicative of the vehicle classification.

Contacts controlled by these ripple circuit relays are employed in the vehicle classification punch interposer magnet circuits shown in FIG. 31e. An examination of these circuits and of the classification determination circuits shown in FIG. 31o, will reveal that a classification value of one, i.e., when relay R377 remains picked after the end classify relay has been picked, is not caused to be punched in the trip card. Only the classifications 2 through 9 are caused to be perforated, class 9 being an overweight vehicle class.

If, for example, during the dynamic weight classifying operation, relay R379 (FIG. 31o) is caused to remain picked after the end classify relay R394P (FIG. 31p) has been picked, a classification value of 3 will be entered in row 1, column E of trip card 51 (FIG. 5). The circuit for energizing the three classification punch interposer magnet PM2 (FIG. 31e) will be formed from line 401 through contacts C1, 155N, R26d, R317g n/c, R63f and R63e, R395b and R379f, magnet PM2, to line 402. Contacts R395b will be closed in response to the energization of proof of class reset relay R395 which will be accomplished after start classify No. 2 relay R392 is energized and if the ring shown in FIG. 31o has been reset and relay R390 picked. Thus, a circuit will be completed to relay R395 from line 401 (FIG. 31e) through contacts C1, R390a and R392e, relay R395, to line 402. Stick points R395a will provide a hold circuit for the relay.

*Proof of classification punch interposer magnet.*—This magnet, PM9 (FIG. 31e) will be energized only if the vehicle classification is other than zero so that relay R376 will be dropped out, and if the ripple circuit is not reset prior to a toll recorder operation but immediately after a classification determination so that relay R390 will not be up. If these conditions are met, a circuit to magnet PM9 will be completed via contacts R376b and R390b, whereby a hole will be punched in row 1, column B of the trip card.

*Overweight axle punch interposer magnet.*—Inasmuch as relay R317 (FIG. 31f) will be picked consequent upon an overweight vehicle axle, a circuit may be formed to overweight axle magnet PM10 (FIG. 31e) via contacts R317d when one or more vehicle axles are overweight. This will cause a hole to be punched in row 1, column A of the trip card 51 (FIG. 5).

(C5) *Other Exit Station Apparatus Circuits*

Those circuits in the exit station system apparatus which are similar to entrance station system circuits, have been described hereinbefore under the heading (C3) Similar Entrance and Exit Station Apparatus Circuits. There will now follow a description of those circuits which may be found in only the exit station apparatus.

(C5a) *Card indicia sensing station.*—Referring to FIG. 1, it will be recalled that vehicle 20 is stopped opposite toll booth 35 for examination by the exit station toll collector, whereby a determination is made by him as to the number of axles carried by the vehicle. After having made such an axle count determination, the toll collector will operate an axle key in an axle key unit 49, said key corresponding to the number of axles determined to be on the vehicle by the toll collector. After having operated the proper axle key in unit 49, the exit station toll collector will take the partially processed trip card 51 (see also FIG. 5) from the vehicle operator for insertion into the card receiver of the exit station toll recorder 45. It must be remembered that the trip card which was partially processed, or validated, at the entrance station is carried by the vehicle operator for delivery to the exit station toll collector so that the processing of the trip card may be completed as the exit station. As the description advances, it will become clear that complete insertion of the trip card with proper regard to the position of corner cut is necessary in order to condition for operation electrical circuits in the exit station toll recorder which cause a card sensing mechanism to operate, said mechanism having been described in detail previously. Suffice it to state for the present that complete and proper insertion of a trip card into the card receiver of an exit station toll recorder will cause relay R1054 (FIG. 32e) to pick. The contacts R1054a (see also FIG. 32d) controlled thereby will cause card sensing solenoid 165 to become energized.

As described hereinbefore with reference to FIG. 18, the energization of solenoid 165 will permit the sensing pins 176 (see also FIG. 16) to move towards the trip card which is positioned in the card receiver 120, so as to engage the card. The presence of a hole in the trip card will permit a corresponding sensing pin 176 to move a sufficient amount forward in order to permit the associated pair of sensing contacts 181 to transfer.

The card sensing mechanism in the exit station toll recorder will analyze the trip card for the following items of perforated information:

(1) The number of vehicle axles caused to be punched in row 3 at columns B through D in the trip card at the entrance station.

(2) The entrance station number punched in row 2, at columns F through L in trip card 51 (see FIG. 5).

(3) The time of trip control value punched in row 3 at columns E through L in the trip card at the entrance station.

(4) A trip card cancellation marking in row 3 at column A which, if present, will present a toll recorder operation and the reuse of a trip card inasmuch as this cancelation marking is entered upon the trip card only by exit station punching mechanism.

(5) The classification of the vehicle as determined at the entrance station in row 1 at columns D through K with the exception of a class 1 which is not punched in the trip card.

(6) A proof of classification perforation in row 1 at column B.

*Axle count relays.*—These relays are shown in FIG. 32l. Relay R1056 is energized if a hole is punched in row 3 at column D of trip card 51 (see also FIG. 5), relay R1057 is energized when sensing contacts SS2 close in response to a hole punched in row 3 at column C, and relay R1058 is energized consequent upon a hole being detected at row 3 and column B. The sensing contacts SS1 through SS3 are controlled by sensing pins 176 (see FIGS. 16 and 18).

*Entrance station number relays.*—These relays, i.e., R1067 (FIG. 32l) through R1075, are controlled by sensing contacts SS4 through SS9, respectively. The relays R1072 through R1075, when energized, represent the units digit of the station identification number, whereas the relays R1067 and R1068 represent the tens digit of this identification number. Inasmuch as provision is made in the preferred embodiment of this invention for sensing only the 1 through 4 digits of the tens position of a station identification number, those relays required for sensing the 8 digit of the tens position have been omitted.

*Time of trip start relays.*—The relays controlled by the time of trip start sensing pins are shown in FIG. 32m, to include relays R1079 through R1097. Each of these relays is controlled by a respective set of sensing contacts SS11 through SS17, the common junction of which is connected to line 1840 (see also FIG. 32l) to cam contacts C121. The sensing contacts SS11 through SS14 are employed to sense the tens position of the time of trip start value, whereas sensing contacts SS15 through SS18 are used to detect the units position of the time of trip start value.

(C5b) *Kiting.*—A common fraudulent act which is serious and which was referred to hereinbefore but briefly, is kiting. This act will now be explained in detail as will the apparatus which is used to detect this act.

Referring first to FIG. 7, kiting is an act in which a vehicle operator traveling in a westerly direction, for example, from Binghamton to Jamestown, withholds from the Jamestown exit station toll collector the trip card which was issued to him at the entrance station in Binghamton. On a return trip in an easterly direction, e.g., Jamestown to Binghamton, the vehicle operator will leave the toll highway at Endicott in order to turn over to the toll collector at the Endicott exit station the trip card issued previously at Binghamton. Hence, the vehicle operator will withhold the trip card issued at Jamestown. It should be apparent then that without apparatus to detect such acts, the presentation at the Endicott exit station of a trip card procured at the Binghamton entrance station, will simply indicate to the toll collector at the Endicott exit station that the vehicle has been moved only the comparatively short distance between the Endicott and Binghamton stations. Of course, the fact of the matter is that the vehicle has actually been moved from Jamestown to Endicott. In a similar fashion, during a subsequent general westerly trip in the direction Binghamton to Jamestown, the vehicle operator may leave the toll highway at Kennedy. At that time he will present to the toll collector at the Kennedy exit station that trip card which he received at the Jamestown entrance station during the previous easterly trip. Hence, once again it will appear as if the vehicle has been moved a comparatively short distance, namely from Jamestown to Kennedy. Thus, it may be seen that a single withheld trip card will enable a vehicle operator to commit any number of successive acts of this type, acts which are termed kiting.

Kiting is detected by the present toll highway recorder system invention by providing a time limit in which a vehicle must be moved from an entrance station to any one of a plurality of designated exit stations which are located within a common zone checking area. For example, a vehicle which enters the toll highway at Binghamton must leave the highway att Endicott within a predetermined time limit because Endicott and Binghamton are within a common zone. Similarly, a vehicle which enters the toll highway at Jamestown must leave the highway at Kennedy within a time limit because these two cities are located within one zone. More particularly, it may be stated that Binghamton and Endicott, and Jamestown and Kennedy, are each within a zone checking area 400 and 401, respectively. It should be clear at this time that it is possible to provide a time limit within which a vehicle must be moved from any entrance station to any other exit station, inside or outside of the zone checking area. This, however, is generally not desirable. The reason for this is that as a rule it would not be profitable for any vehicle operator to leave the toll highway some 30 or 40 miles ahead of the true point of highway destination. For this reason zone checking areas such as areas 400 and 401 usually do not extend beyond a radius of approximately 40 miles.

There are two conditions which must be met in order for the present invention to detect kiting. First, the exit station must be located within the same zone checking area as is the entrance station at which the trip card has been validated. Secondly, the vehicle operator must have taken more time than that allotted as an allowable time of trip value, within which the vehicle should be moved from the entrance station to an exit station. Thus, if the exit station is located outside of the zone checking area determined by the location of the entrance station, or if the time taken to drive the vehicle from the entrance station to the exit station is less than the allowable time of trip value, the exit station toll recorder will be conditioned so as not to indicate kiting.

*Zone check circuits.*—Assume that a vehicle operator enters the toll highway at Binghamton for travel to Jamestown. At the Binghamton entrance station, a trip card will be validated, whereby the entrance station number is caused to be punched at the index points in row 2 at columns F through L to indicate the Binghamton station number 30. If the operator of this vehicle wanted to leave the toll highway at the Endicott exit station, a kiting test would be made by the apparatus thereat.

A pluggable control panel at the Endicott exit station is wired to include station numbers 28, 30, 32 and 35, all of these stations being within the Endicott zone checking area 401. Thus, in line with the foregoing statements, any trip cards validated in the entrance toll recorders at the stations of Kirkwood, Binghamton or Owego, must leave the highway at Endicott, for example, within a predetermined allowable time of trip limit. Referring to FIG. 32m, relay R1100P will be energized only if the entrance station identification number punched in the trip card at the entrance station, is outside of the zone area. In order to simplify wiring of the pluggable control panel, the Endicott exit toll recorder is wired to check for station numbers 28 through 37. This, it will be observed, includes those stations within zone 401 shown in FIG. 7. The plug hubs ZT0 through ZT7 correspond to 0 through 7 tens digit values of the entrance station number, and plug hubs ZU0 through ZU9, correspond to a 0 through 9 units digit value of the entrance station number. It may be pointed out here that although provision is made for only 79 entrance station numbers, this is not to be taken as a limitation of the present invention. The control panel shown in FIG. 32m is always plug wired so as to check for ten entrance stations, e.g., station Nos. 28 through 37. In accordance with the conditions set forth hereinabove, the plug hubs ZT0, ZT4, ZT6, ZT1, ZT5 and ZT7 are connected by a common wire to plug hub 1841. This is done because the tens digit position of the entrance station identification numbers within the range 28 through 37 being checked, includes only a 2 or a 3. That is, a 0, 1 and 4 through 7, digit, in tens position of the entrance station identification number will cause a circuit to be formed whereby an impulse is directed to plug hub 1841 and relay R1100P via contacts R1065c. This, it may be seen, would be a correct operation inasmuch as relay R1100 will be picked so long as the entrance station number punched in the trip card is outside of the zone checking area; and, of course, any station number having a tens digit other than a 2 or a 3 must be outside of the Endicott zone checking area.

By the same token, since station Nos. 28 through 37 are being checked, provision must be made to permit signals representing entrance station identification numbers 20 through 27, and 38 and 39 to energize relay R1100P. For this reason, plug hub ZT2 is connected to hub 1842, and hub ZT3 is connected to hub 1843. As may be seen, diodes D135 and D136 are each connected, at one end, to hubs 1842 and 1843, respectively, and, at the other end, to hubs 1844 and 1845, respectively. Hub 1844, in turn is connected to hubs ZU7, ZU3, ZU5, ZU1, ZU6, ZU4, ZU0 and ZU2, whereas hub 1845 is connected to hubs ZU9 and ZU8. Thus, any entrance station identification number punched in a trip card which has a tens position digit of 0, 1, and 4 through 7, will cause an impulse to be directed to relay R1100P via contacts R1065c, whereas an entrance station identification number 20 through 27 will cause an impulse to be directed to relay R1100P via diode D135 and a labyrinth of contacts, including contacts R1073b. An entrance station number 38 or 39 will cause an impulse to be directed to relay R1100V via diode D136 and a labyrinth of contacts including contacts R1075c.

In order to clarify the zone checking circuit operation in greater detail, let it be assumed that a vehicle is caused to enter the toll highway at the Binghamton station No. 30 (see FIG. 7) for travel to Jamestown station No. 10. Upon arriving at Jamestown, the vehicle operator will withhold the trip card received at the Binghamton entrance by simply stating that he lost the card. However, subsequently after travel in an easterly direction from Jamestown to Binghamton, the same vehicle operator will leave the toll highway at the Endicott exit station No. 32. It will be at this station that the operator will turn over the trip card originally validated at the Binghamton entrance station No. 30.

Operation of the card sensing mechanism in the Endicott exit station toll recorder will cause sensing contacts SS4 (FIG. 32l), SS7 and SS9 to close, and sensing contacts SS10 (see also FIG. 32m) to transfer. The transfer of contacts SS10 will indicate a binary 1 hole in the tens digit position whereas the energization of relay R1067 (FIG. 32l) will indicate a binary 2 value hole in the tens digit position. Relays R1073 and R1075 will be energized consequent upon the closing of contacts SS7 and SS9 inasmuch as a 0 in the preferred embodiment of this invention is actually represented by the values 2 and 8, or 10. As a result of the transfer of contacts SS10 (FIG. 32m) and the energization of the foregoing relays, an impulse will be directed from line 1401 (FIG. 32l) through contacts C121, line 1840 (see also FIG. 32m), contacts SS10 n/o, R1067c n/o and R1068c n/c, plug hub ZT3 to hub 1843, diode D136, and hub 1845 to hubs ZU8 and ZU9. An examination of the zone checking circuit at hubs ZU8 and ZU9 will reveal that a circuit to relay R1100P cannot be completed because contacts R1073a and R1073c are transferred. The failure to energize this relay will indicate that the entrance station identification number, actually the Binghamton station No. 30 under the conditions set forth, punched in the trip card is located within the zone checking area 401 of the Endicott exit station at which the trip card is now being checked.

If, for example, a trip card which was validated at an entrance station No. 38, were checked at the exit station, a circuit would be completed from line 1840 (FIG. 32m), contacts SS10 n/o, R1067c n/o and R1068c n/c, hubs ZT3 and 1843, diode D136, hubs 1845 and ZU8, contacts R1075a, R1073a n/c, R1074a n/c, R1072a n/c and R1065c, relay R1100P, to line 1402. The energization of this relay would indicate that the entrance station identification number, namely No. 38, punched in the trip card were outside of the zone checking area 401 of the Endicott exit station. This, it will be recognized is a proper function of the zone checking apparatus as plug wired in FIG. 32m, inasmuch as the plugging circuit shown is simply to detect entrance station numbers between 28 and 37.

*Allowable time of trip checking circuit.*—It will be recalled that the moving of a vehicle within any given zone checking area must be done within a predetermined time limit. If the vehicle movement within a zone checking area requires a time period in excess of the predetermined time limit, the toll recorder apparatus will indicate such a condition to the exit station toll collector when an excess time light 1846 (FIG. 32e) is illuminated and the toll recorder locks up. In the preferred embodiment of this invention, the maximum allowable time of trip limit is always set at five hours. That is, the time limit within which a vehicle is to be moved from an entrance station to an exit station within any given zone checking area, is five hours. The time limit setting is obtained by adjusting the time of trip control apparatus and, particularly, emitters 111 (see also FIG. 13) and 119, in the entrance station toll recorders five hours ahead of the time of trip control apparatus in the exit station toll recorders. It should be clear that this five hour limit, and the means by which it is obtained, is not to be taken as a limitation of the present invention but instead as merely a matter of preference. Any suitable time differential between the entrance and exit stations may be utilized.

If, for example, at the time a trip card is validated by the entrance station toll recorder, the time of trip control value punched at the index positions in row 3 at columns E through L, in trip card 51 (FIG. 5) is 25, the time of trip control value at all exit station toll recorders within the same zone checking area will be 16. It will be recalled by referring to FIGS. 10 and 13 and the description associated therewith, that the time emitters which determine the time control value, are mechanically driven by a time control mechanism in half hour increments, whereby a time control value from 0 to 99, inclusive, to cover a period of fifty hours, may be obtained.

The time of trip comparing apparatus in the exit station toll recorder will indicate excess time only if the exit station time control value at the period the trip card is analyzed by the exit station card sensing mechanism, is greater than the entrance station time control value punched in the trip card. In other words, the moving of a vehicle within the predetermined allowable time limit is indicated if the time control value at the exit station, at the time the trip card is being processed therein, is less than or equal to, the time control value punched in the trip card at the entrance station.

In line with the conditions set forth hereinabove wherein a time of trip control value of 25 had been punched in a trip card at an entrance station, if the trip card is subsequently placed in an exit station toll recorder for processing when the time of control value is 26, an excess time of travel indication will occur if the entrance station and the exit station are within one zone checking area. It may be pointed out here that the exit station time value of 26 as compared with the entrance station time value of 25 which is punched in the trip card, indicates that the vehicle operator required 5½ hours to move from the entrance station to the exit station.

Referring to FIG. 32m, the time control value 25 punched in the trip card at the entrance station will cause relays R1080, R1088 and R1094 to pick up via their respective sensing contacts SS11, SS15 and SS17. Since the time control value at the exit station is 26, the exit station tens digit emitter brush will be connected to the two value conducting segment XT2 (FIG. 32k), whereas the units emitter brush will be in contact with segment XU6 (FIG. 32l). It may be pointed out here that these emitters are similar in all respects to those entrance station emitters described with reference to FIGS. 10, 13 and 31f.

Inasmuch as relay R1100H (FIG. 32k) should be energized if excess time has not been required, this relay will not be energized when an entrance station time control value of 25 is compared with an exit station time control value of 26. The incomplete circuit may be traced from line 1401 (FIG. 32k) through contacts C122 and R1065d, the common emitter strip to hub XT2, contacts 1083b n/c, R1080a n/o, R1082a n/c and R1079a n/c, line 1847 (see also FIG. 32l), the units emitter common strip, hub XU6, to contacts R1091e, R1094e and R1088e, R1085f n/c, cable connector 6 of cable 1848 (see also FIG. 32k), to contacts R1091j n/o. It may be seen that inasmuch as relay R1091 (FIG. 32m) is not energized so that the j contacts thereof are not transferred, the circuit to relay R1100H cannot be completed. This is indicative of excess time.

Very often the tens digit value of the time control value punched in the trip card at the entrance station may be greater by a value of one than is the tens position value of the time control value at the exit station. For example, a time control value of 31 punched in the card at the entrance station, as compared with a time control value of 29 at the exit station. Inasmuch as the exit station time control value does not exceed the entrance station value, relay R1100H (FIG. 32k) should be picked to indicate that the trip was made within the allowable time period. The circuits for taking care of such a tens digit position difference of one will now be explained.

In keeping with the conditions assumed hereinabove, i.e., that a time control value of 31 has been punched in the trip card at the entrance station whereas the actual time control value at the exit station is 29, relays R1079 (FIG. 32m), R1080 and R1088 will be energized during the card sensing period. In addition thereto, the exit station tens digit emitter brush will be in contact with the two value conducting segments XT2 (FIG. 32k) whereas the units emitter brush will be in contact with the nine value conducting segment XU9 (FIG. 32l).

*Card tens high relay R1085.*—The energization of this relay will indicate that the tens position digit punched in the card is high when compared to the tens position digit at the exit station. The said relay will be picked from line 1401 (FIG. 32k) through contacts C122 and R1065d, the common conducting segment of the emitter to segment XT2, from cable connection 2 in cable 1848 to cable connection 3 in cable 1849 to cable connection 13 in cable 1849, contacts R1082f n/c, R1080e n/o and R1079d n/o, relay R1085, to line 1402.

*Allowable time of trip relay R1100H circuit No. 2.*— From line 1401 (FIG. 32k) through contacts C122 and R1065d, the tens emitter common strip to segment XT2, connection 2 of cable 1848 to connection 3 of cable 1849 to connection 13 of cable 1849, contacts R1082f n/c, R1080e n/o, R1079d n/o and R1085i, line 1847 (see also FIG. 32l), the common conducting strip of the units emitter to conducting segment XU2, relay contacts R1091b, R1091c, R1094d, R1094e, R1094f, R1094g, R1097h, R1097j, and R1085j n/o, connection 9 of cable 1848 (see also FIG. 32k), contacts R1097f n/c, R1094i n/c, R1091m n/c, R1088m n/o and R1094m, relay R1100H, to line 1402.

It may be seen in FIG. 32k that the hold circuit for relay R1100H includes cam contacts C123 and relay contacts R1100a.

In summation, allowable time of trip relay R1100H (FIG. 32k) will not be energized if the actual exit station time control value at the time the trip card is being processed, is larger than the time control value punched in the trip card at the entrance station. Furthermore, relay R1100H will not be energized if an amount of time in excess of a predetermined time limit has been required to move a vehicle from an entrance station to an exit station. It will be recalled that relay R1100P (FIG. 32*m*) will be energized if the entrance station number which is punched in the trip card at the entrance station is outside of the zone checking area of the exit station. Hence, the failure to pick relay R1100, either coil R1100P or coil R1100H, is indicative of a vehicle passing over a portion of the toll highway within a single zone checking area while exceeding the allowable time of trip limit for such passage. Of course, the energization of either of the coils R1100P or R1100H will cause the relay R1100 to pick, whereby it will be indicated that the vehicle is either passing from one zone checking area to another or requires less than the predetermined amount of allowable time for passage within one zone checking area.

It may be pointed out here, once again, that the failure to pick relay R1100 will cause a circuit to be completed to an excess time light 1846 in FIG. 32*e* when the release card interposer contacts 155X are caused to close.

(C5c) *Axles in error check.*—The axles per vehicle count caused to be punched in the trip card at the entrance station is compared by the circuit shown in FIG. 32*f* with the axles per vehicle determination made by the exit station toll collector and which is represented by the axle key operated within unit 49 (see also FIG. 1). It will be recalled that binary value 1, 2 and 4 relays R1056 (see also FIG. 32*l*), R1057 and R1058, respectively, are caused to be picked in accordance with the data punched in the trip card at the entrance station in order to represent the axles per vehicle value punched in the trip card. The relays R1004 (FIG. 32*d*) through R1009, on the other hand, are controlled by the axle keys in unit 49 (see also FIG. 1). Axles check relay R1059 (FIG. 32*f*) will be picked if the afore-mentioned axles per vehicle values match.

If, for example, three axles are recorded upon a trip card at the entrance station, relays R1056 and R1057 will be energized at the exit station. Furthermore, if the exit station toll collector operates the three-axles key, relay R1006 will be energized. Hence, a circuit may be completed from line 1401 (FIG. 32*f*) through contacts C101, R1065*d* and R1006*c*, connector 3 of cable 1850, contacts R1056*a* n/o, R1057*a* and R1058*a* n/c, relay R1059, to line 1402. As the description advances, it will be shown that the contacts controlled by the axles check relay R1059 are employed in the exit station toll recorder interlock circuits and the exit station indicator panel light control circuits.

(C5d) *Dynamic weight vehicle classifying check.*—The method of, and the apparatus for, dynamic weight vehicle classifying has been described in detail hereinbefore under the heading (C3q) Vehicle Classifying. A similar vehicle classifying apparatus is made use of at the exit station for determining the vehicle classification at the exit station. In addition, a classifying check circuit is provided for at the exit station to compare the exit and entrance class values. In the preferred embodiment of this invention, the circuits are arranged so that if the class punched in the trip card at the entrance station is two or more classes less than the class determined at the exit station, class agree relay R1318P will not be picked.

A comparison of the exit station dynamic weight classifying circuit shown in FIG. 32*s* with the entrance station classifying circuit shown in FIG. 31*o*, will show that the exit station ripple circuit starts with the class 1 relay R1377, whereas the entrance station ripple circuit begins with class zero relay R376. One reason for omitting the class zero relay in the exit station apparatus is that the contacts of this relay are used to check the operation of the classifying circuits, and in the preferred embodiment of this invention, this check is provided for only at the entrance station (proof of classification magnet PM9 in FIG. 31*e*).

Referring to FIG. 32*s*, sensing contacts SS19 through SS26 are controlled by the card sensing pins for reading a classification perforation caused to be entered on the trip card at the entrance station. If, for example, a classification of three has been punched in the trip card at the entrance station, contacts SS25 will be operated.

The exit station classifying ripple circuit shown in FIG. 32*s* is always reset during the toll recorder operation to a class 9 position, i.e., one wherein relay R1388 is caused to remain picked. Hence, at the start of a vehicle classifying operation when start classify No. 3 relay contacts R1391*b* close, a circuit will be completed to class 1 relay R1377LP when line 1622 goes positive. This circuit may be traced from line 1622 through contacts R1388*d* n/o, R1387*c* n/c and R1391*b*, relay R1377LP, contacts R1394*e*, diode D126, to line 1621. During the portion of the alternating current wave when line 1621 goes positive, a circuit will be completed to energize latch trip relay R1388LT through diode D127, relay R1388LT, contacts R1388*c* n/o, R1377*d* and R1395*a*, to line 1622. The ripple circuit ring will then continue to advance to pick relay R1378, drop out relay R1377, pick relay R1379, drop out relay R1378, etc. When the proper exit station classification value relay has been picked, an impulse will be directed to the left plate of vacuum tube V101 (see also FIG. 32*u*), whereby end classify relay R1394P will be energized. In response to the picking of relay R1394, contacts R1394*e* (FIG. 32*s*) will open so as to prevent any further advance of the ripple circuit ring.

If, for example, a class three valve is punched in the trip card at the entrance station, and the classification at the exit station is calculated to be one of the classes 1 through 4, class agree relay R1318P will be energized to indicate that the classification of the vehicle determined at the exit station is not two or more classes higher than that determined at the entrance station. The circuit for energizing relay R1318P may be traced from line 1622 (FIG. 32*s*) through contacts R1388*d* n/c, R1387*d* n/c, R1385*d* n/c, R1384*d* n/c and R1382*d* n/c, sensing contacts SS25, proof of classification sensing contacts SS27, contacts R1395*j*, relay R1318P, diode D127 to line 1621. It may be pointed out here that relay contacts R1395*j* will be closed inasmuch as relay R1395P will have been energized in response to the pickup of end classify relay R1394. The circuit for energizing relay R1395 may be traced from line 1622 through contacts R1394*f* n/o and R1391*a* n/c,, relay R1395, diode D126, to line 1621.

It may be seen that inasmuch as the class agree test impulse passes through the contacts R1382*d*, R1384*d*, R1385*d*, R1387*d* and R1388*d*, wherein each of these contacts represents one of the classes 5 through 9, respectively, had any of these contacts been transferred the circuit to relay R1318P would have been open.

*Axle treadle 39 circuits.*—A detailed description will now be provided for the circuits associated with axle treadle 39 (FIG. 1). After the trip card associated with vehicle 20 has been completely processed at the exit station, the vehicle is permitted to pass on during the course of which the vehicle axles will be caused to move over treadle 39. As has been mentioned previously, inasmuch as the exit station toll booth 35 is ahead of treadle 39, any zero control counter information to be recorded upon a trip card must be recorded on the trip card which is associated with the next following vehicle.

Referring particularly to FIG. 32*a*, the forward motion of a vehicle axle over treadle 39 will cause treadle contacts 39*a* to close first, whereby a circuit will be completed through the said contacts to relay R1291. In response to the energization of this relay, a circuit will be completed to energize relay R1294 via contacts R1291*c* and R1295*a* n/c. During the interim period when the vehicle axle causes both contacts 39*a* and 39*b* to close, both relays R1291 and R1292 being energized as a result thereof, a parallel hold circuit to relay R1294 will be formed through contacts R1292*d*, R1294*b* and R1295*a* n/c. In response to a continued forward motion of the vehicle axle whereupon relay R1291 will be de-energized, a circuit will be formed to relay R1296 via contacts R1292c, R1294a n/o and R1291a. A hold circuit for relay R1296 will be completed through contacts R1204a, R1296a and R1291a. When the vehicle axle has been moved in a forward direction a sufficient distance to cause treadle contacts 39b to open, whereby relay R1292 will drop out, a circuit will be completed to energize relay R1201 via contacts R1292b, R1291 and R1296b. The energization of this relay will cause a circuit to be completed to relay R1204 via contacts R1201e, to thereby effect the deenergization of relay R1296 when contacts R1204a are caused to separate. As may be seen, the de-energization of relay R1296 will cause contacts R1296b to separate, whereby relay R1201 will be caused to drop out.

In the event a vehicle is caused to pass over treadle 39 in a reverse direction, relay R1292 will be energized first when contacts R39b are closed. The energization of this relay will cause relay R1295 to become energized via contacts R1292c and R1294a n/c. The subsequent energization of relay R1291 when the vehicle axle causes contacts 39a to close will complete a parallel circuit to relay R1295 via contacts R1291d, R1295b and R1294a n/c. Continued reverse motion of the vehicle axle will cause relay R1292 to drop out, whereby a circuit will be completed to relay R1297 via contacts R1291c, R1295a n/o and R1292a. As soon as relay R1297 is energized, and relay R1291 is de-energized, a circuit will be completed to relays R1242 and R1245 via contacts R1292b, R1291b and R1297b. It may be pointed out here that the energization of these relays causes a circuit to be completed to relay R1208 via contacts R1242i n/o. Relay R1208, in turn, causes a circuit to be completed to relay R1206P via contacts R1208b.

(C5e) *Zero control counter.*—Referring to FIG. 1, it may be seen that a zero control counter 46 is provided for comparing the axles per vehicle counted by the circuits associated with treadle 39 with the axles per vehicle represented by the manually operated key in axle key unit 49. If the actual axles per vehicle value matches the manually controlled axles per vehicle value, a zero balance will remain in counter 46 because one value will be entered in the counter in a complement form of the other value.

*Zero control counter—keyed axle count.*—It will be recalled that the operation of one of the axle keys in axle key unit 49 (see FIGS. 1 and 32d) will cause a corresponding axle key relay to pick. An examination of the keying mechanism description provided previously will show that an axle key which has been operated is permitted to remain in an operated position for a substantial portion of a toll recorder cycle. Consequently, an axle key relay which has been caused to pick, will remain picked for a corresponding portion of the toll recorder cycle. Suffice it to state for the present that the axle key relays will remain picked through 300° (refer to timing chart shown in FIG. 33) so that a setup pulse from 288° through 300° may be directed by cam contacts C105 (FIG. 32j) to one of the zero control counter relays R1109LP through R1120LP. To clarify this point, if, for example, a three axle is operated, relay R1006 (see also FIG. 32d) will be energized. In turn, its contacts R1006b (FIG. 32j) will be closed, and will remain closed at 288° when cam contacts C105 close to complete a circuit to relay R1114LP from line 1401 through contacts C105, R1011f n/c and R1006b, relay R1114LP, to line 1402. Inasmuch as this relay is a latch type relay, it will remain picked after the latch pick coil has once been energized until the coil R1114LT is energized.

In brief, it may be stated that relay R1111 will be picked in response to the energization of the one-axle key relay, R1112 will be picked in response to the energization of the two-axle key relay, R1114 will be picked in response to the three-axle key relay, etc.

*Zero control counter—treadle axle count.*—Referring to FIG. 1, it may be seen that the axle treadle pulses due to the passing of vehicle 20 over the treadle 39 are directed to the tour-of-duty recorder 42 and the zero control counter 46 after the trip card associated with vehicle 20 has already been completely processed at the exit station. In response to an axle passing over treadle 39 in a forward direction, contacts R1506b (FIG. 32i) will be caused to transfer, to thereby direct a pulse per axle to the zero control counter relay ring shown in FIG. 32j.

It may be stated here that although the zero control counter treadle circuits are designed to detect the passage of vehicles in either direction, the zero control counter to be described in detail shortly is designed to operate only when an axle passes over the treadle in a forward direction. In the preferred embodiment of this invention, an axle passing over treadle 39 in a reverse direction will not affect the zero control counter. This is not to be taken as a limitation of the present invention, but instead as a practical expedient because a vehicle is not expected to stop after once leaving its position opposite the exit station toll booth. When an axle is moved over the treadle in a reverse direction, a pulse will be directed to hub 1863 (FIG. 32i).

Assume, for example, that a three-axle key had been operated by the toll collector for a vehicle passing through the exit station. As described previously, this would cause zero control counter relay R1114LP to be energized during the toll recorder operation while the trip card associated with the vehicle in question is caused to be processed. If, assuming further, the vehicle has three axles thereon which pass over treadle 39 (FIG. 1) in a forward direction, forward motion lock relay R1506 (see also FIG. 32a) will be operated three separate times, once for each axle passing over the treadle. Of course, each time this relay is energized, contacts R1506b (FIG. 32i) will be transferred to complete a circuit to the zero control counter latch pick relays. Thus, during the first transfer of contacts R1506b, a circuit will be completed from line 1401 (FIG. 32i) through contacts R1501b, R1502b and R1506b n/o, line 1851 (see also FIG. 32j), contacts R1115b and R1114c, relay R1112 LP, to line 1402. When the contacts R1506b (FIG. 32i) are restored to normal, a circuit will be completed to energize relay R1114LT from line 1401 through contacts R1501b, R1502b and R1506b n/c, line 1852 (FIG. 32j), contacts R1112d n/o and R1114a, relay R1114LT, to line 1402. During the next transfer of contacts R1506b (FIG. 32i), consequent upon the forward motion of another axle over treadle 39 (see also FIG. 1), a circuit will be completed to relay R1111LP from line 1851 (FIG. 32j) through contacts R1114b and R1112c. In response to the contacts R1506b (FIG. 32i) returning to a normal condition for a second time, an impulse will be directed from line 1852 (FIG. 32j) through contacts R1111d n/o and R1112a to relay R1112LT. During the third transfer operation of contacts R1506b (FIG. 32i), a circuit will be completed to relay R1109LP from line 1851 (FIG. 32j) through contacts R1112b, R1111c and R1124a. When contacts R1506b (FIG. 32i) are returned to normal for a third time, it will be observed that a circuit will be completed to relay R1111LT via contacts R1109d n/o (FIG. 32j) and R1111a. Hence, as a result of the toll collector operating a three-axle key, and the vehicle passing over treadle 39 (see also FIG. 1) having three axles thereon, relay R1109 will remain picked after the vehicle has passed beyond the treadle. It will be shown hereinafter, that relay R1109 represents a "no-axles" in error, or a zero axle balance.

It may readily be seen that should a two-axle vehicle pass over the axle treadle after a three-axle key has been depressed, relay R1111LP will remain picked after the vehicle has passed beyond the treadle. This relay indicates a single axle in error. In line with the foregoing, relays R1112, R1114, R1115, R1117, R1118 and R1120 represent two through seven axles in error, respectively.

During the toll recorder operation following the passage of the vehicle over the axle treadle, cam contacts C125 (FIG. 32j) will close at 238° so as to direct a reset pulse whereby the latch trip relay associated with the relay having remained picked, will be energized. If, for example, zero axle balance relay R1109 is the one remaining picked after the vehicle has passed over the treadle, when contacts C125 close a reset impulse will be directed through these contacts and contacts R1123d n/c and R1109a, to relay R1109LT. Hence, it may be seen that all of the zero control counter relays will be dropped out after the reset pulse. If, for example, five axles should pass over treadle 39 in a forward direction after the three-axle key had been operated by the toll collector, a negative two value would remain standing in the zero control counter after the vehicle had completely passed over the treadle. In response to the forward motion of the vehicle over the treadle, the zero control counter relay ring will advance from relay R1114 to R1112 to R1111 and to R1109, in the manner described previously. In response to the transfer of contacts R1506b (FIG. 32i) as a result of the fourth vehicle axle passing over the treadle, a circuit will be completed to energize complement relay R1124LT and −1 axle relay R1123 from line 1851 through contacts R1111b and R1109c. The restoration of contacts R1506b will cause a circuit to be completed from line 1852 through contacts R1123d n/o and R1109a to relay R1109LT. During the fifth axle operation of contacts R1506b, a circuit will be completed to −2 axle relay R1121LP from line 1851 through contacts R1109b and R1123c. The restoration of the contacts R1506b will cause an impulse to be applied to line 1852, whereby relay R1123LT will be energized via contacts R1121d n/o and relay R1123a. It is to be observed that the complement relay coil R1124LT will not be energized and, as a result, the relay will remain picked. This, of course, is necessary inasmuch as the relay R1124, when picked, indicates that the number of axles passing over the treadle is in excess of the number of axles represented by the axle key operated. It may be stated here, too, that the pickup of relay R1124 in combination with any of the relays R1120, R1118, R1117, R1115, R1114, R1112 and R1111, will indicate 3 through 9 minus axles, respectively. Relay R1109 cannot be energized as a minus relay inasmuch as contacts R1124a are interposed in the latch pick coil circuit thereof.

(C5f) *Interlock control circuits.*—Although the exit station toll recorder interlock control circuits are similar in many respects to the circuits already described for the entrance station toll recorder, it is believed that there is enough difference therebetween to warrant a detailed description of the exit station interlock control circuits.

The insertion of a toll collector's identification key into the toll recorder will cause a pair of key contacts 261X (FIG. 32d) to close, whereby direct current power will be applied to the toll recorder main lines 1401 and 1402. When power is applied to these lines, power light 1406 will be illuminated.

Referring to FIG. 1, when vehicle 20 is stopped opposite exit station toll booth 35, the vehicle will be examined by the exit station toll collector in order that a determination may be made by him as to the number of axles on the vehicle. After having made such an axle count determination, the toll collector will operate an axle key in unit 49, said key corresponding to the number of axles. Furthermore, after operating an axle key, the toll collector will take the partially processed or entrance station validated trip card from the vehicle operator for insertion into the card receiver of the exit station toll recorder. It will be recalled that the trip card is carried by the vehicle operator from the entrance station to the exit station. This, of course, is done so that the partially processed trip card may be completely processed at the exit station. In much the same manner as at the entrance station, there must be a complete insertion of the trip card with proper regard to the position of corner cut in order to condition for operation electrical circuits which cause the exit station toll recorder operation to begin.

In response to the insertion of a card into the card receiver, card inserted contacts 127X (see FIGS. 12, 14, 15 and 32e) will be closed. The full insertion of the trip card will cause card fully inserted contacts 132X (see FIGS. 17 and 32e) to close, whereas proper regard to corner cut will permit the contacts 136X to remain normal. Contacts 421X (see FIGS. 12 and 32e) will remain normal so long as handle 139 is not moved upwardly. Hence, the proper and full insertion of the trip card into the card receiver will permit a circuit to form to relay R1054P from line 1401 through contacts C126, 421X n/c, 127X, 132X and 136X n/c, relay R1054P, to line 1402. Immediately thereafter, a circuit will be completed to card sensing solenoid 165 (see FIGS. 18 and 32d), via contacts C108 and R1054a. As described previously under the (B3) Card Sensing Mechanism description, the energization of this solenoid will permit the sensing pins 176 (see also FIG. 16) to analyze the perforated data entered on the trip card by the entrance station toll recorder.

*Relay R1065 circuit.*—Consequent upon the detection by the card sensing mechanism of an entrance station number in the trip card, one or more of the relays R1072 (FIG. 32l) through R1075 will be energized so that a circuit may be completed through corresponding relay contacts shown in FIG. 32f whereby relay R1065P may be energized. In particular, this circuit will include cam contacts C101, one or more of the contacts R1072d through R1075d, and R1265d.

It will be recalled that the no axles stored relay R1265 (see also FIG. 32r) will be energized only if there are no axles stored in the exit station toll recorder. The R1265d contacts in FIG. 32f are interposed in the relay R1065P circuit so that a toll recorder operation at the exit station may be prevented so long as there are no axles stored in the exit station toll recorder.

The relay R1065H coil is short circuited to provide a slight delay in pickup and drop out time.

*Release card interposer magnet.*—Referring to FIG. 18, it may be seen that in response to the energization of solenoid 165, the sensing mechanism pins 176 will be moved toward the trip card in card receiver 120. This motion will also be applied to contact operating pin 183, whereby card bail sensing contacts 184 will be closed to indicate that the forward motion of the sensing pins has been completed.

In addition thereto, the card sensing contacts 465 (see FIGS. 18 and 32e) are provided to prevent a reuse of an exit station validated trip card. Referring to FIG. 5, a completely processed trip card will have a cancelation hole punched in row 3 at column A. The presence of this cancelation hole in the trip card will cause exit cancelation contacts 465 (see FIGS. 18 and 32e) to transfer during card sensing time, whereby an exit station toll recorder operation will be prevented. In addition thereto, the transfer of contacts 465 will cause a circuit to be closed to release card light 1466 via contacts C126 (FIG. 32e), 184, 465 n/o and R1063g. It may be pointed out here that a circuit can be completed to release card light 1466 through release card handle contacts 421X n/o which, it will be recalled, will be transferred only when the card release handle 139 (see also FIG. 12) is moved upwardly in order to disable the card braking mechanism. Thus, when the toll collector at the exit station observes an illuminated release card light 1466, it will signify that either a reuse of a trip card is being attempted or that the card release handle 139 is in an upward position.

Assuming the absence of a cancelation hole in the trip card being analyzed by the card sensing mechanism, a circuit will be completed to release card interposer magnet 153X from line 1401 (FIG. 32e) through contacts C126, 184, 465 n/c, and R1065a n/o, magnet 153X, to line 1402.

*Clutch interlock relay.*—In response to the energization of magnet 153X (see also FIG. 12), the release card interposer contacts 155X will be closed, whereupon a circuit will be completed to clutch interlock relay R1063P from line 1401 (FIG. 32e) through contacts C124, 155X, C127, R1003b, R1394c, and R1318c n/o, relay R1063P, to line 1402.

It will be recalled that end classify relay R1394 (see also FIG. 32u) will be energized when a classification determination has been completed at the exit station, and class agree relay R1318 (see also FIG. 32s) will be energized if the classification determination at the exit station is not more than one class higher than the entrance station classification. It may also be pointed out here, that should either of these two relays fail to be picked, relay R1063P may be picked nevertheless if release relay R1319 is picked so that the contacts controlled thereby, namely contacts R1319b and R1319c, will complete a circuit to relay R1063P. The circuit for energizing relay R1319P will be completely consequent upon the operation of release key RK2.

Immediately upon the energization of relay R1063P, a hold circuit will completed to relays R1063H and R1054H via contacts C126 and R1063b.

*Indicator lights relay.*—A circuit will be completed to energize relay R1064P from line 1401 through contacts C124, 155X, R1026d, one of the axle key relay contacts R1004 through R1009a, relay R1064P, to line 1402.

*Punch and print clutch magnet.*—This magnet, 203X (see FIGS. 11 and 32e), will be energized from line 1401 through contacts C124, 155X, C127, R1063c, R1063d and 194X, magnet 203X, to line 1402. Suffice it to state for the present that punch interposer bail contacts 194X (see also FIG. 12) will be closed consequent upon the movement of any one interposer 195 into an operative position.

Referring to FIG. 11, the energization of magnet 203X will cause dog 205 to engage the rotating clutch ratchet 206. This, in turn, will cause punch shaft 156 to rotate, whereby the punch mechanism and the print mechanism will be caused to operate.

(C5g) *Exit station punch interposer magnets.*—Prior to the closing of punch interposer bail contacts 194X (FIG. 32e), selected punch interposer magnets must be energized in order to set up the following information in the trip card at the exit station:

(1) The axles in error in row 5 of the trip card (FIG. 5) at columns I through L.

(2) The type of axles in error, i.e., plus or minus, in row 5 at column G.

(3) An excess time indication in row 5 at column F.

(4) The axles per vehicle manually set up as a result of the determination thereof by the toll collector, in row 5 at columns B through D.

(5) The vehicle classification as determined at the exit station only if the exit station classification value is greater by two or more classes than the entrance station classification, and is punched in row 4 at columns A through D.

(6) A cancelation indication in row 3 at column A.

*Zero control counter balance punch interposer magnets.*—The balance in the zero control counter 46 (see FIG. 1) is caused to be punched in the trip card at the exit station. The magnets therefor, namely magnets PM101 (FIG. 32f) through PM104, are energized in accordance with a binary notation. For example, if zero balance relay R1109 (see also FIG. 32j) remains standing after the vehicle has completely passed over treadle 39, an 8 digit and 2 digit representing perforations will be recorded on the trip card when a circuit is completed to magnets PM102 and PM104 from line 1401 (FIG. 32e) through contacts C124 and R1063f, line 1853 (see also FIG. 32f), and parallel contacts R1109e and R1109f to their respective magnets PM102 and PM104.

Should a greater number of axles pass over the treadle than as is represented by the axle key operated, complement relay R1124 (see also FIG. 32j) will be energized. The contacts controlled thereby will in effect reverse the punch interposer magnet circuits so that if the relay R1118 (FIG. 32j) remains picked with relay R1124 after the vehicle has passed completely over the treadle, a four-axle value normally represented by relay R1118. This axle value normally represented by reay R1118. This circuit for energizing magnet PM103 (FIG. 32f) may be traced from line 1853 through contacts R1118f to magnet PM103. It may be observed that the circuit normally including contacts R1118e and R1124f n/c to magnet PM104, is now open.

Whenever the number of axles passing over the treadle exceeds the number of axles represented by the axle key operated, relay contacts R1124b will be closed to energize complement punch interposer magnet PM105. Thus, it may be seen, the presence of a complement perforation in the trip card will indicate a greater number of actual axles per vehicle than keyed axles per vehicle.

*Excess time punch interposer magnet.*—In the event that relay R1100 is picked as a result of either coil R1100P (FIG. 32m) or R1100H (FIG. 32k) being energized, contacts R1100d (FIG. 32f) will be closed so as to permit a circuit to be formed to excess time interposer magnet PM106. Hence, it should be clear that an excess time perforation will indicate that a vehicle in question has moved from an entrance station to the exit station within one zone in an allowable period of time, or that the vehicle has moved from one zone checking area to another zone checking area. The absence of this perforation will indicate that the allowable time of trip limit has been exceeded by a vehicle passing from an entrance station to an exit station, both of which are located in the same zone checking area.

*Axles keyed punch interposer magnet.*—These punch interposer magnets, PM107 through PM109, are shown in FIG. 32f. The circuits therefor are similar in all respects to the axles keyed punch interposer magnet circuits for the entrance station, and for this reason need not be described in detail. Suffice it to state that consequent upon the energization of an axle key relay R1004 (see also FIG. 32d) through R1009, a circuit will be completed from line 1853 (FIG. 32f) through the contacts controlled by energized axle key relays, to one or more magnets PM107 through PM109.

*Classification punch interposer magnets.*—These magnets are shown in FIG. 32e and are identified by the reference numerals PM110 through PM113. As has been stated previously, the vehicle classification as determined at the exit station will be entered on the trip card at the exit station, only if there is a difference between the entrance and exit station class determinations. This, it may be seen, is controlled by the contacts R1318d which will be closed only if the classes do not agree in a predetermined fashion. If the classes agree, or if the exit class is not more than one class greater than the entrance class, relay R1318 (see also FIG. 32s) will be energized, and contacts R1318d (FIG. 32e) will be caused to open.

If, for example, the three class relay R1379 (see also FIG. 32s) remains picked after the end classify relay has been picked, a circuit may be completed to magnet PM111 (FIG. 32e) from line 1401 through contacts C124, R1063f, R1011c, R1318d (only if the classes disagree), and R1379f, magnet PM111, to line 1402. A parallel circuit will be formed to punch magnet PM110 via contacts R1379e.

(C5h) *Receipt card operation.*—Provision is made in the preferred embodiment of this invention whereby a receipt card may be issued to the vehicle operator at the exit station only after a trip card has been processed. As will be explained shortly, the receipt card circuits have been designed to prevent a receipt card toll recorder operation following either a tour-of-duty card operation or a charge card operation. In addition, inasmuch as a receipt card may be considered to be a part of the transaction involving the preceding trip card, there are provided means whereby the counter for printing the transaction number on the face of the card (see FIG. 5), is not advanced during a receipt card operation, and the sequence number count accumulated in tour-of-duty recorder counter 290 (see also FIG. 22) is not advanced during a receipt card operation.

During a normal trip card toll recorder operation, when any of the axle key contacts A11 (FIG. 32d) through A16 is closed, a circuit will be completed to relay R1102 via one of the diodes D40 through D45. At 288° of the toll recorder cycle when cam contacts C130 close, one of the circuits to either the latch pick or latch trip coils of relay R1104 will be completed. Which of the two coils is to be energized will depend upon the position of contacts R1102b and charge card sensing contacts 1877. If the toll recorder operation is for a trip card, contacts R1102b will be transferred inasmuch as relay R1102 is picked. On the other hand, if the card in the card receiver of the toll recorder is actually a charge card, contacts 1877 will be transferred inasmuch as a hole is always present at row 2 (see also FIG. 5) column C of a charge card. However, if the card being processed is not a charge card but instead a trip card, contacts 1877 will not be transferred and a circuit will be completed from line 1401 through contacts C130, R1063g, R1102b n/o and 1877 n/c, relay R1104LP to line 1402. Thus, it should be clear that relay R1104 will be picked only if the card being processed is a trip card. In keeping with this, should the card being processed be a tour-of-duty card or a charge card, relay R1104LT will be energized, whereby the relay will be dropped out.

Immediately after this toll recorder operation, during which relay R1104 is picked, should a receipt card be desired, receipt key RC must be operated in order to energize relay R1148 via contacts 1426, RC and R1104a. A hold circuit for relay R1148 will be formed immediately via contacts R1148a and R1148b. In addition, tour-of-duty relay R1026 will be energized via contacts R1148b. The energization of relay R1026 will in effect cause a toll recorder operation similar to a tour-of-duty card operation. In particular, circuits to the punch interposer magnets will be opened so that only the station identification number will be punched in the receipt card in exactly the same position as in the tour-of-duty card 53 (FIG. 6).

Referring to FIG. 32d once again, inasmuch as relay R1102 is not energized during a receipt card operation, when cam contacts C130 close, relay R1104LT will be energized. This provides assurance against more than one receipt card operation for every trip card operation.

Referring to FIG. 32b, it may be seen that during a receipt card operation contacts R1148c will be open, whereby the circuit to sequence count magnet 391X will be opened, and the counter 290 (see also FIG. 22) associated with magnet 391X will not be advanced. As is shown in FIG. 32e, during a receipt card operation contacts R1148d will be open, to thereby prevent a circuit from being completed to transaction control magnet 1878 (see also FIG. 34).

Under the heading (B5) Card Printing Mechanism, the printing counter for setting up the sequential transaction number for each toll recorder operation or cycle, was described. Briefly, referring to FIG. 16, member 250 is fixed to shaft 145 and is connected to a link 251. Link 251, in turn, is connected to rocker 252 which is attached by conventional means to arm 253, both of which are rotatably mounted on a stud 254. Arm 253 has a pawl 255 pivotally attached thereto at its upper end, and spring-biased so that the pawl constantly engages ratchet 256 which is joined to the units wheel 257 of the transaction counter. Thus, when member 250 is moved in a counter-clockwise direction, arm 253 is moved in a clockwise direction about stud 254, to thereby cause pawl 255 to engage the next notch of ratchet 256.

At those exit stations where a receipt card operation is provided for, the transaction counter mechanism now to be described with reference to FIG. 34, is used. A pin 1879 which is connected to member 250 is passed through an elongated slot in link 1880. A spring 1881 is connected at one end to pin 1879, and, at the other end, to a pin attached to link 1880. The other end of link 1880 is connected to the rocker 252 (see also FIG. 16). A spring-biased armature 1882 is normally in a position to engage a step 1883 in link 1880 so that during a counter-clockwise motion of member 250, the armature will prevent link 1880 from moving. However, when magnet 1878 is energized so as to attract thereto armature 1882, during a counterclockwise motion of member 250 the link 1880 will be caused to follow this motion via the resilient connection between the member and the link. During this movement of link 1880, the counter wheel 257 (see also FIG. 16) will be advanced one position. It should be apparent at this time, that magnet 1878 is energized during a normal toll recorder operation, and is de-energized during a receipt card operation inasmuch as it is not desired at that time to advance the counter.

(D) INDICATOR PANEL AND CIRCUITS

Figure 8:
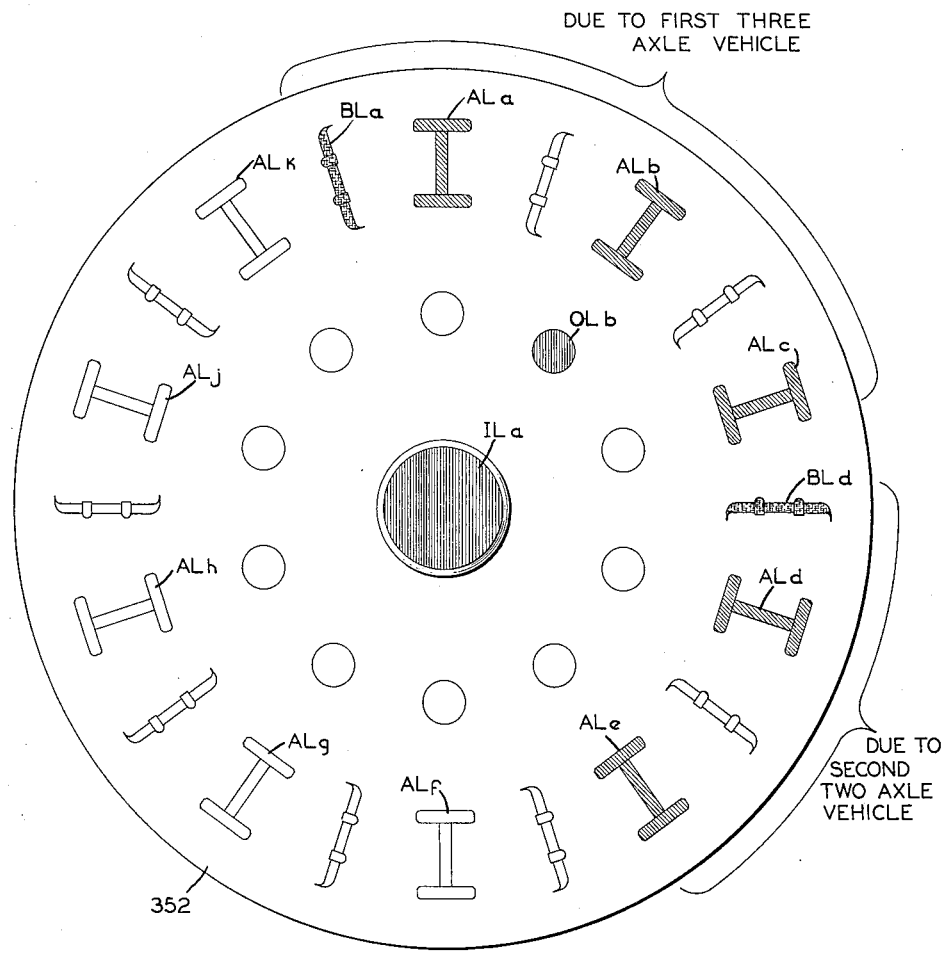
FIG. 8 is a full face view of the indicator panel.

The indicator panel mask 352 shown in FIG. 8 is employed with both the entrance and exit station apparatus as a visual aid to the toll collector. Both the entrance and exit station indicator panels have bumper lights which, it will be shown, are used to group axles per vehicle, and axle lights for representing those axles of vehicles at a station for which trip cards are to be processed. The entrance station panel additionally includes overweight axle lights which the exit station panel does not, inasmuch as the preferred embodiment of the exit station apparatus does not include means for detecting overweight axles. In the description to follow, it will be understood that the overweight axle light portion will relate to only the entrance station indicator panel.

The axle lights AL1 through AL10 (FIG. 31m) are controlled, in part, by the readout advance control relay contacts R276f through R289f. The bumper lights BL1 through BL10 are controlled, in part, by the first-axle relay contacts R229d through R238d, whereas the overweight axle lights OL1 through OL10 are controlled, in part, by the overweight axle storage relay contacts R252d through R261d.

It will be recalled that the capacitor weight storage input relays R401 through R424 shown in FIG. 31i are advanced in step with each axle passing over the axle treadle. In addition, the readout advance control relays do not advance except during a toll recorder cycle. Hence, if it is assumed that relay R276 is up along with relay R401 prior to the passage of a first vehicle axle over a treadle, the passage of three axles will cause the condenser weight storage input relays to advance to a point where relay R409 remains picked. Thus, if a voltage is applied to line 854, lights AL1 through AL3 will be illuminated by the parallel circuits including contacts R276f n/o, R401a n/c, R277f n/c, R404a n/c, R279f n/c, R406a n/c, R280f n/c to R409a n/o.

Should a two-axle vehicle pass over the treadle prior to a toll recorder operation, the condenser weight storage input relays will be advanced to a point where relay R414 will remain picked. As a result, axle lights AL4 and AL5 will also be illuminated should a voltage be applied to line 854.

It is to be remembered that the first axle relay corresponding to a first vehicle axle will not be energized, whereas all of the remaining first axle relays corresponding to the other axles of any given vehicle, will be energized. Hence, in line with the conditions set forth hereinabove, during the passage of the first vehicle axle over the treadle whereby relay R212LP (see also FIG. 31j) will be energized, first axle storage relay R229LP will not be energized, and its contacts R229d (FIG. 31m) will remain closed. The relays R230 and R231 whose contacts R230d and R231d are shown in FIG. 31m, will be energized in response to the second and third vehicle axles passing over the treadle. The first vehicle axle for the next following two-axle vehicle will cause relay R232 (see also FIG. 31j) to remain dropped out, whereby its contacts R232d will remain closed. The second axle of this vehicle will cause contacts R233d to open. Hence, should a voltage appear along line 854, parallel circuits will be completed to bumper lights BL1 and BL4 from line 854 through contacts R276f n/o, R401a n/c and R229d to bumper light BL1; and from contacts R401a n/c through R277f n/c, R404a n/c, R279f n/c, R406a n/c, R280f n/c, R409a n/c and R232d, to bumper light BL4.

As a result of axle lights AL1 through AL5 being illuminated, light rays will be transmitted through their respective transparent masks ALa (FIG. 8) through ALe. In addition, due to the illumination of bumper lights BL1 and BL4, light will be transmitted through the transparent bumper configurations BLa (FIG. 8) and BLd. Thus, simply by observing the lights on his indicator panel, the toll collector will be made aware of the number of vehicles and the axles per vehicle groupings in the station lane.

As mentioned previously, the entrance station includes overweight axle detection apparatus and overweight axle indicating lights. For example, should the second axle of the first three-axle vehicle be an overweight axle, relay R253LP (FIG. 31j) will be energized, whereby its R253d contacts (FIG. 31m) will be closed to form a circuit to the overweight light OL2 when contacts R64c and R317b close. The illumination of this light will cause an indication to appear at OLb (see FIG. 8). Inasmuch as this indication at OLb is in radial alignment with the axle ALb, the toll collector may easily determine that it is the second axle of the first vehicle which is overweight.

The various lights described in the foregoing paragraphs will be illuminated only if predetermined errors occur. These errors in the entrance station apparatus include a disagreement in the axles per vehicle check, whereby relay R316 (Fig. 31g) will not be energized, and an overweight axle condition whereby overweight axles relay R317 (see also FIG. 31f) will be energized.

The bumper and axle lights in the exit station apparatus (there are no overweight axle lights in the exit station apparatus), are caused to be illuminated consequent upon an axles per vehicle disagreement whereby relay R1316 (see also FIG. 32g) is not picked and an axles check disagreement whereby relay R1059 (see also FIG. 32f) is not picked. As mentioned previously, relay R1059 is used to compare the number of axles punched in the trip card at the entrance station with the number of axles indicated by the manual operation of the axle key at the exit station.

The center mask 11a permits light being emitted from lamp 406 (FIG. 31d) at the entrance station, for example, to pass through, to thereby indicate that the toll recorder power is switched on.

(E) TOUR-OF-DUTY RECORDER CIRCUITS

The tour-of-duty recorder mechanism for recorders 28 (FIG. 1) and 42 has been described previously and, it will be recalled, the exit and entrance station tour-of-duty recorders are similar in construction, function and purpose. For this reason the circuit diagram for only the entrance station tour-of-duty recorder 28 will be described in detail, whereas the circuit diagram for the exit station tour-of-duty recorder 42 will be described only briefly.

*Total axles keyed magnet 395N.*—This magnet is shown in FIG. 31b to be included in a circuit having axle keyed relay contacts as a part thereof across lines 410 and 411. If, for instance, the three-axle key A3 (see also FIG. 31d) is operated so as to energize relay R6, the relay contacts R6k and R6m in FIG. 31b will be closed. Cam contacts C11, C12, C13 and C14 close for 25 degree periods (see also FIG. 33) a plurality of times during a toll recorder cycle whereby axle indicating pulses are directed to magnet 395N. Thus, when contacts C11 close from 5° to 30°, a circuit will be completed from line 410 through contacts C11, R6k (under the conditions set forth the three-axle relay R6 will be energized), 408N n/c (see also FIG. 22) and R513c, magnet 395N, to line 411. The resulting energization of magnet 395N will cause contacts 408N to transfer, whereupon a circuit will be completed through the 408N n/o contacts to cut off relay R513. A hold circuit for this relay will be completed through contacts R513a so that after magnet 395N is de-energized when contacts R513c open, relay R513 will remain picked notwithstanding the restoration of contacts 408N. Of course, when cam contacts C11 separate at 30°, relay R513 will be de-energized. At 55° when cam contacts C12 close, magnet 395N will once again be energized in the manner just described. As may be seen in FIG. 31b, this second circuit will be completed through contacts R6m. At 105° when cam contacts C13 close, the magnet 395N will be energized for a third time through contacts R6m. Thus, the axles keyed magnet 395N will have had three pulses directed thereto during the toll recorder cycle due to the three-axle relay R6 having been energized as a result of the three-axle key having been operated.

By referring to the exit station tour-of-duty recorder circuit diagram shown in FIG. 32b, it may be seen that the circuits for pulsing magnet 395X are similar in all respects to those already described for magnet 395N.

*Forward axle count magnet 390N.*—Referring to FIGS. 22 and 24, it will be recalled that the forward axle counter 289 is employed to record the number of axles passing over an axle treadle, for example treadle 23 (see also FIG. 1), in a forward direction. As has already been described hereinbefore, relay R506, shown in FIG. 31a, is energized consequent upon a vehicle axle passing over treadle 23 a sufficient distance to cause relay R501 to drop out and R502 to pick up. Referring to FIG. 31c, after the vehicle axle has completely passed over the treadle so as to cause relay R502 to drop out, a circuit will be completed to forward axles magnet 390N from line 410 through contacts R501f, R502f, R506f, R506e, 387N n/c (see also FIGS. 22 and 23), and R516c, magnet 390N, to line 411. In response to the energization of this magnet, contacts 387N will be transferred and a circuit will be completed through the normally open points thereof to relay R516. A hold circuit for relay R516 will be formed immediately through contacts R516a. The separation of contacts R516c will cause magnet 390N to de-energize, and contacts 387N, in turn, will be restored. Relay R516 will be de-energized after relay R506 (FIG. 31a) is caused to drop out due to contacts R516e. It should be apparent at this time that magnet 390N will be operated once in response to each axle passing over treadle 23 (FIG. 31a) in a forward direction.

The circuit diagram for energizing the exit station forward axle count magnet 390X (FIG. 32c) will not be described inasmuch as the said circuit is similar to the one already described with respect to the entrance station tour-of-duty recorder.

*Sequence number count magnet 391N.*—It will be recalled that counter 290 (FIG. 22) is advanced one position in response to every toll recorder operation or cycle. Referring to FIG. 31b, a circuit will be completed to magnet 391N once for each toll recorder cycle, when cam contacts C10 close at 280°, from line 410 through contacts C10, 407N n/c (see also FIG. 22) and R511c, magnet 391N, to the other side of the line. Consequent upon the energization of magnet 391N, contacts 407N will transfer and a circuit will be completed to relay R511 through contacts 407N n/o. A hold circuit for relay R511 will be completed through contacts R511a during the effective period of cam contacts C10. As a result of the energization of this latter relay, contacts R511c will open to thereby cause magnet 391N to de-energize, and contacts 407N to return to a normal status. Relay 511, of course, will be de-energized when cam contacts C10 open at 305°.

The exit station sequence count magnet 391X, shown in FIG. 32b, is arranged in a similar circuit to the one already described for the entrance station recorder. For this reason, the exit station circuit for magnet 391X will not be described.

*Day magnet 396N.*—It will be recalled with reference to FIG. 25 that contacts 607 are caused to close once every twenty-four hours due to the operation of cam 604. As is shown in FIG. 31b, when entrance station toll recorder contacts 607N close, a circuit is formed to magnet 396N. Magnet 396N will be de-energized when contacts 607N are restored during the day print wheel advancing period.

*Minute magnet 625N.*—Timer contacts 598N (see FIGS. 28 and 31b) close once each minute to complete a circuit to magnet 625N via contacts 626N n/c and R514c. The resulting transfer of contacts 626N will complete a pick circuit to relay R514, whereas the operation of contacts R514a will form a hold circuit to relay R514. Magnet 625N will be de-energized when contacts R514c open.

*"\*" (asterisk).*—As is shown in FIGS. 31c and 32c, the entrance and exit tour-of-duty recorder asterisk print control magnets are 810N and 810X, respectively. With reference to FIG. 26 and the tour-of-duty recorder mechanism description, it will be recalled that the type element 580 for printing an asterisk, for example, will move outside of the printing line only if the control magnet 810 is energized. Referring now to the entrance station recorder circuit diagram shown in FIG. 31c, magnet 810N will be energized during every entrance station tour-of-duty recorder printing operation so long as power is applied to the toll recorder associated therewith to maintain relay R518 (see also FIG. 31i) picked. Suffice it to state for the present, contacts R530a must be closed during a tour-of-duty recorder operation. Hence, if relay R518 is picked and contacts R518g are closed, magnet 810N will be energized through contacts R530a and R518g. This will move the type element 580 (see also FIG. 26) outside of the printing line so as to avoid printing an asterisk on the summary sheet 50 (see also FIG. 24).

*Reverse vehicle motion "R" print control magnet.*—The mechanism controlled by this magnet, magnet 811N, is similar in all respects to the mechanism controlled by magnet 810N.

Relay R510 is picked consequent upon a vehicle axle passing over treadle 23 a sufficient distance in the reverse direction to pick up and drop out relay R502 and to pick up relay R501. As will be described shortly, a reverse vehicular movement over the axle treadle will cause a tour-of-duty recorder operation, and in so doing, contacts R530a (FIG. 31c) will be closed, whereas contacts R510f, will be opened. Thus, magnet 811N will be maintained de-energized, and the "R" type element which is arranged on a wheel similar to the "\*" wheel (see also FIG. 26), will be kept inside of the printing line.

*Overweight axle "V" print control magnet.*—It has been explained hereinbefore that relay R317 (FIG. 31f) will be energized consequent upon the toll recorder apparatus detecting an overweight vehicle axle. As will be described shortly, whenever a trip card is processed for a vehicle having an overweight axle, the tour-of-duty recorder associated with the afore-mentioned toll recorder, will be caused to effect a printing operation. Thus, during this printing operation a "V" will be printed on record sheet 50 (see line L2 in FIG. 24). The control magnet for the type wheel having a "V" type element thereon, is magnet 812N shown in FIG. 31c. This magnet is used to control a mechanism similar to that shown in FIG. 26 and described with reference to magnet 810. Thus, in the event a tour-of-duty recorder operation is effected as a result of an overweight axle vehicle trip card being processed, magnet 812 will fail to be energized due to contacts R317j being open, and a "V" will print.

(E1) Tour-of-Duty Recorder Operation

As stated previously, a tour-of-duty recorder may be caused to operate in response to any one of a number of conditions which have been enumerated in the Tour-of-Duty Recorder Mechanism description. The circuits that are formed as a result of these conditions will now be described in detail with reference to the entrance station tour-of-duty recorder, and inasmuch as these circuits are similar to the exit station tour-of-duty recorder circuits for accomplishing the same function, the exit station circuits will be referred to only briefly.

*(E1a) Insertion or removal of the toll collector's identification key.*—Relay R520 shown in FIG. 31a is a latch type relay. Thus, at any given time, the relay will either be picked as a result of the mechanical latch, or dropped out. If it is assumed that this relay is picked, the removal of the toll collector's identification key from the toll recorder will cause a circuit to be completed to print control magnet R530 (FIG. 31c) from line 410 through contacts R520c n/o, R520d and R518e n/c, relay R530, to the other side of the line. It may be pointed out here, once again, relay R518 (FIG. 31i) is maintained energized so long as power is applied to the toll recorder lines 401 and 402. Power is applied to these lines, however, only so long as the toll collector's identification key is in the toll recorder to keep contacts 261N (see also FIGS. 12 and 31d) closed. When contacts R530a (FIG. 31c) close, the print solenoid 397N (see also FIG. 22) will be energized to effect a tour-of-duty recorder print operation.

During the time that solenoid 397N is energized, contacts 399N and 398N are caused to close and to open, respectively. Thus, the latch trip coil of relay R530 will be energized through contacts 399N and 518c n/c. When a toll collector's key is placed within the toll recorder at some later time, to thereby close contacts 261N (FIG. 31d), a circuit will be completed to print control relay R530 through contacts R520c n/c (FIG. 31c), R520b, R514d and R518e n/o. Of course, relay R518 will at this time be energized inasmuch as the insertion of the toll collector's key into the toll recorder will cause power to be applied to the toll recorder lines.

*Reverse motion of vehicle across an axle counting treadle.*—Referring to FIG. 31a, it will be recalled that relay R510 is energized as a result of relays R502 and R501 being operated in the order given. As a result thereof, after relay R501 has been caused to drop out, a circuit will be completed to print control relay R530 (FIG. 31c) from line 410 through contacts R501f, R502f, R510d and R510e, relay R530, to the other side of the line. During the print stroke when contacts 398N (FIG. 31a) are caused to open, relay R510 is deenergized. This action will cause relay R530 (FIG. 31c) to become deenergized.

*The processing of a trip card for a vehicle having an overweight axle thereon.*—It will be recalled relay R317 (FIG. 31f) will be energized in response to the detection of a vehicle having an overweight axle thereon. As a result thereof, contacts R317j (FIG. 31b) will be closed so as to complete a circuit to relay R520LT (see also FIG. 31a) when cam contacts C9 close, from line 413 (FIG. 31b) through contacts C9, R317j and R518c n/o (FIG. 31a), relay R520LT, to line 414. The drop out of relay R520 will cause a circuit to be formed to relay R530 (FIG. 31c) through contacts R520c n/c, R520b, R521b and R518e n/o. The energization of this latter relay will, of course, cause print solenoid 397N to become energized in the manner described previously.

*A forward movement across a treadle when the toll collector's key is out of the toll recorder.*—It has been described previously that an axle caused to move in a forward direction over an axle treadle will cause a pulse to be directed to a forward axles magnet 390N (FIG. 31c), whereupon relay R516 will be picked. As is shown in FIG. 31a, in the event that relay R516 is picked, contacts R516f will be closed to complete a circuit to relay R520LP, only if there is no power being applied to the toll recorder. That is, a circuit will be formed from line 412, contacts 398N, R510a n/c, R516f and R518b n/c, relay R520LP, to line 414. Referring to FIG. 31c, the pick of relay R520 during the period that power is not applied to the toll recorder, i.e., during the time that relay R518 is de-energized, will cause a circuit to be completed through contacts R520c n/o, R520d and R518e n/c, to print control relay R530. During the print stroke when print solenoid 397N is energized, contacts 399N (FIG. 31a) will be closed to energize relay R520LT via contacts R518c n/c.

*Tour-of-duty recorder operation every hour on the hour.*—Hour contacts 601N (FIGS. 28 and 31c) are caused to close once each hour, whereby relay R521 is energized. When contacts R521a (FIG. 31a) closes a circuit will be compelted to relay R520LT through contacts 398N, R510a n/c, R521a and R518c n/o. Immediately upon the drop out of relay R520, print control relay R530 (see also FIG. 31c) will be conditioned for energization. Immediately upon the de-energization of relay R521, a circuit will be completed to relay R530 through contacts R520c n/c, R520b, R521b and R518e n/o. As before, during the print stroke when contacts 399N (FIG. 31a) are closed, relay R520LP will be energized via contacts R518b n/o.

*Manual operation.*—As is shown in FIG. 31c, switch 822 is interposed between line 410 and print solenoid 397N so that consequent upon the closing of this switch, print solenoid 397N will be energized to effect a printing operation.

Figure 2:
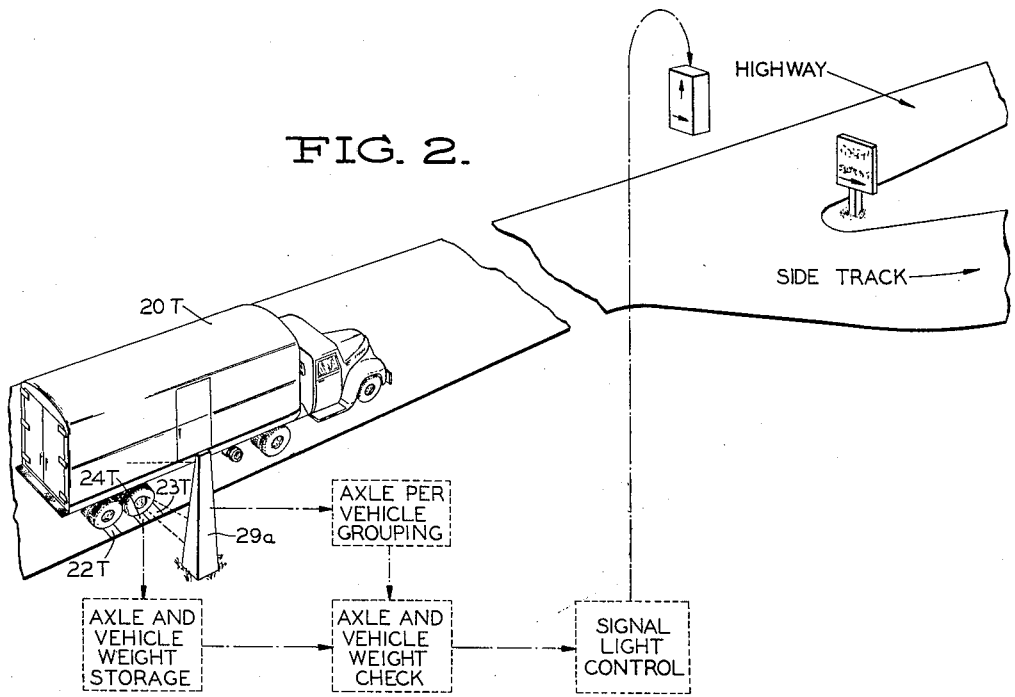
FIG. 2 shows a tandem axle treadle controlled dynamic weight signalling system.

*Two-axle tandem axle treadle control.*—Prior to describing the Operation and Summary of the present invention, it is desired to briefly touch upon the dynamic weighing scheme employing tandem axle treadles which as shown in FIG. 2 may or may not be a part of a toll recorder system. Tandem axle treadles 22T and 23T are shown to be arranged in a roadway approximately 46 to 48 inches apart and 500 feet, for example, ahead of a point in the highway at which a side track is situated. With the aforementioned treadles, weighing platform 24T is positioned in the roadway in order to weigh the dynamic axle load as the axle passes thereover. A photoelectric gating sysem identified by reference numeral 29a, is also provided so as to detect the presence of a vehicle prior to the first axle thereof moving over the treadle 23T. Thus, as truck 20T passes the dynamic weighing axle platform 24T, each axle may be checked for an overweight condition, and after truck 20T passes the platform 24T, the vehicle may be checked for an overweight condition. In the event that either an axle or the vehicle is heavier than the limit allowed by the authority governing the highway, a traffic signal may be operated to require the vehicle to move into the side track whereat the vehicle will be required to come to a complete stop so that a static weight thereof may be taken in order to substantiate the result obtained by the dynamic weighing apparatus.

In the event that neither an axle nor the vehicle is heavier than the weight limit, the traffic signal will be controlled so as to signify to the vehicle operator to by-pass the side track and, in fact, continue along the roadway.

Figure 3:
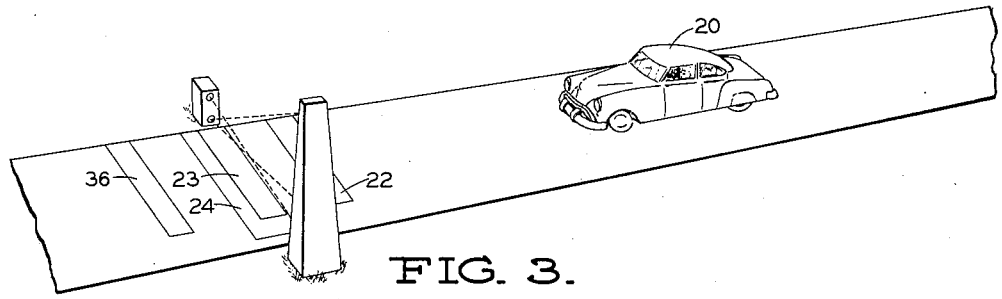
FIG. 3 is a perspective view of entrance lane treadle apparatus.

An examination of FIGS. 2 and 3 will show that the tandem axle treadle scheme being described at this time, includes only two treadles and does not have an additional treadle, such as treadle 36, beyond the weighing platform. Referring to FIG. 36, relay R20TLP may be energized consequent upon treadle 22T (see also FIG. 2), contacts 22Ta being closed simultaneously with the transfer of contacts R504Ta. Reference is made to FIG. 31a, wherein circuits similar to those for picking relay R504 may be used to pick R504T (not shown). Interlock relay R500 (FIG. 36) will also pick via contacts 22Ta and R504b with relay R20T, and will drop out when treadle contacts 22Ta open.

Relay R20T will remain picked for tandem axle comparison operations until a vehicle axle passes over only treadle 22T (see also FIG. 2), at which time a circuit will be completed to relay R20TLT via contacts 22Ta, R504Ta n/c and R500h.

(F) OPERATION AND SUMMARY

In order to provide a somewhat concise explanation of the operational aspects of the preferred embodiment of this invention, it will be assumed that a three-axle truck and a two-axle passenger vehicle are to pass from an entrance station to an exit station. Before describing the operation of the toll highway recorder system for the three-axle and two-axle vehicles, it will be assumed that prior to the first axle of the first vehicle, i.e., the truck, entering the entrance and exit stations, the following relays will be picked:

(1) Readout advance control relays R276 (FIG. 31l) and R1276 (FIG. 32q).

(2) Read-in advance control relays R211 (FIG. 31j) and R1211 (FIG. 32o).

(3) Condenser weight storage input relays R401 (FIG. 31i) and R1401 (FIG. 32q).

(4) Readout storage relays R301 (FIG. 31m) and R1301 (FIG. 32r).

Furthermore, it will be assumed that the second and third axles of the three-axle truck are tandem axles, and that the second axle of the truck is overweight. In addition, it will be assumed that the dynamic weight classification of the truck as determined at the entrance station is five, whereas the classification as determined at the exit station is eight. To account for this increase in dynamic weight classification, it may be assumed that an additional load is placed on the truck somewhere on route between the entrance and exit stations.

As the three-axle truck approaches the entrance station, the photogating light beams (see FIG. 3) will be broken, whereupon photo control relay R451 (FIG. 31r) will be caused to pick. In response to the first truck axle passing over treadle 23 (see also FIG. 1), relays R501 (FIG. 31a) and R502 will be operated in succession to indicate a forward axle movement. As the axle passes over weighing platform 24, a voltage signal corresponding to the truck first-axle weight will be directed from the weighing platform load cells (FIG. 31p) so that a resulting D.C. signal indicative of and proportional to the axle weight will then be directed along lines 424 and 425 to axle weight storage condensers SV (FIG. 31n) and S1 (it will be recalled that relay R401 is up). The voltage stored in condenser SV will be compared with the voltage available at the movable arm of potentiometer 745 (FIG. 31o) so as to determine whether the first axle is an overweight axle. In keeping with the conditions stated hereinbefore, i.e., that the first axle is not overweight, relay R270 (FIG. 31p) will be energized, whereupon the overweight axle storage relay R252LP (FIG. 31j) will not be energized. During the forward motion of the first axle over the treadle, relay R201 (FIG. 31i) will be caused to operate, whereupon the read-in advance pick circuits control ring (FIG. 31j) will be advanced from relay R211 to R212, and the condenser weight storage input control will be advanced to relay R404. In addition, inasmuch as first-axle storage control relay R273 (FIG. 31i) is not picked during the time that the first axle is passing over the treadle, first-axle storage relay R229LP (FIG. 31j) will not be energized.

Due to the fact that the second and third axles of the afore-mentioned truck are tandem axles, these axles will pass over treadles 22 (see FIG. 1) and 23 simultaneously, whereby relay R20LP (FIG. 31b) will be energized. This will cause contacts R20a (FIG. 31o) to transfer so that the weighing platform controlled voltage corresponding to an axle weight may be compared with a tandem axle weight limit voltage instead of a single axle weight limit voltage. As the second axle passes over weighing platform 24, a signal corresponding to the weight of this axle will be directed along lines 424 and 425 to axle weight storage condensers S2 (FIG. 31n) and SV. During the forward motion of the second axle of the first vehicle over the treadle, relay R201 will be operated, the read-in advance control ring will be advanced from relay R212 (FIG. 31j) to R214, the first axle storage relay R230LP will be energized, as will be overweight axle storage relay R253LP, and the capacitor weight storage input control relay R406. It will be recalled that under the conditions set forth hereinbefore, the second axle of the truck is assumed to be overweight. As a result of the comparison between the second axle weight voltage stored in condenser SV (FIG. 31n) and the tandem axle voltage standard available at the movable arm of potentiometer 833 (FIG. 31o), relay R270 (FIG. 31p) will be de-energized to indicate an overweight axle, and relay R253LP (FIG. 31j) will be energized to indicate that it is the second axle of the first vehicle which is overweight.

As the third vehicle axle passes over the treadle and the weighing platform, the D.C. signal corresponding to the weight of this axle will be directed to axle weight condensers S3 and SV, and the read-in advance ring will be advanced to relay R215 (FIG. 31j), the first axle storage relay R231LP will be energized, whereas the overweight axle relay R254LP will not be energized. Furthermore, the condenser weight storage input control relay R409 (FIG. 31i) will be energized.

A continued forward motion of the truck will cause the first axle thereof to pass over treadle 36 (see FIGS. 1 and 31b), whereupon relay R20LT will be energized to condition the entrance station system once again for so-called single axles. A continued forward motion of the vehicle will cause photo control relay R451 (FIG. 31r) to drop out when the photogating light beams are no longer interrupted. During the forward motion of the vehicle axles over treadle 23 (FIG. 1), axle count pulses will be directed to forward axle magnet 390N (FIG. 31c).

The presence of the second vehicle, a two-axle passenger automobile, at the entrance station will cause photo control relay R451 to pick once again. As the second vehicle first axle passes over treadle 23 (FIG. 1) and weighing platform 24, a signal corresponding to the weight of this axle will be directed to axle weight condensers S4 (FIG. 31n) and SV, the read-in advance ring will be advanced to the relay R217LP (FIG. 31j), and relay R411 (FIG. 31i) will be energized. Inasmuch as this axle is the first axle of the second vehicle, first-axle storage relay R232LP will not be energized. Since the first axle is not an overweight axle, overweight axle relay R255LP will not be energized.

The second axle of the second vehicle passing over the treadle and the weighing platform will cause an axle weight signal to be directed to axle storage condensers S5 and SV, the read-in advance ring to advance to relay R218LP (FIG. 31j), weight storage relay R414 (FIG. 31i) to pick, and the first axle storage relay R233LP to pick. The overweight axle storage relay R256 will not be picked because the axle weight is below the maximum axle weight limit.

After the truck is stopped opposite toll booth 21 (FIG. 1), the toll collector will examine the vehicle for the number of axles it carries prior to operating a corresponding axle count axle key in unit 33. Inasmuch as the truck is a three-axle vehicle, the toll collector will depress the three-axle key A3 (FIG. 31d) so as to energize relay R6. As soon as contacts R6b (FIG. 31g) close, an axles per vehicle check test will be made in order to compare the axles per vehicle grouped automatically by the operation of the first-axle storage relays, with the axles per vehicle grouped manually by the operation of the axle key. Inasmuch as the three-axle key is operated, and since the truck is actually a three-axle vehicle, axles per vehicle check relay R316 (FIG. 31g) will be picked to indicate that the axles per vehicle agree. In addition, immediately upon the transfer of contacts R6e (FIG. 31h), a circuit will be completed through overweight axle storage relay contacts R253b (relay R253 is picked due to the second axle on the first vehicle being overweight) to overweight axles relay R317P shown in FIG. 31f.

The toll collector will then place a trip card into the card receiver of the toll recorder with proper regard to corner cut, whereby contacts 127N (FIG. 31e) and 132N will be closed, and contacts 136N will be permitted to remain in a normal position. Hence, relay R54 will be picked. The transfer of contacts R54b will cause a circuit to be completed to indicator light delay relay R64 whose contacts R64c (FIG. 31m), in turn, will then cause a circuit to be completed via the overweight axles contacts R317b n/c to overweight axle light OL2, bumper lights BL1 and BL4, and axle lights AL1 through AL5. This, as may be seen in FIG. 8, will reveal to the toll collector on his indicator panel that there are two vehicles in the entrance station lane as repersented by the bumper masks BLa and BLd, that the first vehicle includes three axles whereas the second vehicle includes two axles, as is represented by the axle masks ALa through ALe, and that the second axle of the first vehicle is overweight as is indicated by the mask OLb.

In order to cause a toll recorder operation, notwithstanding the overweight axle condition, the toll collector must operate release key RK1 (FIG. 31e) in order to energize classify relay delay R226. Consequent upon the closing of contacts R226b, start classify No. 1 relay R262 will be energized. The contacts thereof shown in FIG. 31h will transfer in order to complete circuits to condenser weight storage output control relays R426, R429 and R431. These relays will place the condensers S1 (FIG. 31n) through S3 in series circuit so that the total voltage thereof which is indicative of the total vehicle weight, may be obtained. Due to the transfer of the condenser weight storage output relay contacts shown in FIG. 31f, start classify No. 2 relay R392 will be energized. The closing of contacts R392f (FIG. 31o) will cause start classify No. 3 relay R391 to pick, whereupon the ripple circuit which includes relays R376 through R390 will start to advance. Inasmuch as it has been assumed that the truck has a classification of five, a signal will be directed to the left plate of vacuum tube V1 when relay R382LP is energized, which signal will cause the energization of end classify relay R394 (FIG. 31p) so as to stop any further advancement of the ripple circuit.

When relay R226 is energized due to the operation of release key RK1 (FIG. 31d), the R226d contacts will cause a circuit to be completed to release card interposer 153N which, in turn, will cause contacts 155N to close. As a result thereof, clutch interlock relay R63P will be energized via contacts R394c so that circuits to the various punch interposer magnets may be formed via the clutch interlock relay contacts. Consequent upon the punch interposer magnets being energized, whereby the interposers will be moved so as to close contacts 194N, punch and print magnet 203N will be energized to effect a toll recorder operation, or cycle, whereby the first vehicle trip card will be validated.

The ripple circuit timing ring reset will begin during the toll recorder operation when relay R394H (FIG. 31f) is de-energized and contacts R394e (FIG. 31o) are caused to close, whereupon reset relay R390 will alone remain picked. Relay R376LP cannot be picked during the reset operation due to the open R391b contacts, and relay R390LT cannot be energized inasmuch as contacts R376d are open.

During the toll recorder operation readout advance control relay R19 (FIG. 31b) will be operated once for each axle. As may be seen in FIG. 31l, the R19a contacts advance the readout advance control ring in much the same manner that the read-in advance control ring is caused to advance. Inasmuch as contacts R19a will operate three times, once for each of three axles, the readout advance ring will be advanced from relay R276 to relay R280. At the same time, the latch trip coils of relays R276 through R279 will be energized, the first axle storage coils R230LT and R231LT will be energized, and the overweight axle storage coil R253LT (FIG. 31k) will be energized. Furthermore, during the toll recorder operation, axle keyed pulses corresponding to the number of axles keyed in unit 33 (FIG. 1) will be directed to magnet 395N (FIG. 31b), and a sequence count pulse will be directed to magnet 391N.

When the second vehicle, i.e., the two-axle passenger vehicle, is stopped opposite the entrance station toll booth, the toll collector will operate a two-axle key so as to effect the energization of relay R5 (FIG. 31d). An axles per vehicle check will cause relay R316 (FIG. 31g) to pick, inasmuch as the number of axles grouped automatically and manually is the same. Since there are no second vehicle overweight axles, relay R317P (FIG. 31f) will not pick.

Consequent upon the full and proper insertion of a trip card into the card receiver of the entrance station toll recorder, relays R54 (FIG. 31e) and R64 will pick. Since there are no overweight axles and inasmuch as the axles check relay R316 is picked, the indicator panel lights shown in FIG. 31m will not be energized.

Classify delay relay R226 (FIG. 31e) will pick via the contacts R64a so that start classify No. 1 relay R262 will be energized through the contacts R226b. The contacts of relay R262 shown in FIG. 31h will transfer to complete circuits to condenser weight storage output control relays R434 and R436, whereupon the axle storage condensers S4 (FIG. 31n) and S5 will be connected in series circuit to provide a second vehicle total weight voltage. In response to the energization of relay R392 (FIG. 31f) and the closing of contacts R392f (FIG. 31o), the ripple circuit timing ring will start to advance, to thereby effect a vehicle classification determination for the second vehicle, during which time relay R394 will be caused to pick.

Due to the closing of contacts R394c (FIG. 31e), and the closing of contacts 155N in response to interposer 153N being energized, relay R63P will pick so that circuits to the various punch interposer magnets may be formed. Consequent upon contacts 194N closing due to the energization of punch interposer magnets, magnet 203N will be energized so as to effect a toll recorder operation, whereby the second vehicle trip card will be validated.

During the toll recorder operation, the ripple circuit timing ring will be reset, and the readout advance ring will be advanced from relay R280 (FIG. 31l) to relay R283. During the same period, coils R280LT and R282LT will be energized, as will first-axle storage coil R233LT. Since the readout advance ring has been caused to advance to a point corresponding to the relay picked in the read-in advance ring, the no axles stored relay R265 (FIG. 31m) will be energized via the contacts R283e n/o and R218f n/o. In addition, axle keyed pulses will be directed to magnet 395N (FIG. 31b), and a sequence count pulse will be applied to magnet 391N.

As the three-axle truck approaches the exit station, the photogating light beams threat will be broken and relay R1451 (FIG. 32x) will be caused to pick. In response to the first axle of the first vehicle passing over treadle 37 (FIG. 1), relays R1291 (FIG. 32n) and R1292 will be picked in succession to indicate a forward axle motion. This forward motion over weighing platform 38 will cause an axle weight representing voltage signal to be directed from the weighing platform load cells (FIG. 32v) and along lines 1424 and 1425, to axle storage condenser S11 (FIG. 32t). Furthermore, the read-in advance ring will be advanced from relay R1211 (FIG. 32o) to R1212, the condenser weight storage input control will be advanced to relay R1404 (FIG. 32q), and the first-axle storage relay R1229LP (FIG. 32o) will not be picked.

In a similar fashion the second and third first vehicle axles will cause the read-in advance ring to be advanced from relay R1212 to R1215, and the condenser weight storage input control to be advanced from relay R1404 (FIG. 32q) to R1409. The second and third axle weights will be stored in condensers S12 (FIG. 32t) and S13, respectively, and the first-axle storage relays R1230LP (FIG. 32o) and R1231LP will be caused to pick.

The passage of the two-axle second vehicle over the treadle and weighing platform will cause the read-in advance ring to advance to relay R1218, the condenser weight storage input control to advance to relay R1414 (FIG. 32q), the axle weights to be stored in condensers S14 (FIG. 32t) and S15, respectively, and the first-axle storage relay R1233LP (FIG. 32o) to pick.

When the truck, i.e., the first vehicle, is halted opposite toll booth 35 (FIG. 1), the exit station toll collector will examine the vehicle for the number of axles thereon. Since the truck is a three-axle vehicle, the toll collector will depress the three-axle key A13 (FIG. 32d) so as to energize relay R1006. An axles per vehicle check test will be made in order to compare the axles per vehicle grouped automatically by the operation of the first-axle storage relays, with the axles per vehicle grouped manually by the operation of key A13. Due to the fact that a three-axle key is operated for a three-axle vehicle, relay R1316 (FIG. 32g) will pick.

The toll collector will then place the entrance station validated trip card into the card receiver of the exit station toll recorder, whereupon contacts 127X (FIG. 32e) and 132X will close, and contacts 136X will remain normal. Hence, relay R1054 will pick. Immediately thereafter, sensing magnet 165 (see also FIGS. 18 and 32d) will be energized, whereupon the perforated information entered on the trip card at the entrance station, may be analyzed so that the exit station toll recorder circuits may effect the following determinations:

(1) Excess time was not required for the first vehicle while moving within a single zone checking area from the entrance station to the exit station, as is indicated by the energization of relays R1100H (FIG. 32k) and R1100P (FIG. 32m), respectively.

(2) The absence of a cancellation hole as is indicated by the normal status of contacts 465 (FIG. 32e).

(3) The number of axles per vehicle perforated in the trip card is the same as the number of axles keyed, as is indicated by the energization of relay R1059 (FIG. 32f).

(4) An entrance station number is perforated in the trip card, as is indicated by the energization of relay R1065 (FIG. 32f).

(5) The exit station vehicle classification does not exceed the entrance station vehicle classification by two or more classes, as is indicated by the energization of relay R1318 (FIG. 32s).

In connection with the last enumerated point hereinabove, the exit station vehicle classification for the first vehicle will be determined after the voltages stored in condensers S11 (FIG. 32t) through S15 are connected in series circuit due to the energization of condenser output storage control relays R1426 (FIG. 32h), R1429 and R1431, and are compared with the different class voltage standards under control of the ripple circuit timing ring including relays R1377 (FIG. 32s) through R1388. Inasmuch as it has been assumed that the truck, i.e., the first vehicle, has an exit station classification of eight, a signal will be transmitted to energize end classify relay R1394 (FIG. 32u) when relay R1387LP (FIG. 32s) is energized. Accordingly, relay R1318P will be energized due to the fact that the exit station classification value exceeds the entrance station value by more than one.

Contacts 155X (FIGS. 12 and 32e) will be closed in response to the energization of release card interposer 153X. As a result thereof, clutch interlock relay R1063P and indicator lights delay relay R1064P will be picked. Since axles check relay R1316 (FIG. 32g) and axles agree relay R1059 (FIG. 32f) are energized, none of the indicator lamps (see FIG. 32r) at the exit station will be lit.

The contacts common to relay R1063 will form circuits to various punch interposer magnets which will cause a recording of exit station perforated data on the trip card. It may be pointed out here that the dynamic weight class value determined at the exit station will be punched in the trip card due to the fact that contacts R1318d (FIG. 32e) will be closed because the exit station classification exceeds the entrance station classification by a value greater than one.

Consequent upon the energization of the punch interposer magnets, contacts 194X (FIG. 32e) will be caused to close, to thereby complete a circuit to print and punch clutch magnet 203X. As a result, an exit station toll recorder operation will be effected, whereby the trip card for the first vehicle will be completely processed. During this recorder operation, the ripple circuit will be reset to relay R1388 (FIG. 32s), the readout control ring will be advanced from relay R1276 (FIG. 32q) to relay R1280, and the first-axle storage coils R1230LT (FIG. 32p) and R1231LT will be energized. In addition, pulses corresponding to the number of axles keyed will be directed to magnet 395X (FIG. 32b), and a sequence count pulse will be directed to magnet 391X.

During the forward motion of the first vehicle axles over treadle 39 (see FIG. 1), axle count pulses will be directed to forward axles magnet R390X (FIG. 32c) and to the zero control counter 46 (FIG. 1) which includes relays R1109 (FIG. 32j) through R1124. Due to the fact that the counter has stored therein the axles keyed value, and since the axles passing over the treadle are subtracted from the axles keyed value, the counter balance will indicate the relationship between the two counts. Inasmuch as the first vehicle trip card is completely processed prior to the vehicle axles passing over treadle 39, the zero control balance must, of necessity be entered on the next following trip card.

The operation of the exit station toll recorder circuits for the two-axle vehicle is similar to that for the preceding three-axle vehicle, except for the energization of the classes agree relay R1318P (FIG. 32s). During this recorder operation, the ripple circuit will be reset to relay R1388, the readout control ring will be advanced from relay R1280 (FIG. 32q) to R1283, and the first-axle storage relay R1233 (FIG. 32p) will be caused to drop out. As indicated above, the zero control balance for the preceding three-axle truck will be entered on the two-axle vehicle trip card.

It will be recalled that the condenser weight storage output relays, entrance station relays R426 (FIG. 31h) through R449 for example, are energized under control of contacts common to the axle key relays R4 (FIG. 31d) through R9. These relays are shown to be manually controlled in FIG. 31d, whereas the same relays are shown in FIG. 35 to be governed automatically by the first axle storage relays R229 (see also FIG. 31i) through R238. If, for example, relay R229 corresponds to the first axle of a three-axle vehicle, only relays R230 and R231 will be picked. Inasmuch as readout storage relay R301 (FIG. 31m) will also be picked (assuming the readout advance control ring to be at relay R276), the three-axle representing relay R6E will be picked via contacts R301t, R229t, R230u, R231u and R232t. Hence, an automatic axles per vehicle manifestation for one through six relays may be had for any first-axle storage relay ring combination by employing a switching network having ten circuits, each similar to that shown in FIG. 35, and employing the contacts shown in the following tables 1a and 1b:

*Table 1a*

CIRCUITS

|    | 1 | 2 | 3 | 4 | 5 |
|----|------|------|------|------|------|
| 1  | R301t | R304t | R307t | R301t | R313t |
| 2  | R229t | R230v | R231x | R232z | R233q |
| 3  | R230t | R231v | R232x | R233z | R234q |
| 4  | R230u | R231w | R232y | R233p | R234r |
| 5  | R231t | R232v | R233x | R234z | R235z |
| 6  | R231u | R232w | R233y | R234p | R235p |
| 7  | R232t | R233v | R234x | R235x | R236x |
| 8  | R232u | R233w | R234y | R235y | R236y |
| 9  | R233t | R234v | R235v | R236v | R237v |
| 10 | R233u | R234w | R235w | R236w | R237w |
| 11 | R234t | R235t | R236t | R237t | R238t |
| 12 | R234u | R235u | R236u | R237u | R239v |

*Table 1b*

CIRCUITS

|    | 6 | 7 | 8 | 9 | 10 |
|----|------|------|------|------|------|
| 1  | R236t | R329t | R332t | R335t | R338t |
| 2  | R234s | R235s | R236s | R237s | R238s |
| 3  | R235q | R236q | R237q | R238q | R229r |
| 4  | R235r | R236r | R237r | R238r | R229s |
| 5  | R236z | R237z | R238z | R229p | R230r |
| 6  | R236p | R237p | R238p | R229q | R230s |
| 7  | R237x | R238x | R229y | R230p | R231r |
| 8  | R237y | R238y | R229z | R230q | R231s |
| 9  | R238v | R229w | R230y | R231p | R232r |
| 10 | R238w | R229x | R230z | R231q | R232s |
| 11 | R229u | R230w | R231y | R232p | R233r |
| 12 | R229v | R230x | R231z | R232q | R233s |

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A toll highway recorder system comprising a first treadle having an associated apparatus which is operated in response to a vehicle axle passing over said first treadle, a second treadle, a latch type relay having a latch pick coil and a latch trip coil, means controlled by said first and said second treadles for effecting the energization of said latch pick coil in response to a pair of vehicle axles passing over said first and said second treadles simultaneously, a vehicle axle weighing apparatus arranged with respect to said first treadle so as to provide an axle weight output during the period said first treadle apparatus is operated, a variable voltage emitting device controlled by said weighing apparatus for providing a voltage output which is proportional to an axle weight applied to said weighing apparatus, a storage capacitor, means controlled by said first treadle apparatus for clearing out of capacitor storage the axle weight voltage of a preceding axle prior to the entry therein of the axle weight voltage of a succeeding axle, a first treadle apparatus controlled electrical circuit for connecting said voltage emitting device to said storage means during the period said first treadle apparatus is operated, means for manifesting a single axle weight limit voltage and a tandem axle weight limit voltage, means controlled by said manifesting means and said storage means for comparing the stored vehicle axle weight voltage with an axle weight limit voltage, a switching circuit controlled by said relay for controlling said manifesting means so that the tandem axle weight limit voltage is compared with the stored axle weight voltage consequent upon the operation of said relay, a third treadle located in the roadway at a position beyond said first and said second treadles so that the first vehicle axle of a pair of tandem axles passes over said third treadle after the second one of the tandem axles moves past said weighing apparatus, and means controlled by said third treadle for effecting the energization of said latch trip coil in response to a vehicle axle moving past said third treadle, whereby a single axle weight limit is applied to said comparing means.

2. A toll highway recorder system comprising a first treadle, a second treadle having an associated apparatus which is operated in response to a vehicle axle passing over said second treadle, a latch type relay having a latch pick coil and a latch trip coil, switch means controlled by said first and said second treadles for effecting the energization of said latch pick coil in response to a pair of tandem vehicle axles passing over said first and said second treadles simultaneously, a vehicle axle weighing apparatus arranged with respect to said second treadle so as to provide an axle weight output during the period said second treadle apparatus is operated, a variable voltage emitting device controlled by said weighing apparatus for providing a voltage output which is proportional to an axle weight applied to said weighing apparatus, a storage capacitor, means controlled by said second treadle apparatus for clearing out of capacitor storage the axle weight voltage of a preceding axle prior to the entry therein of the axle weight voltage of a succeeding axle, a second treadle apparatus controlled electrical circuit for connecting said voltage emitting device to said storage capacitor during the period said second treadle apparatus is operated, means for manifesting a single axle weight limit voltage and a tandem axle weight limit voltage, means controlled by said manifesting means and said storage capacitor for comparing the stored vehicle axle weight voltage with an axle weight limit voltage, a switching circuit controlled by said relay for controlling said manifesting means so that the tandem axle weight limit voltage is compared with the stored axle weight voltage consequent upon the operation of said relay, and means controlled by said first treadle for effecting the energization of said latch trip coil in response to a single vehicle axle moving past said first treadle, whereby a single axle weight limit is applied to said comparing means.

References Cited in the file of this patent

UNITED STATES PATENTS

| | | |
|---|---|---|
| 1,101,999 | Clark | June 30, 1914 |
| 1,508,162 | Chubb | Sept. 9, 1924 |
| 2,092,178 | Murphy | Sept. 7, 1937 |
| 2,266,779 | Loughridge et al. | Dec. 23, 1941 |
| 2,308,729 | Walter | Jan. 19, 1943 |
| 2,349,437 | Keeler | May 23, 1944 |
| 2,551,977 | Smith | May 8, 1951 |
| 2,603,419 | Barker et al. | July 15, 1952 |
| 2,621,101 | Cooper | Dec. 9, 1952 |
| 2,646,270 | Thayer | July 21, 1953 |
| 2,672,393 | Cooper | Mar. 16, 1954 |
| 2,688,458 | Schieser et al. | Sept. 7, 1954 |
| 2,688,459 | Merrill et al. | Sept. 7, 1954 |
| 2,700,755 | Burkhart | Jan. 25, 1955 |
| 2,714,201 | Whitehead | July 26, 1955 |
| 2,784,911 | Cooper | Mar. 12, 1957 |
| 2,806,685 | Vande Sande et al. | Sept. 17, 1957 |
| 2,843,839 | Cunningham et al. | July 15, 1958 |

FOREIGN PATENTS

| | | |
|---|---|---|
| 880,182 | France | Dec. 18, 1942 |